United States Patent
Jaafar-Thiel et al.

(10) Patent No.: US 12,447,217 B2
(45) Date of Patent: *Oct. 21, 2025

(54) FIBROBLAST ACTIVATION PROTEIN (FAP) INHIBITORS, FAP CONJUGATES, AND DIAGNOSTIC AND THERAPEUTIC USES THEREOF

(71) Applicants: Nuclidium AG, Basel (CH); University of Basel, Basel (CH)

(72) Inventors: Leila Jaafar-Thiel, Erlangen (DE); Melpomeni Fani, Basel (CH); Jacopo Millul, Basel (CH); Francesco De Rose, Munich (DE)

(73) Assignees: Nuclidium AG, Basel (CH); University of Basel, Basel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,209

(22) Filed: Sep. 25, 2023

(65) Prior Publication Data

US 2024/0131203 A1 Apr. 25, 2024

Related U.S. Application Data

(60) Provisional application No. 63/520,323, filed on Aug. 17, 2023, provisional application No. 63/520,329, filed on Aug. 17, 2023, provisional application No. 63/416,479, filed on Oct. 14, 2022, provisional application No. 63/409,687, filed on Sep. 23, 2022.

(51) Int. Cl.

| | |
|---|---|
| *A61K 51/00* | (2006.01) |
| *A61K 51/04* | (2006.01) |
| *A61M 36/14* | (2006.01) |
| *C07F 1/08* | (2006.01) |

(52) U.S. Cl.
CPC ............ *A61K 51/0482* (2013.01); *C07F 1/08* (2013.01); *A61K 2121/00* (2013.01); *A61K 2123/00* (2013.01)

(58) Field of Classification Search
CPC ............ A61K 51/0482; A61K 2121/00; A61K 2123/00; A61K 51/0455; A61K 51/0497; A61K 47/545; C07F 1/08; C07B 2200/05; C07B 59/004; A61P 35/00; C07D 401/12; C07D 401/14
See application file for complete search history.

(56) References Cited

U.S. PATENT DOCUMENTS

| | | |
|---|---|---|
| 6,306,393 B1 | 10/2001 | Goldenberg |
| 6,875,886 B2 | 4/2005 | Frangioni |
| 7,960,342 B2 | 6/2011 | Rivier et al. |
| 8,501,687 B2 | 8/2013 | Rivier et al. |
| 8,691,761 B2 | 4/2014 | Rivier et al. |
| 11,318,121 B2 | 5/2022 | Low et al. |
| 11,413,360 B2 | 8/2022 | Wurzer et al. |
| 11,497,822 B1 | 11/2022 | Kim et al. |
| 11,661,402 B2 | 5/2023 | Pomper et al. |
| 2004/0097418 A1 | 5/2004 | Coy et al. |
| 2008/0199370 A1 | 8/2008 | Mourtada et al. |
| 2008/0299040 A1 | 12/2008 | Rivier et al. |
| 2008/0311037 A1 | 12/2008 | Heston et al. |
| 2010/0183509 A1 | 7/2010 | Babich et al. |
| 2014/0323718 A1 | 10/2014 | Donnelly et al. |
| 2016/0228587 A1 | 8/2016 | Eder et al. |
| 2022/0016274 A1 | 1/2022 | McCann |
| 2022/0096663 A1 | 3/2022 | Basilion et al. |
| 2022/0118120 A1 | 4/2022 | Wurzer et al. |
| 2023/0147962 A1 | 5/2023 | Biancofiore et al. |

FOREIGN PATENT DOCUMENTS

| | | |
|---|---|---|
| AU | 2018382479 A1 | 4/2020 |
| EP | 0607103 A2 | 7/1994 |
| EP | 2076535 B1 | 3/2013 |
| EP | 2433963 B1 | 6/2014 |
| EP | 2383289 B1 | 10/2014 |
| EP | 2801582 A1 | 11/2014 |
| EP | 2801582 B1 | 9/2017 |
| EP | 3495355 A1 | 6/2019 |
| KR | 10-2022-0006286 A | 1/2022 |
| WO | WO 2008/048942 A2 | 4/2008 |
| WO | WO 2009/129311 A2 | 10/2009 |
| WO | WO 2010/108125 A2 | 9/2010 |
| WO | WO 2013/029616 A1 | 3/2013 |
| WO | WO 2015/175972 A2 | 11/2015 |
| WO | WO 2018/111989 A1 | 6/2018 |
| WO | WO 2018/215627 A1 | 11/2018 |
| WO | WO 2019/083990 A2 | 5/2019 |

(Continued)

OTHER PUBLICATIONS

Greifenstein, L.N, (2019) Synthesis, radiolabeling and in vitro and in vivo evaluation of different chelator systems with 44Sc, 64Cu, 68Ga and 177Lu (Doctoral dissertation, Dissertation, Mainz, Johannes Gutenberg-Universität, 2019).*
Mansour et al. (Nucl. Med. Biol. 2018, 56, 31-38).*
Moon et al. (EJNMMI Radiopharm. Chem. (2020) 5:19, pp. 1-20).*
Anderson, R-C. et al. "Management Impact of $^{68}$Ga-DOTATATE PET/CT in Neuroendocrine Tumors." Nuclear Medicine and Molecular Imaging, vol. 55, Jan. 7, 2021, pp. 31-37.
Banerjee, S. R. et al. "$^{64}$Cu-Labeled Inhibitors of Prostate-Specific Membrane Antigen for PET Imaging of Prostate Cancer." Journal of Medicinal Chemistry, vol. 57, No. 6, Mar. 27, 2014, pp. 2657-2669.
Banerjee, S. R. et al. "$^{68}$Ga-Labeled Inhibitors of Prostate-Specific Membrane Antigen (PSMA) for Imaging Prostate Cancer." Journal of Medicinal Chemistry, vol. 53, No. 14, Jul. 22, 2010, pp. 5333-5341.

(Continued)

*Primary Examiner* — Michael G. Hartley
*Assistant Examiner* — Melissa J Perreira
(74) *Attorney, Agent, or Firm* — Olivia Uitto; Carl Morales; Goodwin Procter LLP

(57) ABSTRACT

The present disclosure relates to the field of fibroblast activation protein (FAP) inhibitors, conjugates comprising the novel FAP inhibitors, including radiotracers, for the imaging, diagnosis and treatment of conditions characterized by overexpression of FAP.

33 Claims, 25 Drawing Sheets

(56) References Cited

FOREIGN PATENT DOCUMENTS

| WO | WO 2019/115547 A1 | 6/2019 | |
|---|---|---|---|
| WO | WO 2019/154886 A1 | 8/2019 | |
| WO | WO-2021160825 A1 * | 8/2021 | ........... A61K 47/545 |
| WO | WO 2021/225760 A1 | 11/2021 | |
| WO | WO 2022/099420 A1 | 5/2022 | |
| WO | WO-2022171811 A1 * | 8/2022 | ........... A61K 47/545 |
| WO | WO 2022/212958 A1 | 10/2022 | |
| WO | WO 2022/266499 A1 | 12/2022 | |
| WO | WO 2023/057457 A1 | 4/2023 | |
| WO | WO 2023/144379 A1 | 8/2023 | |

OTHER PUBLICATIONS

Baum, R. P. et al. "First-in-Human Study of Novel SSTR Antagonist $^{177}$Lu-DOTA-LM3 for Peptide Receptor Radionuclide Therapy in Patients with Metastatic Neuroendocrine Neoplasms: Dosimetry, Safety and Efficacy." The Journal of Nuclear Medicine, vol. 62, No. 11, Nov. 2021, pp. 1571-1581.

Baum, R. P. et al. "First-in-Human Study of Novel SSTR Antagonist $^{177}$Lu-DOTA-LM3 for Peptide Receptor Radionuclide Therapy in Patients with Metastatic Neuroendocrine Neoplasms: Dosimetry, Safety and Efficacy." The Journal of Nuclear Medicine, Epub, Mar. 5, 2021, pp. 1-30.

Bauer, W. et al. "SMS 201-995: A Very Potent and Selective Octapeptide Analogue of Somatostatin with Prolonged Action." Life Sciences, vol. 31, No. 11, Sep. 13, 1982, pp. 1133-1140.

Bavelaar, B. M. et al. "Subcellular Targeting of Theranostic Radionuclides." Frontiers in Pharmacology, vol. 9, Sep. 2018, pp. 1-17.

Benešová, M. et al. "Albumin-Binding PSMA Ligands: Optimization of the Tissue Distribution Profile." Molecular Pharamceutics, vol. 15, No. 3, Mar. 5, 2018, pp. 934-946.

Benešová, M. et al. "Linker Modification Strategies to Control the Prostate-Specific Membrane Antigen (PSMA)-Targeting and Pharmacokinetic Properties of DOTA-Conjugated PSMA Inhibitors." Journal of Medicinal Chemistry, vol. 59, No. 5, Mar. 10, 2016, pp. 1761-1775.

Benešová, M. et al. "Preclinical Evaluation of a Tailor-Made DOTA-Conjugated PSMA Inhibitor with Optimized Linker Moiety for Imaging and Endoradiotherapy of Prostate Cancer." The Journal of Nuclear Medicine, vol. 56, No. 6, Jun. 2015, pp. 914-920.

Bernabeu, T. B. et al. "$^{61}$Cu-PSMA: A New Radiotracer for PET Imaging of Prostate Cancer." 34th Annual Congress of the European Association of Nuclear Medicine, Oct. 20-23, 2021, 10 slides.

Bois, F. et al. "[$^{68}$Ga]Ga-PSMA-11 in Prostate Cancer: A Comprehensive Review." American Journal of Nuclear Medicine and Molecular Imaging, vol. 10, No. 6, Dec. 15, 2020, pp. 349-374.

Brabander, T. et al. "Long-Term Efficacy, Survival, and Safety of [$^{177}$Lu-DOTA°, Tyr$^3$]octreotate in Patients with Gastroenteropancreatic and Bronchial Neuroendocrine Tumors." Clinical Cancer Research, vol. 23, No. 16, Aug. 15, 2017, pp. 4617-4624.

Calderoni, L. et al. "Evaluation of an Automated Module Synthesis and a Sterile Cold Kit-Based Preparation of $^{68}$Ga-PSMA-11 in Patients with Prostate Cancer." The Journal of Nuclear Medicine, vol. 61, No. 5, May 2020, pp. 716-722.

Cardinale, J. et al. "Preclinical Evaluation of $^{18}$F-PSMA-1007, a New Prostate-Specific Membrane Antigen Ligand for Prostate Cancer Imaging." The Journal of Nuclear Medicine, vol. 58, No. 3, Mar. 2017, pp. 425-431.

Cardinale, J. et al. "Procedures for the GMP-Compliant Production and Quality Control of [$^{18}$F]PSMA-1007: A Next Generation Radiofluorinated Tracers for the Detection of Prostate Cancer." Pharmaceuticals, vol. 10, No. 4, Sep. 27, 2017, pp. 1-18.

Casnici, C. et al. "Anti-Inflammatory Effect of Somatostatin Analogue Octreotide on Rheumatoid Arthritis Synoviocytes." Inflammation, vol. 41, No. 5, Oct. 2018, pp. 1648-1660.

Cescato, R. et al. "Design and in vitro Characterization of Highly Sst$_2$-Selective Somatostatin Antagonists Suitable for Radio-Targeting." Journal of Medicinal Chemistry, Author Manuscript, vol. 51, No. 13, Jul. 10, 2008, pp. 4030-4037.

Chatalic, K. L. S. et al. "Towards Personalized Treatment of Postate Cancer: PSMA I&T, a Promising Prostate-Specific Membrane Antigen-Targeted Theranostic Agent." Theranostics, vol. 6, No. 6, Apr. 12, 2016, pp. 849-861.

Cremonesi, M. et al. "Dosimetry in Peptide Radionuclide Receptor Therapy: A Review." The Journal of Nuclear Medicine, vol. 47, No. 9, Sep. 2006, pp. 1467-1475.

Cui, C. et al. "Synthesis and Evaluation of [$^{64}$Cu]PSMA-617 Targeted for Prostate-Specific Membrane Antigen in Prostate Cancer." American Journal of Nuclear Medicine and Molecular Imaging, vol. 7, No. 2, Apr. 30, 2017, pp. 40-52.

Cwikla, J. B. et al. "Efficacy of Radionuclide Treatment Dotatate Y-90 in Patients with Progressive Metastatic Gastroenteropancreatic Neuroendocrine Carcinomas (GEP-NETs): A Phase II Study." Annals of Oncology, vol. 21, No. 4, Apr. 2010, pp. 787-794.

Dalm, S. U. et al. "Comparison of the Therapeutic Response to Treatment with a $^{177}$Lu-Labeled Somatostatin Receptor Agonist and Antagonist in Preclinical Models." The Journal of Nuclear Medicine, vol. 57, No. 2, Feb. 2016, pp. 260-265.

Das, S. et al. "$^{177}$Lu-DOTATATE for the Treatment of Gastroenteropancreatic Neuroendocrine Tumors." Expert Review of Gastroenterology & Hepatology, Author Manuscript, vol. 13, No. 11, Nov. 2019, pp. 1-20.

Dietlein, F et al. "PSA-Stratified Performance of $^{18}$F- and $^{68}$Ga-PSMA PET in Patients with Biochemical Recurrence of Prostate Cancer." The Journal of Nuclear Medicine, vol. 58, No. 6, Jun. 2017, pp. 947-952.

Donin, N. M. et al. "Why Targeting PSMA is a Game Changer in the Management of Prostate Cancer." The Journal of Nuclear Medicine, vol. 59, No. 2, Feb. 2018, pp. 177-182.

Dos Santos, J. C. et al. "Development of Novel PSMA Ligands for Imaging and Therapy with Copper Isotopes." The Journal of Nuclear Medicine, vol. 61, No. 1, Jan. 2020, pp. 70-79.

Dos Santos, J. C. et al. "Development of Novel PSMA Ligands for Imaging and Therapy with Copper Isotopes." The Journal of Nuclear Medicine, Epub, Sep. 20, 2019, pp. 1-55.

Eder, M. et al. "$^{68}$Ga-Complex Lipophilicity and the Targeting Property of a Urea-Based PSMA Inhibitor for PET Imaging." Bioconjugate Chemistry, vol. 23, No. 4, Apr. 18, 2012, pp. 688-697.

Eychenne, R. et al. "Overview of Radiolabeled Somatostatin Analogs for Cancer Imaging and Therapy." Molecules, vol. 25, No. 17, Sep. 2, 2020, pp. 1-35.

Fani, M. et al. "Radiolabeled Somatostatin Analogs—A Continuously Evolving Class of Radiopharmaceuticals." Cancers, vol. 14, No. 5, Feb. 24, 2022, pp. 1-14.

Fani, M. et al. "Somatostatin Receptor Antagonists for Imaging and Therapy." The Journal of Nuclear Medicine, vol. 58, No. 9, Sep. 2017, pp. 61S-66S.

Fani, M. et al. "Unexpected Sensitivity of sst$_2$ Antagonists to N-Terminal Radiometal Modifications." The Journal of Nuclear Medicine, vol. 53, No. 9, Sep. 2012, pp. 1481-1489.

Ghosh, A. et al. "Tumor Target Prostate Specific Membrane Antigen (PSMA) and its Regulation in Prostate Cancer." Journal of Cellular Biochemistry, vol. 91, No. 3, Feb. 15, 2004, pp. 528-539.

Giesel, F. L. et al. "F-18 Labelled PSMA-1007: Biodistribution, Radiation Dosimetry and Histopathological Validation of Tumor Lesions in Prostate Cancer Patients." European Journal of Nuclear Medicine and Molecular Imaging, vol. 44, Nov. 26, 2016, pp. 678-688.

Ginj, M. et al. "Radiolabeled Somatostatin Receptor Antagonists are Preferable to Agonists for in vivo Peptide Receptor Targeting of Tumors." PNAS, vol. 103, No. 44, Oct. 31, 2006, pp. 16436-16441.

Gomes-Porras, M. et al. "Somatostatin Analogs in Clinical Practice: A Review." International Journal of Molecular Sciences, vol. 21, No. 5, Feb. 29, 2020, pp. 1-27.

Gorges, T. M. et al. "Heterogeneous PSMA Expression on Circulating Tumor Cells—A Potential Basis for Stratification and Monitoring of PSMA-Directed Therapies in Prostate Cancer." Oncotarget, vol. 7, No. 23, Apr. 26, 2016, pp. 34930-34941.

(56) References Cited

OTHER PUBLICATIONS

Gourni, E. et al. "(R)-NODAGA-PSMA: A Versatile Precursor for Radiometal Labeling and Nuclear Imaging of PSMA-Positive Tumors." PLoS ONE, vol. 10, No. 12, Dec. 23, 2015, pp. 1-16.

Graham, M. M. et al. "$^{68}$Ga-DOTATOC Imaging of Neuroendocrine Tumors: A Systematic Review and Metaanalysis." The Journal of Nuclear Medicine, vol. 58, No. 9, Sep. 2017, pp. 1452-1458.

Helgebostad, R. et al. "Clinical Applications of Somatostatin Receptor (Agonist) PET Tracers Beyond Neuroendocrine Tumors." Diagnostics, vol. 12, No. 2, Feb. 18, 2022, pp. 1-19.

Hennrich, U. et al. "[$^{68}$Ga]Ga-PSMA-11: The First FDA-Approved $^{68}$Ga-Radiopharmaceutical for PET Imaging of Prostate Cancer." Pharmaceuticals, vol. 14, No. 8, Jul. 23, 2021, pp. 1-12.

Heppeler, A. et al. "Radiometal-Labelled Macrocyclic Chelator-Derivatised Somatostatin Analogue with Superb Tumour-Targeting Properties and Potential for Receptor-Mediated Internal Radiotherapy." Chemistry: A European Journal, vol. 5, No. 7, Jul. 2, 1999, pp. 1974-1981.

Hocart, S. J. et al. "Highly Potent Cyclic Disulfide Antagonists of Somatostatin." Journal of Medicinal Chemistry, vol. 42, No. 11, Jun. 3, 1999, pp. 1863-1871.

Hofland, L. J. et al. "Somatostatin Receptors and Disease: Role of Receptor Subtypes." Baillière's Clinical Endocrinology and Metabolism, vol. 10, No. 1, Jan. 1996, pp. 164.

Hofmann, M. et al. "Biokinetics and Imaging with the Somatostatin Receptor PET Radioligand $^{68}$Ga-DOTATOC: Preliminary Data." European Journal of Nuclear Medicine, vol. 28, No. 12, Dec. 2001, pp. 1751-1757.

Jeitner, T. M. et al. "Advances in PSMA Theranostics." Translational Oncology, vol. 22, Aug. 2022, pp. 1-16.

Johnbeck, C. B. et al. "Head-to-Head Comparison of $^{64}$Cu-DOTATATE and $^{68}$Ga-DOTATOC PET/CT: A Prospective Study of 59 Patients with Neuroendocrine Tumors." The Journal of Nuclear Medicine, Sep. 22, 2016, pp. 1-30.

Kaemmerer, D. et al. "Molecular Imaging with $^{68}$Ga-SSTR PET/CT and Correlation to Immunohistochemistry of Somatostatin Receptors in Neuroendocrine Tumours." European Journal of Nuclear Medicine and Molecular Imaging, vol. 38, May 31, 2011, pp. 1659-1668.

Kaemmerer, D. et al. "Somatostatin Receptors in Bronchopulmonary Neuroendocrine Neoplasms: New Diagnostic, Prognostic, and Therapeutic Markers." The Journal of Clinical Endocrinology & Metabolism, vol. 100, No. 3, Mar. 1, 2015, pp. 831-840.

Kelly, J. et al. "Trifunctional PSMA-Targeting Constructs for Prostate Cancer with Unprecedented Localization to LNCaP Tumors." European Journal of Nuclear Medicine and Molecular Imaging, vol. 45, Apr. 6, 2018, pp. 1841-1851.

Kelly, J. M. et al. "Dual-Target Binding Ligands with Modulated Pharmacokinetics for Endoradiotherapy of Prostate Cancer." The Journal of Nuclear Medicine, vol. 58, No. 9, Sep. 2017, pp. 1442-1449.

Kiesewetter, B. et al. "Pulmonary Neuroendocrine Tumours and Somatostatin Receptor Status: An Assessment of Unlicensed Use of Somatostatin Analogues in the Clinical Practice." ESMO Open, vol. 7, No. 3, Jun. 2022, pp. 1-7.

Kim, M. H. et al. "Evaluation of a $^{64}$Cu-Labeled 1,4,7-Triazacyclononane, 1-Glutaric Acid-4,7 Acetic Acid (NODAGA)-Galactose-Bombesin Analogue as a PET Imaging Probe in a Gastrin-Releasing Peptide Receptor-Expressing Prostate Cancer Xenograft Model." International Journal of Oncology, vol. 46, No. 3, Mar. 2015, pp. 1159-1168.

Krebs, S. et al. "Biodistribution and Radiation Dose Estimates for $^{68}$Ga-DOTA-JR11 in Patients with Metastatic Neuroendocrine Tumors." European Journal of Nuclear Medicine and Molecular Imaging, Author Manuscript, vol. 46, No. 3, Mar. 2019, pp. 1-19.

Krebs, S. et al. "Comparison of $^{68}$Ga-DOTA-JR11 PET/CT with Dosimetric $^{177}$Lu-Satoreotide Tetraxetan ($^{177}$Lu-DOTA-JR11) SPECT/CT in Patients with Metastatic Neuroendocrine Tumors Undergoing Peptide Receptor Radionuclide Therapy." European Journal of Nuclear Medicine and Molecular Imaging, Author Manuscript, vol. 47, No. 13, Dec. 2020, pp. 1-19.

Lafont, M. A. et al. "Radiopharmaceutical Production of [$^{61}$Cu]Cu-(R)NODAGA-LM3 Injection Solution." 36th Annual Congress of the European Association of Nuclear Medicine, Vienna, Sep. 9-13, 2023, 14 slides.

Lafont, M. A. et al. "Radiopharmaceutical Production of [$^{61}$Cu]Cu-(R)NODAGA-LM3 Injection Solution." 36th Annual Congress of the European Association of Nuclear Medicine, Abstract, Vienna, Sep. 9-13, 2023, pp. 1-2.

Łapińska, G. et al. "The Diagnostic Role of $^{68}$Ga-DOTATATE PET/CT in the Detection of Neuroendocrine Tumours." Nuclear Medicine Review, vol. 14, No. 1, Jul. 1, 2011, pp. 16-20.

Liu, T. et al. "Spacer Length Effects on In Vitro Imaging and Surface Accessibility of Fluorescent inhibitors of Prostate Specific Membrane Antigen." Bioorganic and Medicinal Chemistry Letters, Author Manuscript, vol. 21, No. 23, Dec. 1, 2011, pp. 1-10.

Lowrance, W. et al. "Advanced Prostate Cancer: AUA/SUO Guideline." American Urological Association, Apr. 2023, pp. 1-53.

Lütje, S. et al. "PSMA Ligands for Radionuclide Imaging and Therapy of Prostate Cancer: Clinical Status." Theranostics, vol. 5, No. 12, Oct. 18, 2015, pp. 1388-1401.

Machulkin, A. E. et al. "Small-Molecule PSMA Ligands. Current State, SAR and Perspectives." Journal of Drug Targeting, vol. 24, No. 8, Feb. 11, 2016, pp. 1-44.

Malmberg, C. et al. "$^{64}$Cu-DOTATATE for Noninvasive Assessment of Atherosclerosis in Large Arteries and Its Correlation with Risk Factors: Head-to-Head Comparison with $^{68}$Ga-DOTATOC in 60 Patients." The Journal of Nuclear Medicine, vol. 56, No. 12, Dec. 2015, pp. 1895-1900.

Maurer, T. et al. "Current Use of PSMA-PET in Prostate Cancer Management." Nature Reviews Urology, vol. 13, Feb. 23, 2016, pp. 1-10.

Meester, E. J. et al. "Imaging Inflammation in Atherosclerotic Plaques, Targeting SST$_2$ with [$^{111}$In]In-DOTA-JR11." Journal of Nuclear Cardiology, vol. 28, Feb. 5, 2020, pp. 2506-2513.

Morris, M. J. et al. "Diagnostic Performance of 18F-DCFPyL-PET/CT in Men with Biochemically Recurrent Prostate Cancer: Results from the CONDOR Phase III, Multicenter Study." Clinical Cancer Research, vol. 27, No. 13, Jul. 1, 2021, pp. 3674-3682.

Nedrow, J. R.. et al. "Positron Emission Tomographic Imaging of Copper 64- and Gallium 68-Labeled Chelator Conjugates of the Somatostatin Agonist Tyr$_3$-Octreotate." Molecular Imaging, vol. 13, No. 7, Sep. 2014, pp. 1-13.

Nicolas, G. P. et al. "Safety, Biodistribution, and Radiation Dosimetry of $^{68}$Ga-OPS202 in Patients with Gastroenteropancreatic Neuroendocrine Tumors: A Prospective Phase I Imaging Study." The Journal of Nuclear Medicine, vol. 59, No. 6, Jun. 2018, pp. 909-914.

Nicolas, G. P. et al. "Sensitivity Comparison of $^{68}$Ga-OPS202 and $^{68}$Ga-DOTATOC PET/CT in Patients with Gastroenteropancreatic Neuroendocrine Tumors: A Prospective Phase II Imaging Study." The Journal of Nuclear Medicine, vol. 59, No. 6, Jun. 2018, pp. 915-921.

Nisa, L. et al. "Yttrium-90 DOTATOC Therapy in GEP-NET and Other SST2 Expressing Tumors: A Selected Review." Annals of Nuclear Medicine, vol. 25, Nov. 25, 2010, pp. 75-85.

Parker, C. et al. "Prostate Cancer: ESMO Clinical Practice Guidelines for Diagnosis, Treatment and Follow-Up." Annals of Oncology, vol. 31, No. 9, Sep. 2020, pp. 1119-1134.

Pauwels, E. et al. "Somatostatin Receptor PET Ligands—The Next Generation for Clinical Practice." American Journal of Nuclear Medicine and Molecular Imaging, vol. 8, No. 5, Oct. 20, 2018, pp. 311-331.

Pedersen, S. F. et al. "$^{64}$Cu-DOTATATE PET/MRI for Detection of Activated Macrophages in Carotid Atherosclerotic Plaques: Studies in Patients Undergoing Endarterectomy." Arteriosclerosis, Thrombosis, and Vascular Biology, vol. 35, No. 7, Jul. 2015, pp. 1696-1703.

Perner, S. et al. "Prostate-Specific Membrane Antigen Expression as a Predictor of Prostate Cancer Progression." Human Pathology, vol. 38, No. 5, May 2007, pp. 696-701.

(56) References Cited

OTHER PUBLICATIONS

Privé, B. M et al. "Lutetium-177-PSMA-I&T as Metastases Directed Therapy in Oligometastatic Hormone Sensitive Prostate Cancer, a Randomized Controlled Trial." BMC Cancer, vol. 20, Sep. 14, 2020, pp. 1-9.
Pyronnet, S. et al. "Antitumor Effects of Somatostatin." Molecular and Cellular Endocrinology, vol. 286, Nos. 1-2, May 14, 2008, pp. 230-237.
Rajasekaran, S. A. et al. "A Novel Cytoplasmic Tail MXXXL Motif Mediates the Internalization of Prostate-Specific Membrane Antigen." Molecular Biology of the Cell, vol. 14, No. 12, Dec. 2003, pp. 4745-4845.
Ravert, H. T. et al. "An Improved Synthesis of the Radiolabeled Prostate-Specific Membrane Antigen Inhibitor, [$^{18}$F]DCFPyL." Journal of Labelled Compounds and Radiopharmaceuticals, vol. 59, No. 11, Sep. 2016, pp. 439-450.
Reubi, J. C. et al. "Affinity Profiles for Human Somatostatin Receptor Subtypes SST1-SST5 of Somatostatin Radiotracers Selected for Scintigraphic and Radiotherapeutic Use." European Journal of Nuclear Medicine, vol. 27, Mar. 2000, pp. 273-282.
Reubi, J. C. et al. "Highly Increased $^{125}$I-JR11 Antagonist Binding In Vitro Reveals Novel Indications for sst2 Targeting in Human Cancers." The Journal of Nuclear Medicine, vol. 58, No. 2, Feb. 2017, pp. 300-306.
Rowe, S. P. et al. "[18F]DCFPyL PET/CT for Imaging of Prostate Cancer." Nuklearmedizin, vol. 61, No. 3, Jan. 14, 2022, pp. 1-8.
Rylova, S. N. et al. "The Somatostatin Receptor 2 Antagonist $^{64}$Cu-NODAGA-JR11 Outperforms $^{64}$Cu-DOTA-TATE in a Mouse Xenograft Model." PLoS ONE, vol. 13, No. 4, Apr. 18, 2018, pp. 1-16.
Sarkar, S. et al. "High in Vivo Stability of $^{64}$Cu-Labeled Cross-Bridged Chelators is a Crucial Factor in Improved Tumor Imaging of RGD Peptide Conjugates." Journal of Medicinal Chemistry, vol. 61, No. 1, Jan. 11, 2018, pp. 385-395.
Soeda, F. et al. "Impact of $^{18}$F-PSMA-1007 Uptake in Prostate Cancer Using Different Peptide Concentrations: Preclinical PET/CT Study in Mice." The Journal of Nuclear Medicine, Epub, Mar. 22, 2019, pp. 1-31.
Szabo, Z. et al. "Initial Evaluation of [18F]DCFPyL for Prostate-Specific Membrane Antigen (PSMA)-Targeted PET Imaging of Prostate Cancer." Molecular Imaging and Biology, vol. 17, Apr. 21, 2015, pp. 565-574.
Tarkin, J. M. et al. "Detection of Atherosclerotic Inflammation by $^{68}$Ga-DOTATATE PET Compared to [18F]FDG Pet Imaging." Journal of the American College of Cardiology, vol. 69, No. 14, Apr. 11, 2017, pp. 1774-1791.
Umbricht, C. A. et al. "Design and Preclinical Evaluation of an Albumin-Binding PSMA Ligand for $^{64}$Cu-Based PET Imaging." Molecular Pharmaceutics, vol. 15, No. 12, Dec. 3, 2018, pp. 5556-5564.
Umbricht, C. A. et al. "Preclinical Development of Novel PSMA-Targeting Radioligands: Modulation of Albumin-Binding Properties to Improve Prostate Cancer Therapy." Molecular Pharmaceutics, Just Accepted Manuscript, Apr. 23, 2018, pp. 1-35.
Uspenskaya, A. A. et al. "The Importance of Linkers in the Structure of PSMA Ligands." Current Medicinal Chemistry, vol. 29, No. 2, Jan. 1, 2022, pp. 268-298.
Veber, D. F. et al. "Highly Active Cyclic and Bicyclic Somatostatin Analogues of Reduced Ring Size." Nature, vol. 280, Aug. 9, 1979, pp. 512-514.
Waldherr, C. et al. "The Clinical Value of [90Y-DOTA]-D-Phe1-Tyr3-Octreotide (90Y-DOTATOC) in the Treatment of Neuroendocrine Tumours: A Clinical Phase II Study." Annals of Oncology, vol. 12, No. 7, Jul. 2001, pp. 941-945.
Wang, X. et al. "Comprehensive Evaluation of a Somatostatin-Based Radiolabelled Antagonist for Diagnostic Imaging and Radionuclide Therapy." vol. 39, Aug. 29, 2012, pp. 1876-1885.
Weineisen, M. et al. "$^{68}$Ga- and $^{177}$Lu-Labeled PSMA I&T: Optimization of a PSMA-Targeted Theranostic Concept and First Proof-of-Concept Human Studies." The Journal of Nuclear Medicine, vol. 56, No. 8, Aug. 2015, pp. 1169-1176.
Weineisen, M. et al. "Synthesis and Preclinical Evaluation of DOTAGA-Conjugated PSMA Ligands for Functional Imaging and Endoradiotherapy of Prostate Cancer." EJNMMI Research, vol. 4, Nov. 25, 2014, pp. 1-15.
Wild, D. et al. "A Phase I/II Study of the Safety and Efficacy of [$^{177}$Lu]Lu-Satoreotide Tetraxetan in Advanced Somatostatin Receptor-Positive Neuroendocrine Tumours." European Journal of Nuclear Medicine and Molecular Imaging, Sep. 18, 2023, pp. 1-13.
Wirtz, M. et al. "Synthesis and In Vitro and In Vivo Evaluation of Urea-Based PSMA Inhibitors with Increased Lipophilicity." EJNMMI Research, vol. 8, Aug. 22, 2018, pp. 1-11.
Zhang, A. X. et al. "A Remote Arene-Binding Site on Prostate Specific Membrane Antigen Revealed by Antibody-Recruiting Small Molecules." Journal of the American Chemical Society, vol. 132, No. 36, Sep. 15, 2010, pp. 12711-12716.
Zhu, W. et al. "A Prospective, Randomized, Double-Blind Study to Evaluate the Safety, Biodistribution, and Dosimetry of $^{68}$Ga-NODAGA-LM3 and $^{68}$Ga-DOTA-LM3 in Patients with Well-Differentiated Neuroendocrine Tumors." The Journal of Nuclear Medicine, vol. 62, No. 10, Oct. 2021, pp. 1398-1405.
Zhu, W. et al. "Head-to-Head Comparison of $^{68}$Ga-DOTA-JR11 and $^{68}$Ga-DOTATATE PET/CT in Patients with Metastatic, Well-Differentiated Neuroendocrine Tumors: A Prospective Study." The Journal of Nuclear Medicine, vol. 61, No. 6, Jun. 2020, pp. 897-903.
Afshar-Oromieh, A. et al. "Radiation Dosimetry of $^{68}$Ga-PSMA-11 (HBED-CC) and Preliminary Evaluation of Optimal Imaging Timing." European Journal of Nuclear Medicine and Molecular Imaging, vol. 43, vol. 9, Aug. 2016, pp. 1611-1620.
Afshar-Oromieh, A. et al. "The Clinical Impact of Additional Late PET/CT Imaging with $^{68}$Ga-PSMA-11 (HBED-CC) in the Diagnosis of Prostate Cancer." vol. 58, No. 5, May 2017, pp. 750-755.
Berliner, C. et al. "Delayed Imaging Improves Lesion Detectability in [$^{99}$mTc]Tc-PSMA-I&S SPECT/CT in Recurrent Prostate Cancer." The Journal of Nuclear Medicine, May 2023, pp. 1-7.
Beyer, T. et al. "A 2022 International Survey on the Status of Prostate Cancer Theranostics." The Journal of Nuclear Medicine, vol. 64, No. 1, Jan. 2023, pp. 47-53.
Cerci, J. J. et al. "Diagnostic Performance and Clinical Impact of $^{68}$Ga-PSMA-11 PET/CT Imaging in Early Relapsed Prostate Cancer After Radical Therapy: A Prospective Multicenter Study (IAEA-PSMA Study)." The Journal of Nuclear Medicine, vol. 63, No. 2, Feb. 2022, pp. 240-247.
Debnath, S. et al. "PSMA-Targeting Imaging and Theranostic Agents—Current Status and Future Perspective." International Journal of Molecular Science, vol. 23, No. 3, Jan. 21, 2022, pp.
ESHI. "Map of PET/CT Systems in Europe per City." European Society for Hybrid, Molecular and Translational Imaging, Oct. 18, 2023, 4 pages, [Online] [Retrieved Dec. 12, 2023], Retrieved from the Internet <URL:https://www.eshi-society.org/petct-map/>.
Fani, M. et al. "$^{61}$Cu-Labeled Radiotracers: Alternative or Choice?" The Journal of Nuclear Medicine, vol. 64, No. 12, Dec. 2023, pp. 1855-1857.
Fanti, S. et al. "EAU-EANM Consensus Statements on the Role of Prostate-specific Membrane Antigen Positron Emission Tomography/Computed Tomography in Patients with Prostate Cancer and with Respect to [$^{177}$Lu]Lu-PSMA Radioligand Therapy." European Urology Oncology, vol. 5, No. 5, Oct. 2022, pp. 530-536.
Fendler, W. P. et al. "PSMA PET/CT: Joint EANM Procedure Guideline/SNMMI Procedure Standard for Prostate Cancer Imaging 2.0." European Journal of Nuclear Medicine and Molecular Imaging, vol. 50, Jan. 5, 2023, 1466-1486.
Fonesca, A. I. et al. "Production of GMP-Compliant Clinical Amounts of Copper-61 Radiopharmaceuticals from Liquid Targets." Pharmaceuticals, vol. 15, No. 6, Jun. 7, 2022, pp. 1-13.
Gafita, A. et al. "Predictors and Real-World Use of Prostate-Specific Radioligand Therapy: PSMA and Beyond." American Society of Clinical Oncology Educational Book, vol. 42, May 24, 2022, pp. 366-382.
Hohberg, M. et al. "Combined Early and Late [$^{68}$Ga]PSMA-HBED-CC PET Scans Improve Lesion Detectability in Biochemical Recur-

(56) References Cited

OTHER PUBLICATIONS rence of Prostate Cancer with Low PSA Levels." Molecular Imaging and Biology, vol. 21, No. 3, Jun. 2019, pp. 558-566.
IAEA. "Copper-64 Radiopharmaceuticals: Production, Quality Control and Clinical Applications." IAEA Radioisotopes and Radiopharmaceuticals Series, No. 7, Vienna, Nov. 2022, pp. 1-140.
Jadvar, H. et al. "Appropriate Use Criteria for Prostate-Specific Membrane Antigen PET Imaging." The Journal of Nuclear Medicine, vol. 63, No. 1, Jan. 2022, pp. 59-68.
Jalilian, A. R. et al. "Radiosynthesis and Evaluation of [$^{61}$Cu]-9,10-Phenanthrenequinone Thiosemicarbazone in Fibrosarcoma-Bearing Animals for PET Imaging." Radiochimica Acta, vol. 98, No. 3, Mar. 2010, pp. 175-181.
Kálmán-Szabó, I et al. "$^{61}$Cu-Labelled Radiodiagnostics of Melanoma with NAPamide-Targeted Radiopharmaceutical." International Journal of Pharmaceutics, vol. 632, Feb. 5, 2023, pp. 1-9.
Karimzadeh, A. et al. "The Impact of PSMA PET-Based Eligibility Criteria Used in the Prospective Phase II TheraP Trial in Metastatic Castration-Resistant Prostate Cancer Patients Undergoing Prostate-Specific Membrane Antigen—Targeted Radioligand Therapy." The Journal of Nuclear Medicine, Jun. 2023, pp. 1-7.
Kuppermann, D. et al. "Imaging Prostate Cancer: Clinical Utility of Prostate-Specific Membrane Antigen." The Journal of Urology, vol. 207, No. 4, Apr. 2022, pp. 769-778.
Maisto, C. et al. "On Site Production of [$^{18}$F]PSMA-1007 Using Different [$^{18}$F]fluoride Activities: Practical, Technical and Economical Impact." EJNMMI Radiopharmacy and Chemistry, vol. 6, No. 36, pp. 1-10.
Neels, O. C. et al. "Radiolabeled PSMA Inhibitors." Cancers, vol. 13, No. 24, Dec. 13, 2021, pp. 1-24.
Nucadvisor. "Co-ordinated Approach to the Development and Supply of Radionuclides in the EU." European Commission, Final Report, First Edition, Aug. 2021, pp. 1-260.
Svedjehed, J. et al. "Automated, Cassette-Based Isolation and Formulation of High-Purity [$^{61}$Cu]CuCl$_2$ from Solid Ni Targets." EJNMMI Radiopharmacy and Chemistry, vol. 5, No. 21, Nov. 5, 2020, pp. 1-14.
Williams, H. A. et al. "A Comparison of PET Imaging Characteristics of Various Copper Radioisotopes." European Journal of Nuclear Medicine and Molecular Imaging, vol. 32, No. 12, Dec. 2005, pp. 1473-1480.
Wondergem, M. et al. "$^{18}$F-DCFPyL PET/CT in the Detection of Prostate Cancer at 60 and 120 Minutes: Detection Rate, Image Quality, Activity Kinetics, and Biodistribution." The Journal of Nuclear Medicine, vol. 58, No. 11, Nov. 2017, pp. 1797-1804.
Zhang, Y. et al. "Positron Emission Tomography Imaging of Vascular Endothelial Growth Factor Receptor Expression with 61Cu-Labeled Lysine-Tagged VEGF$_{121}$." Molecular Pharmaceutics, Author Manuscript, vol. 9, No. 12, Dec. 3, 2012, pp. 1-17.
Ahmedova, A. et al. "Copper Radiopharmaceuticals for Theranostic Applications." European Journal of Medicinal Chemistry, vol. 157, Sep. 5, 2018, pp. 1406-1425.
Alberts, I. L. et al. "Comparing the Diagnostic Performance of Radiotracers in Recurrent Prostate Cancer: A Systematic Review and Network Meta-Analysis." European Journal of Nuclear Medicine and Molecular Imaging, vol. 48, Feb. 6, 2021, pp. 2978-2989.
Ballal, S. et al. "First-in-Human Results on the Biodistribution, Pharmacokinetics, and Dosimetry of [$^{177}$Lu]Lu-DOTA.SA.FAPi and [$^{177}$Lu]Lu-DOTAGA. (SA.FAPi)$_2$." Pharmaceuticals, vol. 14, No. 12, Nov. 24, 2021, pp. 1-18.
Baum, R. P. et al. "Feasibility, Biodistribution and Preliminary Dosimetry in Peptide-Targeted Radionuclide Therapy (PTRT) of Diverse Adenocarcinomas using $^{177}$Lu-FAP-2286: First-in-Human Results." The Journal of Nuclear Medicine, vol. 63, No. 3, Mar. 2022, pp. 1-45.
Bernabeu, T. B. et al. "$^{61}$Cu-PSMA Versus $^{68}$Ga-PSMA for PET Imaging of Prostate Cancer." Abstract, European Journal of Nuclear Medicine and Molecular Imaging, vol. 48, Suppl. 1, Oct. 20-23, 2021, pp. S20-S21.
Bernabeu, T. B. et al. "$^{61}$Cu-PSMA: A New Radiotracer for PET Imaging of Prostate Cancer." Abstract, European Journal of Nuclear Medicine and Molecular Imaging, vol. 48, Suppl. 1, Oct. 20-23, 2021, pp. S15.
Bughda, R. et al. "Fibroblast Activation Protein (FAP)-Targeted CAR-T Cells: Launching an Attack on Tumor Stroma." ImmunoTargets and Therapy, vol. 10, Aug. 5, 2021, pp. 313-323.
Calais, J. "FAP: The Next Billion Dollar Nuclear Theranostics Target?" The Journal of Nuclear Medicine, vol. 61, No. 2, Feb. 2020, pp. 163-165.
Chen, H. et al. "Usefulness of [$^{68}$Ga]Ga-DOTA-FAPI-04 PET/CT in Patients Presenting with Inconclusive [$^{18}$F]FDG Pet/Ct Findings." European Journal of Nuclear Medicine and Molecular Imaging, vol. 48, Jun. 25, 2020, pp. 73-86.
Deng, M. et al. "Comparison of $^{68}$Ga-FAPI and $^{18}$F-FDG PET/CT in the Imaging of Pancreatic Cancer with Liver Metastases." Clinical Nuclear Medicine, vol. 46, No. 7, Jul. 2021, pp. 589-591.
Eisenwiener, K-P. et al. "NODAGATOC, a New Chelator-Coupled Somatostatin Analogue Labeled with [$^{67/68}$Ga] and [$^{111}$In] for SPECT, PET, and Targeted Therapeutic Applications of Somatostatin Receptor (hsst2) Expressing Tumors." Bioconjugate Chemistry, vol. 13, No. 3, Apr. 23, 2002, pp. 530-541.
Fani, M. et al. "PET of Somatostatin Receptor-Positive Tumors Using 64Cu- and 68Ga-Somatostatin Antagonists: The Chelate Makes the Difference." Supplemental Data, The Journal of Nuclear Medicine, vol. 52, No. 7, Jul. 2011, pp. 1110-1118.
Fani, M. et al. "PET of Somatostatin Receptor-Positive Tumors Using $^{64}$Cu- and $^{68}$Ga-Somatostatin Antagonists: The Chelate Makes the Difference." The Journal of Nuclear Medicine, vol. 52, No. 7, Jul. 2011, pp. 1110-1118.
Farolfi, A. et al. "Current and Emerging Clinical Applications of PSMA PET Diagnostic Imaging for Prostate Cancer." The Journal of Nuclear Medicine, vol. 62, No. 5, May 2021, pp. 596-604.
Filippi, L. et al. "Recent Advances in PET Probes for Hepatocellular Carcinoma Characterization." Expert Review of Medical Devices, Accepted Manuscript, vol. 16, No. 5, Apr. 28, 2019, pp. 1-34.
Fu, W. et al. "Increased FAPI Uptake in Brain Metastasis from Lung Cancer on $^{68}$Ga-FAPI PET/CT." Clinical Nuclear Medicine, vol. 46, No. 1, Jan. 2021, pp. e1-e2.
Giesel, F. L. et al. "FAPI-74 PET/CT Using Either $^{18}$F-AIF or Cold-Kit $^{68}$Ga-Labeling: Biodistribution, Radiation Dosimetry and Tumor Delineation in Lung Cancer Patients." The Journal of Nuclear Medicine vol. 62, No. 2, Feb. 2021, pp. 1-22.
Giesel, F. L. et al. "FAPI-PET/CT Improves Staging in a Lung Cancer Patient with Cerebral Metastasis." European Journal of Nuclear Medicine and Molecular Imaging, vol. 46, May 22, 2019, pp. 1754-1755.
Gourni, E. et al. "Metal-Based PSMA Radioligands." Molecules, vol. 22, No. 4, Mar. 24, 2017, pp. 1-34.
Guo, W. et al. "Imaging Fibroblast Activation Protein in Liver Cancer: A Single-Center Post Hoc Retrospective Analysis to Compare [68Ga]Ga-FAPI-04 PET/CT Versus MRI and [18F]-FDG PET/CT." European Journal of Nuclear Medicine and Molecular Imaging, vol. 48, Nov. 11, 2020, pp. 1604-1617.
Hamson, E. J. et al. "Understanding Fibroblast Activation Protein (FAP): Substrates, Activities, Expression and Targeting for Cancer Therapy." Proteomics Clinical Applications, vol. 8, No. 5-6, Jun. 2014, pp. 454-463.
Hicks, R. J. et al. "FAPI-PET/CT: Will it End the Hegemony of $^{18}$F-FDG in Oncology?" The Journal of Nuclear Medicine, vol. 62, No. 3, Mar. 2021, pp. 296-302.
Hu, K. et al. "Preclinical Evaluation and Pilot Clinical Study of 18F-AIF-Labeled FAPI-Tracers for PET Imaging of Cancer Associated Fibroblasts." Research Square, Preprint, Mar. 6, 2021, pp. 1-19.
Jansen, K. et al. "Extended Structure-Activity Relationship and Pharmacokinetic Investigation of (4-Quinolinoyl)glycyl-2-cyanopyrrolidine Inhibitors of Fibroblast Activation Protein (FAP)." Journal of Medicinal Chemistry, vol. 57, No. 7, Mar. 11, 2014, pp. 3053-3074.

(56) References Cited

OTHER PUBLICATIONS

Jansen, K. et al. "Selective Inhibitors of Fibroblast Activation Protein (FAP) with a (4-Quinolinoyl)-glycyl-2-cyanopyrrolidine Scaffold." ACS Medicinal Chemistry Letters, vol. 4, No. 5, Mar. 18, 2013, pp. 491-496.

Jha, P. et al. "PET/CT for Pancreatic Malignancy: Potential Pitfalls." Journal of Nuclear Medicine Technology, vol. 43, No. 2, Jun. 2015, pp. 92-97.

Jiang, X. et al. "FAPI-04 PET/CT Using [$^{18}$F]AlF Labeling Strategy: Automatic Synthesis, Quality Control, and in vivo Assessment in Patient." Frontiers in Oncology, vol. 11, Mar. 2021, pp. 1-9.

Jiang, Y. et al. "A Novel Molecular Imaging Probe [$^{99}$mTc]Tc-HYNIC-FAPI Targeting Cancer-Associated Fibroblasts." Scientific Reports, vol. 13, Mar. 3, 2023, pp. 1-7.

Jones, W. et al. "PSMA Theranostics: Review of the Current Status of PSMA-Targeted Imaging and Radioligand Therapy." Cancers, vol. 12, No. 6, May 26, 2020, pp. 1-14.

Joshi, T. et al. "Harnessing the Coordination Chemistry of 1,4,7-Triazacyclononane for Biomimicry and Radiopharmaceutical Applications." ChemPlusChem, vol. 83, No. 7, Apr. 4, 2018, pp. 554-564.

Koerber, S. A. et al. "The Role of FAPI-PET/CT for Patients with Malignancies of the Lower Gastrointestinal Tract - First Clinical Experience." The Journal of Nuclear Medicine, vol. 61, No. 9, Feb. 14, 2020, pp. 1-21.

Kratochwil, C. et al. "$^{68}$Ga-FAPI PET/CT: Tracer Uptake in 28 Different Kinds of Cancer." The Journal of Nuclear Medicine, vol. 60, No. 6, Jun. 2019, pp. 801-805.

Kuten, J. et al. "Head-to-Head Comparison of [$^{68}$Ga]Ga-FAPI-04 and [$^{18}$F]-FDG PET/CT in Evaluating the Extent of Disease in Gastric Adenocarcinoma." European Journal of Nuclear Medicine and Molecular Imaging, vol. 49, Jul. 24, 2021, pp. 743-750.

Lee, S. M. et al. "Emerging Role of $^{18}$F-Fluorodeoxyglucose Positron Emission Tomography for Guiding Management of Hepatocellular Carcinoma." World Journal of Gastroenterology, vol. 25, No. 11, Mar. 21, 2019, pp. 1289-1306.

Li, M. et al. "Clinical Summary of Fibroblast Activation Protein Inhibitor-Based Radiopharmaceuticals: Cancer and Beyond." European Journal of Nuclear Medicine Imaging, vol. 49, Jan. 31, 2022, pp. 2844-2868.

Liermann, J. et al. "Impact of FAPI-PET/CT on Target vol. Definition in Radiation Therapy of Locally Recurrent Pancreatic Cancer." Cancers, vol. 13, No. 4, Feb. 14, 2021, pp. 1-13.

Lindner, T. et al. "Development of Quinoline-Based Theranostic Ligands for the Targeting of Fibroblast Activation Protein." The Journal of Nuclear Medicine, Supplemental Data, vol. 59, No. 9, Sep. 2018, pp. 1-22.

Lindner, T. et al. "Development of Quinoline-Based Theranostic Ligands for the Targeting of Fibroblast Activation Protein." The Journal of Nuclear Medicine, vol. 59, No. 9, Sep. 2018, pp. 1415-1422.

Lindner, T. et al. "Radioligands Targeting Fibroblast Activation Protein (FAP)." Cancers, vol. 13, No. 22, Nov. 16, 2021, pp. 1-12.

Lindner, T. et al. "Targeting of Activated Fibroblasts for Imaging and Therapy." EJNMMI Radiopharmacy and Chemistry, vol. 4, No. 16, Jul. 25, 2019, pp. 1-15.

Liu, H. et al. "Elevated [$^{68}$Ga]Ga-DOTA-FAPI-04 Activity in Degenerative Osteophyte in a Patient with Lung Cancer." European Journal of Nuclear Medicine and Molecular Imaging, vol. 48, Nov. 12, 2020, pp. 1-2.

Loktev, A. et al. "Development of Fibroblast Activation Protein-Targeted Radiotracers with Improved Tumor Retention." The Journal of Nuclear Medicine, vol. 60, No. 10, Oct. 2019, pp. 1421-1429.

Marciniak, A. et al. "Somatostatin Analogues Labeled with Copper Radioisotopes: Current Status." Journal of Radioanalytical and Nuclear Chemistry, vol. 313, No. 2, Jun. 13, 2017, pp. 279-289.

Martin, M. et al. "Novel Generation of FAP Inhibitor-Based Homodimers for Improved Application in Radiotheranostics." Cancers, vol. 15, No. 6, Mar. 21, 2023, pp. 1-24.

Millul, J. et al. "An Ultra-High-Affinity Small Organic Ligand of Fibroblast Activation Protein for Tumor-Targeting Applications." PNAS, vol. 118, No. 16, Apr. 13, 2021, pp. 1-10.

Millul, J. et al. "Enhancing the Tumor-to-Background Ratio of FAP-Positive PET/CT Scans with the Novel $^{61}$Cu-Kalios Derivatives: Synthesis, in vitro, and in vivo Characterization." 36th Annual Congress of the European Association of Nuclear Medicine, Abstract, Sep. 9-13, 2023, pp. 1-2.

Millul, J. et al. "Enhancing the Tumor-to-Background Ratio of FAP-Positive PET/CT Scans with the Novel $^{61}$Cu-Kalios Derivatives: Synthesis, in vitro, and in vivo Characterization." 36th Annual Congress of the European Association of Nuclear Medicine, Presentation, Sep. 9-13, 2023, slides 1-14.

Millul, J. et al. "Head-to-Head Comparison of Different Classes of FAP Radioligands Designed to Increase Tumor Residence Time: Monomer, Dimer, Albumin Binders, and Small Molecules vs Peptides." European Journal of Nuclear Medicine and Molecular Imaging, vol. 50, Jun. 1, 2023, pp. 3050-3061.

Mishra, P. J. et al. "Carcinoma Associated Fibroblast Like Differentiation of Human Mesenchymal Stem Cells." Cancer Research, Author Manuscript, vol. 68, No. 11, Jun. 1, 2008, pp. 1-21.

Mori, Y. et al. "FAPI PET: Fibroblast Activation Protein Inhibitor Use in Oncologic and Nononcologic Disease." Radiology, vol. 306, No. 2, Feb. 2023, pp. 1-14.

Pang, Y. et al. "Comparison of $^{68}$Ga-FAPI and $^{18}$F-FDG Uptake in Gastric, Duodenal, and Colorectal Cancers." Radiology, vol. 298, No. 2, Feb. 2021, pp. 393-402.

Price, E. W. et al. "Matching Chelators to Radiometals for Radiopharmaceuticals." Chemical Society Reviews, vol. 43, No. 1, Jan. 7, 2014, pp. 260-290.

Privé, B. M. et al. "Fibroblast Activation Protein-Targeted Radionuclide Therapy: Background, Opportunities, and Challenges of First (pre) Clinical Studies." European Journal of Nuclear Medicine and Molecular Imaging, vol. 50, Feb. 23, 2023, pp. 1906-1918.

Qin, C. et al. "$^{68}$Ga-DOTA-FAPI-04 PET/MR in the Evaluation of Gastric Carcinomas: Comparison with $^{18}$F-FDG PET/CT." The Journal of Nuclear Medicine, vol. 63, No. 1, Jan. 2022, pp. 81-88.

Quigley, N. G. et al. "Click-Chemistry (CuAAC) Trimerization of an $\alpha_v\beta_6$ Integrin Targeting Ga-68-Peptide: Enhanced Contrast for in-Vivo PET Imaging of Human Lung Adenocarcinoma Xenografts." ChemBioChem, vol. 21, No. 19, Oct. 1, 2020, pp. 2836-2843.

Quigley, N. G. et al. "PET/CT Imaging of Head-and-Neck and Pancreatic Cancer in Humans by Targeting the 'Cancer Integrin' $\alpha v\beta 6$ with Ga-68-Trivehexin." European Journal of Nuclear Medicine and Molecular Imaging, vol. 49, Sep. 24, 2021, pp. 1136-1147.

Röhrich, M. et al. "Fibroblast Activation Protein-Specific PET/CT Imaging in Fibrotic Interstitial Lung Diseases and Lung Cancer: A Translational Exploratory Study." The Journal of Nuclear Medicine, vol. 63, No. 1, Jan. 2022, pp. 127-133.

Ryabtsova, O. et al. "Acylated Gly-(2-cyano)pyrrolidines as Inhibitors of Fibroblast Activation Protein (FAP) and the Issue of FAP/prolyl Oligopeptidase (PREP)-Selectivity." Bioorganic & Medicinal Chemistry Letters, vol. 22, No. 10, May 15, 2012, pp. 3412-3417.

Sandach, P. et al. "Molecular Imaging and Therapy of Colorectal and Anal Cancer." Seminars in Nuclear Medicine, vol. 50, No. 5, Sep. 2020, pp. 465-470.

Ševčik, R. et al. "Formation and Decomplexation Kinetics of Copper(II) Complexes with Cyclen Derivatives Having Mixed Carboxylate and Phosphonate Pendant Arms." Dalton Transactions, vol. 45, No. 32, Aug. 1, 2016, pp. 12723-12733.

Shi, X. et al. "Comparison of PET Imaging of Activated Fibroblasts and 18F-FDG for Diagnosis of Primary Hepatic Tumours: A Prospective Pilot Study." European Journal of Nuclear Medicine and Molecular Imaging, vol. 48, Oct. 24, 2020, pp. 1593-1603.

Šimeček, J. et al. "Copper-64 Labelling of Triazacyclononane-Triphosphinate Chelators." Dalton Transactions, vol. 41, No. 45, Dec. 7, 2012, pp. 13803-13806.

Sollini, M. et al. "State-of-the-art of FAPI-PET Imaging: A Systematic Review and Meta-Analysis." European Journal of Nuclear Medicine and Molecular Imaging, vol. 48, Jun. 25, 2021, pp. 4396-4414.

(56) References Cited

OTHER PUBLICATIONS

Strobel, O. et al. "FDG-PET is Not Useful in Early Pancreatic Cancer Diagnosis." Nature Reviews Gastroenterology & Hepatology, vol. 10, Apr. 2013, pp. 203-205.

Van Den Hoven, A. F. et al. "Current Research Topics in FAPI Theranostics: A Bibliometric Analysis." European Journal of Nuclear Medicine and Molecular Imaging, vol. 50, Nov. 28, 2022, pp. 1014-1027.

Wadas, T. J. et al. "Coordinating Radiometals of Copper, Gallium, Indium, Yttrium, and Zirconium for PET and SPECT Imaging of Disease." Chemical Reviews, vol. 110, No. 5, Apr. 23, 2010, pp. 2858-2902.

Wang, L. et al. "Comparison of $^{68}$Ga-FAPI and $^{18}$F-FDG PET/CT in the Evaluation of Advanced Lung Cancer." Radiology, vol. 303, No. 1, Apr. 2022, pp. 1-9.

Wang, Q. et al. "$^{68}$Ga-DOTA-FAPI-04 PET/CT as a Promising Tool for Differentiating Ovarian Physiological Uptake: Preliminary Experience of Comparative Analysis with $^{18}$F-FDG." Frontiers in Medicine, vol. 8, Oct. 2021, pp. 1-7.

Wiering, B. et al. "Role of FDG-PET in the Diagnosis and Treatment of Colorectal Liver Metastases." Expert Review of Anticancer Therapy, vol. 4, No. 4, Jan. 10, 2004, pp. 607-613.

Young, J. R. et al. "$^{18}$F-FDG PET/CT of Hepatocellular Adenoma Subtypes and Review of Literature." Abdominal Radiology, vol. 46, Feb. 8, 2021, pp. 2604-2609.

Zhao, L. et al. "Clinical Evaluation of $^{68}$Ga-FAPI-RGD for Imaging of Fibroblast Activation Protein and Integrin $\alpha_v\beta_3$ in Various Cancer Types." The Journal of Nuclear Medicine, May 2023, pp. 1-8.

Zippel, C. et al. "Current Status of PSMA-Radiotracers for Prostate Cancer: Data Analysis of Prospective Trials Listed on ClinicalTrials.gov." Pharmaceuticals, vol. 13, No. 1, Jan. 13, 2020, pp. 1-13.

Backhaus, P. et al. "Translational Imaging of the Fibroblast Activation Protein (FAP) Using the New Ligand [$^{68}$Ga]Ga-OncoFAP-DOTAGA." European Journal of Nuclear Medicine and Molecular Imaging, vol. 49, Dec. 27, 2021, pp. 1822-1832.

Bartoli, F. et al. "Automated Radiosynthesis, Preliminary In Vitro/In Vivo Characterization of OncoFAP- Based Radiopharmaceuticals for Cancer Imaging and Therapy." Pharmaceuticals, vol. 15, No. 8, Aug. 2, 2022, pp. 1-18.

Bernabeu, T. B. et al. "61Cu-PSMA PET in Prostate Cancer: Development and Selection of the First Radioligand for Clinical Translation." European Journal of Nuclear Medicine and Molecular Imaging, vol. 50, No. 1, Sep. 1, 2023, pp. S425-S426.

Cullinane, C. et al. "Peptide Receptor Radionuclide Therapy with $^{67}$Cu-CuSarTATE is Highly Efficacious Against a Somatostatin-Positive Neuroendocrine Tumor Model." The Journal of Nuclear Medicine, vol. 61, No. 12, Dec. 2020, pp. 1800-1805.

Galbiati, A. et al. "A Dimeric FAP-Targeting Small-Molecule Radioconjugate with High and Prolonged Tumor Uptake." The Journal of Nuclear Medicine, vol. 63, No. 12, Dec. 2022, pp. 1852-1858.

Gilardoni, E. et al. "Mass Spectrometry-Based Method for the Determination of the Biodistribution of Tumor-Targeting Small Molecule-Metal Conjugates." Analytical Chemistry, vol. 94, No. 30, Jul. 12, 2022, pp. 10715-10721.

Hesterman, J. et al. "Preclinical Characterization of Novel Radiolabeled and Fluorescent-Labeled Fibroblast Activation Protein (FAP)-Targeting Ligands Using Gamma Counting, SPECT Imaging and Cryo-Fluorescence Tomography (CFT)." European Journal of Nuclear Medicine and Molecular Imaging, vol. 50, No. 1, Sep. 1, 2023, pp. S424-S425.

Kelly, J. M. et al. "Preclinical Evaluation of a High-Affinity Sarcophagine-Containing PSMA Ligand for 64 Cu/67Cu-Based Theranostics in Prostate Cancer." Molecular Pharmaceutics, vol. 17, No. 6, Apr. 14, 2020, pp. 1954-1962.

Li, W. P. et al. "DOTA-$_D$-Tyr$_1$-Octreotate: A Somatostatin Analogue for Labeling with Metal and Halogen Radionuclides for Cancer Imaging and Therapy." Bioconjugate Chemistry, vol. 13, No. 4, May 25, 2002, pp. 721-728.

Millul, J. et al. "Enhancing the Tumor-to-Background Ratio of FAP-Positive PET/CT Scans with the Novel $^{61}$Cu-Kalios Derivatives: Synthesis, in vitro, and in vivo Characterization." European Journal of Nuclear Medicine and Molecular Imaging, vol. 50, No. 1, Sep. 1, 2023, pp. S186.

Nambisan, A. et al. "Preclinical Evaluation of 67Cu-PSMA-617 Theranostic as an Alternative to 177Lu-PSMA-617 for Prostate Cancer." The Journal of Nuclear Medicine, vol. 63, No. 2, Jun. 2022, pp. 1-5.

PCT International Search Report and Written Opinion, PCT Application No. PCT/US2023/075066, Jan. 9, 2024, 20 pages.

PCT International Search Report and Written Opinion, PCT Application No. PCT/US2023/075067, Apr. 16, 2024, 45 pages.

PCT Invitation to Pay Additional Fees, PCT Application No. PCT/US2023/075067, Jan. 5, 2024, 25 pages.

Pfeifer, A. et al. "Clinical PET of Neuroendocrine Tumors Using 64Cu-DOTATATE: First-in-Humans Study." The Journal of Nuclear Medicine, vol. 53, No. 8, Aug. 2012, pp. 1207-1215.

Svedjehed, J. et al. "New Extractant-Impregnated iTLC-SG Paper Facilitates Improved TLC Analysis for Cu Radiolabelled Peptides." Terachem, Sep. 14-17, 2022, pp. P-80.

Watabe, T. et al. "Theranostics Targeting Fibroblast Activation Protein in the Tumor Stroma: $^{64}$Cu- and $^{225}$Ac-Labeled FAPI-04 in Pancreatic Cancer Xenograft Mouse Models." The Journal of Nuclear Medicine, vol. 61, No. 4, Apr. 2020, pp. 563-569.

Zana, A. et al. "Fibroblast Activation Protein Triggers Release of Drug Payload from Non-Internalizing Small Molecule Drug Conjugates in Solid Tumors." Clinical Cancer Research, vol. 28, No. 24, Dec. 15, 2022, pp. 5440-5454.

Zandi, N. "$^{61}$CU/$^{67}$Cu Theranostic Pair Production, Chemical Separation and Radiolabeling." Inaugural Dissertation, University of Bern, Oct. 29, 2021, pp. 1-192.

Köhler, M. et al. "Radionuclide Impurities in [$^{18}$F]F- and [$^{18}$F]FDG for Positron Emission Tomography." Applied Radiation and Isotopes, vol. 81, Nov. 2013, pp. 268-271.

\* cited by examiner

A

B

C

D

A

B

A

B

A

B

FIBROBLAST ACTIVATION PROTEIN (FAP) INHIBITORS, FAP CONJUGATES, AND DIAGNOSTIC AND THERAPEUTIC USES THEREOF

1. BACKGROUND

The present disclosure is directed to novel fibroblast activation protein (FAP) inhibitors and conjugates comprising the novel FAP inhibitors, including radiotracers, for the diagnosis and treatment of conditions characterized by expression of FAP.

In nuclear medicine, radiotracers are used for the diagnosis and therapy of various conditions and diseases. Radiotracers are compounds in which radionuclides are linked to targeting moieties that target specific organs, cells, or biomarkers in the human body.

Radiotracers can be used in targeted radionuclide therapy with the use of targeting moieties that selectively localize in malignant cells, tumors, or the microenvironments associated therewith, and with radionuclides selected to emit low-range highly ionizing radiation, e.g., α or β⁻ particles and Auger electrons. The combination of both the diagnosis and the treatment of a disease utilizing the same or similar biological targeting moieties which target a specific biomarker (e.g., a cell surface receptor) with different diagnostic and therapeutic radionuclides is called targeted theranostics. This approach overcomes the difficulty of quantifying the individual dose needed for the therapy through the diagnosis, rendering the treatment of the patient highly individualized. The theranostic approach is further improved using radionuclides of the same element, e.g., copper radionuclides, $^{60}$Cu, $^{61}$Cu, $^{62}$Cu, and $^{64}$Cu as positron emitters in diagnostic imaging and $^{67}$Cu as a β⁻ emitter in the radiotherapeutic, as the isotopically different radiotracers will bind identically to the biomarker.

FAP is a transmembrane glycoprotein expressed on activated fibroblasts such as cancer-associated fibroblasts (CAFs), a primary component of tumor microenvironment. Structurally, FAP is a type II transmembrane glycoprotein consisting of 760 amino acids. FAP is a serine protease, and unlike other members of the dipeptidyl peptidase (DPP) family, it has both endopeptidase and exopeptidase activity, which enable it to cleave gelatin and type I collagen and play an important role in extracellular matrix (ECM) remodeling. CAFs with FAP expression are found in various neoplasms, particularly epithelial cancers, and in malignancies with a strong desmoplastic reaction such as breast, colorectal, pancreatic, and lung cancer. Overall, a high degree of FAP expression is associated with tumor aggressiveness and poor prognosis (Cohen, S. J.; Alpaugh, R. K.; Palazzo, I.; Meropol, N.J.; Rogatko, A.; Xu, Z.; Hoffman, J. P.; Weiner, L. M.; Cheng, J. D. Fibroblast Activation Protein and Its Relationship to Clinical Outcome in Pancreatic Adenocarcinoma. *Pancreas* 2008, 37, 154-158). The negligible expression of FAP in normal healthy adult tissues makes it an attractive target for oncological imaging and therapy (Lindner, T.; Loktev, A.; Giesel, F.; Kratochwil, C.; Altmann, A.; Haberkorn, U. Targeting of Activated Fibroblasts for Imaging and Therapy. *EJNMMI Radiopharm. Chem.* 2019, 4, 16.).

FAP overexpression has been targeted with small-molecule FAP inhibitors (aka "FAPIs") with an N-(4-quinolinoyl)-Gly-(2-cyanopyrrolidine) scaffold, first developed at the University of Antwerp (Hansen, K.; Heirbaut, L.; Cheng, J. D.; Joossens, J.; Ryabtsova, O.; Cos, P.; Maes, L.; Lambeir, A.-M.; De Meester, I.; Augustyns, K.; et al. Selective Inhibitors of Fibroblast Activation Protein (FAP) with a (4-Quinolinoyl)-Glycyl-2-Cyanopyrrolidine Scaffold. *ACS Med. Chem. Lett.* 2013, 4, 491-496; Jansen, K.; Heirbaut, L.; Verkerk, R.; Cheng, J. D.; Joossens, J.; Cos, P.; Maes, L.; Lambeir, A.-M.; De Meester, I.; Augustyns, K.; et al. Extended Structure-Activity Relationship and Pharmacokinetic Investigation of (4-Quinolinoyl)Glycyl-2-Cyanopyrrolidine Inhibitors of Fibroblast Activation Protein (FAP). *J. Med. Chem.* 2014, 57, 3053-3074). This scaffold was modified to develop FAPI-01 and FAPI-02 as the first quinoline-based FAPIs, which were radiolabeled with $^{125}$I and $^{68}$Ga/$^{177}$Lu, respectively. Further attempts at improving tumor retention led to the development of FAPI-46 (Loktev, A.; Lindner, T.; Burger, E.-M.; Altmann, A.; Giesel, F.; Kratochwil, C.; Debus, J.; Marme, F.; Jager, D.; Mier, W.; et al. Development of Fibroblast Activation Protein-Targeted Radiotracers with Improved Tumor Retention. *J. Nucl. Med.* 2019, 60, 1421-1429). WO 2019/154886 describes FAP inhibitors, FAP inhibitor-chelator constructs, radiolabeled FAP inhibitor-chelator constructs useful for diagnosis or treatment of diseases characterized by overexpression of FAP, e.g., cancer.

Because FAP overexpression is not limited to CAFs, the use of FAP inhibitors in combination with positron emission tomography-computed tomography (PET-CT) may find application in a wide range of non-oncological pathological states, e.g., inflammatory, infectious, and immune pathologies. FAP overexpression has also been associated with cardiovascular diseases, liver fibrosis and cirrhosis, arthritic disorders (e.g., rheumatoid arthritis), IgG4-related disease, pulmonary fibrosis and interstitial lung disease, Crohn's disease, tuberculosis, sarcoidosis, and periprosthetic joint infections (Chandekar, K. R.; Prashanth, A.; Vinjamuri, S.; Kumar, R. FAPI PET/CT Imaging—An Updated Review. *Diagnostics* 2023, 13, 2018).

The availability of a large portfolio of FAP inhibitors and radiotracers is essential for the development of nuclear medicine.

Accordingly, an object of the present disclosure is to provide compounds, compositions, and methods that fully or in part overcome one or more of the issues recognized in the prior art encompassing FAP inhibitors; conjugates comprising FAP inhibitors, including pharmaceuticals and radiotracers; and their use.

2. SUMMARY

The present disclosure relates to improved FAP inhibitors, conjugates comprising the improved FAP inhibitors, and their use in the diagnosis and treatment of various diseases characterized by overexpression of FAP.

In one aspect, compounds are provided herein, wherein the compound is of Formula I:

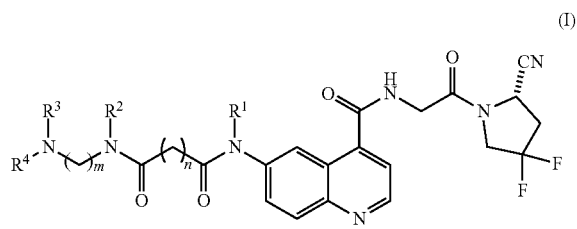

(I)

wherein:

$R^1$ is $R^a$;

$R^2$ and $R^3$ are each $R^a$ or together form a $C_{2-9}$ heterocycle with the nitrogen atoms to which they are attached;

$R^4$ is H, an amine protecting group, or -L-T;

$R^a$, independently for each occurrence, is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', —NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl;

L is a bond or a divalent linker;

T comprises (a) a chelating moiety suitable for chelating a radionuclide, (b) an imaging agent, or (c) a drug;

n is an integer from 1 to 20; and m is an integer from 1 to 20;

or is a pharmaceutically acceptable salt thereof.

In another aspect, the compound is of Formula II:

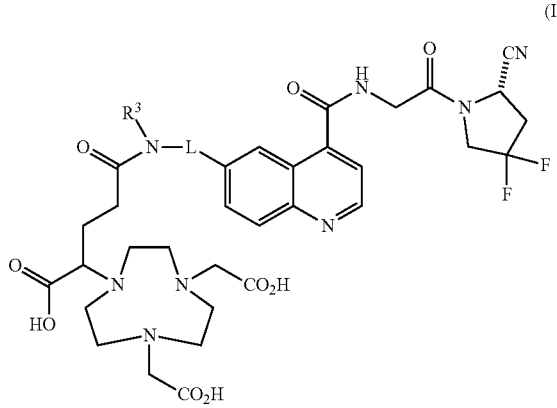

(II)

wherein:

$R^3$ is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl; or $R^3$, together with a moiety in L, form a $C_{2-9}$ heterocycle with the nitrogen atom(s) to which they are attached; and L is a divalent linker, preferably up to 20 atoms in length;

or is a pharmaceutically acceptable salt thereof.

In another aspect, the compound is of Formula III:

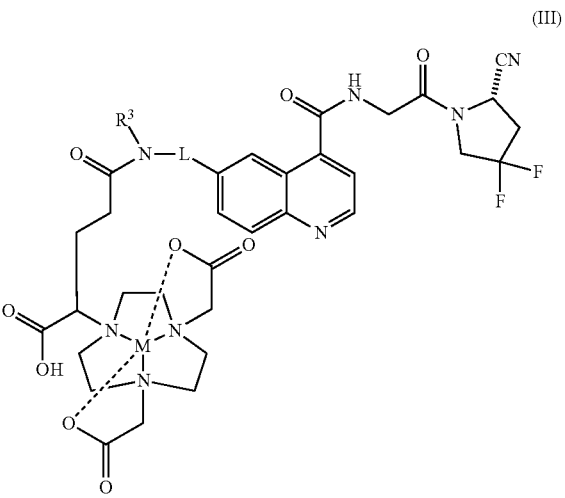

(III)

wherein:

$R^3$ is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl; or $R^3$, together with a moiety in L, form a $C_{2-9}$ heterocycle with the nitrogen atom(s) to which they are attached;

L is a divalent linker, preferably up to 20 atoms in length; and

M is selected from $^{225}$Ac, $^{51}$Cr, $^{66}$Ga, $^{67}$Ga, $^{68}$GA, [$^{18}$F]AlF, $^{111}$In, $^{113m}$In, $^{52m}$Mn, $^{99m}$Tc, $^{186}$Re, $^{188}$Re, $^{139}$La, $^{140}$La, $^{175}$Yb, $^{179}$Yb, $^{153}$Sm, $^{177m}$Sn, $^{166}$Ho, $^{86}$Y, $^{88}$Y, $^{90}$Y, $^{149}$Pm, $^{165}$Dy, $^{169}$Er, $^{177}$Lu, $^{52}$Fe, $^{43}$Sc, $^{44}$Sc, $^{46}$Sc, $^{47}$Sc, $^{142}$Pr, $^{157}$Gd, $^{159}$Gd, $^{212}$Bi, $^{213}$Bi, $^{72}$As, $^{77}$As, $^{97}$Ru, $^{109}$Pd, $^{105}$Rh, $^{101m}$Rh, $^{119}$Sb, $^{197}$Hg, $^{151}$Eu, $^{153}$Eu, $^{169}$Eu, $^{201}$Tl, $^{149}$Tb, $^{152}$Tb, $^{155}$Tb, $^{161}$Tb, $^{203}$Pb, $^{212}$Pb, $^{151}$Pm, $^{153}$Pm, $^{142}$Pr, $^{143}$Pr, $^{55}$Co, $^{60}$Cu, $^{61}$Cu, $^{62}$Cu, $^{64}$Cu, $^{67}$Cu, $^{62}$Zn, $^{188}$Re, $^{198}$Au, $^{199}$Au, $^{227}$Th, $^{111}$Ag, $^{199}$Ag, $^{211}$At, $^{223}$Ra, $^{88}$Zr, and $^{89}$Zr.

or is a pharmaceutically acceptable salt thereof.

In another aspect, compositions, including pharmaceutical compositions and radiotracer compositions, comprising compounds described herein are provided.

In another aspect, a method of generating one or more images of a subject is provided, the method comprising administering to the subject an effective amount of a compound described herein comprising a radionuclide or a pharmaceutical composition comprising the same; and generating one or more images of at least a part of the subject's body, e.g., using positron emission tomography (PET), PET-computerized tomography (PET-CT), or single-photon emission computerized tomography (SPECT).

In another aspect of the disclosure, a method of detecting a disease in a subject is provided, the method comprising administering to the subject a compound described herein comprising a radionuclide or a pharmaceutical composition comprising the same, detecting the localization of the radionuclide in the subject using, e.g., PET, PET-CT, or SPECT, and determining the presence or absence of the disease based on the presence or absence of localization.

In another aspect of the disclosure, a method of monitoring the effect of cancer treatment on a subject afflicted with cancer is provided, the method comprising administering to the subject an effective an amount of a compound described herein comprising a radionuclide or a pharmaceutical composition comprising the same, detecting the localization of the radionuclide in the subject using, e.g., PET, PET-CT, or SPECT, and determining the effects of the cancer treatment.

In another aspect of the disclosure, a method of treating a disease in a patient afflicted with a disease is provided, the method comprising administering to the patient an effective amount of a compound or pharmaceutical composition described herein.

In another aspect of the disclosure, a theranostic method is provided, the method comprising (a) administering to a subject an effective amount of a first compound comprising a $^{61}$Cu radionuclide described herein or a pharmaceutical composition comprising the same; (b) generating one or more images of a subject (e.g., of a certain region or part of the subject's body); and (c) administering to the subject an effective amount of a compound comprising a $^{67}$Cu radionuclide described herein or a pharmaceutical composition comprising the same, wherein the compounds in step (a) and (c) differ only by radioisotope.

3. BRIEF DESCRIPTION OF THE DRAWINGS

These and other features, aspects, and advantages of the present disclosure will become better understood with regard to the following description, and accompanying drawings, where:

Figure 3:
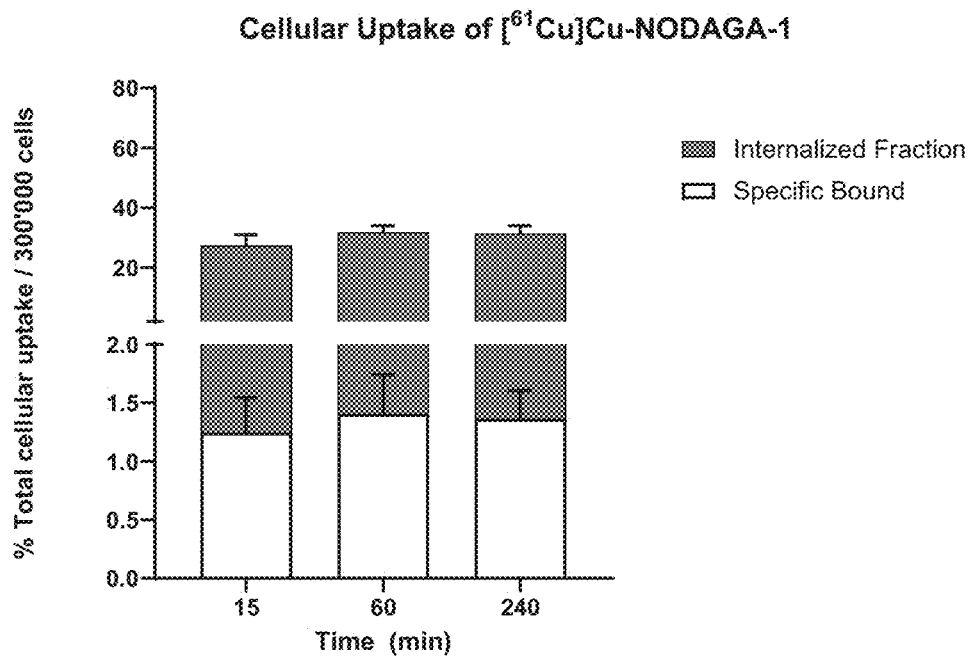
Figure 3:
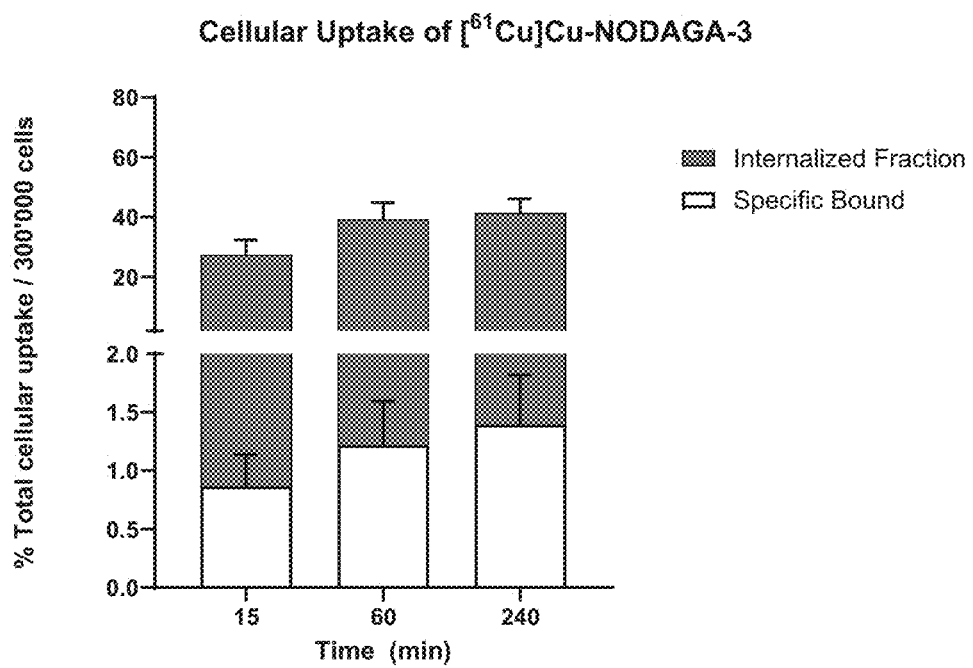
Figure 3:
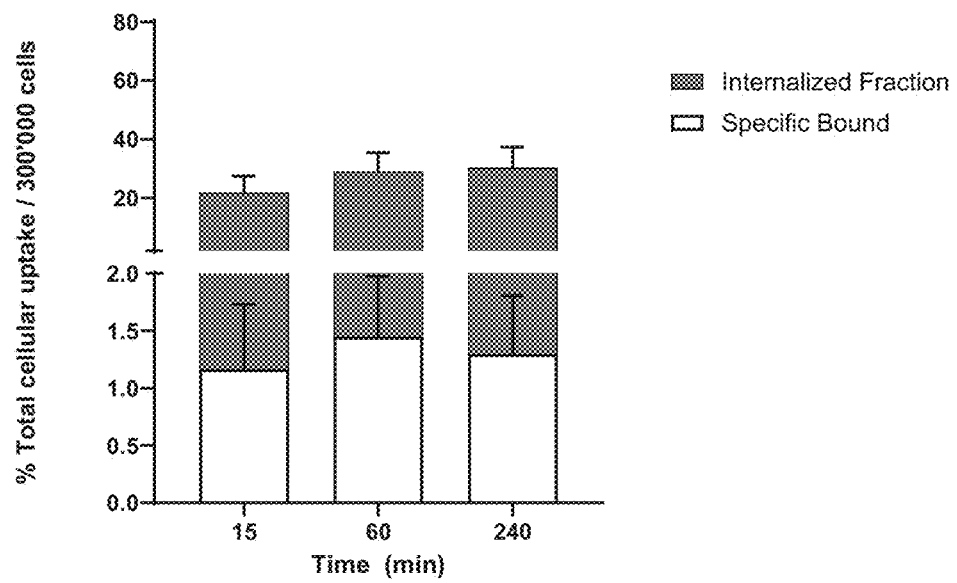
Figure 3:
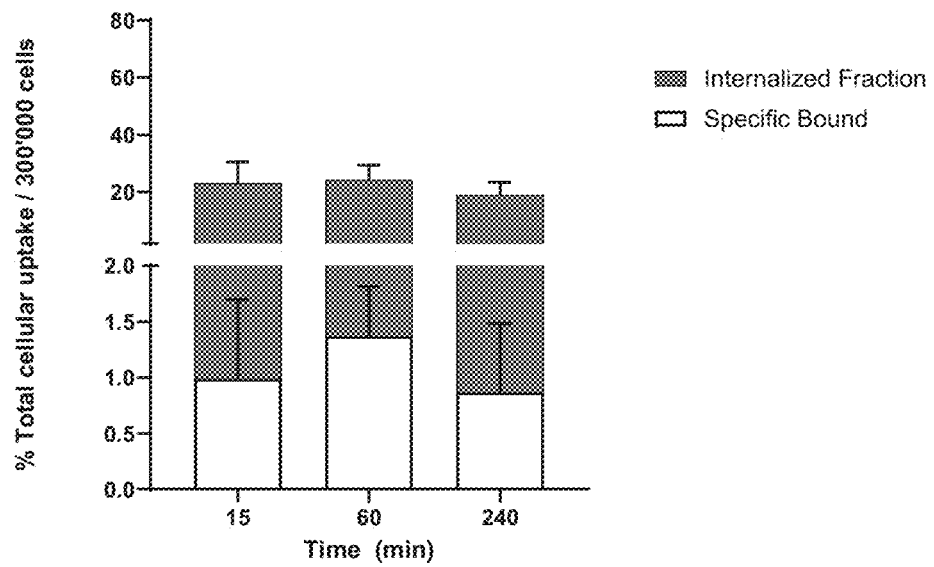

FIG. 3, panels A-D, show cellular uptake of cell surface (cell membrane bound) and internalized fractions of [$^{61}$Cu]Cu-NODAGA-1 (panel A), [$^{61}$Cu]Cu-NODAGA-3 (panel B), [$^{61}$Cu]Cu-NODAGA-2 (panel C), and [$^{61}$Cu]Cu-NODAGA-4 (panel D). The values are expressed as % of the applied activity and refer to the specific uptake calculated after subtracting the non-specific values (measured in the presence of the non-FAP expressing cell line HT-1080.wt) from the total values (specific=total−non-specific).

Figure 4:
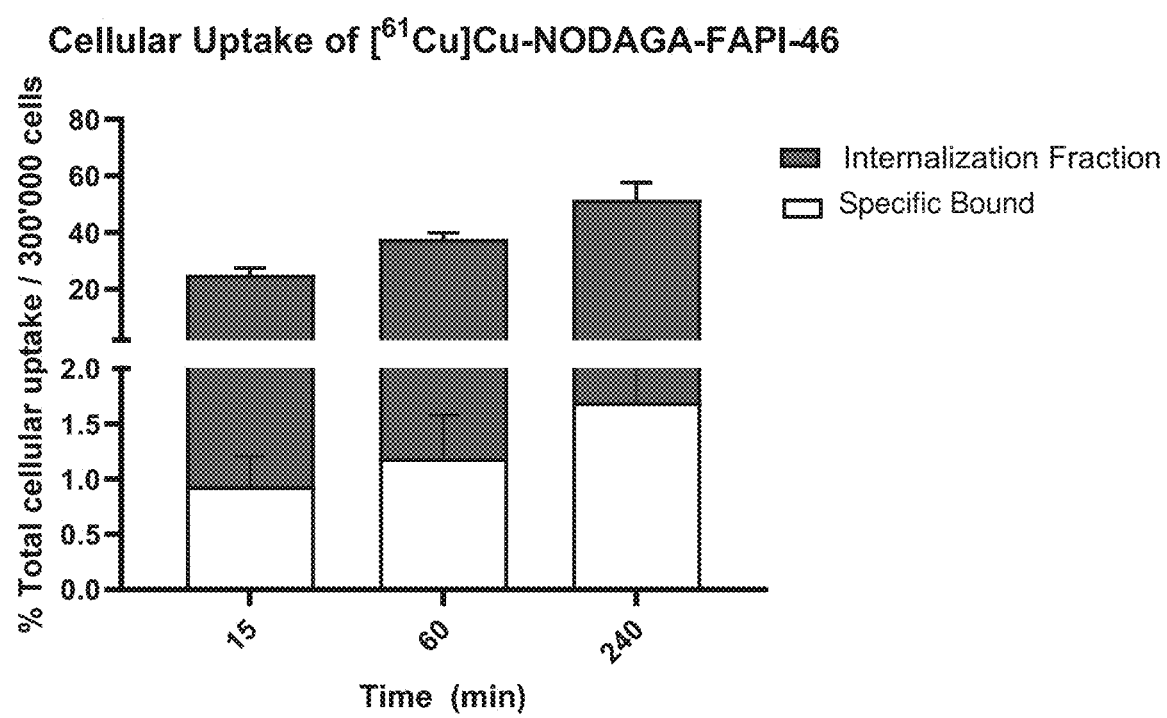

FIG. 4 shows cellular uptake of cell surface (cell membrane bound) and internalized fractions of [$^{61}$Cu]Cu-NODAGA-FAPI-46. The values are expressed as % of the applied activity and refer to the specific uptake calculated after subtracting the non-specific values (measured in the presence of the non-FAP expressing cell line HT-1080.wt) from the total values (specific=total−non-specific).

Figure 5:
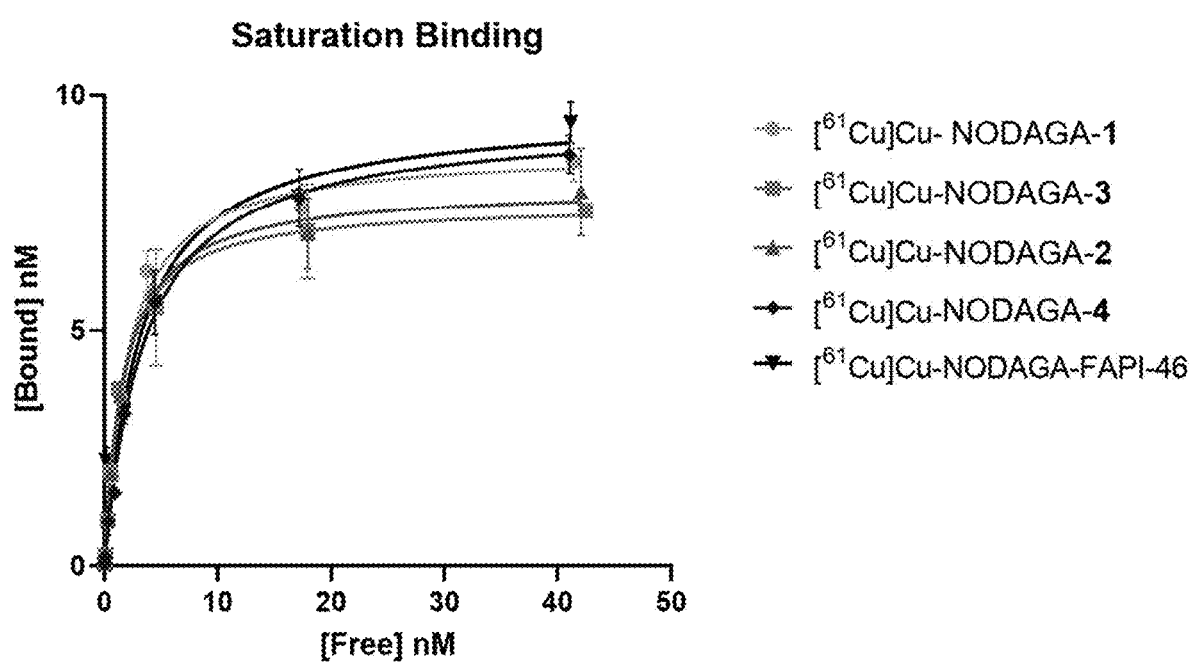

FIG. 5 shows the saturation binding of $^{61}$Cu-labeled conjugates on isolated HEK-293-hFAP membranes.

Figure 6:
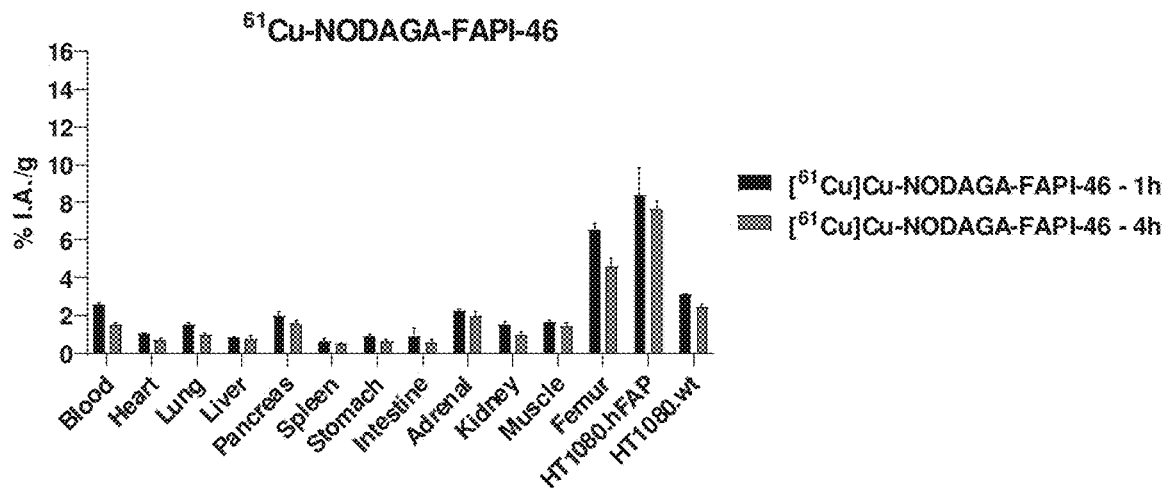
Figure 6:
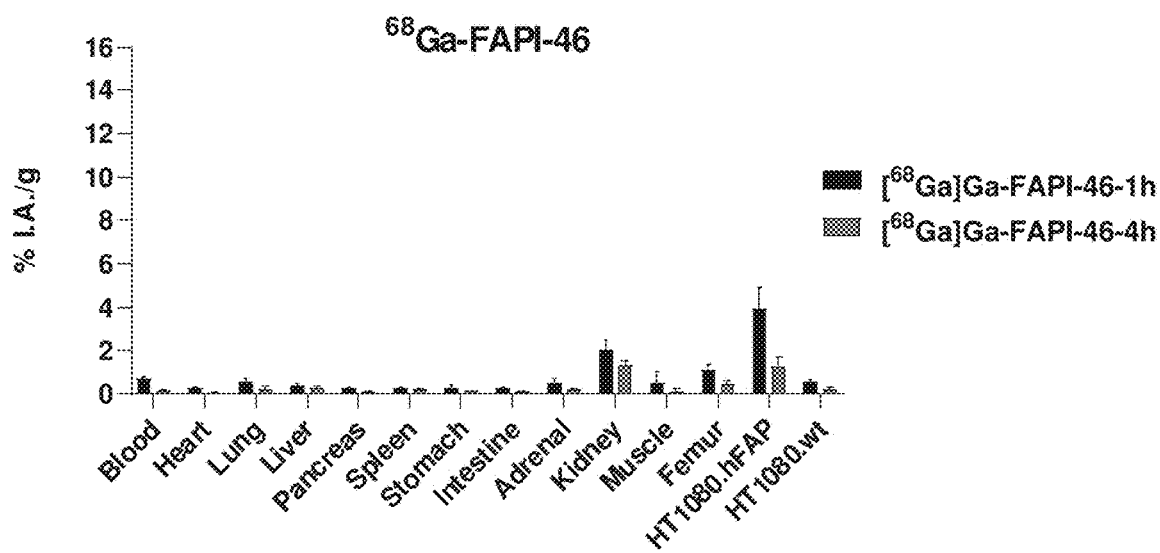

FIG. 6, panels A and B, show the biodistribution profiles of [$^{61}$Cu]Cu-NODAGA-FAPI-46 (panel A) and [$^{68}$Ga]Ga-FAPI-46 (panel B) in HT-1080.hFAP tumor-bearing mice at 1 hour and 4 hours following administration.

Figure 7:
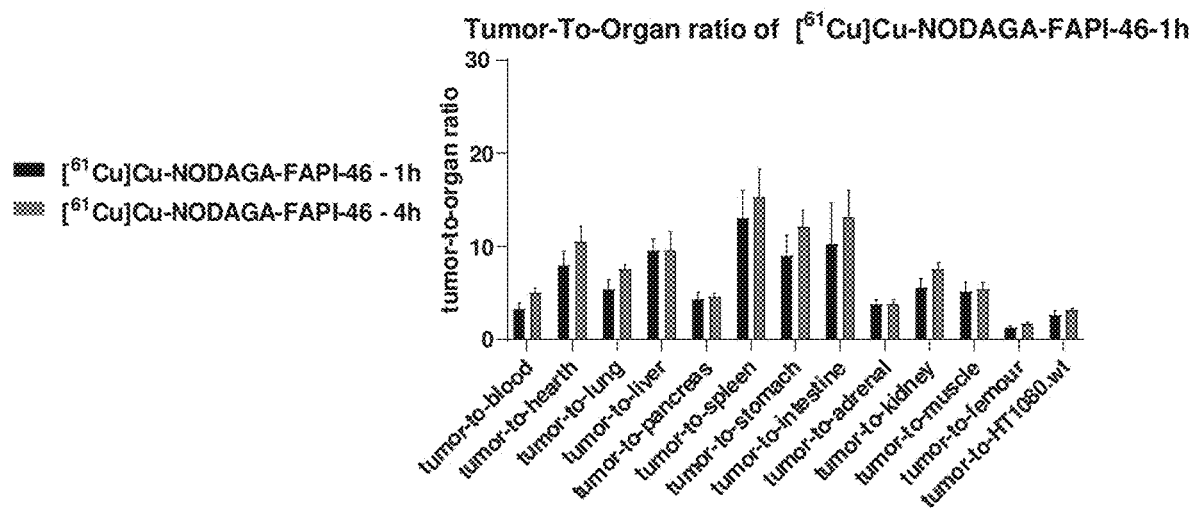
Figure 7:
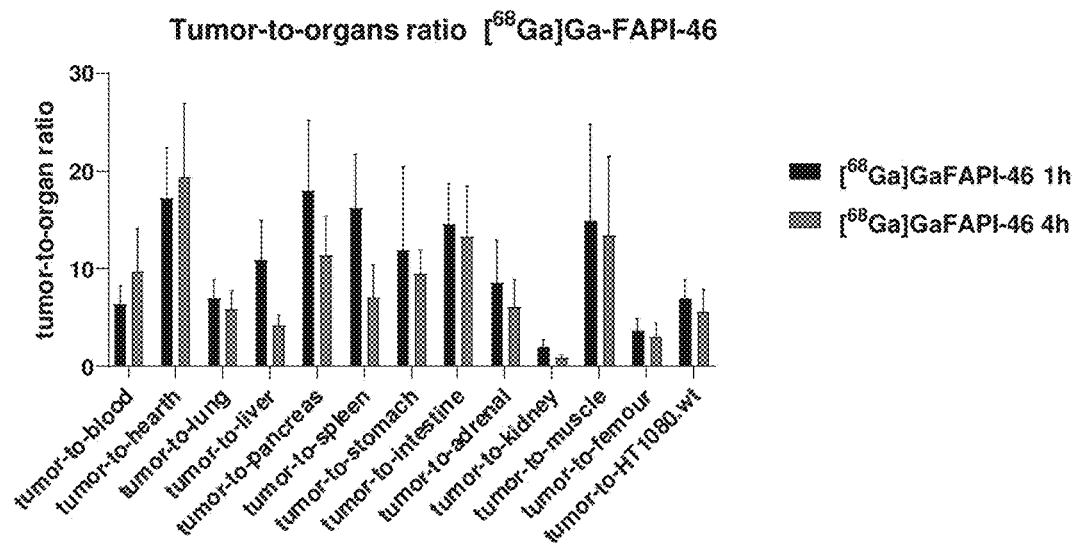

FIG. 7, panels A and B, show the tumor-to-organ ratios of [$^{61}$Cu]Cu-NODAGA-FAPI-46 (panel A) and [$^{68}$Ga]Ga-FAPI-46 (panel B) in HT-1080.hFAP tumor-bearing mice at 1 hour and hours following administration.

Figure 8:
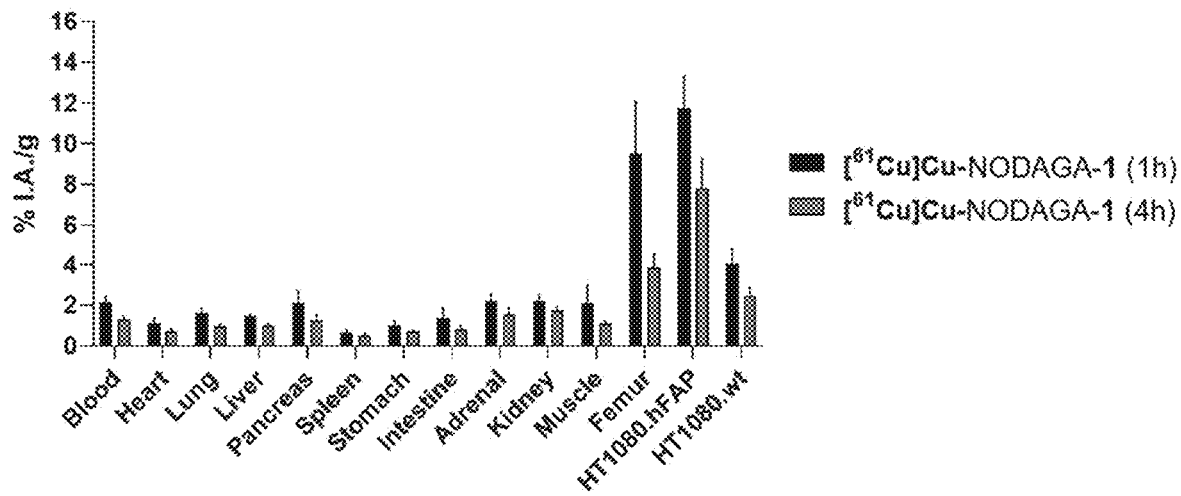
Figure 8:
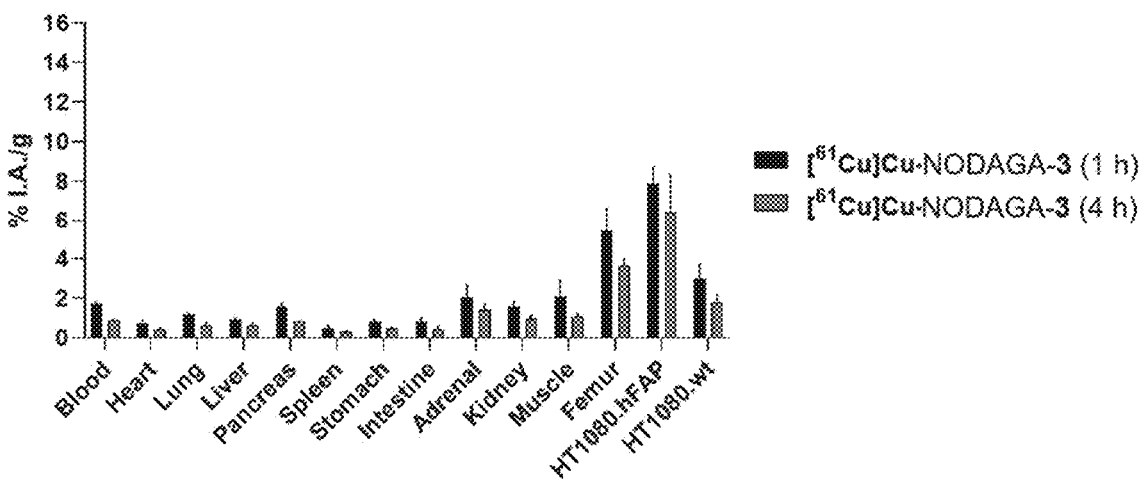

FIG. 8, panels A-B, show biodistribution profiles of [$^{61}$Cu]Cu-NODAGA-1 (panel A) and [$^{61}$Cu]Cu-NODAGA-3 (panel B), in HT-1080.hFAP tumor-bearing mice at 1 hour and 4 hours following administration.

Figure 9:
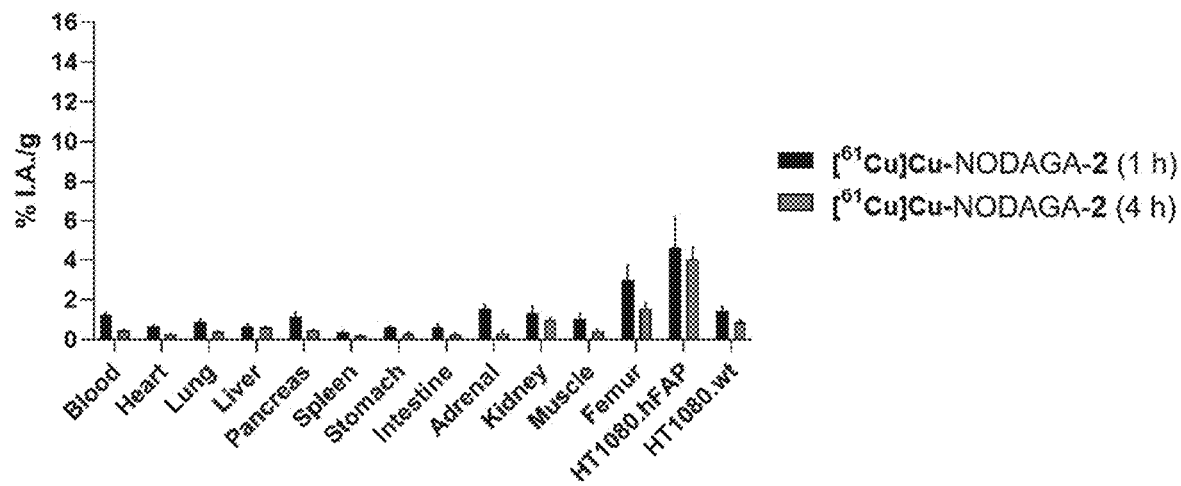
Figure 9:
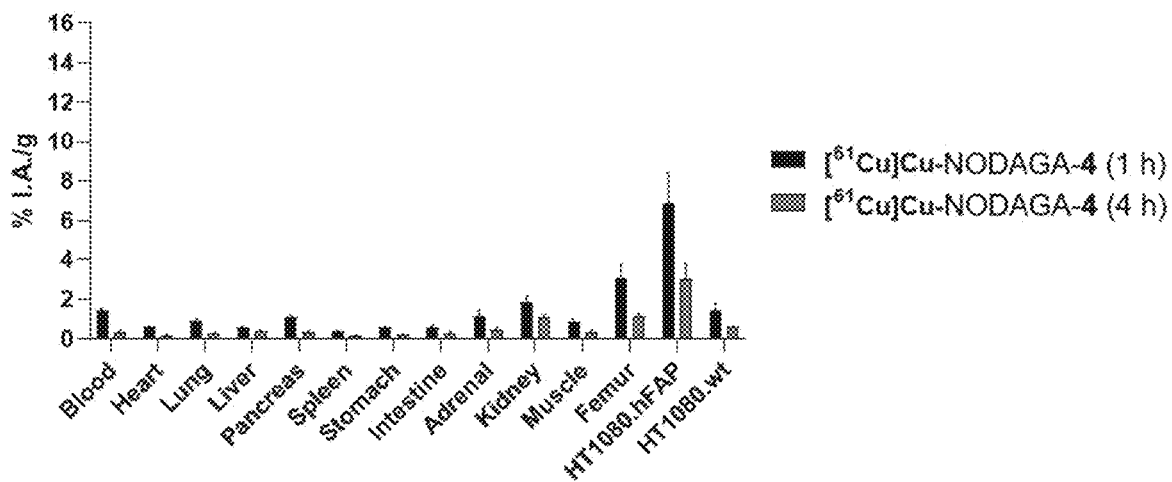

FIG. 9, panels A-B, show biodistribution profiles of [$^{61}$Cu]Cu-NODAGA-2 (panel A) and [$^{61}$Cu]Cu-NODAGA-4 (panel B) in HT-1080.hFAP tumor-bearing mice at 1 hour and hours following administration.

Figure 10:
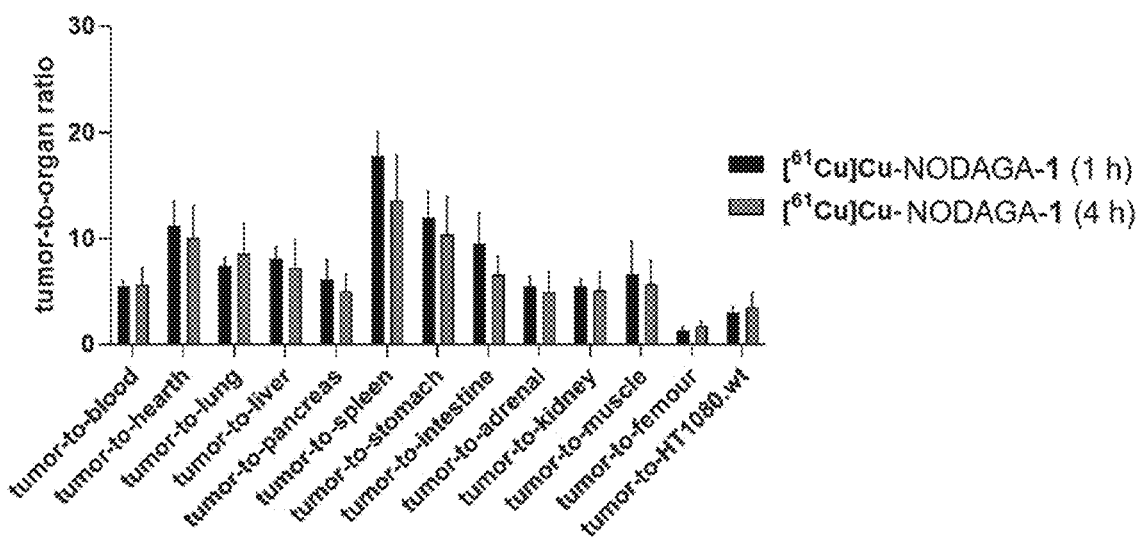
Figure 10:
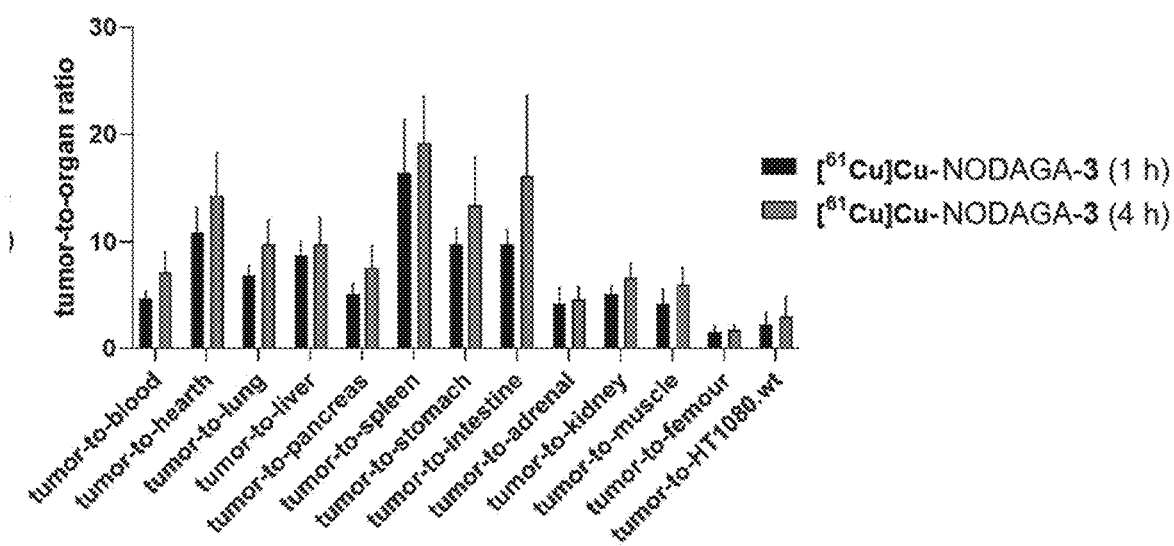

FIG. 10, panels A-B, show the tumor-to-organ ratios of [$^{61}$Cu]Cu-NODAGA-1 (panel A) and [$^{61}$Cu]Cu-NODAGA-3 (panel B), in HT-1080.hFAP tumor-bearing mice at 1 hour and 4 hours following administration.

Figure 11:
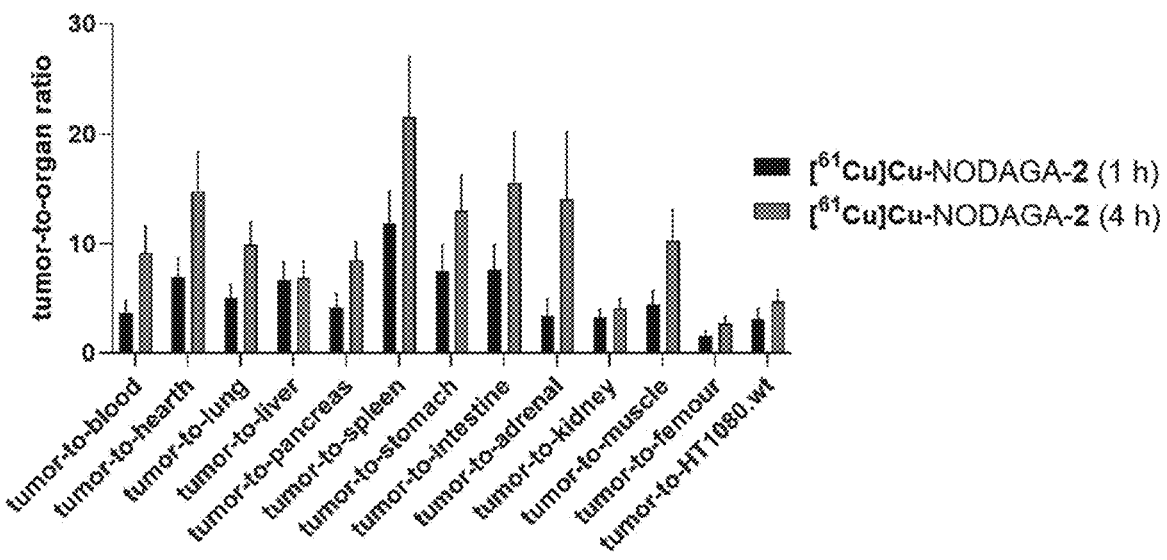
Figure 11:
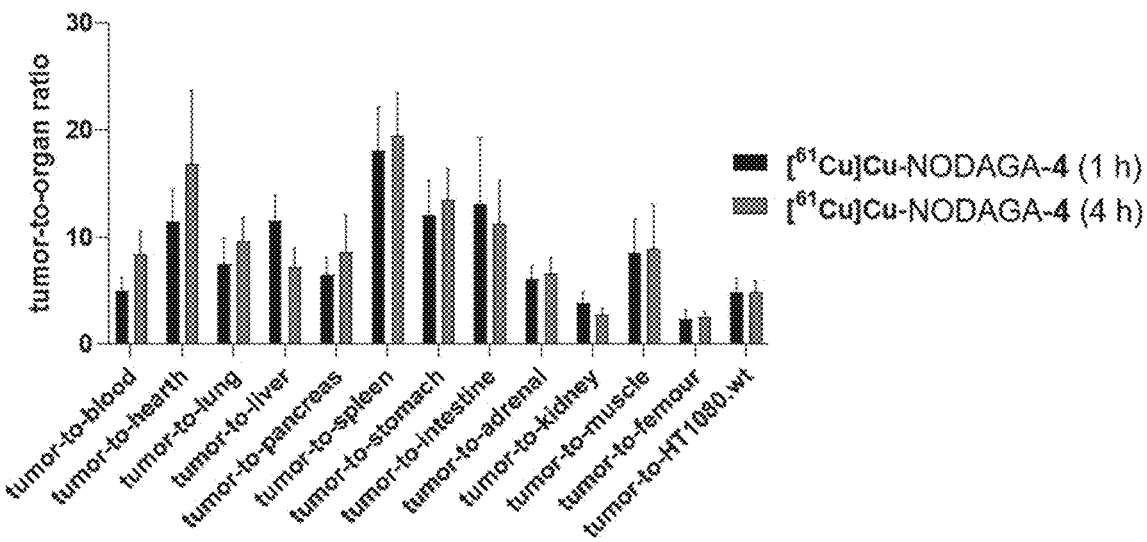

FIG. 11, panels A-B, show the tumor-to-organ ratios of [$^{61}$Cu]Cu-NODAGA-2 (panel A), and [$^{61}$Cu]Cu-NODAGA-4 (panel B) in HT-1080.hFAP tumor-bearing mice at 1 hour and 4 hours following administration.

Figure 12:
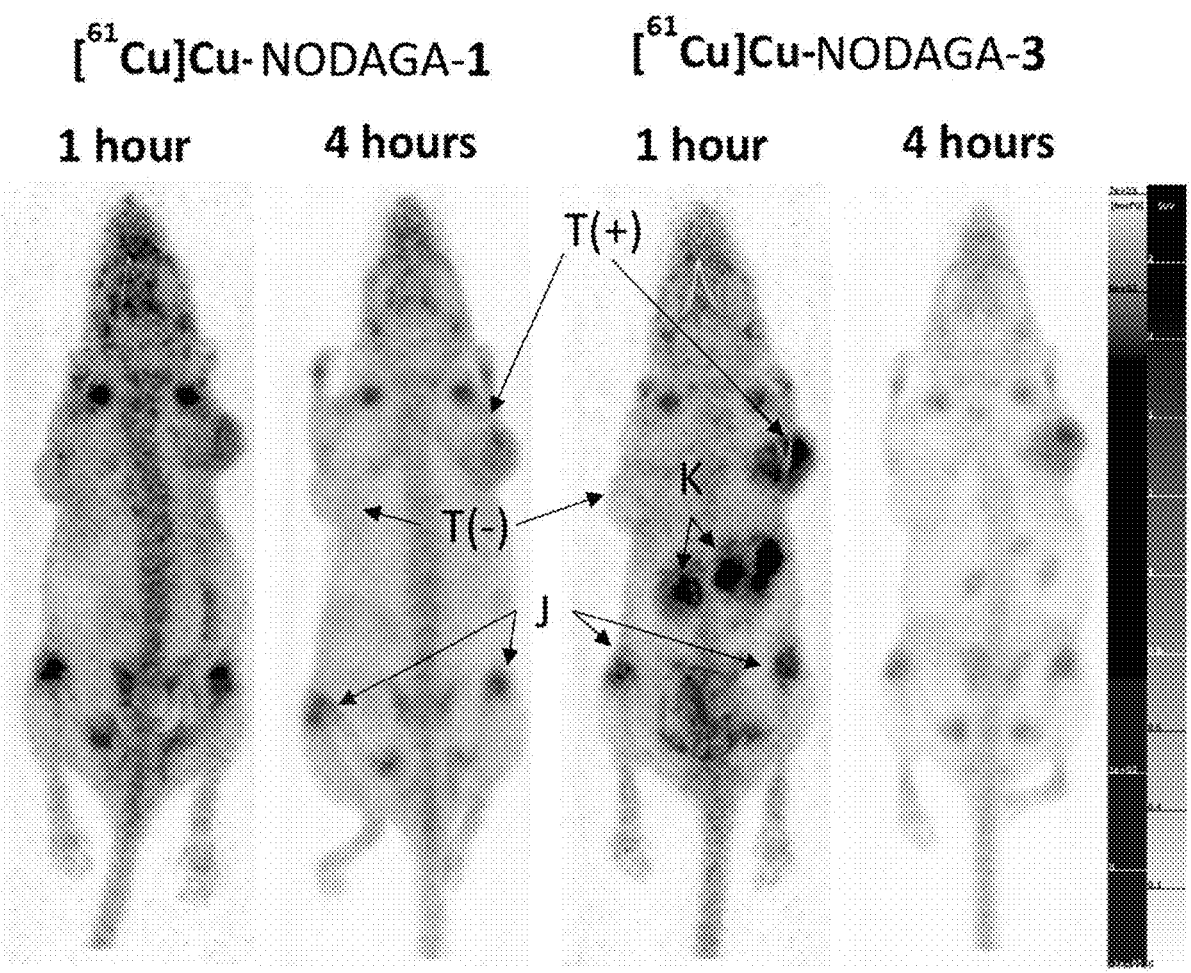

FIG. 12 shows the dynamic PET/CT scans of [$^{61}$Cu]Cu-NODAGA-1 and [$^{61}$Cu]Cu-NODAGA-3 in mice bearing FAP-positive xenografts.

Figure 13:
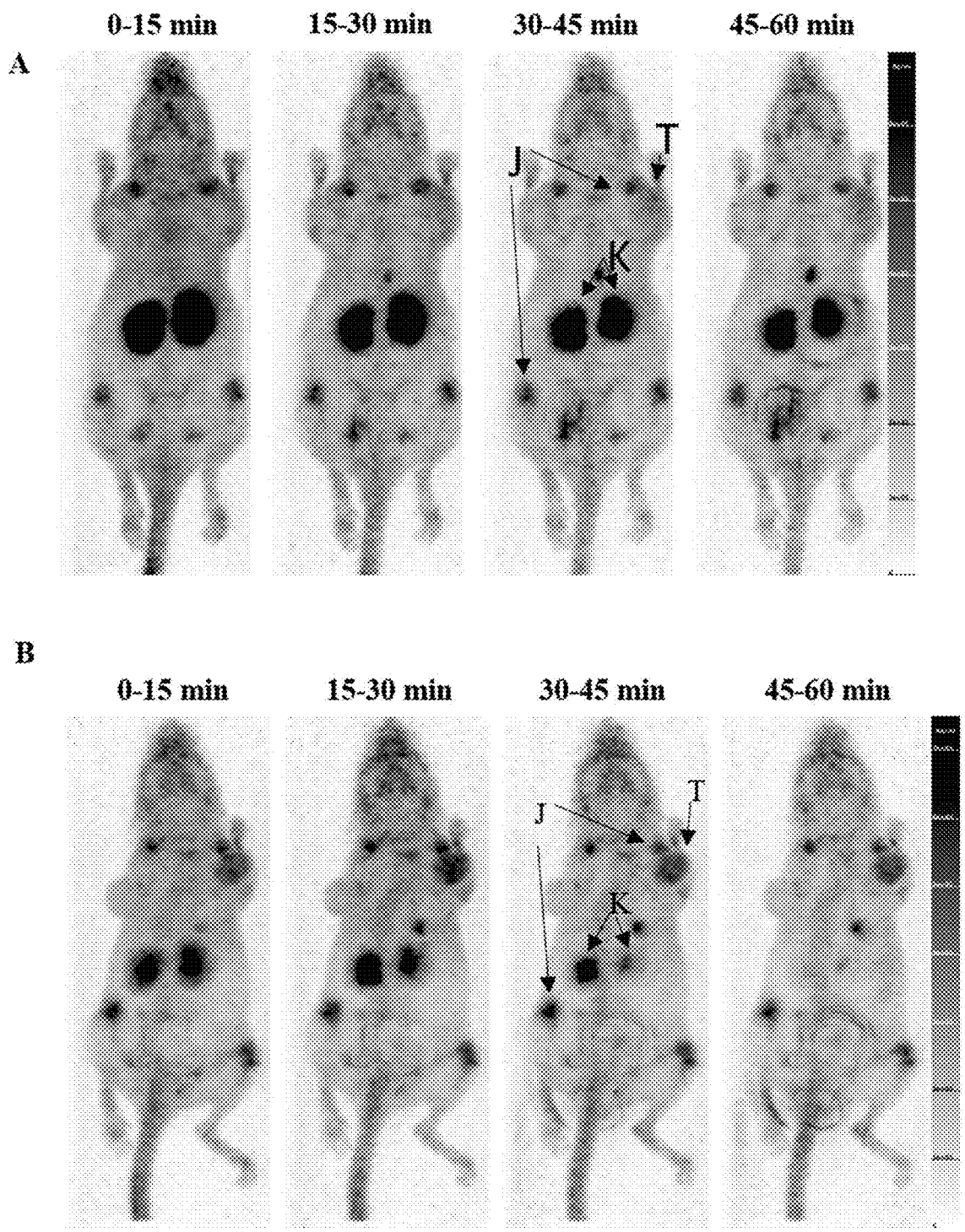

FIG. 13, panels A and B, show the dynamic PET/CT scans of [$^{61}$Cu]Cu-NODAGA-2 (panel A) and [$^{61}$Cu]Cu-NODAGA-4 (panel B) in mice bearing FAP-positive xenografts.

Figure 14:
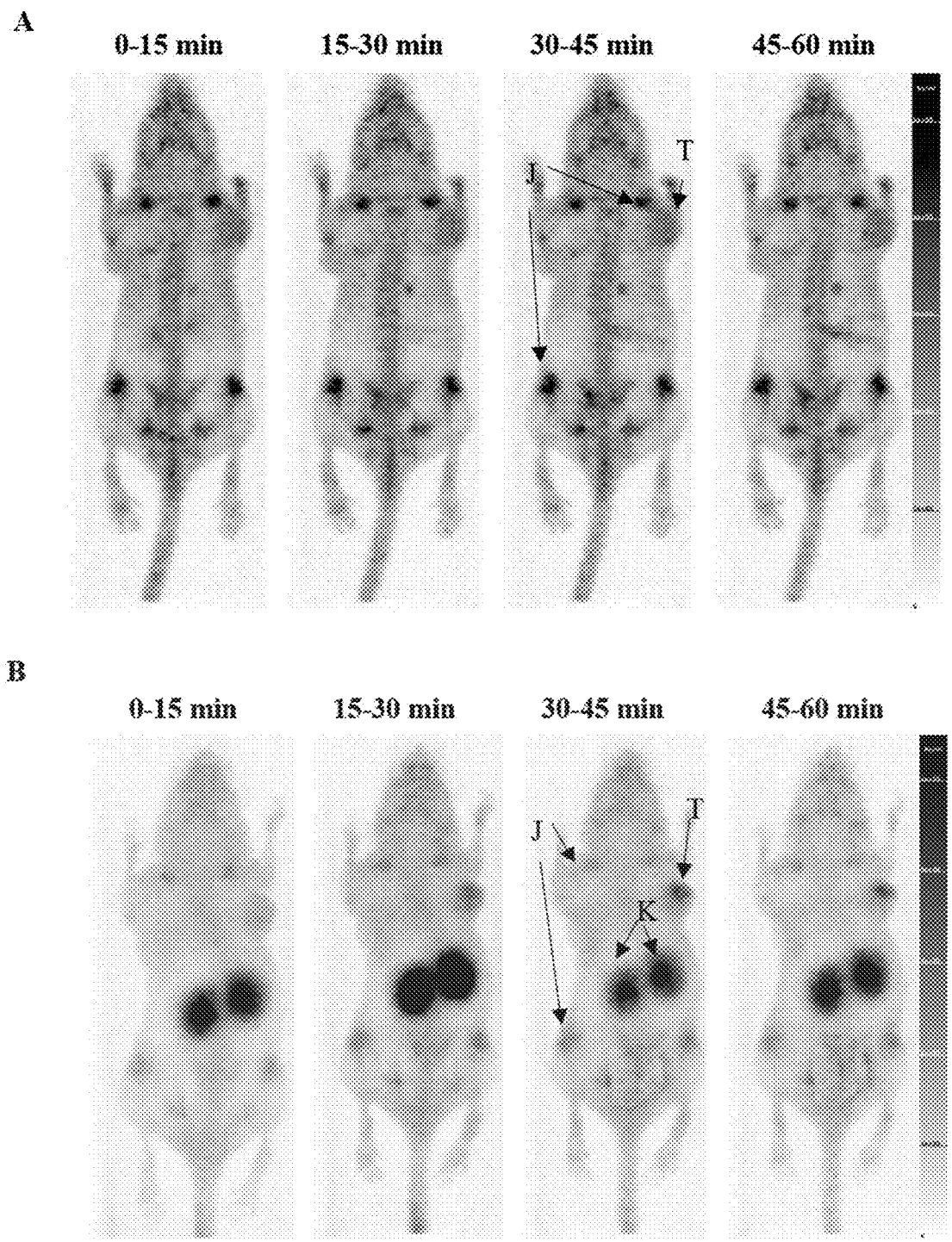

FIG. 14, panels A and B, show the dynamic PET/CT scans of [$^{61}$Cu]Cu-NODAGA-FAPI-46 (panel A) and [$^{68}$Ga]Ga-FAPI-46 (panel B) in mice bearing FAP-positive xenografts.

Figure 15:
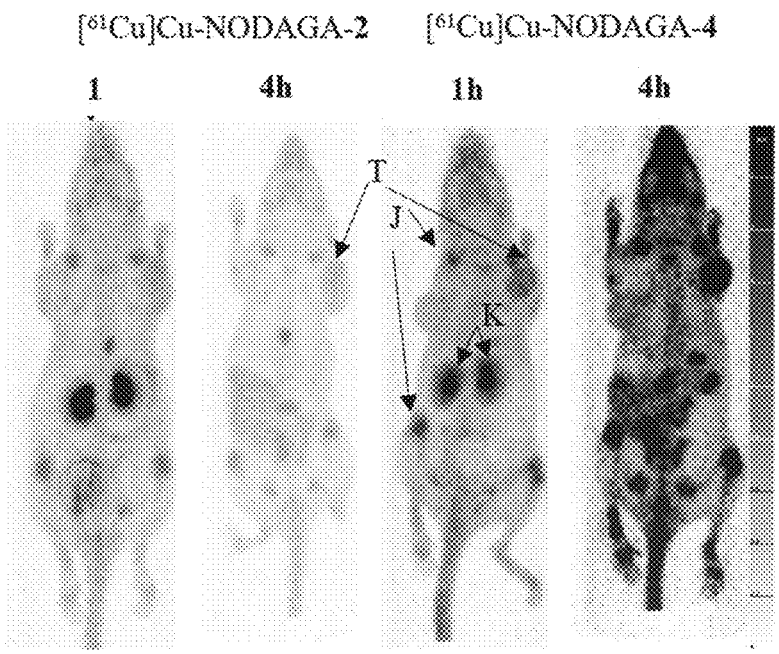
Figure 15:
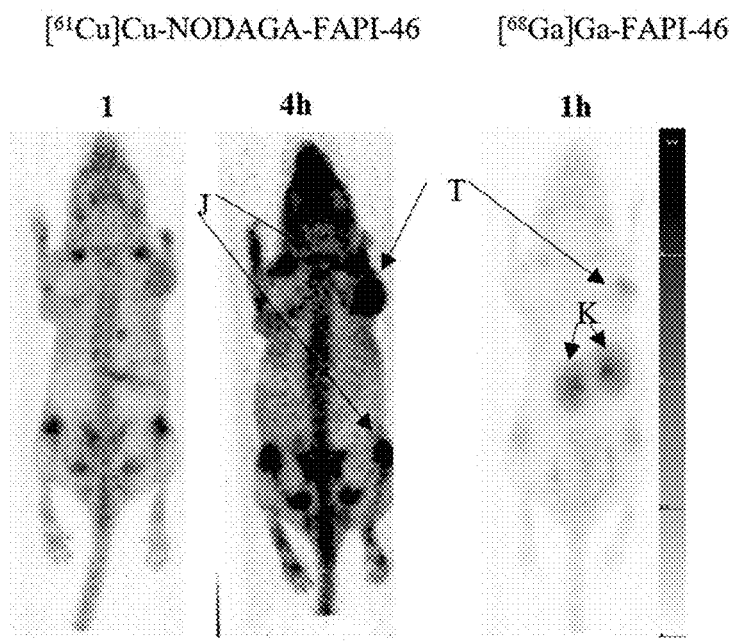

FIG. 15, panels A and B, show SUV PET imaging of [$^{61}$Cu]Cu-NODAGA-2 and [$^{61}$Cu]Cu-NODAGA-4 (1 h and 4 h) (panel A) and [$^{61}$Cu]Cu-NODAGA-FAPI-46 vs $^{68}$Ga-FAPI-46 (1 h and 4 h for [$^{61}$Cu]Cu-NODAGA-FAPI-46 and 1 h only for [$^{68}$Ga]Ga-FAPI-46) (panel B).

Figure 16:
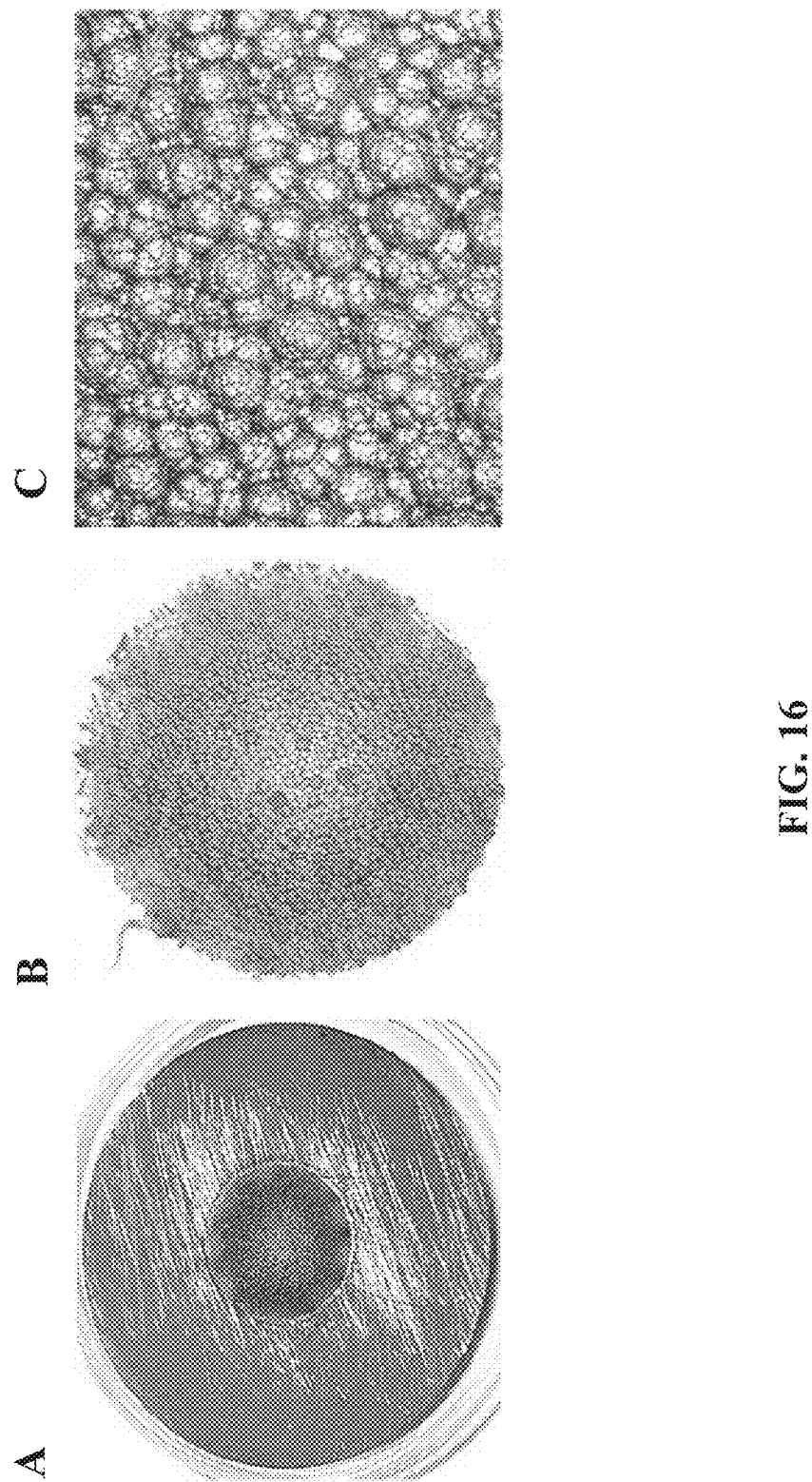

FIG. 16, panels A-C, display, with increasing magnification, a homogenous Ni coating having durable adhesion to the niobium coin upon completion of electroplating, as evaluated using a DINOLite digital microscope to observe the crystal structure and homogeneity of the surface.

Figure 17:
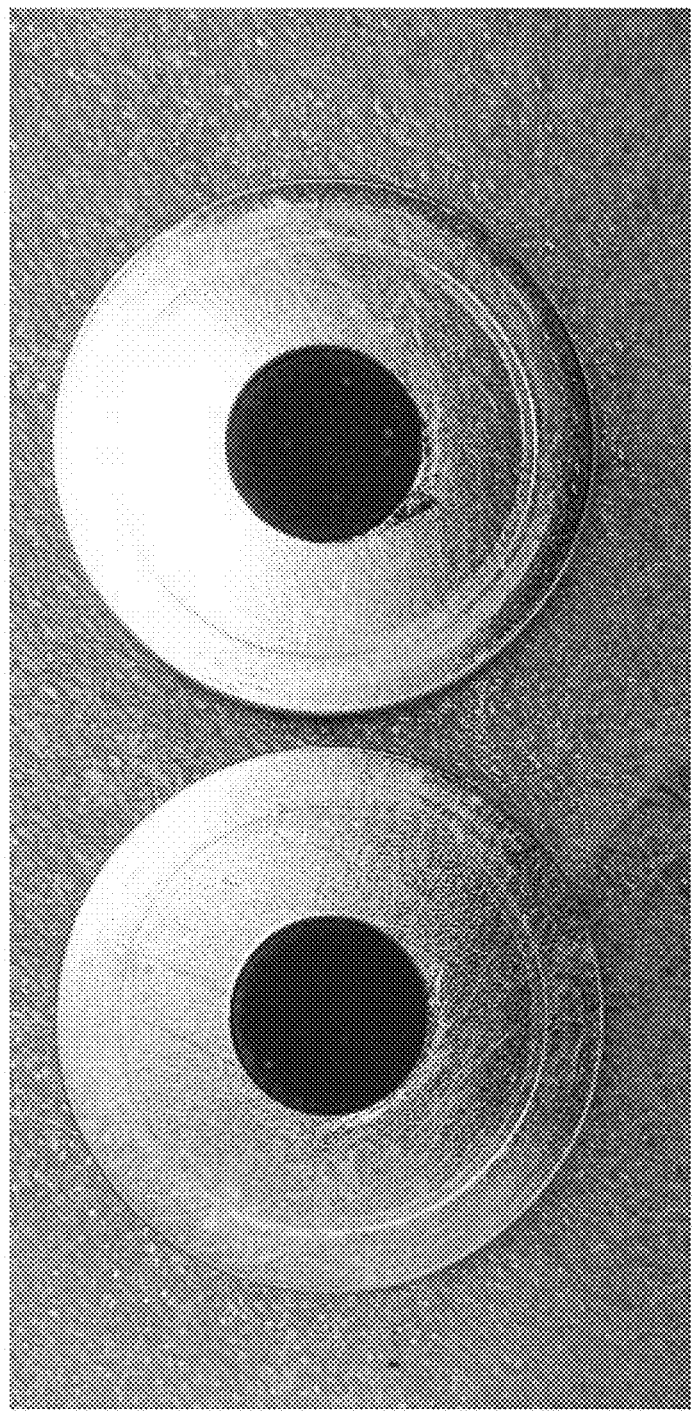

FIG. 17 shows samples of target backing coin with nickel electrodeposited in the center of a niobium backing.

Figure 18:
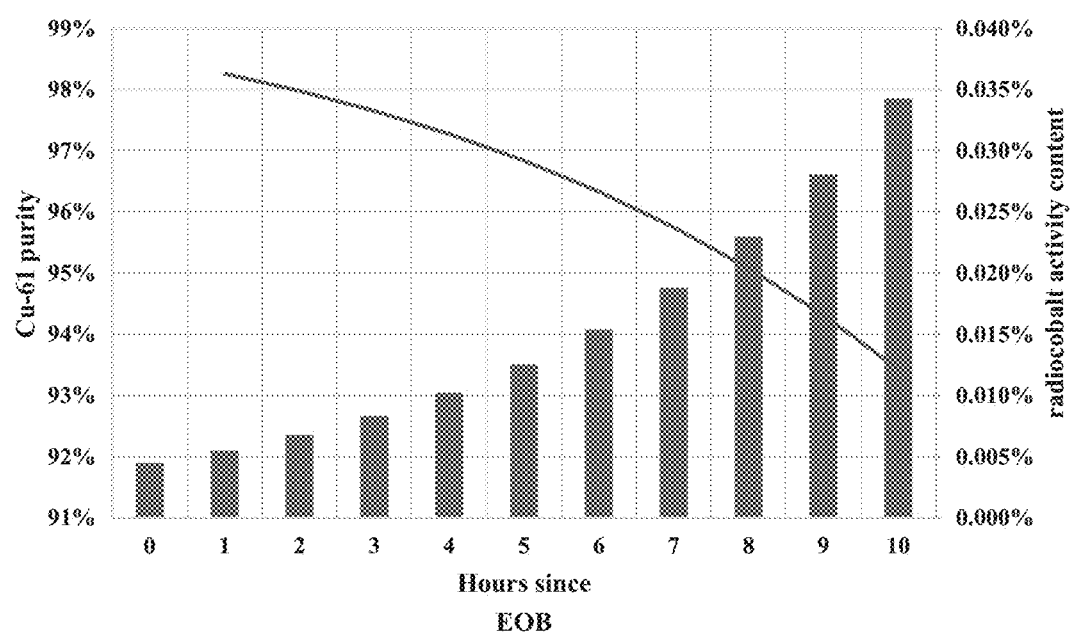

FIG. 18 shows analysis of $^{61}$Cu purity of a [$^{61}$Cu]CuCl$_2$ solution obtained by irradiation of $^{nat}$Ni on Nb backing with a deuteron beam at 8.4 MeV for 3 h at 50 μA. The line corresponds to change in % purity of $^{61}$Cu over time and the bars correspond to radiocobalt activity over time.

Figure 19:
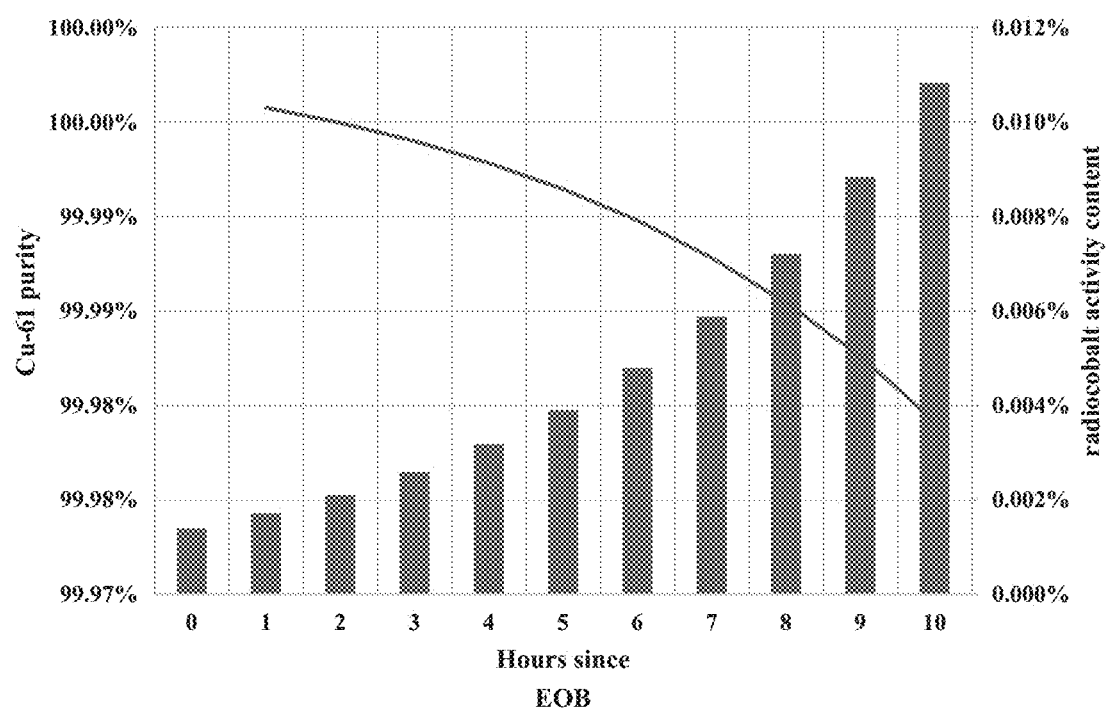

FIG. 19 shows analysis of $^{61}$Cu purity of a [$^{61}$Cu]CuCl$_2$ solution obtained by irradiation of $^{60}$Ni on Nb backing with a deuteron beam at 8.4 MeV for 3 h at 50 μA. The line corresponds to change in % purity of $^{61}$Cu over time and the bars correspond to radiocobalt activity over time.

Figure 20:
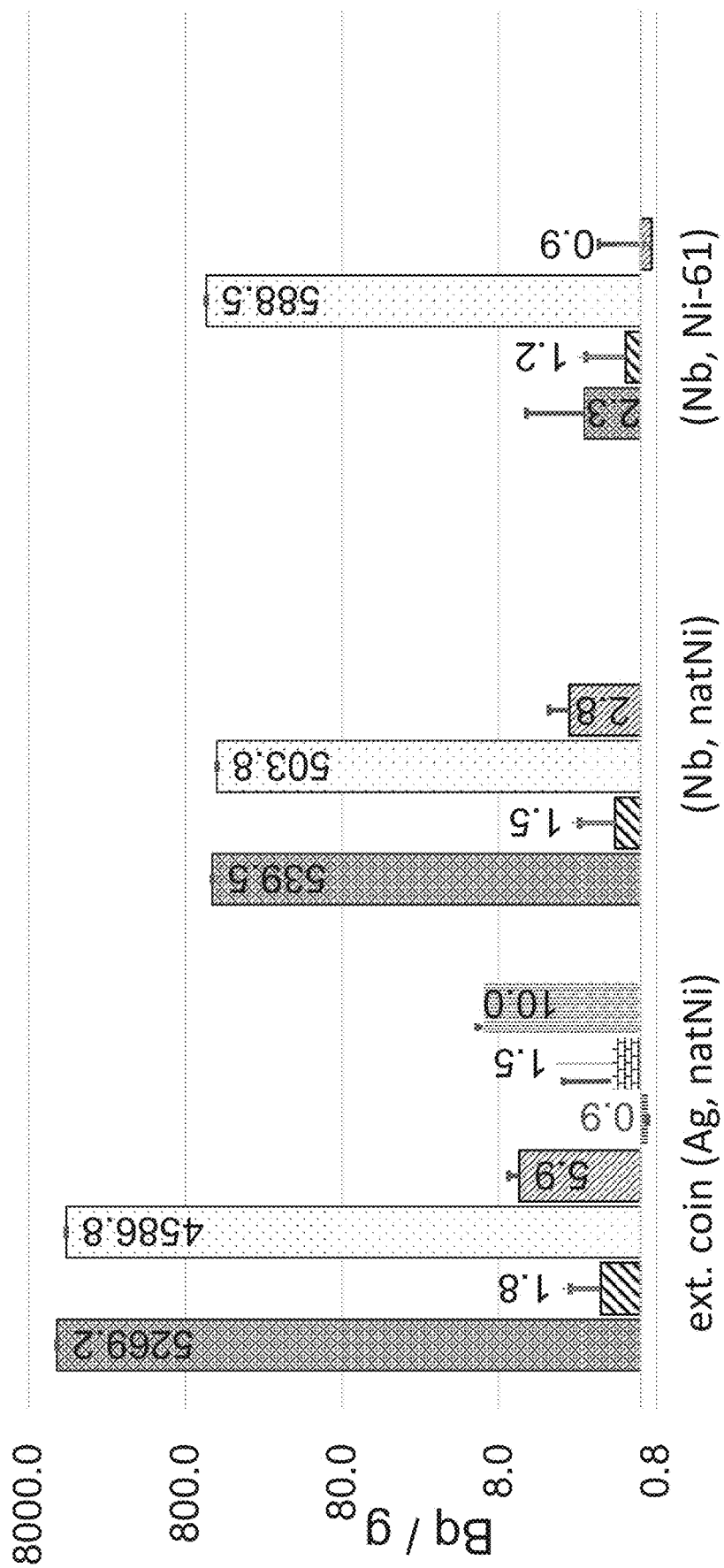

FIG. 20 compares the radionuclidic purity of [$^{61}$Cu]CuCl$_2$ solution that is produced with commercially available $^{nat}$Ni targets on Ag backing and the radionuclidic purity of [$^{61}$Cu]CuCl$_2$ solution produced by certain embodiments of the present disclosure when assessed by gamma spectrometry in Bq/g. Ag and Co isotopes are significantly reduced in the [$^{61}$Cu]CuCl$_2$ solution when produced by irradiation of Ni targets electroplated according to the present disclosure on high purity Nb backing (showing specific radionuclidic impurities).

Figure 21:
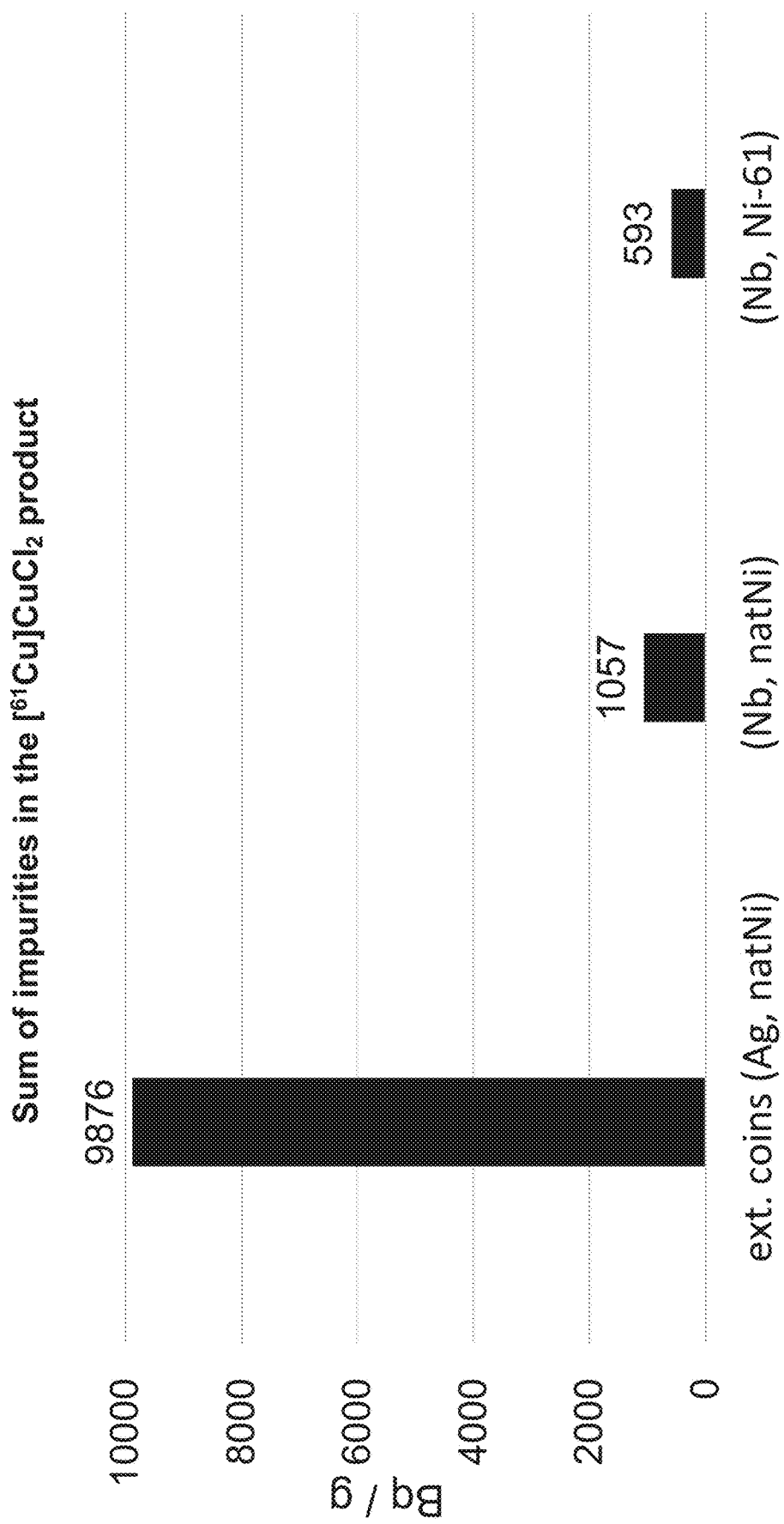

FIG. 21 displays how the radionuclidic purity of [$^{61}$Cu]CuCl$_2$ solution that is produced with commercially available $^{nat}$Ni targets (Ag backing) compares to the radionuclidic purity of [$^{61}$Cu]CuCl$_2$ solution produced by irradiation of Ni targets electroplated according to the present disclosure on high purity Nb backing when assessed by gamma spectrometry in Bq/g (summed radionuclidic impurities). The presented data highlight in particular the reduction of overall impurities in the [$^{61}$Cu]CuCl$_2$ solution when produced by embodiments of the present disclosure.

Figure 22:
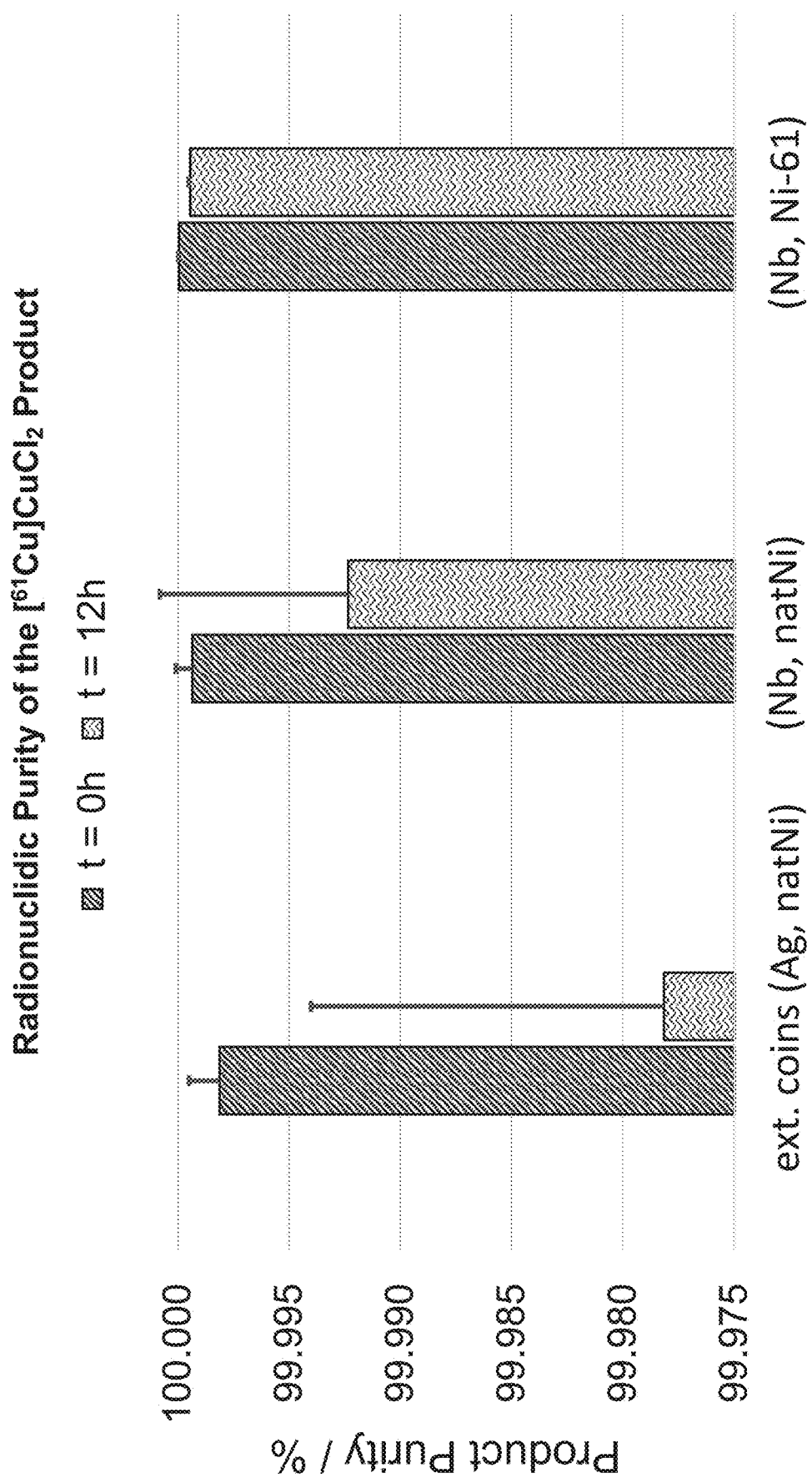

FIG. 22 displays how the radionuclidic purity of [$^{61}$Cu] CuCl$_2$ solution that is produced with commercially available $^{nat}$Ni targets on Ag backing compared to the radionuclidic purity of [$^{61}$Cu]CuCl$_2$ solution produced by irradiation of Ni targets electroplated according to the present disclosure on high purity Nb backing when assessed by gamma spectrometry in Bq/g (summed radionuclidic impurities) at t=0 h and at t=12 h. The presented data highlight the superior quality of the [$^{61}$Cu]CuCl$_2$ solution when produced by irradiation of Ni targets electroplated according to the present disclosure on high purity Nb backing, where the purity after 12 hours is still well above the purity limits set by pharmacopeia for similar radionuclides for medical use.

Figure 23:
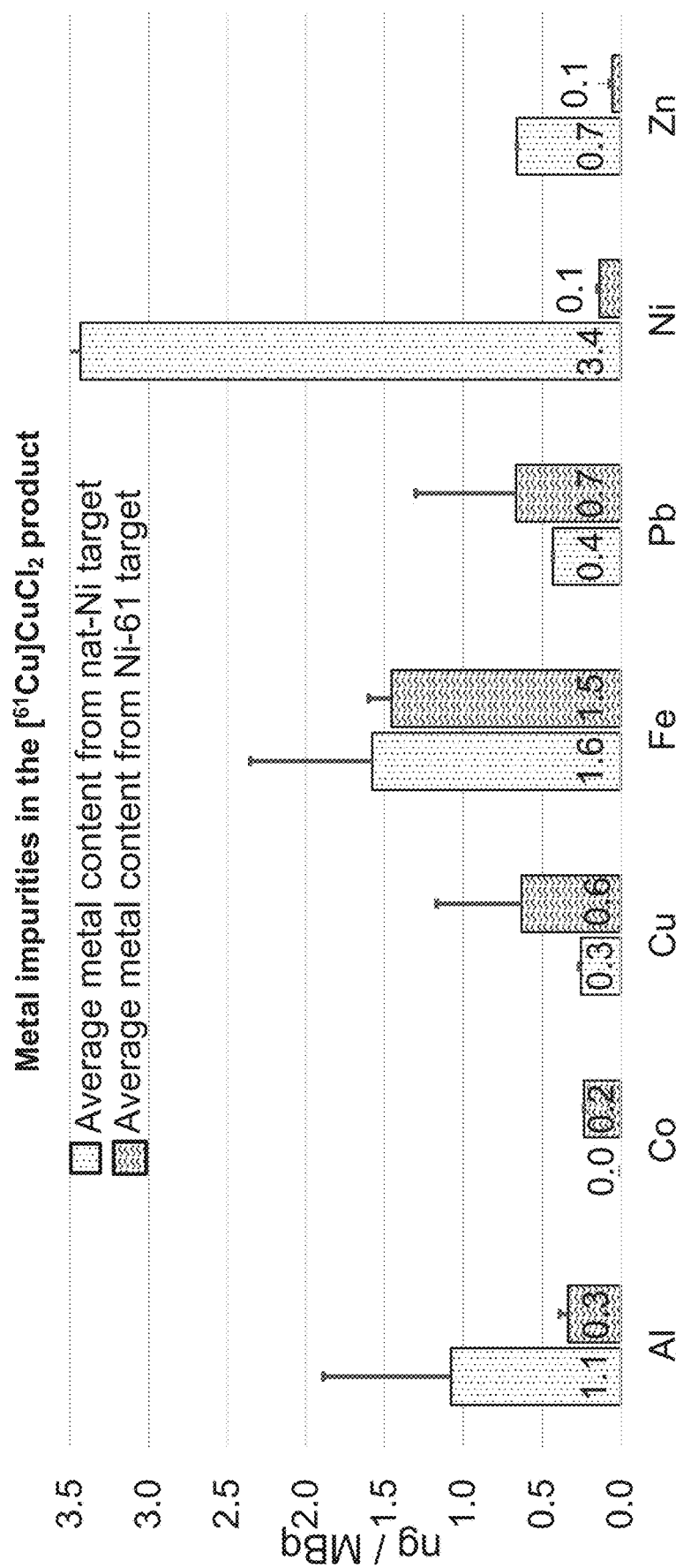

FIG. 23 displays chemical impurities, as measured by ICP-MS, of the [$^{61}$Cu]CuCl$_2$ solution when produced by bombardment of $^{nat}$Ni vs. $^{61}$Ni when produced by irradiation of Ni targets electroplated according to the present disclosure on high purity Nb backing.

Figure 24:
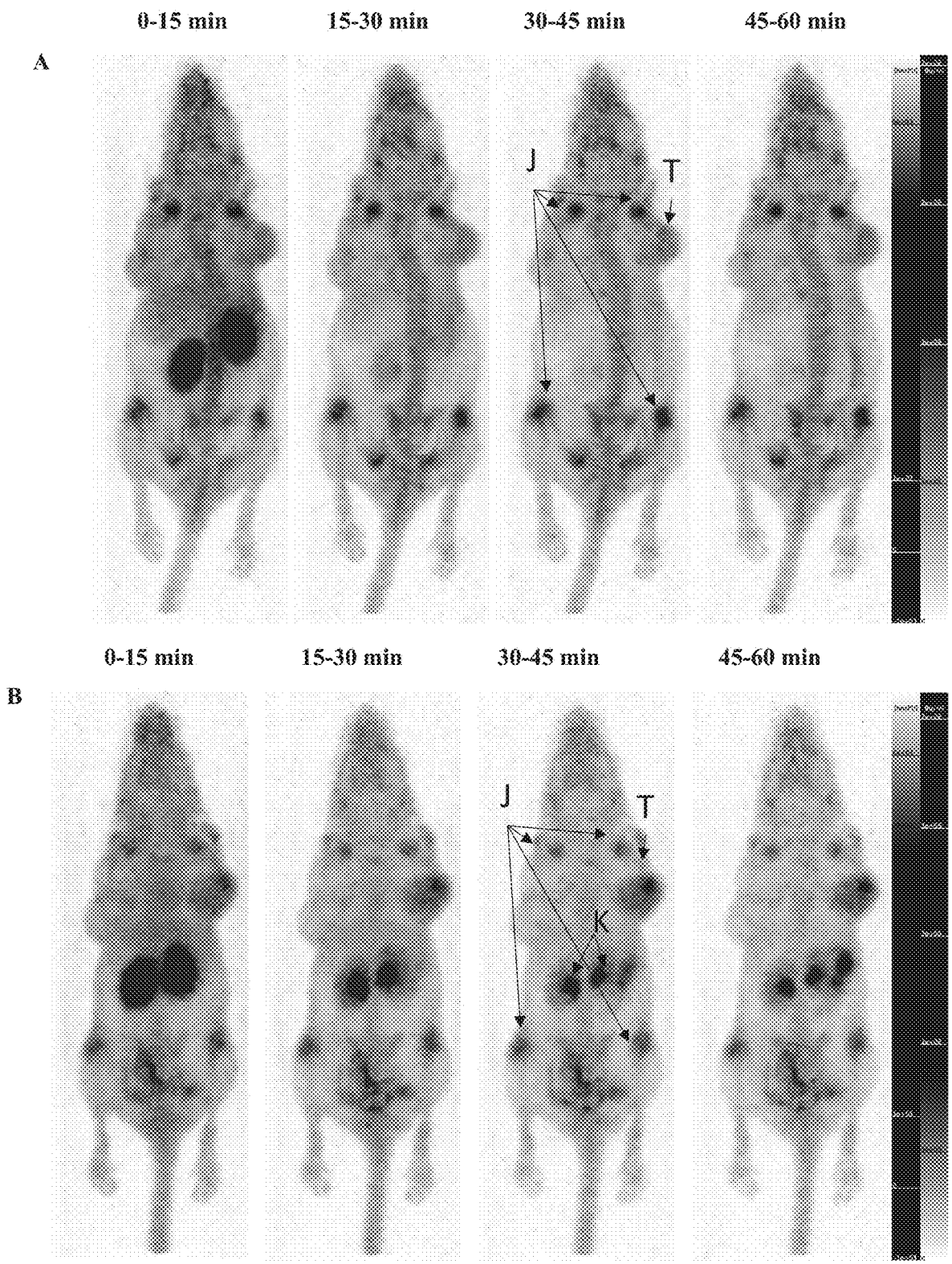

FIG. 24 panels A-B illustrate the dynamic PET/CT scans of [$^{61}$Cu]Cu-NODAGA-F1 (panel A) and [$^{61}$Cu]Cu-NODAGA-F3 (panel B) in dual HT1080.hFAP and HT1080.wt tumor-bearing mice within 1 hour.

4. DETAILED DESCRIPTION

1. Definitions

When describing the embodiments of the present disclosure, which may include compounds and pharmaceutically acceptable salts thereof, pharmaceutical compositions containing such compounds and methods of using such compounds and compositions, the following terms, if present, have the following meanings unless otherwise indicated.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

As used herein, the term "alkyl" refers to both straight and branched chain $C_1$-$C_{30}$ hydrocarbons and includes both saturated and unsaturated hydrocarbons. The use of designations such as, for example, "$C_1$-$C_{20}$" is intended to refer to an alkyl (e.g., straight or branched chain and inclusive of alkenes and alkyls) having the recited range carbon atoms. In certain embodiments, an alkyl group has 1 to 10 carbon atoms ("$C_1$-$C_{10}$ alkyl"). In certain embodiments, an alkyl group has 1 to 9 carbon atoms ("$C_1$-$C_9$ alkyl"). In certain embodiments, an alkyl group has 1 to 8 carbon atoms ("$C_1$-$C_8$ alkyl"). In certain embodiments, an alkyl group has 1 to 7 carbon atoms ("$C_1$-$C_7$ alkyl"). In certain embodiments, an alkyl group has 1 to 6 carbon atoms ("$C_1$-$C_6$ alkyl"). In certain embodiments, an alkyl group has 1 to 5 carbon atoms ("$C_1$-$C_5$ alkyl"). In certain embodiments, an alkyl group has 1 to 4 carbon atoms ("$C_1$-$C_4$ alkyl"). In certain embodiments, an alkyl group has 1 to 3 carbon atoms ("$C_1$-$C_3$ alkyl"). In certain embodiments, an alkyl group has 1 to 2 carbon atoms ("$C_1$-$C_2$ alkyl"). In certain embodiments, an alkyl group has 1 carbon atom ("$C_1$ alkyl"). Examples of $C_{1-6}$ alkyl groups include methyl, ethyl, propyl, isopropyl, butyl, isobutyl, pentyl, hexyl, and the like. Representative straight chain alkyls include methyl, ethyl, n-propyl, n-butyl, n-pentyl, n-hexyl, and the like; while saturated branched alkyls include isopropyl, sec-butyl, isobutyl, tert-butyl, isopentyl, and the like. Representative saturated cyclic alkyls include cyclopropyl, cyclobutyl, cyclopentyl, cyclohexyl, and the like.

As used herein, the term "alkenyl" refers to a radical of a straight-chain or branched hydrocarbon group having from 2 to 20 carbon atoms, one or more carbon-carbon double bonds (e.g., 1, 2, 3, or 4 carbon-carbon double bonds), and optionally one or more carbon-carbon triple bonds (e.g., 1, 2, 3, or 4 carbon-carbon triple bonds) ("$C_2$-$C_{20}$ alkenyl"). In certain embodiments, alkenyl does not contain any triple bonds. In certain embodiments, an alkenyl group has 2 to 10 carbon atoms ("$C_2$-$C_{10}$ alkenyl"). In certain embodiments, an alkenyl group has 2 to 9 carbon atoms ("$C_2$-$C_9$ alkenyl"). In certain embodiments, an alkenyl group has 2 to 8 carbon atoms ("$C_2$-$C_8$ alkenyl"). In certain embodiments, an alkenyl group has 2 to 7 carbon atoms ("$C_2$-$C_7$ alkenyl"). In certain embodiments, an alkenyl group has 2 to 6 carbon atoms ("$C_2$-$C_6$ alkenyl"). In certain embodiments, an alkenyl group has 2 to 5 carbon atoms ("$C_2$-$C_5$ alkenyl"). In certain embodiments, an alkenyl group has 2 to 4 carbon atoms ("$C_2$-$C_4$ alkenyl"). In certain embodiments, an alkenyl group has 2 to 3 carbon atoms ("$C_2$-$C_3$ alkenyl"). In certain embodiments, an alkenyl group has 2 carbon atoms ("$C_2$ alkenyl"). The one or more carbon-carbon double bonds can be internal (such as in 2-butenyl) or terminal (such as in 1-butenyl). Examples of $C_{2-4}$ alkenyl groups include ethenyl ($C_2$), 1-propenyl ($C_3$), 2-propenyl ($C_3$), 1-butenyl ($C_4$), 2-butenyl ($C_4$), butadienyl ($C_4$), and the like. Examples of $C_{2-6}$ alkenyl groups include the aforementioned $C_{2-4}$ alkenyl groups as well as pentenyl ($C_5$), pentadienyl ($C_5$), hexenyl ($C_6$), and the like. Additional examples of alkenyl include heptenyl ($C_7$), octenyl ($C_8$), octatrienyl ($C_9$), and the like.

As used herein, the terms "alkylene," "alkenylene," and "alkynylene" refer to a divalent radical of an alkyl, alkenyl, or alkynyl group, respectively. When a range or number of carbons is provided for a particular "alkylene," "alkenylene," or "alkynylene," it is understood that the range or number refers to the range or number of carbons in the linear carbon divalent chain. "Alkylene," "alkenylene," and "alkynylene" groups may be substituted or unsubstituted with one or more substituents as described herein.

As used herein, the term "aryl" refers to aromatic groups (e.g., monocyclic, bicyclic and tricyclic structures) containing six to ten carbons in the ring portion. The aryl groups may be optionally substituted through available carbon atoms and in certain embodiments may include one or more heteroatoms such as oxygen, nitrogen or sulfur. In some embodiments, an aryl group has six ring carbon atoms ("$C_6$ aryl"; e.g., phenyl). In some embodiments, an aryl group has ten ring carbon atoms ("$C_{10}$ aryl"; e.g., naphthyl such as 1-naphthyl and 2-naphthyl).

As used herein, the terms "chelating moiety" or "chelator" are used interchangeably in the context of the present disclosure and refer to a molecule, often an organic molecule, and often a Lewis base, having two or more unshared electron pairs available for donation to a metal ion. The metal ion is usually coordinated by two or more electron pairs to the chelating moiety. The terms, "bidentate chelating moiety", "tridentate chelating moiety," and "tetradentate chelating moiety" refer to chelating moieties having, respectively, two, three, and four electron pairs readily available for simultaneous donation to a metal ion coordinated by the chelating moiety. Usually, the electron pairs of a chelating moiety form coordinate bonds with a single metal ion; however, in certain examples, a chelating moiety may form coordinate bonds with more than one metal ion, with a variety of binding modes being possible.

With respect to chemical structures that include a chelated metal, the structure as drawn is not intended to define the coordination sphere. Further, the presence or absence of a proton on an ionizable binding moiety is not intended to be definitive. A person of skill in the art will be able to determine the coordination sphere, oxidation states and degree of ionization on a case by case basis.

As used herein, the terms "effective amount," "pharmaceutically effective amount," or "therapeutically effective amount" mean a sufficient amount of the compound or composition to provide the desired utility when administered to a subject. The term "therapeutically effective amount" therefore refers to an amount of a compound or composition that is sufficient to promote a particular effect when administered to a subject in need of treatment. In certain embodiments, an effective amount includes an amount of compound or composition sufficient to prevent or delay the development of a symptom of the disease, alter the course of a symptom of the disease (for example but not limited to, slow the progression of a symptom of the disease), or reverse a symptom of the disease. In certain embodiments, an effective amount includes an amount of compound or composition sufficient to generate an image of subject. In certain embodiments, an effective amount includes an amount of compound or composition sufficient to diagnose a disease in a subject. It is understood that for any given case, an appropriate "effective amount" can be determined by one of ordinary skill in the art using routine experimentation. For example, when administered in clinic, such compounds or compositions will contain an amount of active ingredient effective to achieve the desired result (e.g., imaging cancerous tissue and/or decreasing an amount of cancerous tissue in a subject).

As used herein, "halo" and "halogen" refer to an atom selected from fluorine (fluoro, F), chlorine (chloro, Cl), bromine (bromo, Br), and iodine (iodo, I).

As used herein, "heteroaryl" refers to a radical of a 5-10 membered monocyclic or bicyclic 4n+2 aromatic ring system (e.g., having 6 or 10 electrons shared in a cyclic array) having ring carbon atoms and 1-4 ring heteroatoms provided in the aromatic ring system, wherein each heteroatom is independently selected from nitrogen, oxygen and sulfur ("5-10 membered heteroaryl"). In heteroaryl groups that contain one or more nitrogen atoms, the point of attachment can be a carbon or nitrogen atom, as valency permits. Heteroaryl bicyclic ring systems can include one or more heteroatoms in one or both rings. "Heteroaryl" includes ring systems wherein the heteroaryl ring, as defined above, is fused with one or more carbocyclyl or heterocyclyl groups wherein the point of attachment is on the heteroaryl ring, and in such instances, the number of ring members continue to designate the number of ring members in the heteroaryl ring system. "Heteroaryl" also includes ring systems wherein the heteroaryl ring, as defined above, is fused with one or more aryl groups wherein the point of attachment is either on the aryl or heteroaryl ring, and in such instances, the number of ring members designates the number of ring members in the fused (aryl/heteroaryl) ring system. Bicyclic heteroaryl groups wherein one ring does not contain a heteroatom (e.g., indolyl, quinolinyl, carbazolyl, and the like) the point of attachment can be on either ring, i.e., either the ring bearing a heteroatom (e.g., 2-indolyl) or the ring that does not contain a heteroatom (e.g., 5-indolyl).

As used herein, the term "heterocyclyl" or "heterocyclic" refers to a radical of a 3- to 10-membered non-aromatic ring system having ring carbon atoms and 1 to 4 ring heteroatoms, wherein each heteroatom is independently selected from nitrogen, oxygen, sulfur, boron, phosphorus, and silicon ("3-10 membered heterocyclyl"). In heterocyclyl groups that contain one or more nitrogen atoms, the point of attachment can be a carbon or nitrogen atom, as valency permits. A heterocyclyl group can either be monocyclic ("monocyclic heterocyclyl") or a fused, bridged or spiro ring system such as a bicyclic system ("bicyclic heterocyclyl"), and can be saturated or can be partially unsaturated. Heterocyclyl bicyclic ring systems can include one or more heteroatoms in one or both rings. "Heterocyclyl" also includes ring systems wherein the heterocyclyl ring, as defined above, is fused with one or more carbocyclyl groups wherein the point of attachment is either on the carbocyclyl or heterocyclyl ring, or ring systems wherein the heterocyclyl ring, as defined above, is fused with one or more aryl or heteroaryl groups, wherein the point of attachment is on the heterocyclyl ring, and in such instances, the number of ring members continue to designate the number of ring members in the heterocyclyl ring system. The terms "heterocycle," "heterocyclyl," "heterocyclyl ring," "heterocyclic group," "heterocyclic moiety," and "heterocyclic radical," may be used interchangeably. Heterocycles include morpholinyl, pyrrolidinonyl, pyrrolidinyl, piperidinyl, piperizynyl, hydantoinyl, valerolactamyl, oxiranyl, oxetanyl, tetrahydrofuranyl, tetrahydropyranyl, tetrahydropyridinyl, tetrahydroprimidinyl, tetrahydrothiophenyl, tetrahydrothiopyranyl, tetrahydropyrimidinyl, tetrahydrothiophenyl, tetrahydrothiopyranyl, and the like.

As used herein, the term "pharmaceutically acceptable salt" refers to those salts which are, within the scope of sound medical judgment, suitable for use in contact with the tissues of humans and lower animals without undue toxicity, irritation, allergic response, and the like, and are commensurate with a reasonable benefit/risk ratio. Pharmaceutically acceptable salts are well known in the art. For example, Berge et al., describes pharmaceutically acceptable salts in detail in J. Pharmaceutical Sciences (1977) 66:1-19. Pharmaceutically acceptable salts of the compounds of this disclosure include those derived from suitable inorganic and organic acids and bases. Examples of pharmaceutically acceptable, nontoxic acid addition salts are salts of an amino group formed with inorganic acids such as hydrochloric acid, hydrobromic acid, phosphoric acid, sulfuric acid and perchloric acid or with organic acids such as acetic acid, oxalic acid, maleic acid, tartaric acid, citric acid, succinic acid, or malonic acid or by using other methods used in the art such as ion exchange. Other pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Pharmaceutically acceptable salts derived from appropriate bases include alkali metal, alkaline earth metal, ammonium, and N+(C1-4alkyl)4 salts. Representative alkali or alkaline earth metal salts include sodium, lithium, potassium, calcium, magnesium, and the like. Further pharmaceutically acceptable salts include, when appropriate, nontoxic ammonium, quaternary ammonium, and amine cations formed using counterions such as halide, hydroxide, carboxylate, sulfate, phosphate, nitrate, lower alkyl sulfonate, and aryl sulfonate.

As used herein, the term "radioactive moiety" refers to a molecular assembly which carries a radioactive nuclide. The nuclide is bound by covalent or coordinate bonds, or a combination thereof, which remain stable under physiological conditions.

As used herein, "radioisotope" refers to a radioactive isotope of an element (included by the term "radionuclide") emitting, for example, α-, β-, and/or γ-radiation.

As used herein, "radiotracer" refers to a compound of the present disclosure comprising a radionuclide or radioisotope. The radionuclide can be chelated to a chelating moiety that is a covalently bound component of the radiotracer, or the radionuclide itself can be a covalently bound component of the radiotracer. It is understood herein that when a compound, e.g., a radiotracer, is described as comprising a particular radioisotope or radionuclide (e.g., $^{61}Cu$) that the compound is isotopically enriched in that isotope at the indicated position.

As used herein, the term "substituted", whether preceded by the term "optionally" or not, means that at least one hydrogen present on a group (e.g., a hydrogen attached to a carbon or nitrogen atom of a group) is replaced with a permissible substituent, e.g., a substituent which upon substitution results in a stable compound, e.g., a compound which does not spontaneously undergo transformation such as by rearrangement, cyclization, elimination, or other reaction. Unless otherwise indicated, a "substituted" group has a substituent at one or more substitutable positions of the group, and when more than one position in any given structure is substituted, the substituent is either the same or different at each position.

When a range of values is listed, it is intended to encompass each value and sub-range within the range. For example, "$C_1$-$C_6$ alkyl" is intended to encompass, $C_1$, $C_2$, $C_3$, $C_4$, $C_5$, $C_6$, $C_1$-$C_6$, $C_1$-$C_5$, $C_1$-$C_4$, $C_1$-$C_3$, $C_1$-$C_2$, $C_2$-$C_6$, $C_2$-$C_5$, $C_2$-$C_4$, $C_2$-$C_3$, $C_3$-$C_6$, $C_3$-$C_5$, $C_3$-$C_4$, $C_4$-$C_6$, $C_4$-$C_5$, and $C_5$-$C_6$ alkyl.

In typical embodiments, the present disclosure is intended to encompass the compounds disclosed herein, and the pharmaceutically acceptable salts, pharmaceutically acceptable esters, tautomeric forms, polymorphs, and prodrugs of such compounds. In certain embodiments, the present disclosure includes a pharmaceutically acceptable addition salt, a pharmaceutically acceptable ester, a solvate (e.g., hydrate) of an addition salt, a tautomeric form, a polymorph, an enantiomer, a mixture of enantiomers, a stereoisomer or mixture of stereoisomers (pure or as a racemic or non-racemic mixture) of a compound described herein.

Compounds described herein can comprise one or more asymmetric centers, and thus can exist in various isomeric forms, e.g., enantiomers and/or diastereomers. For example, the compounds described herein can be in the form of an individual enantiomer, diastereomer or geometric isomer, or can be in the form of a mixture of stereoisomers, including racemic mixtures and mixtures enriched in one or more stereoisomer. Isomers can be isolated from mixtures by methods known to those skilled in the art, including chiral high pressure liquid chromatography (HPLC) and the formation and crystallization of chiral salts; or preferred isomers can be prepared by asymmetric syntheses. See, for example, Jacques et al., Enantiomers, Racemates and Resolutions (Wiley Interscience, New York, 1981); Wilen et al., Tetrahedron 33:2725 (1977); Eliel, Stereochemistry of Carbon Compounds (McGraw-Hill, N Y, 1962); and Wilen, Tables of Resolving Agents and Optical Resolutions p. 268 (E. L. Eliel, Ed., Univ. of Notre Dame Press, Notre Dame, IN 1972). The present disclosure additionally encompasses compounds described herein as individual isomers substantially free of other isomers, and alternatively, as mixtures of various isomers.

2. Compounds

In one aspect, the present disclosure provides FAP inhibitor compounds and compounds (also referred to a "conjugates") comprising the novel FAP inhibitors. The FAP inhibitors and conjugates thereof can be used in the diagnosis and treatment of diseases characterized by expression of FAP.

The present disclosure provides compounds, wherein the compound is of Formula I:

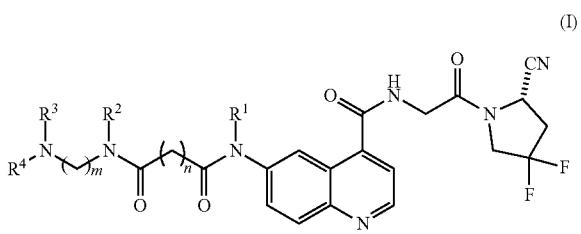

(I)

wherein:
$R^1$ is $R^a$;
$R^2$ and $R^3$ are each $R^a$ or together form a $C_{2-9}$ heterocycle with the nitrogen atoms to which they are attached;
$R^4$ is H, an amine protecting group, or -L-T;
$R^a$, independently for each occurrence, is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', —NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl;
L is a bond or a divalent linker;
T comprises (a) a chelating moiety suitable for chelating a radionuclide (b) an imaging agent, or (c) a drug;
n is an integer from 1 to 20; and
m is an integer from 1 to 20;
or is a pharmaceutically acceptable salt thereof.

In certain embodiments of Formula I, $R^1$ is H. In certain embodiments of Formula I, $R^1$ is selected from $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', —NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl. In certain embodiments of Formula I, $R^1$ is selected from H, $C_{1-10}$ alkyl, $C_{2-10}$ alkenyl, $C_{3-10}$ alkynyl, $C_{3-10}$ cycloalkyl, optionally substituted by one or more substituents selected from —OH, —OR', =O, =S, —SH, —SR', —NH$_2$, —NHR', —N(R')$_2$, —NHCOR', —NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl.

In certain embodiments of Formula I, $R^1$ is selected from H and $C_{1-10}$ alkyl. In certain embodiments of Formula I, $R^1$ is H. In certain embodiments of Formula I, $R^1$ is $C_{1-10}$ alkyl. In certain embodiments of Formula I, $R^1$ is $C_1$-$C_6$ alkyl. In certain embodiments of Formula I, R is selected from methyl, ethyl, propyl, isopropyl, butyl, isobutyl, pentyl and hexyl. In certain embodiments of Formula I, $R^1$ is methyl.

In certain embodiments of Formula I, $R^2$ is H. In certain embodiments of Formula I, $R^2$ is selected from $C_{1-10}$ alkyl, $C_{2-10}$ alkenyl, $C_{3-10}$ alkynyl, $C_{3-10}$ cycloalkyl, optionally substituted by one or more substituents selected from —OH, —OR', =O, =S, —SH, —SR', —NH$_2$, —NHR', —N(R')$_2$, —NHCOR', —NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl.

In certain embodiments of Formula I, $R^3$ is H. In certain embodiments of Formula I, $R^3$ is selected from $C_{1-10}$ alkyl, $C_{2-10}$ alkenyl, $C_{3-10}$ alkynyl, $C_{3-10}$ cycloalkyl, optionally substituted by one or more substituents selected from —OH, —OR', =O, =S, —SH, —SR', —NH$_2$, —NHR', —N(R')$_2$, —NHCOR', —NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl.

In certain embodiments of Formula I, $R^2$ and $R^3$ together form a $C_{2-9}$ heterocycle with the nitrogen atoms to which they are attached. In certain embodiments of Formula I, the $C_{2-9}$ heterocycle is a 5-, 6-, or 7-membered heterocycle. In certain embodiments of Formula I, the $C_{2-9}$ heterocycle is a 5-membered heterocycle selected from a pyrrolidine, pyrazolidine, and imidazoline. In certain embodiments of Formula I, the $C_{2-9}$ heterocycle is a 6-membered heterocycle selected from a piperazine, hexahydropyrimidine, hexahydropyridazine, 1,2,3-triazinane, 1,2,4-triazinane, and 1,3,5-triazinane. In certain embodiments of Formula I, the $C_{2-9}$ heterocycle is a piperazine.

In certain embodiments of Formula I, $R^4$ is H.

In certain embodiments of Formula I, $R^4$ is an amine protecting group. In certain embodiments, the amine protecting group is selected from carbobenzyloxy (Cbz), p-methoxybenzyl carbonyl (Moz or MeOZ), tert-butyloxycarbonyl (Boc), 9-fluorenylmethyloxycarbonyl (FMOC), acetyl (Ac), benzoyl (Bz), benzyl (Bn), a carbamate, p-methoxybenzyl (PMB), 3,4-dimethoxybenzyl (DMPM), p-methoxyphenyl (PMP), a succinimide (i.e., a cyclic imide), and tosyl (Ts). In certain embodiments of Formula I, the amine protecting group is Boc.

In certain embodiments of Formula I, $R^4$ is -L-T.

In certain embodiments of Formula I, n is an integer from 1 to 10. In certain embodiments of Formula I, n is an integer from 1 to 5. In certain embodiments of Formula I, n is 1, 2, 3, 4, or 5. In certain embodiments of Formula I, n is 2.

In certain embodiments of Formula I, m is an integer from 1 to 10. In certain embodiments of Formula I, m is an integer from 1 to 5. In certain embodiments of Formula I, m is 1, 2, 3, 4, or 5. In certain embodiments of Formula I, m is 2.

In certain embodiments of Formula I, $R^1$ is selected from H and $C_{1-10}$ alkyl, $R^2$ is H, $R^3$ is H, $R^4$ is H, n is an integer from 1 to 20, and m is an integer from 1 to 20. In certain embodiments of Formula I, $R^1$ is selected from H and $C_{1-10}$ alkyl, $R^2$ is H, $R^3$ is H, $R^4$ is H, n is an integer from 1 to 10, and m is an integer from 1 to 10. In certain embodiments of Formula I, $R^1$ is selected from H and $C_{1-10}$ alkyl, $R^2$ is H, $R^3$ is H, $R^4$ is H, n is an integer from 1 to 5, and m is an integer from 1 to 5. In certain embodiments of Formula I, $R^1$ is selected from H and $C_{1-10}$ alkyl, $R^2$ is H, $R^3$ is H, $R^4$ is H, n is 2, and m is 2.

In certain embodiments of Formula I, $R^1$ is selected from H and $C_{1-10}$ alkyl, $R^2$ is H, $R^3$ is H, $R^4$ is an amine protecting group, n is an integer from 1 to 20, and m is an integer from 1 to 20. In certain embodiments of Formula I, $R^1$ is selected from H and $C_{1-10}$ alkyl, $R^2$ is H, $R^3$ is H, $R^4$ is an amine protecting group, n is an integer from 1 to 10, and m is an integer from 1 to 10. In certain embodiments of Formula I, $R^1$ is selected from H and $C_{1-10}$ alkyl, $R^2$ is H, $R^3$ is H, $R^4$ is an amine protecting group, n is an integer from 1 to 5, and m is an integer from 1 to 5. In certain embodiments of Formula I, $R^1$ is selected from H and $C_{1-10}$ alkyl, $R^2$ is H, $R^3$ is H, $R^4$ is an amine protecting group, n is 2, and m is 2.

In certain embodiments of Formula I, $R^1$ is selected from H and $C_{1-10}$ alkyl, $R^2$ is H, $R^3$ is H, $R^4$ is -L-T, n is an integer from 1 to 20, and m is an integer from 1 to 20. In certain embodiments of Formula I, $R^1$ is selected from H and $C_{1-10}$ alkyl, $R^2$ is H, $R^3$ is H, $R^4$ is -L-T, n is an integer from 1 to 10, and m is an integer from 1 to 10. In certain embodiments of Formula I, $R^1$ is selected from H and $C_{1-10}$ alkyl, $R^2$ is H, $R^3$ is H, $R^4$ is -L-T, n is an integer from 1 to 5, and m is an integer from 1 to 5. In certain embodiments of Formula I, $R^1$ is selected from H and $C_{1-10}$ alkyl, $R^2$ is H, $R^3$ is H, $R^4$ is -L-T, n is 2, and m is 2.

In certain embodiments of Formula I, $R^1$ is selected from H and $C_{1-10}$ alkyl, $R^2$ and $R^3$ together form a $C_{2-9}$ heterocycle with the nitrogen atoms to which they are attached, $R^4$ is H, n is an integer from 1 to 20, and m is an integer from 1 to 20. In certain embodiments of Formula I, $R^1$ is selected from H and $C_{1-10}$ alkyl, $R^2$ and $R^3$ together form a $C_{2-9}$ heterocycle with the nitrogen atoms to which they are attached, $R^4$ is H, n is an integer from 1 to 10, and m is an integer from 1 to 10. In certain embodiments of Formula I, $R^1$ is selected from H and $C_{1-10}$ alkyl, $R^2$ and $R^3$ together form a $C_{2-9}$ heterocycle with the nitrogen atoms to which they are attached, $R^4$ is H, n is an integer from 1 to 5, and m is an integer from 1 to 5. In certain embodiments of Formula I, $R^1$ is selected from H and $C_{1-10}$ alkyl, $R^2$ and $R^3$ together form a $C_{2-9}$ heterocycle with the nitrogen atoms to which they are attached, $R^4$ is H, n is 2, and m is 2.

In certain embodiments of Formula I, $R^1$ is selected from H and $C_{1-10}$ alkyl, $R^2$ and $R^3$ together form a $C_{2-9}$ heterocycle with the nitrogen atoms to which they are attached, $R^4$ is an amine protecting group, n is an integer from 1 to 20, and m is an integer from 1 to 20. In certain embodiments of Formula I, $R^1$ is selected from H and $C_{1-10}$ alkyl, $R^2$ and $R^3$ together form a $C_{2-9}$ heterocycle with the nitrogen atoms to which they are attached, $R^4$ is an amine protecting group, n is an integer from 1 to 10, and m is an integer from 1 to 10. In certain embodiments of Formula I, $R^1$ is selected from H and $C_{1-10}$ alkyl, $R^2$ and $R^3$ together form a $C_{2-9}$ heterocycle with the nitrogen atoms to which they are attached, $R^4$ is an amine protecting group, n is an integer from 1 to 5, and m is an integer from 1 to 5. In certain embodiments of Formula I, $R^1$ is selected from H and $C_{1-10}$ alkyl, $R^2$ and $R^3$ together form a $C_{2-9}$ heterocycle with the nitrogen atoms to which they are attached, $R^4$ is an amine protecting group, n is 2, and m is 2.

In certain embodiments of Formula I, $R^1$ is selected from H and $C_{1-10}$ alkyl, $R^2$ and $R^3$ together form a $C_{2-9}$ heterocycle with the nitrogen atoms to which they are attached, $R^4$ is -L-T, n is an integer from 1 to 20, and m is an integer from 1 to 20. In certain embodiments of Formula I, $R^1$ is selected from H and $C_{1-10}$ alkyl, $R^2$ and $R^3$ together form a $C_{2-9}$ heterocycle with the nitrogen atoms to which they are attached, $R^4$ is -L-T, n is an integer from 1 to 10, and m is an integer from 1 to 10. In certain embodiments of Formula I, $R^1$ is selected from H and $C_{1-10}$ alkyl, $R^2$ and $R^3$ together form a $C_{2-9}$ heterocycle with the nitrogen atoms to which they are attached, $R^4$ is -L-T, n is an integer from 1 to 5, and m is an integer from 1 to 5. In certain embodiments of Formula I, $R^1$ is selected from H and $C_{1-10}$ alkyl, $R^2$ and $R^3$ together form a $C_{2-9}$ heterocycle with the nitrogen atoms to which they are attached, $R^4$ is -L-T, n is 2, and m is 2.

In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 5-, 6-, or 7-membered heterocycle, $R^4$ is H, n is an integer from 1 to 20, and m is an integer from 1 to 20. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 5-, 6-, or 7-membered heterocycle, $R^4$ is H, n is an integer from 1 to 10, and m is an integer from 1 to 10. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 5-, 6-, or 7-membered heterocycle, $R^4$ is H, n is an integer from 1 to 5, and m is an integer from 1 to 5. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 5-, 6-, or 7-membered heterocycle, $R^4$ is H, n is 2, and m is 2.

In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 5-, 6-, or 7-membered heterocycle, $R^4$ is an amine protecting group, n is an integer from 1 to 20, and m is an integer from 1 to 20. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 5-, 6-, or 7-membered heterocycle, $R^4$ is an amine protecting group, n is an integer from 1 to 10, and m is an integer from 1 to 10. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 5-, 6-, or 7-membered heterocycle, $R^4$ is an amine protecting group, n is an integer from 1 to 5, and m is an integer from 1 to 5. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 5-, 6-, or 7-membered heterocycle, $R^4$ is an amine protecting group, n is 2, and m is 2.

In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 5-, 6-, or 7-membered heterocycle, $R^4$ is -L-T, n is an integer from 1 to 20, and m is an integer from 1 to 20. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 5-, 6-, or 7-membered heterocycle, $R^4$ is -L-T, n is an integer from 1 to 10, and m is an integer from 1 to 10. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 5-, 6-, or 7-membered heterocycle, $R^4$ is -L-T, n is an integer from 1 to 5, and m is an integer from 1 to 5. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 5-, 6-, or 7-membered heterocycle, $R^4$ is -L-T, n is 2, and m is 2.

In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 6-membered heterocycle, $R^4$ is H, n is an integer from 1 to 20, and m is an integer from 1 to 20. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 6-membered heterocycle, $R^4$ is H, n is an integer from 1 to 10, and m is an integer from 1 to 10. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 6-membered heterocycle, $R^4$ is H, n is an integer from 1 to 5, and m is an integer from 1 to 5. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 6-membered heterocycle, $R^4$ is H, n is 2, and m is 2.

In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 6-membered heterocycle, $R^4$ is an amine protecting group, n is an integer from 1 to 20, and m is an integer from 1 to 20. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 6-membered heterocycle, $R^4$ is an amine protecting group, n is an integer from 1 to 10, and m is an integer from 1 to 10. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 6-membered heterocycle, $R^4$ is an amine protecting group, n is an integer from 1 to 5, and m is an integer from 1 to 5. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 6-membered heterocycle, $R^4$ is an amine protecting group, n is 2, and m is 2.

In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 6-membered heterocycle, $R^4$ is -L-T, n is an integer from 1 to 20, and m is an integer from 1 to 20. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 6-membered heterocycle, $R^4$ is -L-T, n is an integer from 1 to 10, and m is an integer from 1 to 10. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 6-membered heterocycle, $R^4$ is -L-T, n is an integer from 1 to 5, and m is an integer from 1 to 5. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a 6-membered heterocycle, $R^4$ is -L-T, n is 2, and m is 2.

In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a piperazine, $R^4$ is H, m is an integer from 1 to 20, and n is an integer from 1 to 20. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a piperazine, $R^4$ is H, m is an integer from 1 to 10, and n is an integer from 1 to 10.

In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a piperazine, $R^4$ is H, m is an integer from 1 to 5, and n is an integer from 1 to 5. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a piperazine, $R^4$ is H, m is 2, and n is 2.

In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a piperazine, $R^4$ is an amine protecting group, m is an integer from 1 to 20, and n is an integer from 1 to 20. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a piperazine, $R^4$ is an amine protecting group, m is an integer from 1 to 10, and n is an integer from 1 to 10. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a piperazine, $R^4$ is an amine protecting group, m is an integer from 1 to 5, and n is an integer from 1 to 5. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a piperazine, $R^4$ is an amine protecting group, m is 2, and n is 2.

In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a piperazine, $R^4$ is -L-T, m is an integer from 1 to 20, and n is an integer from 1 to 20. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a piperazine, $R^4$ is -L-T, m is an integer from 1 to 10, and n is an integer from 1 to 10. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a piperazine, $R^4$ is -L-T, m is an integer from 1 to 5, and n is an integer from 1 to 5. In certain embodiments of Formula I, $R^1$ is selected from H and $C_{1-10}$ alkyl, $R^2$ and $R^3$ together form a $C_{2-9}$ heterocycle with the nitrogen atoms to which they are attached, wherein the $C_{2-9}$ heterocycle is a piperazine, $R^4$ is -L-T, m is 2, and n is 2.

In certain embodiments of Formula I, $R^2$ and $R^3$ together form a piperazine with the nitrogen atoms to which they are attached and m is 2, thereby providing a compound of Formula Ia:

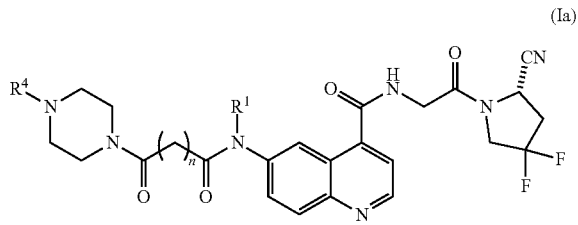

or a pharmaceutically acceptable salt thereof, wherein $R^1$, $R^4$, and n are as described above for Formula I.

In certain embodiments of Formula Ia, $R^1$ is H. In certain embodiments of Formula Ia, $R^1$ is selected from $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', —NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl.

In certain embodiments of Formula Ia, $R^1$ is selected from H, $C_{1-10}$ alkyl, $C_{2-10}$ alkenyl, $C_{3-10}$ alkynyl, $C_{3-10}$ cycloalkyl, optionally substituted by one or more substituents selected from —OH, —OR', =O, =S, —SH, —SR', —NH$_2$, —NHR', —N(R')$_2$, —NHCOR', —NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl.

In certain embodiments of Formula Ia, $R^1$ is selected from H and $C_{1-10}$ alkyl. In certain embodiments of Formula Ia, $R^1$ is H. In certain embodiments of Formula Ia, $R^1$ is $C_{1-10}$ alkyl. In certain embodiments of Formula Ia, $R^1$ is $C_1$-$C_6$ alkyl. In certain embodiments of Formula Ia, R is selected from methyl, ethyl, propyl, isopropyl, butyl, isobutyl, pentyl and hexyl. In certain embodiments of Formula Ia, $R^1$ is methyl.

In certain embodiments of Formula Ia, $R^4$ is H.

In certain embodiments of Formula Ia, $R^4$ is an amine protecting group. In certain embodiments of Formula Ia, the amine protecting group is selected from carbobenzyloxy (Cbz), p-methoxybenzyl carbonyl (Moz or MeOZ), tert-butyloxycarbonyl (Boc), 9-fluorenylmethyloxycarbonyl (FMOC), acetyl (Ac), benzoyl (Bz), benzyl (Bn), a carbamate, p-methoxybenzyl (PMB), 3,4-dimethoxybenzyl (DMPM), p-methoxyphenyl (PMP), a succinimide (i.e., a cyclic imide), and tosyl (Ts). In certain embodiments of Formula Ia, the amine protecting group is Boc.

In certain embodiments of Formula Ia, $R^4$ is -L-T.

In certain embodiments of Formula Ia, n is an integer from 1 to 10. In certain embodiments of Formula Ia, n is an integer from 1 to 5. In certain embodiments of Formula Ia, n is 1, 2, 3, 4, or 5. In certain embodiments of Formula Ia, n is 2.

In certain embodiments of Formula Ia, $R^1$ is selected from H and $C_{1-10}$ alkyl, $R^4$ is H, and n is an integer from 1 to 20. In certain embodiments of Formula Ia, $R^1$ is selected from H and $C_{1-10}$ alkyl, $R^4$ is H, and n is an integer from 1 to 10. In certain embodiments of Formula Ia, $R^1$ is selected from H and $C_{1-10}$ alkyl, $R^4$ is H, and n is an integer from 1 to 5. In certain embodiments of Formula Ia, $R^1$ is selected from H and $C_{1-10}$ alkyl, $R^4$ is H, and n is 2.

In certain embodiments of Formula Ia, $R^1$ is selected from H and $C_{1-10}$ alkyl, $R^4$ is an amine protecting group, and n is an integer from 1 to 20. In certain embodiments of Formula Ia, $R^1$ is selected from H and $C_{1-10}$ alkyl, $R^4$ is an amine protecting group, and n is an integer from 1 to 10.

In certain embodiments of Formula Ia, $R^1$ is selected from H and $C_{1-10}$ alkyl, $R^4$ is an amine protecting group, and n is an integer from 1 to 5. In certain embodiments of Formula Ia, $R^1$ is selected from H and $C_{1-10}$ alkyl, $R^4$ is an amine protecting group, and n is 2.

In certain embodiments of Formula Ia, $R^1$ is selected from H and $C_{1-10}$ alkyl, $R^4$ is -L-T, and n is an integer from 1 to 20. In certain embodiments of Formula Ia, $R^1$ is selected from H and $C_{1-10}$ alkyl, $R^4$ is -L-T, and n is an integer from 1 to 10. In certain embodiments of Formula Ia, $R^1$ is selected from H and $C_{1-10}$ alkyl, $R^4$ is -L-T, and n is an integer from 1 to 5. In certain embodiments of Formula Ia, $R^1$ is selected from H and $C_{1-10}$ alkyl, $R^4$ is -L-T, and n is 2.

In certain embodiments of Formula I, $R^2$ and $R^3$ are H and m is 2, thereby providing a compound of Formula Ib:

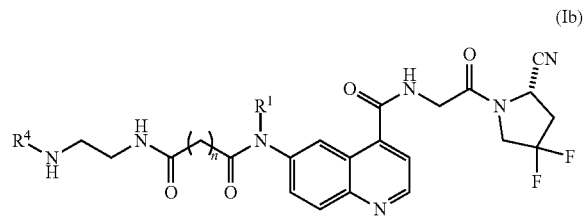

or a pharmaceutically acceptable salt thereof, wherein $R^1$, $R^4$, and n are as described above for Formula I.

In certain embodiments of Formula Ib, $R^1$ is H. In certain embodiments of Formula Ib, $R^1$ is selected from $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', —NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl.

In certain embodiments of Formula Ib, $R^1$ is selected from H, $C_{1-10}$ alkyl, $C_{2-10}$ alkenyl, $C_{3-10}$ alkynyl, $C_{3-10}$ cycloalkyl, optionally substituted by one or more substituents selected from —OH, —OR', =O, =S, —SH, —SR', —NH$_2$, —NHR', —N(R')$_2$, —NHCOR', —NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl.

In certain embodiments of Formula Ib, $R^1$ is selected from H and $C_{1-10}$ alkyl. In certain embodiments of Formula Ib, $R^1$ is H. In certain embodiments of Formula Ib, $R^1$ is $C_{1-10}$ alkyl. In certain embodiments of Formula Ib, $R^1$ is $C_1$-$C_6$ alkyl. In certain embodiments of Formula Ib, R is selected from methyl, ethyl, propyl, isopropyl, butyl, isobutyl, pentyl and hexyl. In certain embodiments of Formula Ib, $R^1$ is methyl.

In certain embodiments of Formula Ib, $R^4$ is H.

In certain embodiments of Formula Ib, $R^4$ is an amine protecting group. In certain embodiments of Formula Ib, the amine protecting group is selected from carbobenzyloxy (Cbz), p-methoxybenzyl carbonyl (Moz or MeOZ), tert-butyloxycarbonyl (Boc), 9-fluorenylmethyloxycarbonyl (FMOC), acetyl (Ac), benzoyl (Bz), benzyl (Bn), a carbamate, p-methoxybenzyl (PMB), 3,4-dimethoxybenzyl (DMPM), p-methoxyphenyl (PMP), a succinimide (i.e., a cyclic imide), and tosyl (Ts). In certain embodiments of Formula Ib, the amine protecting group is Boc.

In certain embodiments of Formula Ib, $R^4$ is -L-T.

In certain embodiments of Formula Ib, n is an integer from 1 to 10. In certain embodiments, n is an integer from 1 to 5. In certain embodiments, n is 1, 2, 3, 4, or 5. In certain embodiments, n is 2.

In certain embodiments of Formula Ib, $R^1$ is selected from H and $C_{1-10}$ alkyl, $R^4$ is H, and n is an integer from 1 to 20. In certain embodiments of Formula Ib, $R^1$ is selected from H and $C_{1-10}$ alkyl, $R^4$ is H, and n is an integer from 1 to 10. In certain embodiments of Formula Ib, $R^1$ is selected from H and $C_{1-10}$ alkyl, $R^4$ is H, and n is an integer from 1 to 5. In certain embodiments of Formula Ib, $R^1$ is selected from H and $C_{1-10}$ alkyl, $R^4$ is H, and n is 2.

In certain embodiments of Formula Ib, $R^1$ is selected from H and $C_{1-10}$ alkyl, $R^4$ is an amine protecting group, and n is an integer from 1 to 20. In certain embodiments of Formula Ib, $R^1$ is selected from H and $C_{1-10}$ alkyl, $R^4$ is an amine protecting group, and n is an integer from 1 to 10.

In certain embodiments of Formula Ib, $R^1$ is selected from H and $C_{1-10}$ alkyl, $R^4$ is an amine protecting group, and n is an integer from 1 to 5. In certain embodiments of Formula Ib, $R^1$ is selected from H and $C_{1-10}$ alkyl, $R^4$ is an amine protecting group, and n is 2.

In certain embodiments of Formula Ib, $R^1$ is selected from H and $C_{1-10}$ alkyl, $R^4$ is -L-T, and n is an integer from 1 to 20. In certain embodiments of Formula Ib, $R^1$ is selected from H and $C_{1-10}$ alkyl, $R^4$ is -L-T, and n is an integer from 1 to 10. In certain embodiments of Formula Ib, $R^1$ is selected from H and $C_{1-10}$ alkyl, $R^4$ is -L-T, and n is an integer from 1 to 5. In certain embodiments of Formula Ib, $R^1$ is selected from H and $C_{1-10}$ alkyl, $R^4$ is -L-T, and n is 2.

In certain embodiments, the compound of Formula I-Ib is selected from:

| Compound | Structure |
| --- | --- |
| 1 | |
| 2 | |
| 3 | and |

| Compound | Structure |
|---|---|
| 4 | ![Structure of compound 4: a piperazine-containing group linked through a succinamide to an N-methyl-quinoline-4-carboxamide, connected via glycine to a 4,4-difluoro-2-cyanopyrrolidine] | or is a pharmaceutically acceptable salt thereof.

In certain embodiments of Formula I-Ib, the pharmaceutically acceptable salt is an inorganic or organic acid salt of a compound of Formula I-Ib. In certain embodiments of Formula I-Ib, the pharmaceutically acceptable salt is an organic acid salt, e.g., the salt of an organic acid such as acetic acid, trifluoroacetic acid, oxalic acid, maleic acid, tartaric acid, citric acid, succinic acid, or malonic acid. In certain embodiments of Formula I-Ib, the pharmaceutically acceptable salt is the trifluoroacetate (TFA) salt.

In certain embodiments of Formula I-Ib, as described above, $R^4$ is -L-T, wherein L is a bond or a divalent linker and T comprises (a) a chelating moiety suitable for chelating a radionuclide, (b) an imaging agent, or (c) a drug. In certain embodiments of Formula I-Ib, T is means for chelating a radionuclide.

In certain embodiments of Formula I-Ib, $R^4$ is -L-T, wherein L is a bond such that the terminal nitrogen of the compound of Formula I is bound directly to T.

In certain embodiments of Formula I, $R^4$ is -L-T, wherein L is a divalent linker that links, connects, or bonds to T. In certain embodiments of Formula I-Ib, L is a cleavable divalent linker. Cleavable linkers include linkers that are cleaved by intracellular metabolism following internalization, e.g., cleavage via hydrolysis, reduction, or enzymatic reaction. In certain embodiments of Formula I-Ib, L is a non-cleavable divalent linker. Non-cleavable linkers include linkers that release an attached payload via lysosomal degradation following internalization.

In certain embodiments of Formula I-Ib, L is selected from an acid-labile linker, a hydrolysis-labile linker, an enzymatically cleavable linker, a reduction labile linker, a self-immolative linker, and a non-cleavable linker.

In certain embodiments of Formula I-Ib, L comprises one or more peptides, amino acids, glucuronides, succinimide-thioethers, polyethylene glycol (PEG) units, hydrazones, mal-caproyl units, dipeptide units, valine-citruline units, para-aminobenzyl (PAB) units, or a combination thereof.

In certain embodiments of Formula I-Ib, L comprises one or more amino acids. Suitable amino acids include natural, non-natural, standard, non-standard, proteinogenic, non-proteinogenic, and L- or D-α-amino acids. In certain embodiments, the L linker comprises alanine, valine, glycine, leucine, isoleucine, methionine, tryptophan, phenylalanine, proline, serine, threonine, cysteine, tyrosine, asparagine, glutamine, aspartic acid, glutamic acid, lysine, arginine, histidine, or citrulline, or derivatives thereof. In some embodiments, L comprises 2, 3, 4, 5, or 6 amino acids.

In certain embodiments of Formula I-Ib, $R^4$ is -L-T, wherein T comprises a chelating moiety suitable for chelating a radionuclide. In certain embodiments of Formula I-Ib, the chelating moiety comprises from 2 to 8 binding moieties. In certain embodiments, of Formula I-Ib the chelating moiety is selected from DOTAGA (1,4,7,10-tetraazacyclododececane,1-(glutaric acid)-4,7,10-triacetic acid), DOTA (1,4,7,10-tetraazacyclododecane-1,4,7,10-tetraacetic acid), DOTASA (1,4,7,10-tetraazacyclododecane-1-(2-succinic acid)-4,7,10-triacetic acid), CB-DO2A (10-bis(carboxymethyl)-1,4,7,10-tetraazabicyclo[5.5.2]tetradecane), DEPA (7-[2-(Bis-carboxymethylamino)-ethyl]-4,10-bis-carboxymethyl-1,4,7,10-tetraaza-cyclododec-1-yl-acetic acid)), 3p-C-DEPA (2-[(carboxymethyl)][5-(4-nitrophenyl-1-[4,7,10-tris(carboxymethyl)-1,4,7,10-tetraazacyclododecan-1-yl]pentan-2-yl)amino]acetic acid)), TCMC (2-(4-isothiocyanotobenzyl)-1,4,7,10-tetraaza-1,4,7,10-tetra-(2-carbamonyl methyl)-cyclododecane), oxo-DO3A (1-oxa-4,7,10-triazacyclododecane-5-S-(4-isothiocyanatobenzyl)-4,7,10-triacetic acid), p-NH2-Bn-Oxo-DO3A (1-Oxa-4,7,10-tetraazacyclododecane-5-S-(4-aminobenzyl)-4,7,10-triacetic acid), TE2A ((1,8-N,N'-bis-(carboxymethyl)-1,4,8,11-tetraazacyclotetradecane), MM-TE2A, DM-TE2A, CB-TE2A (4,11-bis(carboxymethyl)-1,4,8,11-tetraazabicyclo[6.6.2]hexadecane), CB-TE1A1P (4,8,11-tetraazacyclotetradecane-1-(methanephosphonic acid)-8-(methanecarboxylic acid), CB-TE2P (1,4,8,11-tetraazacyclotetradecane-1,8-bis(methanephosphonic acid), TETA (1,4,8,11-tetraazacyclotetradecane-1,4,8,11-tetraacetic acid), NOTA (1,4,7-triazacyclononane-N,N',N"-triacetic acid), NODA (1,4,7-triazacyclononane-1,4-diacetate), NODAGA (1,4,7-triazacyclononane-1-glutaric acid-4,7-acetic acid) (also known as NOTAGA), NODA Desferoxamine (1,4,7-triazacyclononane-1,4-diyl)diacetic acid DFO), NETA ([4-[2-(bis-carboxymethylamino)-ethyl]-7-carboxymethl-[1,4,7]triazonan-1-yl}-acetic acid), TACN-TM (N,N',N", tris(2-mercaptoethyl)-1,4,7-triazacyclononane), Diamsar (1,8-Diamino-3,6,10,13,16,19-hexaazabicyclo(6,6,6)eicosane, 3,6,10,13,16,19-Hexaazabicyclo[6.6.6]eicosane-1,8-diamine), Sarar (1-N-(4-aminobenzyl)-3, 6,10,13,16,19-hexaazabicyclo[6.6.6]eicosane-1,8-diamine), AmBaSar (4-((8-amino-3,6,10,13,16,19-hexaazabicyclo [6.6.6] icosane-1-ylamino) methyl) benzoic acid), and 4,4'-((3,6,10,13,16,19-hexaazabicyclo[6.6.6]ico-sane-1,8-diylbis(aza-nediyl)) bis(methylene))dibenzoic acid (BaBaSar). In certain embodiments of Formula I-Ib, the chelating moiety is selected from DOTAGA, DOTA, NOTA, NODAGA, and NODA.

In certain embodiments of Formula I-Ib, the chelating moiety is NODAGA. In certain embodiments of Formula I-Ib, $R^4$ is -L-NODAGA. In certain embodiments of Formula I-Ib, $R^4$ is -L-T, wherein L is a bond, such that $R^4$ is NODAGA.

In certain embodiments of Formula I-Ib, T comprises a chelating moiety that does not comprise a radionuclide.

In certain embodiments, the compound of Formula I-lb is selected from:
| Compound | Structure |
|---|---|
| NODAGA-1 | 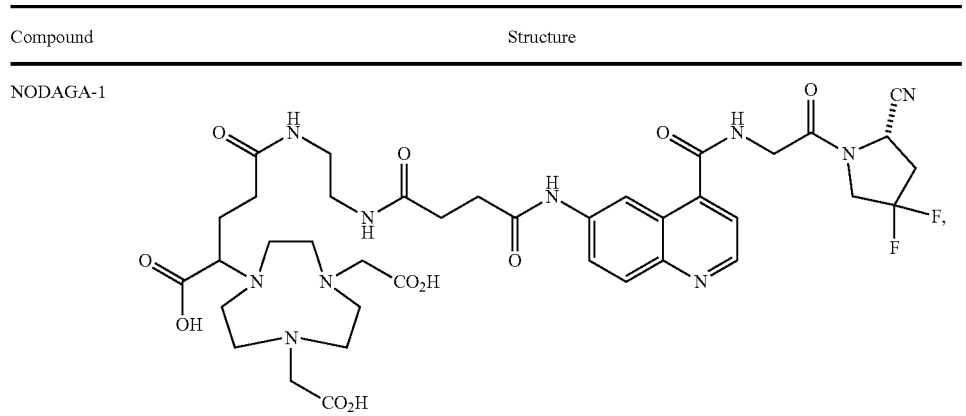 |
| NODAGA-2 | 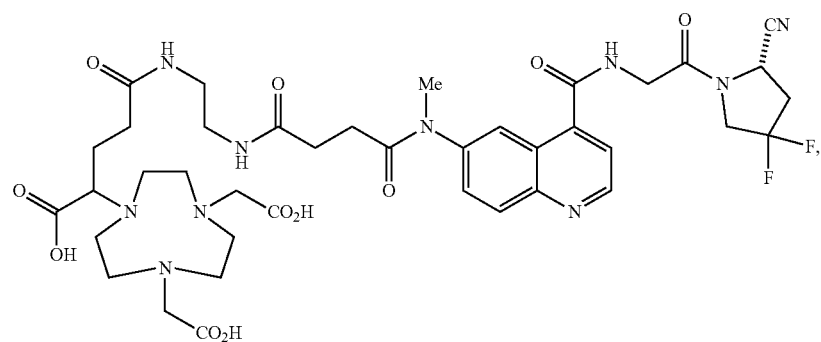 [SMILES: CN(C(=O)CCC(=O)NCCNC(=O)CCC(C(=O)O)N1CCN(CC(=O)O)CCN(CC(=O)O)CC1)c1ccc2nccc(C(=O)NCC(=O)N3CC(F)(F)C[C@H]3C#N)c2c1] |
| NODAGA-3 | 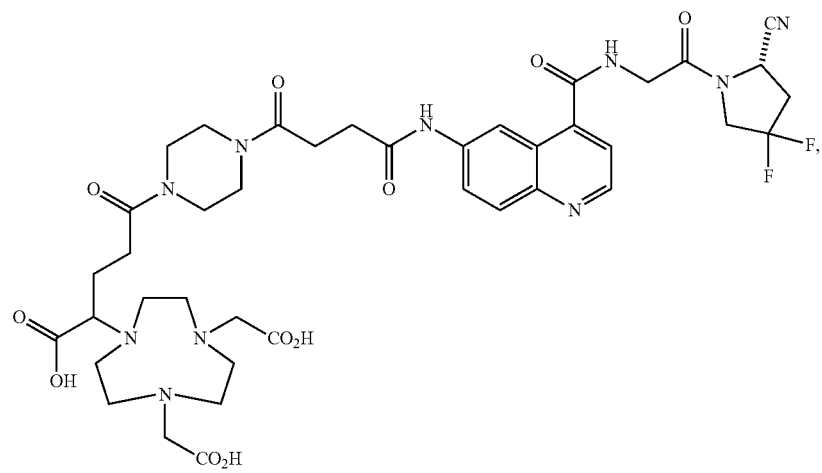 [SMILES: N#C[C@@H]1CC(F)(F)CN1C(=O)CNC(=O)c1ccnc2ccc(NC(=O)CCC(=O)N3CCN(C(=O)CCC(C(=O)O)N4CCN(CC(=O)O)CCN(CC(=O)O)CC4)CC3)cc12] and |

| Compound | Structure |
|---|---|
| NODAGA-4 | 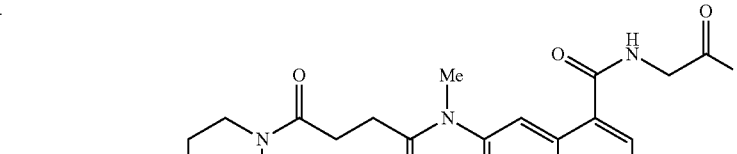 | or is a pharmaceutically acceptable salt thereof.

In certain embodiments of Formula I-Ib, T comprises a chelating moiety chelated to a radionuclide. In certain embodiments of Formula I-Ib, the radionuclide is selected from alpha radiation emitting isotopes, beta radiation emitting isotopes, gamma radiation emitting isotopes, Auger electron emitting isotopes, X-ray emitting isotopes, and fluorescence emitting isotopes. In certain embodiments of Formula I-Ib, the radionuclide is selected from $^{225}$Ac, $^{51}$Cr, $^{66}$Ga, $^{67}$Ga, $^{68}$GA, [$^{18}$F]AlF, $^{111}$In, $^{113m}$In, $^{52m}$Mn, $^{99m}$Tc, $^{186}$Re, $^{188}$Re, $^{139}$La, $^{140}$La, $^{175}$Yb, $^{179}$Yb, $^{153}$Sm, $^{177m}$Sn, $^{166}$Ho, $^{86}$Y, $^{88}$Y, $^{90}$Y, $^{149}$Pm, $^{165}$Dy, $^{169}$Er, $^{177}$Lu, $^{52}$Fe, $^{43}$Sc, $^{44}$Sc, $^{46}$Sc, $^{47}$Sc, $^{142}$Pr, $^{157}$Gd, $^{159}$Gd, $^{212}$Bi, $^{213}$Bi, $^{72}$As, $^{77}$As, $^{97}$Ru, $^{109}$Pd, $^{105}$Rh, $^{101m}$Rh, $^{119}$Sb, $^{197}$Hg, $^{151}$Eu, $^{153}$Eu, $^{169}$Eu, $^{201}$Tl, $^{149}$Tb, $^{152}$Tb, $^{155}$Tb, $^{161}$Tb, $^{203}$Pb, $^{212}$Pb, $^{151}$Pm, $^{153}$Pm, $^{142}$Pr, $^{143}$Pr, $^{55}$Co, $^{60}$Cu, $^{61}$Cu, $^{62}$Cu, $^{64}$Cu, $^{67}$Cu, $^{62}$Zn, $^{188}$Re, $^{198}$Au, $^{199}$Au, $^{227}$Th, $^{111}$Ag, $^{199}$Ag, $^{211}$At, $^{223}$Ra, $^{88}$Zr, and $^{89}$Zr.

In certain embodiments of Formula I-Ib, the radionuclide is selected from $^{61}$Cu, $^{62}$Cu, $^{64}$Cu, and $^{67}$Cu. In certain embodiments of Formula I-Ib, the radionuclide is $^{61}$Cu. In certain embodiments of Formula I-Ib, the radionuclide is $^{67}$Cu.

In certain embodiments of Formula I-Ib, $R^1$ is -L-NODAGA-*Cu, wherein *Cu is selected from $^{61}$Cu, $^{62}$Cu, $^{64}$Cu, and $^{67}$Cu. In certain embodiments of Formula I-Ib, R is -L-T, wherein L is a bond, such that R is NODAGA-*Cu, wherein *Cu is selected from $^{61}$Cu, $^{62}$Cu, $^{64}$Cu, and $^{67}$Cu.

In certain embodiments of Formula I-Ib, $R^1$ is selected from H and methyl; $R^4$ is -L-T, wherein T comprises a chelating moiety chelated to a radionuclide, wherein the radionuclide is selected from $^{61}$Cu, $^{64}$Cu, and $^{67}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the radionuclide is $^{61}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the radionuclide is $^{64}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the radionuclide is $^{67}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is selected from DOTAGA, DOTA, NOTA, NODAGA, and NODA; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is DOTAGA; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is DOTA; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is NOTA; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is NODAGA; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is NODA; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is selected from DOTAGA, DOTA, NOTA, NODAGA, and NODA, wherein the radionuclide is selected from $^{61}$Cu, $^{64}$Cu, and $^{67}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is DOTAGA and the radionuclide is selected from $^{61}$Cu, $^{64}$Cu, and $^{67}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is DOTAGA and the radionuclide is $^{61}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is DOTAGA and the radionuclide is $^{64}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is DOTAGA and the radionuclide is $^{67}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is DOTA and the radionuclide is selected from $^{61}$Cu, $^{64}$Cu, and $^{67}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is DOTA and the radionuclide is $^{61}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is DOTA and the radionuclide is $^{64}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is DOTA and the radionuclide is $^{67}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is NOTA and the radionuclide is selected from $^{61}$Cu, $^{64}$Cu, and $^{67}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is NOTA and the radionuclide is $^{61}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is NOTA and the radionuclide is $^{64}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is NOTA and the radionuclide is $^{67}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is NODAGA and the radionuclide is selected from $^{61}$Cu, $^{64}$Cu, and $^{67}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is NODAGA and the radionuclide is $^{61}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is NODAGA and the radionuclide is $^{64}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is NODAGA and the radionuclide is $^{67}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is NODA and the radionuclide is selected from $^{61}$Cu, $^{64}$Cu, and $^{67}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is NODA and the radionuclide is $^{61}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is NODA and the radionuclide is $^{61}$Cu; and n is an integer from 1 to 5.

In certain embodiments of Formula I-Ib, $R^1$ is selected from H and methyl; $R^4$ is -L-T, wherein T comprises a chelating moiety chelated to a radionuclide, wherein the chelating moiety is NODA and the radionuclide is $^{67}$Cu; and n is an integer from 1 to 5.

In certain embodiments, the compound of Formula I-Ib is selected from:
| Compound | Structure |
|---|---|
| *Cu-NODAGA-1 | 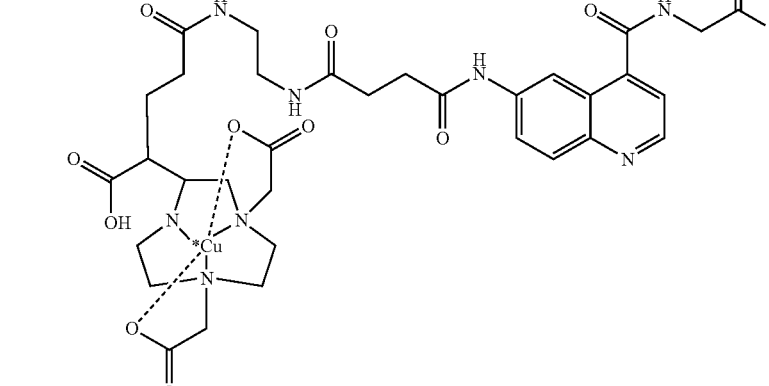 |
| *Cu-NODAGA-2 | 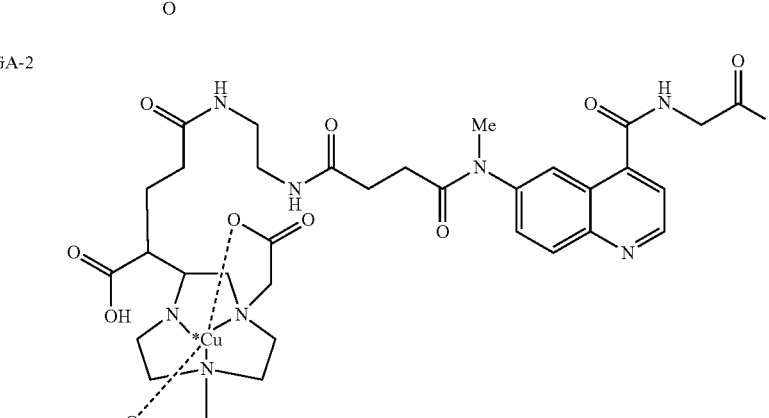 |
| *Cu-NODAGA-3 |  and |

| Compound | Structure |
|---|---|
| *Cu-NODAGA-4 | | or is a pharmaceutically acceptable salt thereof, wherein *Cu is selected from $^{61}$Cu, $^{62}$Cu, $^{64}$Cu, and $^{67}$Cu, particularly from $^{61}$Cu and $^{67}$Cu.

In certain embodiments of Formula I-Ib, T comprises an imaging agent. In certain embodiments of Formula I-Ib, the imaging agent comprises a radionuclide. In certain embodiments of Formula I-Ib, the radionuclide is selected from $^{18}$F, $^{14}$C, $^{11}$C, $^{13}$N, $^{32}$P, $^{35}$S, $^{125}$I, $^{131}$I, $^{124}$I, $^{123}$I, and $^{15}$O.

In certain embodiments of Formula I-Ib, the imaging agent comprises a non-chelating radioactive moiety. In certain embodiments of Formula I-Ib, the non-chelating radioactive moiety is selected from [$^{11}$C]Cu-methionine (Met), [$^{18}$F]F-2-fluoro-2-deoxyglucose (FDG), [$^{18}$F]F-labeled $C_{6-10}$ aryl, and [$^{18}$F]F-labeled $C_{5-9}$ heteroaryl.

In certain embodiments of Formula I-Ib, the imaging agent comprises a chelating moiety chelated to a radionuclide. In certain embodiments of Formula I-Ib, the chelating moiety comprises from 2 to 8 binding moieties. In certain embodiments of Formula I-Ib, the chelating moiety is selected from DOTAGA (1,4,7,10-tetraazacyclododececane, 1-(glutaric acid)-4,7,10-triacetic acid), DOTA (1,4,7,10-tetraazacyclododecane-1,4,7,10-tetraacetic acid), DOTASA (1,4,7,10-tetraazacyclododecane-1-(2-succinic acid)-4,7,10-triacetic acid), CB-DO2A (10-bis(carboxymethyl)-1,4,7,10-tetraazabicyclo[5.5.2]tetradecane), DEPA (7-[2-(Bis-carboxymethylamino)-ethyl]-4,10-bis-carboxymethyl-1,4,7,10-tetraaza-cyclododec-1-yl-acetic acid)), 3p-C-DEPA (2-[(carboxymethyl)][5-(4-nitrophenyl-1-[4,7,10-tris (carboxymethyl)-1,4,7,10-tetraazacyclododecan-1-yl] pentan-2-yl)amino]acetic acid)), TCMC (2-(4-isothiocyanotobenzyl)-1,4,7,10-tetraaza-1,4,7,10-tetra-(2-carbamonyl methyl)-cyclododecane), oxo-DO3A (1-oxa-4,7,10-triazacyclododecane-5-S-(4-isothiocyanatobenzyl)-4,7,10-triacetic acid), p-NH2-Bn-Oxo-DO3A (1-Oxa-4,7,10-tetraazacyclododecane-5-S-(4-aminobenzyl)-4,7,10-triacetic acid), TE2A ((1,8-N,N'-bis-(carboxymethyl)-1,4,8,11-tetraazacyclotetradecane), MM-TE2A, DM-TE2A, CB-TE2A (4,11-bis(carboxymethyl)-1,4,8,11-tetraazabicyclo[6.6.2]hexadecane), CB-TE1A1P (4,8,11-tetraazacyclotetradecane-1-(methanephosphonic acid)-8-(methanecarboxylic acid), CB-TE2P (1,4,8,11-tetraazacyclotetradecane-1,8-bis(methanephosphonic acid), TETA (1,4,8,11-tetraazacyclotetradecane-1,4,8,11-tetraacetic acid), NOTA (1,4,7-triazacyclononane-N,N',N"-triacetic acid), NODA (1,4,7-triazacyclononane-1,4-diacetate), NODAGA (1,4,7-triazacyclononane-1-glutaric acid-4,7-acetic acid) (also known as NOTAGA), NODA Desferoxamine (1,4,7-triazacyclononane-1,4-diyl)diacetic acid DFO), NETA ([4-[2-(bis-carboxymethylamino)-ethyl]-7-carboxymethl-[1,4,7]triazonan-1-yl}-acetic acid), TACN-TM (N,N',N"', tris(2-mercaptoethyl)-1,4,7-triazacyclononane), Diamsar (1,8-Diamino-3,6,10,13,16,19-hexaazabicyclo(6,6,6)eicosane, 3,6,10,13,16,19-Hexaazabicyclo[6.6.6]eicosane-1,8-diamine), Sarar (1-N-(4-aminobenzyl)-3, 6,10,13,16,19-hexaazabicyclo[6.6.6] eicosane-1,8-diamine), AmBaSar (4-((8-amino-3,6,10,13,16,19-hexaazabicyclo [6.6.6] icosane-1-ylamino) methyl) benzoic acid), and 4,4'-((3,6,10,13,16,19-hexaazabicyclo[6.6.6]ico-sane-1,8-diylbis(aza-nediyl)) bis(methylene))dibenzoic acid (BaBaSar). In certain embodiments of Formula I-Ib, the chelating moiety is selected from DOTAGA, DOTA, NOTA, NODAGA, and NODA. In some embodiments of Formula I-Ib, the chelating moiety is NODAGA.

In certain embodiments of Formula I-Ib, the radionuclide chelated to the chelating moiety of the imaging agent is selected from alpha radiation emitting isotopes, beta radiation emitting isotopes, gamma radiation emitting isotopes, Auger electron emitting isotopes, X-ray emitting isotopes, and fluorescence emitting isotopes. In certain embodiments of Formula I-Ib, the radionuclide is selected from $^{225}$Ac, $^{51}$Cr, $^{66}$Ga, $^{67}$Ga, $^{68}$GA, [$^{18}$F]AlF, $^{111}$In, $^{113m}$In, $^{52m}$Mn, $^{99m}$Tc, $^{186}$Re, $^{188}$Re, $^{139}$La, $^{140}$La, $^{175}$Yb, $^{179}$Yb, $^{153}$Sm, $^{177m}$Sn, $^{166}$Ho, $^{86}$Y, $^{88}$Y, $^{90}$Y, $^{149}$Pm, $^{165}$Dy, $^{169}$Er, $^{177}$Lu, $^{52}$Fe, $^{43}$Sc, $^{44}$Sc, $^{46}$Sc, $^{47}$Sc, $^{142}$Pr, $^{157}$Gd, $^{159}$Gd, $^{212}$Bi, $^{213}$Bi, $^{72}$As, $^{77}$As, $^{97}$Ru, $^{109}$Pd, $^{105}$Rh, $^{101m}$Rh, $^{119}$Sb, $^{197}$Hg, $^{151}$Eu, $^{153}$Eu, $^{169}$Eu, $^{201}$Tl, $^{149}$Tb, $^{152}$Tb, $^{155}$Tb, $^{161}$Tb, $^{203}$Pb, $^{212}$Pb, $^{151}$Pm, $^{153}$Pm, $^{142}$Pr, $^{143}$Pr, $^{55}$Co, $^{60}$Cu, $^{61}$Cu, $^{62}$Cu, $^{64}$Cu, $^{67}$Cu, $^{62}$Zn, $^{188}$Re, $^{198}$Au, $^{199}$Au, $^{227}$Th, $^{111}$Ag, $^{199}$Ag, $^{211}$At, $^{223}$Ra, $^{88}$Zr, and $^{89}$Zr. In certain embodiments of Formula I-Ib, the radionuclide chelated within the chelating moiety of the imaging agent is $^{61}$Cu.

In certain embodiments of Formula I-Ib, T comprises an imaging agent comprising a chelating moiety chelated to a radionuclide. In certain embodiments of Formula I-Ib, T comprises $^{61}$Cu chelated to NODAGA ($^{61}$Cu-NODAGA). In certain embodiments of Formula I-Ib, T is $^{61}$ chelated to NODAGA ($^{61}$Cu-NODAGA).

In certain embodiments of Formula I-Ib, the imaging agent is a fluorescent dye. In certain embodiments, the fluorescent dye is selected from one of the following classes: xanthens, acridines, oxazines, cynines, styryl dyes, coumarines, porphines, metal-ligand-complexes, fluorescent proteins, nanocrystals, perylenes, boron-dipyrromethenes, and phtalocyanines.

In certain embodiments of Formula I-Ib, T comprises a drug.

In certain embodiments of Formula I-Ib, the drug comprises a chelating moiety chelated to a radionuclide. In certain embodiments, the chelating moiety comprises from 2 to 8 binding moieties. In certain embodiments, the chelating moiety is selected from DOTAGA (1,4,7,10-tetraazacyclododececane,1-(glutaric acid)-4,7,10-triacetic acid), DOTA (1,4,7,10-tetraazacyclododecane-1,4,7,10-tetraacetic acid), DOTASA (1,4,7,10-tetraazacyclododecane-1-(2-succinic acid)-4,7,10-triacetic acid), CB-DO2A (10-bis(carboxymethyl)-1,4,7,10-tetraazabicyclo[5.5.2]tetradecane), DEPA (7-[2-(Bis-carboxymethylamino)-ethyl]-4,10-bis-carboxymethyl-1,4,7,10-tetraaza-cyclododec-1-yl-acetic acid)), 3p-C-DEPA (2-[(carboxymethyl)][5-(4-nitrophenyl-1-[4,7,10-tris(carboxymethyl)-1,4,7,10-tetraazacyclododecan-1-yl]pentan-2-yl)amino]acetic acid)), TCMC (2-(4-isothiocyanotobenzyl)-1,4,7,10-tetraaza-1,4,7,10-tetra-(2-carbamonyl methyl)-cyclododecane), oxo-DO3A (1-oxa-4,7,10-triazacyclododecane-5-S-(4-isothiocyanatobenzyl)-4,7,10-triacetic acid), p-NH2-Bn-Oxo-DO3A (1-Oxa-4,7,10-tetraazacyclododecane-5-S-(4-aminobenzyl)-4,7,10-triacetic acid), TE2A ((1,8-N,N'-bis-(carboxymethyl)-1,4,8,11-tetraazacyclotetradecane), MM-TE2A, DM-TE2A, CB-TE2A (4,11-bis(carboxymethyl)-1,4,8,11-tetraazabicyclo[6.6.2]hexadecane), CB-TE1A1P (4,8,11-tetraazacyclotetradecane-1-(methanephosphonic acid)-8-(methanecarboxylic acid), CB-TE2P (1,4,8,11-tetraazacyclotetradecane-1,8-bis(methanephosphonic acid), TETA (1,4,8,11-tetraazacyclotetradecane-1,4,8,11-tetraacetic acid), NOTA (1,4,7-triazacyclononane-N,N',N"-triacetic acid), NODA (1,4,7-triazacyclononane-1,4-diacetate), NODAGA (1,4,7-triazacyclononane-1-glutaric acid-4,7-acetic acid) (also known as NOTAGA), NODA Desferoxamine (1,4,7-triazacyclononane-1,4-diyl)diacetic acid DFO), NETA ([4-[2-(bis-carboxymethylamino)-ethyl]-7-carboxymethl-[1,4,7]triazonan-1-yl}-acetic acid), TACN-TM (N,N',N", tris(2-mercaptoethyl)-1,4,7-triazacyclononane), Diamsar (1,8-Diamino-3,6,10,13,16,19-hexaazabicyclo(6,6,6)eicosane, 3,6,10,13,16,19-Hexaazabicyclo[6.6.6]eicosane-1,8-diamine), Sarar (1-N-(4-aminobenzyl)-3, 6,10,13,16,19-hexaazabicyclo[6.6.6] eicosane-1,8-diamine), AmBaSar (4-((8-amino-3,6,10,13,16,19-hexaazabicyclo [6.6.6] icosane-1-ylamino) methyl) benzoic acid), and 4,4'-((3,6,10,13,16,19-hexaazabicyclo[6.6.6]ico-sane-1,8-diylbis(aza-nediyl)) bis(methylene))dibenzoic acid (BaBaSar). In certain embodiments, the chelating moiety is selected from DOTAGA, DOTA, NOTA, NODAGA, and NODA. In certain embodiments, the chelating moiety is NODAGA.

In certain embodiments of Formula I-Ib, the radionuclide chelated to the chelating moiety of the drug is selected from alpha radiation emitting isotopes and beta radiation emitting isotopes. In certain embodiments of Formula I-Ib, the radionuclide chelated to the chelating moiety of the drug is an alpha radiation emitting isotope. In certain embodiments of formula I-Ib, the radionuclide chelated to the chelating moiety of the drug is selected from $^{225}$Ac, $^{51}$Cr, $^{66}$Ga, $^{67}$Ga, $^{68}$GA, [$^{18}$F]AlF, $^{111}$In, $^{113m}$In, $^{52m}$Mn, $^{99m}$Tc, $^{186}$Re, $^{188}$Re, $^{139}$La, $^{140}$La, $^{175}$Yb, $^{179}$Yb, $^{153}$Sm, $^{177m}$Sn, $^{166}$Ho, $^{86}$Y, $^{88}$Y, $^{90}$Y, $^{149}$Pm, $^{165}$Dy, $^{169}$Er, $^{177}$Lu, $^{52}$Fe, $^{43}$Sc, $^{44}$Sc, $^{46}$Sc, $^{47}$Sc, $^{142}$Pr, $^{157}$Gd, $^{159}$Gd, $^{212}$Bi, $^{213}$Bi, $^{72}$As, $^{77}$As, $^{97}$Ru, $^{109}$Pd, $^{105}$Rh, $^{101m}$Rh, $^{119}$Sb, $^{197}$Hg, $^{151}$Eu, $^{153}$Eu, $^{169}$Eu, $^{201}$Tl, $^{149}$Tb, $^{152}$Tb, $^{155}$Tb, $^{161}$Tb, $^{203}$Pb, $^{212}$Pb, $^{151}$Pm, $^{153}$Pm, $^{142}$Pr, $^{143}$Pr, $^{55}$Co, $^{60}$Cu, $^{61}$Cu, $^{62}$Cu, $^{64}$Cu, $^{67}$Cu, $^{62}$Zn, $^{188}$Re, $^{198}$Au, $^{199}$Au, $^{227}$Th, $^{111}$Ag, $^{199}$Ag, $^{211}$At, $^{223}$Ra, $^{88}$Zr, and $^{89}$Zr. In certain embodiments of Formula I-Ib, the radionuclide chelated to the chelating moiety of the drug is $^{67}$Cu.

In certain embodiments of Formula I-Ib, T comprises a drug comprising a chelating moiety chelated to a radionuclide. In certain embodiments of Formula I-Ib, T comprises $^{67}$Cu chelated to NODAGA ([$^{67}$Cu]Cu-NODAGA). In certain embodiments of Formula I-Ib, T is $^{67}$Cu chelated to NODAGA ([$^{67}$Cu]Cu-NODAGA).

In certain embodiments of Formula I-Ib, the drug is a cytotoxic agent. In certain embodiments of Formula I-Ib, cytotoxic agent selected from adrenocorticoids and corticosteroids, alkylating agents, antiandrogens, antiestrogens, androgens, aclamycin and aclamycin derivatives, estrogens, antimetabolites such as cytosine arabinoside, purine analogs, pyrimidine analogs, methotrexate, busulfan, carboplatin, chlorambucil, cisplatin and other platinum compounds, taxanes, such as tamoxiphen, taxol, paclitaxel, paclitaxel derivatives, Taxoteret®, and the like, maytansines and analogs and derivatives thereof, cyclophosphamide, daunomycin, doxorubicin, rhizoxin, T2 toxin, plant alkaloids, prednisone, hydroxyurea, teniposide, mitomycins, discodermolides, microtubule inhibitors, epothilones, tubulysin, cyclopropyl benz[e]indolone, seco-cyclopropyl benz[e]indolone, O—Ac-seco-cyclopropyl benz[e]indolone, bleomycin and any other antibiotic, nitrogen mustards, nitrosureas, vincristine, vinblastine, and analogs and derivative thereof such as deacetylvinblastine monohydrazide, colchicine, colchicine derivatives, allocolchicine, thiocolchicine, trityl cysteine, Halicondrin B, dolastatins such as dolastatin 10, amanitins such as α-amanitin, camptothecin, irinotecan, and other camptothecin derivatives thereof, geldanamycin and geldanamycin derivatives, estramustine, nocodazole, MAP4, colcemid, inflammatory and proinflammatory agents, peptide and peptidomimetic signal transduction inhibitors, penicillins, cephalosporins, vancomycin, erythromycin, clindamycin, rifampin, chloramphenicol, aminoglycoside antibiotics, gentamicin, amphotericin B, acyclovir, trifluridine, ganciclovir, zidovudine, amantadine, and ribavirin.

In certain embodiments of Formula I-Ib, the drug is selected from peptides, oligopeptides, retro-inverso oligopeptides, proteins, protein analogs in which at least one non-peptide linkage replaces a peptide linkage, apoproteins, glycoproteins, enzymes, coenzymes, enzyme inhibitors, amino acids and their derivatives, receptors and other membrane proteins; antigens and antibodies thereto; haptens and antibodies thereto; hormones, lipids, phospholipids, liposomes; toxins; antibiotics; analgesics; bronchodilators; beta-blockers; antimicrobial agents; antihypertensive agents; cardiovascular agents including antiarrhythmics, cardiac glycosides, antianginals and vasodilators; central nervous system agents including stimulants, psychotropics, antimanics, and depressants; antiviral agents; antihistamines; cancer drugs including chemotherapeutic agents; tranquilizers; anti-depressants; H-2 antagonists; anticonvulsants; antinauseants; prostaglandins and prostaglandin analogs; muscle relaxants; anti-inflammatory substances; stimulants; decongestants; antiemetics; diuretics; antispasmodics; antiasthmatics; anti-Parkinson agents; expectorants; cough suppressants; mucolytics; and mineral and nutritional additives.

The present disclosure also provides further compounds, including when the compound is a compound of Formula II:

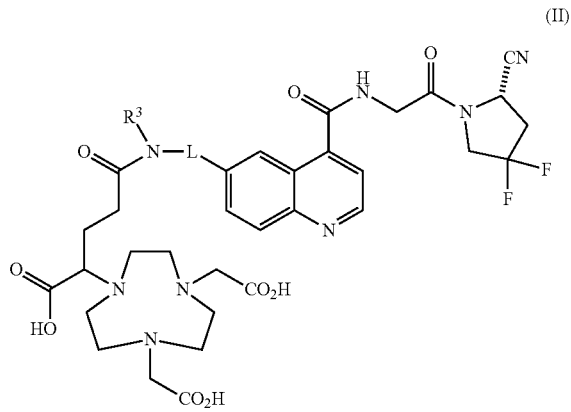

(II)

wherein:
- $R^3$ is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl; or $R^3$, together with a moiety in L, form a $C_{2-9}$ heterocycle with the nitrogen atom(s) to which they are attached; and
- L is a divalent linker, preferably up to 20 atoms in length;
or is a pharmaceutically acceptable salt thereof.

In certain embodiments of Formula II, $R^3$ is H. In certain embodiments of Formula II, $R^3$ is $C_1$-$C_{10}$ alkyl. In certain embodiments of Formula II, $R^3$ is $C_1$-$C_6$ alkyl. In certain embodiments of Formula II, $R^3$ is selected from methyl, ethyl, propyl, isopropyl, butyl, isobutyl, pentyl and hexyl. In certain embodiments of Formula II, $R^3$ is methyl.

In certain embodiments of Formula II, L is a divalent linker as described above for Formula I.

In certain embodiments of Formula II, L is up to 20 atoms in length (meaning up to 20 atoms are connected sequentially to form the backbone of L extending from each of L's two bonding sites to the rest of the compound). In certain embodiments of Formula II, L is up to 15 atoms in length. In certain embodiments of Formula II, L is up to 10 atoms in length. In certain embodiments of Formula II, L is up to 5 atoms in length.

In certain embodiments of Formula II, L comprises one or more occurrences of groups selected from —N(R$^2$)—, —O—, —S—, —C(=NR$^2$)—, —C(=O)—, $C_{1-10}$ alkylene, $C_{2-10}$ alkenylene, $C_{3-10}$ alkynylene, $C_{4-10}$ cycloalkylene, $C_{6-10}$ arylene, and combinations thereof, wherein R$^2$, independently for each occurrence, is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl.

In certain embodiments of Formula II, L comprises one or more —N(R$^2$)— groups, wherein R$^2$, independently for each occurrence, is H or $C_{1-10}$ alkyl, e.g., methyl.

In certain embodiments of Formula II, L comprises one or more —C(=O)— groups.

In certain embodiments of Formula II, L comprises one or more $C_{1-10}$ alkylene groups.

In certain embodiments of Formula II, L comprises one or more —N(R$^2$)— groups and one or more —C(=O)— groups. In certain embodiments of Formula II, L comprises one or more —N(R$^2$-groups and one or more $C_{1-10}$ alkylene groups. In certain embodiments of Formula II, L comprises one or more —C(=O)— groups and one or more $C_{1-10}$ alkylene groups. In certain embodiments of Formula II, L comprises one or more —N(R$^2$)— groups, one or more —C(=O)— groups, and one or more $C_{1-10}$ alkylene groups.

In certain embodiments of Formula II, R$^3$, together with a moiety in L, form a $C_{2-9}$ heterocycle with the nitrogen atom(s) to which they are attached. In certain embodiments of Formula II, the $C_{2-9}$ heterocycle is a 5-, 6-, or 7-membered heterocycle. In certain embodiments of Formula II, the $C_{2-9}$ heterocycle is a 5-membered heterocycle selected from a pyrrolidine, pyrazolidine, and imidazoline. In certain embodiments of Formula II, the $C_{2-9}$ heterocycle is a 6-membered heterocycle selected from a piperazine, hexahydropyrimidine, hexahydropyridazine, 1,2,3-triazinane, 1,2,4-triazinane, and 1,3,5-triazinane. In certain embodiments of Formula II, the $C_{2-9}$ heterocycle is a piperazine.

In certain embodiments of Formula II, R$^3$ is H, L is up to 20 atoms in length and comprises one or more occurrences of groups selected from —N(R$^2$)—, —O—, —S—, —C(=NR$^2$)—, —C(=O)—, $C_{1-10}$ alkylene, $C_{2-10}$ alkenylene, $C_{3-10}$ alkynylene, $C_{4-10}$ cycloalkylene, $C_{6-10}$ arylene, and combinations thereof, wherein R$^2$, independently for each occurrence, is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl. In certain embodiments of Formula II, R$^3$ is H and L is up to 20 atoms in length and comprises one or more occurrences of groups selected from —N(R$^2$)—, —O—, —C(=O)—, $C_{1-10}$ alkylene, and combinations thereof, wherein R$^2$, independently and or each occurrence, is selected from H and $C_{1-10}$ alkyl.

In certain embodiments of Formula II, R$^3$ is H and L is up to 20 atoms in length and comprises one or more —N(R$^2$)— groups, wherein R$^2$, independently for each occurrence, is H or $C_{1-10}$ alkyl, preferably methyl.

In certain embodiments of Formula II, R$^3$ is H and L is up to 20 atoms in length and comprises one or more —C(=O)— groups.

In certain embodiments of Formula II, R$^3$ is H and L is up to 20 atoms in length and comprises one or more $C_{1-10}$ alkylene groups.

In certain embodiments of Formula II, R³ is H and L is up to 20 atoms in length and comprises one or more —C(=O)— groups and one or more or more $C_{1-10}$ alkylene groups. In certain embodiments of Formula II, R³ is H and L is up to 20 atoms in length and comprises one or more —C(=O)— groups and one or more —N(R²)— groups, wherein R², independently for each occurrence, is H or $C_{1-10}$ alkyl, preferably methyl. In certain embodiments of Formula II, R³ is H and L is up to 20 atoms in length and comprises one or more $C_{1-10}$ alkylene groups and one or more —N(R²)— groups, wherein R², independently for each occurrence, is H or $C_{1-10}$ alkyl, preferably methyl. In certain embodiments of Formula II, R³ is H and L is up to 20 atoms in length and comprises one or more —C(=O)— groups, one or more $C_{1-10}$ alkylene groups, and one or more —N(R²)— groups, wherein R², independently for each occurrence, is H or $C_{1-10}$ alkyl, preferably methyl.

In certain embodiments of Formula II, R³, together with a moiety in L, form a $C_{2-9}$ heterocycle with the nitrogen atom(s) to which they are attached, wherein L is up to 20 atoms in length and comprises one or more occurrences of groups selected from —N(R²)—, —O—, —S—, —C(=NR²)—, —C(=O)—, $C_{1-10}$ alkylene, $C_{2-10}$ alkenylene, $C_{3-10}$ alkynylene, $C_{4-10}$ cycloalkylene, $C_{6-10}$ arylene, and combinations thereof, wherein R², independently for each occurrence, is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH₂, —NHR', —N(R')₂, —NHCOR', NR'COR', halogen, —CN, —CO₂H, —CO₂R', —CHO, —COR', —CONH₂, —CONHR', —CON(R')₂, —NO₂, —OP(O)(OH)₂, —SO₃H, —SO₃R', —SOR', and —SO₂R', wherein R', independently for each occurrence, is $C_{1-10}$ alkyl or $C_{3-10}$ cycloalkyl.

In certain embodiments of Formula II, R³, together with a moiety in L, form a $C_{2-9}$ heterocycle with the nitrogen atom(s) to which they are attached, wherein L is up to 20 atoms in length and comprises one or more occurrences of groups selected from —N(R²)—, —O—, —C(=O)—, $C_{1-10}$ alkylene, and combinations thereof, wherein R², independently for each occurrence, is selected from H and $C_{1-10}$ alkyl, optionally substituted by one or more substituents selected from —OH, —OR', =O, =S, —SH, —SR', —NH₂, —NHR', —N(R')₂, —NHCOR', NR'COR', halogen, —CN, —CO₂H, —CO₂R', —CHO, —COR', —CONH₂, —CONHR', —CON(R')₂, —NO₂, —OP(O)(OH)₂, —SO₃H, —SO₃R', —SOR', and —SO₂R', wherein R', independently for each occurrence, is $C_{1-10}$ alkyl or $C_{3-10}$ cycloalkyl.

In certain embodiments of Formula II, R³, together with a moiety in L, form a $C_{2-9}$ heterocycle with the nitrogen atom(s) to which they are attached, wherein L is up to 20 atoms in length and comprises one or more occurrences of —N(R²)—, wherein R², independently for each occurrence, is H or $C_{1-10}$ alkyl.

In certain embodiments of Formula II, the compound is a compound of Formula IIa:

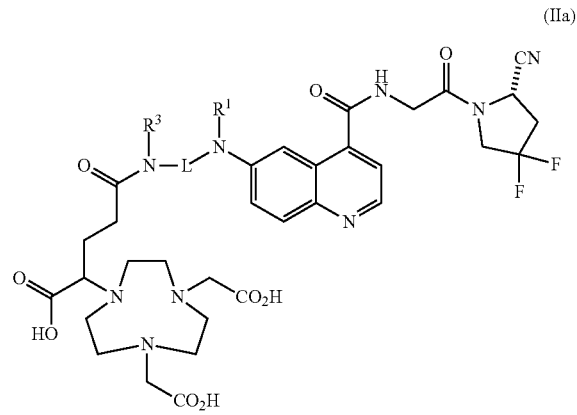

(IIa)

wherein:
R¹ is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH₂, —NHR', —N(R')₂, —NHCOR', NR'COR', halogen, —CN, —CO₂H, —CO₂R', —CHO, —COR', —CONH₂, —CONHR', —CON(R')₂, —NO₂, —OP(O)(OH)₂, —SO₃H, —SO₃R', —SOR', and —SO₂R', wherein R', independently for each occurrence, is $C_{1-10}$ alkyl or $C_{3-10}$ cycloalkyl; and
R³ and L are as described above for Formula II;
or is a pharmaceutically acceptable salt thereof.

In certain embodiments of Formula IIa, R¹ is H. In certain embodiments of Formula IIa, R¹ is $C_1$-$C_{10}$ alkyl. In certain embodiments of Formula IIa, R¹ is $C_1$-$C_6$ alkyl. In certain embodiments of Formula IIa, R¹ is selected from methyl, ethyl, propyl, isopropyl, butyl, isobutyl, pentyl and hexyl. In certain embodiments of Formula IIa, R¹ is methyl.

In certain embodiments of Formula IIa, R³ is H. In certain embodiments of Formula IIa, R³ is $C_1$-$C_{10}$ alkyl. In certain embodiments of Formula IIa, R³ is $C_1$-$C_6$ alkyl. In certain embodiments of Formula IIa, R³ is selected from methyl, ethyl, propyl, isopropyl, butyl, isobutyl, pentyl and hexyl. In certain embodiments of Formula IIa, R³ is methyl.

In certain embodiments of Formula IIa, R³, together with a moiety in L, form a $C_{2-9}$ heterocycle with the nitrogen atom(s) to which they are attached. In certain embodiments of Formula IIa, the $C_{2-9}$ heterocycle is a 5-, 6-, or 7-membered heterocycle. In certain embodiments of Formula IIa, the $C_{2-9}$ heterocycle is a 5-membered heterocycle selected from a pyrrolidine, pyrazolidine, and imidazoline. In certain embodiments of Formula IIa, the $C_{2-9}$ heterocycle is a 6-membered heterocycle selected from a piperazine, hexahydropyrimidine, hexahydropyridazine, 1,2,3-triazinane, 1,2,4-triazinane, and 1,3,5-triazinane. In certain embodiments of Formula IIa, the $C_{2-9}$ heterocycle is a piperazine.

In certain embodiments of Formula IIa, L is a divalent linker as described above for Formula I.

In certain embodiments of Formula IIa, L is up to 20 atoms in length. In certain embodiments of Formula IIa, L is up to 15 atoms in length. In certain embodiments of Formula IIa, L is up to 10 atoms in length. In certain embodiments of Formula IIa, L is up to 5 atoms in length.

In certain embodiments of Formula IIa, L comprises one or more occurrences of groups selected from —N(R²)—, —O—, —S—, —C(=NR$^2$)—, —C(=O)—, $C_{1-10}$ alkylene, $C_{2-10}$ alkenylene, $C_{3-10}$ alkynylene, $C_{4-10}$ cycloalkylene, $C_{6-10}$ arylene, and combinations thereof, wherein R$^2$, independently for each occurrence, is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl.

In certain embodiments of Formula IIa, L comprises one or more —N(R$^2$)—, wherein R$^2$, independently for each occurrence, is H or $C_{1-10}$ alkyl, e.g., methyl.

In certain embodiments of Formula IIa, L comprises one or more —C(=O)— groups.

In certain embodiments of Formula IIa, L comprises one or more $C_{1-10}$ alkylene groups.

In certain embodiments of Formula IIa, L comprises one or more —N(R$^2$)— groups and one or more —C(=O)— groups. In certain embodiments of Formula IIa, L comprises one or more —N(R$^2$-groups and one or more $C_{1-10}$ alkylene groups. In certain embodiments of Formula IIa, L comprises one or more —C(=O)— groups and one or more $C_{1-10}$ alkylene groups. In certain embodiments of Formula IIa, L comprises one or more —N(R$^2$)— groups, one or more —C(=O)— groups, and one or more $C_{1-10}$ alkylene groups.

In certain embodiments of Formula IIa, R$^3$, together with a moiety in L, form a $C_{2-9}$ heterocycle with the nitrogen atom(s) to which they are attached. In certain embodiments of Formula IIa, the $C_{2-9}$ heterocycle is a 5-, 6-, or 7-membered heterocycle. In certain embodiments of Formula IIa, the $C_{2-9}$ heterocycle is a 5-membered heterocycle selected from a pyrrolidine, pyrazolidine, and imidazoline. In certain embodiments of Formula IIa, the $C_{2-9}$ heterocycle is a 6-membered heterocycle selected from a piperazine, hexahydropyrimidine, hexahydropyridazine, 1,2,3-triazinane, 1,2,4-triazinane, and 1,3,5-triazinane. In certain embodiments of Formula IIa, the $C_{2-9}$ heterocycle is a piperazine.

In certain embodiments of Formula IIa, R$^1$ is H or $C_{1-10}$ alkyl; R$^3$ is H; and L is up to 20 atoms in length and comprises one or more occurrences of groups selected from —N(R$^2$)—, —O—, —S—, —C(=NR$_2$)—, —C(=O)—, $C_{1-10}$ alkylene, $C_{2-10}$ alkenylene, $C_{3-10}$ alkynylene, $C_{4-10}$ cycloalkylene, $C_{6-10}$ arylene, and combinations thereof, wherein R$^2$, independently for each occurrence, is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl. In certain embodiments of Formula IIa, R$^1$ is H or $C_{1-10}$ alkyl; R$^3$ is H; and L is up to 20 atoms in length and comprises one or more occurrences of groups selected from —N(R$^2$)—, —O—, —C(=O)—, $C_{1-10}$ alkylene, and combinations thereof, wherein R$^2$, independently and or each occurrence, is selected from H and $C_{1-10}$ alkyl.

In certain embodiments of Formula IIa, R$^1$ is H or $C_{1-10}$ alkyl; R$^3$ is H; and L is up to 20 atoms in length and comprises one or more —N(R$^2$)— groups, wherein R$^2$, independently for each occurrence, is H or $C_{1-10}$ alkyl.

In certain embodiments of Formula IIa, R$^1$ is H or $C_{1-10}$ alkyl; R$^3$ is H; and L is up to 20 atoms in length and comprises one or more —C(=O)— groups.

In certain embodiments of Formula IIa, R$^1$ is H or $C_{1-10}$ alkyl; R$^3$ is H; and L is up to 20 atoms in length and comprises one or more or more $C_{1-10}$ alkylene groups.

In certain embodiments of Formula IIa, R$^1$ is H or $C_{1-10}$ alkyl; R$^3$ is H; and L is up to 20 atoms in length and comprises one or more —C(=O)— groups and one or more $C_{1-10}$ alkylene groups.

In certain embodiments of Formula IIa, R$^1$ is H or $C_{1-10}$ alkyl; R$^3$ is H; and L is up to 20 atoms in length and comprises one or more —C(=O)— groups and one or more —N(R$^2$)— groups, wherein R$^2$, independently for each occurrence, is H or $C_{1-10}$ alkyl. In certain embodiments of Formula IIa, R$^1$ is H or $C_{1-10}$ alkyl; R$^3$ is H; and L is up to 20 atoms in length and comprises one or more $C_{1-10}$ alkylene groups and one or more —N(R$^2$)— groups, wherein R$^2$, independently for each occurrence, is H or $C_{1-10}$ alkyl. In certain embodiments of Formula IIa, R$^1$ is H or $C_{1-10}$ alkyl; R$^3$ is H; and L is up to 20 atoms in length and comprises one or more —C(=O)— groups, one or more $C_{1-10}$ alkylene groups, and one or more —N(R$^2$)— groups, wherein R$^2$, independently for each occurrence, is H or $C_{1-10}$ alkyl.

In certain embodiments of Formula IIa, R$^1$ is H or $C_{1-10}$ alkyl; and R$^3$, together with a moiety in L, form a $C_{2-9}$ heterocycle with the nitrogen atom(s) to which they are attached; wherein L is up to 20 atoms in length and comprises one or more occurrences of groups selected from —N(R$^2$)—, —O—, —S—, —C(=NR$^2$)—, —C(=O)—, $C_{1-10}$ alkylene, $C_{2-10}$ alkenylene, $C_{3-10}$ alkynylene, $C_{4-10}$ cycloalkylene, $C_{6-10}$ arylene, and combinations thereof, wherein R$^2$, independently for each occurrence, is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl.

In certain embodiments of Formula IIa, R$^1$ is H or $C_{1-10}$ alkyl; R$^3$, together with a moiety in L, form a $C_{2-9}$ heterocycle with the nitrogen atom(s) to which they are attached; wherein L is up to 20 atoms in length and comprises one or more occurrences of groups selected from —N(R$^2$)—, —O—, —C(=O)—, $C_{1-10}$ alkylene, and combinations thereof, wherein R$^2$, independently for each occurrence, is selected from H and $C_{1-10}$ alkyl, optionally substituted by one or more substituents selected from —OH, —OR', =O, =S, —SH, —SR', —NH$_2$, —NHR', —N(R')$_2$, —NHCOR', NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl.

In certain embodiments of Formula IIa, R$^1$ is H or $C_{1-10}$ alkyl; R$^3$, together with a moiety in L, form a $C_{2-9}$ heterocycle with the nitrogen atom(s) to which they are attached; wherein L is up to 20 atoms in length and comprises one or more occurrences of —N(R$^2$)—, wherein R$^2$, independently for each occurrence, is H or $C_{1-10}$ alkyl.

The present disclosure also provides yet further compounds, including when the compound is a compound of Formula III:

(III)

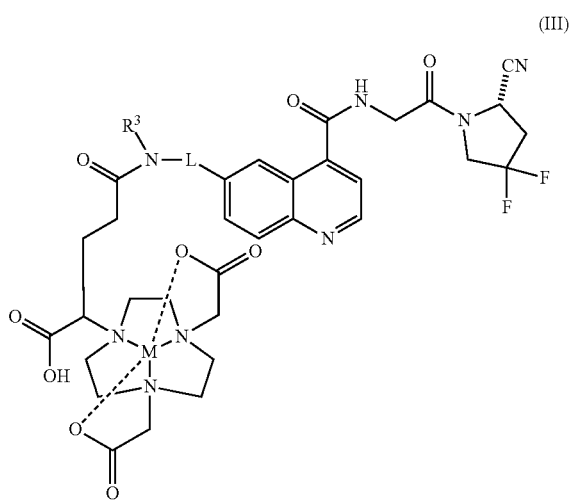

wherein:
R³ is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH₂, —NHR', —N(R')₂, —NHCOR', NR'COR', halogen, —CN, —CO₂H, —CO₂R', —CHO, —COR', —CONH₂, —CONHR', —CON(R')₂, —NO₂, —OP(O)(OH)₂, —SO₃H, —SO₃R', —SOR', and —SO₂R', wherein R', independently for each occurrence, is $C_{1-10}$ alkyl or $C_{3-10}$ cycloalkyl; or R³, together with a moiety in L, form a $C_{2-9}$ heterocycle with the nitrogen atom(s) to which they are attached;
L is a divalent linker, preferably up to 20 atoms in length; and
M is selected from $^{225}$Ac, $^{51}$Cr, $^{66}$Ga, $^{67}$Ga, $^{68}$GA, [$^{18}$F]AlF, $^{111}$In, $^{113m}$In, $^{52m}$Mn, $^{99m}$Tc, $^{186}$Re, $^{188}$Re, $^{139}$La, $^{140}$La, $^{175}$Yb, $^{179}$Yb, $^{153}$Sm, $^{177m}$Sn, $^{166}$Ho, $^{86}$Y, $^{88}$Y, $^{90}$Y, $^{149}$Pm, $^{165}$Dy, $^{169}$Er, $^{177}$Lu, $^{52}$Fe, $^{43}$Sc, $^{44}$Sc, $^{46}$Sc, $^{47}$Sc, $^{142}$Pr, $^{157}$Gd, $^{159}$Gd, $^{212}$Bi, $^{213}$Bi, $^{72}$As, $^{77}$As, $^{97}$Ru, $^{109}$Pd, $^{105}$Rh, $^{101m}$Rh, $^{119}$Sb, $^{197}$Hg, $^{151}$Eu, $^{153}$Eu, $^{169}$Eu, $^{201}$Tl, $^{149}$Tb, $^{152}$Tb, $^{155}$Tb, $^{161}$Tb, $^{203}$Pb, $^{212}$Pb, $^{151}$Pm, $^{153}$Pm, $^{142}$Pr, $^{143}$Pr, $^{55}$Co, $^{60}$Cu, $^{61}$Cu, $^{62}$Cu, $^{64}$Cu, $^{67}$Cu, $^{62}$Zn, $^{188}$Re, $^{198}$Au, $^{199}$Au, $^{227}$Th, $^{111}$Ag, $^{199}$Ag, $^{211}$At, $^{223}$Ra, $^{88}$Zr, and $^{89}$Zr.
or is a pharmaceutically acceptable salt thereof.

In certain embodiments of Formula III, R³ is H. In certain embodiments of Formula III, R³ is $C_1$-$C_{10}$ alkyl. In certain embodiments of Formula III, R³ is $C_1$-$C_6$ alkyl. In certain embodiments of Formula III, R³ is selected from methyl, ethyl, propyl, isopropyl, butyl, isobutyl, pentyl and hexyl. In certain embodiments of Formula III, R³ is methyl.

In certain embodiments of Formula III, L is a divalent linker as described above for Formula I.

In certain embodiments of Formula III, L is up to 20 atoms in length. In certain embodiments of Formula III, L is up to 15 atoms in length. In certain embodiments of Formula III, L is up to 10 atoms in length. In certain embodiments of Formula III, L is up to 5 atoms in length.

In certain embodiments of Formula III, L comprises one or more occurrences of groups selected from —N(R²)—, —O—, —S—, —C(=NR²)—, —C(=O)—, $C_{1-10}$ alkylene, $C_{2-10}$ alkenylene, $C_{3-10}$ alkynylene, $C_{4-10}$ cycloalkylene, $C_{6-10}$ arylene, and combinations thereof, wherein R², independently for each occurrence, is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH₂, —NHR', —N(R')₂, —NHCOR', NR'COR', halogen, —CN, —CO₂H, —CO₂R', —CHO, —COR', —CONH₂, —CONHR', —CON(R')₂, —NO₂, —OP(O)(OH)₂, —SO₃H, —SO₃R', —SOR', and —SO₂R', wherein R', independently for each occurrence, is $C_{1-10}$ alkyl or $C_{3-10}$ cycloalkyl.

In certain embodiments of Formula III, L comprises one or more —N(R²)—, wherein R², independently for each occurrence, is H or $C_{1-10}$ alkyl, e.g., methyl.

In certain embodiments of Formula III, L comprises one or more —C(=O)— groups.

In certain embodiments of Formula III, L comprises one or more $C_{1-10}$ alkylene groups.

In certain embodiments of Formula III, L comprises one or more —N(R²)— groups and one or more —C(=O)— groups. In certain embodiments of Formula III, L comprises one or more —N(R²)— groups and one or more $C_{1-10}$ alkylene groups. In certain embodiments of Formula III, L comprises one or more —C(=O)— groups and one or more $C_{1-10}$ alkylene groups. In certain embodiments of Formula III, L comprises one or more —N(R²)— groups, one or more —C(=O)— groups, and one or more $C_{1-10}$ alkylene groups.

In certain embodiments of Formula III, R³, together with a moiety in L, form a $C_{2-9}$ heterocycle with the nitrogen atom(s) to which they are attached. In certain embodiments of Formula III, the $C_{2-9}$ heterocycle is a 5-, 6-, or 7-membered heterocycle. In certain embodiments of Formula III, the $C_{2-9}$ heterocycle is a 5-membered heterocycle selected from a pyrrolidine, pyrazolidine, and imidazoline. In certain embodiments of Formula III, the $C_{2-9}$ heterocycle is a 6-membered heterocycle selected from a piperazine, hexahydropyrimidine, hexahydropyridazine, 1,2,3-triazinane, 1,2,4-triazinane, and 1,3,5-triazinane. In certain embodiments of Formula III, the $C_{2-9}$ heterocycle is a piperazine.

In certain embodiments of Formula III, M is selected from $^{61}$Cu, $^{62}$Cu, $^{64}$Cu, and $^{67}$Cu.

In certain embodiments of Formula III, R³ is H; L is up to 20 atoms in length and comprises one or more occurrences of groups selected from —N(R²)—, —O—, —S—, —C(=NR²)—, —C(=O)—, $C_{1-10}$ alkylene, $C_{2-10}$ alkenylene, $C_{3-10}$ alkynylene, $C_{4-10}$ cycloalkylene, $C_{6-10}$ arylene, and combinations thereof, wherein R², independently for each occurrence, is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH₂, —NHR', —N(R')₂, —NHCOR', NR'COR', halogen, —CN, —CO₂H, —CO₂R', —CHO, —COR', —CONH₂, —CONHR', —CON(R')₂, —NO₂, —OP(O)(OH)₂, —SO₃H, —SO₃R', —SOR', and —SO₂R', wherein R', independently for each occurrence, is $C_{1-10}$ alkyl or $C_{3-10}$ cycloalkyl; and M is selected from $^{61}$Cu, $^{62}$Cu, $^{64}$Cu, and $^{67}$Cu. In certain embodiments of Formula III, R³ is H; L is up to 20 atoms in length and comprises one or more occurrences of groups selected from —N(R²)—, —O—, —C(=O)—, $C_{1-10}$ alkylene, and combinations thereof, wherein R², independently and or each occurrence, is selected from H and $C_{1-10}$ alkyl; and M is selected from $^{61}$Cu, $^{62}$Cu, $^{64}$Cu, and $^{67}$Cu.

In certain embodiments of Formula III, R³ is H; L is up to 20 atoms in length and comprises one or more —N(R²)— groups, wherein R², independently for each occurrence, is H or $C_{1-10}$ alkyl; and M is selected from $^{61}$Cu, $^{62}$Cu, $^{64}$Cu, and $^{67}$Cu.

In certain embodiments of Formula III, $R^3$ is H, L is up to 20 atoms in length and comprises one or more —C(=O)— groups, and M is selected from $^{61}Cu$, $^{62}Cu$, $^{64}Cu$, and $^{67}Cu$.

In certain embodiments of Formula III, $R^3$ is H; L is up to 20 atoms in length and comprises one or more or more $C_{1-10}$ alkylene groups; and M is selected from $^{61}Cu$, $^{62}Cu$, $^{64}Cu$, and $^{67}Cu$.

In certain embodiments of Formula III, $R^3$ is H and L is up to 20 atoms in length and comprises one or more —C(=O)— groups and one or more or more $C_{1-10}$ alkylene groups. In certain embodiments of Formula III, $R^3$ is H and L is up to 20 atoms in length and comprises one or more —C(=O)— groups and one or more —N($R^2$)— groups, wherein $R^2$, independently for each occurrence, is H or $C_{1-10}$ alkyl. In certain embodiments of Formula III, $R^3$ is H and L is up to 20 atoms in length and comprises one or more $C_{1-10}$ alkylene groups and one or more —N($R^2$)— groups, wherein $R^2$, independently for each occurrence, is H or $C_{1-10}$ alkyl. In certain embodiments of Formula III, $R^3$ is H and L is up to 20 atoms in length and comprises one or more —C(=O)— groups, one or more $C_{1-10}$ alkylene groups, and one or more —N($R^2$)— groups, wherein $R^2$, independently for each occurrence, is H or $C_{1-10}$ alkyl.

In certain embodiments of Formula III, $R^3$, together with a moiety in L, form a $C_{2-9}$ heterocycle with the nitrogen atom(s) to which they are attached, wherein L is up to 20 atoms in length and comprises one or more occurrences of groups selected from —N($R^2$)—, —O—, —S—, —C(=N$R^2$)—, —C(=O)—, $C_{1-10}$ alkylene, $C_{2-10}$ alkenylene, $C_{3-10}$ alkynylene, $C_{4-10}$ cycloalkylene, $C_{6-10}$ arylene, and combinations thereof, wherein $R^2$, independently for each occurrence, is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl, and M is selected from $^{61}Cu$, $^{62}Cu$, $^{64}Cu$, and $^{67}Cu$.

In certain embodiments of Formula III, $R^3$, together with a moiety in L, form a $C_{2-9}$ heterocycle with the nitrogen atom(s) to which they are attached, wherein L is up to 20 atoms in length and comprises one or more occurrences of groups selected from —N($R^2$)—, —O—, —C(=O)—, $C_{1-10}$ alkylene, and combinations thereof, wherein $R^2$, independently for each occurrence, is selected from H and $C_{1-10}$ alkyl, optionally substituted by one or more substituents selected from —OH, —OR', =O, =S, —SH, —SR', —NH$_2$, —NHR', —N(R')$_2$, —NHCOR', NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl, and M is selected from $^{61}Cu$, $^{62}Cu$, $^{64}Cu$, and $^{67}Cu$.

In certain embodiments of Formula III, $R^3$, together with a moiety in L, form a $C_{2-9}$ heterocycle with the nitrogen atom(s) to which they are attached, wherein L is up to 20 atoms in length and comprises one or more occurrences of —N($R^2$)—, wherein $R^2$, independently for each occurrence, is H or $C_{1-10}$ alkyl, and M is selected from $^{61}Cu$, $^{62}Cu$, $^{64}Cu$, and $^{67}Cu$.

In certain embodiments of Formula III, the compound is a compound of Formula IIIa:

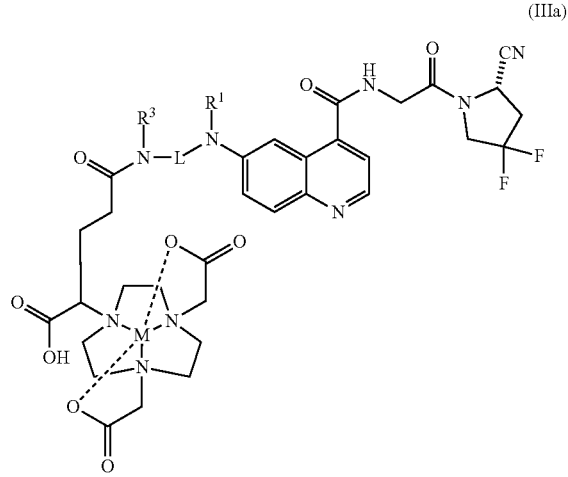

(IIIa)

wherein:
$R^1$ is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl; and
$R^3$, L, and M are as described above for Formula III;
or is a pharmaceutically acceptable salt thereof.

In certain embodiments of Formula IIIa, $R^1$ is H. In certain embodiments of Formula IIIa, $R^1$ is $C_1$-$C_{10}$ alkyl. In certain embodiments of Formula IIIa, $R^1$ is $C_1$-$C_6$ alkyl. In certain embodiments of Formula IIIa, $R^1$ is selected from methyl, ethyl, propyl, isopropyl, butyl, isobutyl, pentyl and hexyl. In certain embodiments of Formula IIIa, $R^1$ is methyl.

In certain embodiments of Formula IIIa, $R^3$ is H. In certain embodiments of Formula IIIa, $R^3$ is $C_1$-$C_{10}$ alkyl. In certain embodiments of Formula IIIa, $R^3$ is $C_1$-$C_6$ alkyl. In certain embodiments of Formula IIIa, $R^3$ is selected from methyl, ethyl, propyl, isopropyl, butyl, isobutyl, pentyl and hexyl. In certain embodiments of Formula IIIa, $R^3$ is methyl.

In certain embodiments of Formula IIIa, $R^3$, together with a moiety in L, form a $C_{2-9}$ heterocycle with the nitrogen atom(s) to which they are attached. In certain embodiments of Formula IIIa, the $C_{2-9}$ heterocycle is a 5-, 6-, or 7-membered heterocycle. In certain embodiments of Formula IIIa, the $C_{2-9}$ heterocycle is a 5-membered heterocycle selected from a pyrrolidine, pyrazolidine, and imidazoline. In certain embodiments of Formula IIIa, the $C_{2-9}$ heterocycle is a 6-membered heterocycle selected from a piperazine, hexahydropyrimidine, hexahydropyridazine, 1,2,3-triazinane, 1,2,4-triazinane, and 1,3,5-triazinane. In certain embodiments of Formula IIIa, the $C_{2-9}$ heterocycle is a piperazine.

In certain embodiments of Formula IIIa, L is a divalent linker as described above for Formula I.

In certain embodiments of Formula IIIa, L is up to 20 atoms in length. In certain embodiments of Formula IIIa, L is up to 15 atoms in length. In certain embodiments of Formula IIIa, L is up to 10 atoms in length. In certain embodiments of Formula IIIa, L is up to 5 atoms in length.

In certain embodiments of Formula IIIa, L comprises one or more occurrences of groups selected from —N($R^2$)—, —O—, —S—, —C(=NR$^2$)—, —C(=O)—, $C_{1-10}$ alkylene, $C_{2-10}$ alkenylene, $C_{3-10}$ alkynylene, $C_{4-10}$ cycloalkylene, $C_{6-10}$ arylene, and combinations thereof, wherein R$^2$, independently for each occurrence, is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl.

In certain embodiments of Formula IIIa, L comprises one or more —N(R$^2$)—, wherein R$^2$, independently for each occurrence, is H or $C_{1-10}$ alkyl, e.g., methyl.

In certain embodiments of Formula IIIa, L comprises one or more —C(=O)— groups.

In certain embodiments of Formula IIIa, L comprises one or more $C_{1-10}$ alkylene groups.

In certain embodiments of Formula IIIa, L comprises one or more —N(R$^2$)— groups and one or more —C(=O)— groups. In certain embodiments of Formula IIIa, L comprises one or more —N(R$^2$)— groups and one or more $C_{1-10}$ alkylene groups. In certain embodiments of Formula IIIa, L comprises one or more —C(=O)— groups and one or more $C_{1-10}$ alkylene groups. In certain embodiments of Formula IIIa, L comprises one or more —N(R$^2$)— groups, one or more —C(=O)— groups, and one or more $C_{1-10}$ alkylene groups.

In certain embodiments of Formula IIIa, R$^3$, together with a moiety in L, form a $C_{2-9}$ heterocycle with the nitrogen atom(s) to which they are attached. In certain embodiments of Formula IIIa, the $C_{2-9}$ heterocycle is a 5-, 6-, or 7-membered heterocycle. In certain embodiments of Formula IIIa, the $C_{2-9}$ heterocycle is a 5-membered heterocycle selected from a pyrrolidine, pyrazolidine, and imidazoline. In certain embodiments of Formula IIIa, the $C_{2-9}$ heterocycle is a 6-membered heterocycle selected from a piperazine, hexahydropyrimidine, hexahydropyridazine, 1,2,3-triazinane, 1,2,4-triazinane, and 1,3,5-triazinane. In certain embodiments of Formula IIIa, the $C_{2-9}$ heterocycle is a piperazine.

In certain embodiments of Formula IIIa, M is selected from $^{61}$Cu, $^{62}$Cu, $^{64}$Cu, and $^{67}$Cu.

In certain embodiments of Formula IIIa, R$^1$ is H or $C_{1-10}$ alkyl; R$^3$ is H; L is up to 20 atoms in length and comprises one or more occurrences of groups selected from —N(R$^2$)—, —O—, —S—, —C(=NR$^2$)—, —C(=O)—, $C_{1-10}$ alkylene, $C_{2-10}$ alkenylene, $C_{3-10}$ alkynylene, $C_{4-10}$ cycloalkylene, $C_{6-10}$ arylene, and combinations thereof, wherein R$^2$, independently for each occurrence, is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', NR$_{1-10}$COR$_{1-10}$, halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl; and M is selected from $^{61}$Cu, $^{62}$Cu, $^{64}$Cu, and $^{67}$Cu. In certain embodiments of Formula IIIa, R$^1$ is H or $C_{1-10}$ alkyl; R$^3$ is H; L is up to 20 atoms in length and comprises one or more occurrences of groups selected from —N(R$^2$)—, —O—, —C(=O)—, $C_{1-10}$ alkylene, and combinations thereof, wherein R$^2$, independently and or each occurrence, is selected from H and $C_{1-10}$ alkyl; and M is selected from $^{61}$Cu, $^{62}$Cu, $^{64}$Cu, and $^{67}$Cu.

In certain embodiments of Formula IIIa, R$^1$ is H or $C_{1-10}$ alkyl; R$^3$ is H; L is up to 20 atoms in length and comprises one or more —N(R$^2$)— groups, wherein R$^2$, independently for each occurrence, is H or $C_{1-10}$ alkyl; and M is selected from $^{61}$Cu, $^{62}$Cu, $^{64}$Cu, and $^{67}$Cu.

In certain embodiments of Formula IIIa, R$^1$ is H or $C_{1-10}$ alkyl; R$^3$ is H; and L is up to 20 atoms in length and comprises one or more —C(=O)— groups; and M is selected from $^{61}$Cu, $^{62}$Cu, $^{64}$Cu, and $^{67}$Cu.

In certain embodiments of Formula IIIa, R$^1$ is H or $C_{1-10}$ alkyl; R$^3$ is H; L is up to 20 atoms in length and comprises one or more or more $C_{1-10}$ alkylene groups; and M is selected from $^{61}$Cu, $^{62}$Cu, $^{64}$Cu, and $^{67}$Cu.

In certain embodiments of Formula IIIa, R$^1$ is H or $C_{1-10}$ alkyl; R$^3$ is H; and L is up to 20 atoms in length and comprises one or more —C(=O)— groups and one or more $C_{1-10}$ alkylene groups. In certain embodiments of Formula IIIa, R$^1$ is H or $C_{1-10}$ alkyl; R$^3$ is H; and L is up to 20 atoms in length and comprises one or more —C(=O)— groups and one or more —N(R$^2$)— groups, wherein R$^2$, independently for each occurrence, is H or $C_{1-10}$ alkyl. In certain embodiments of Formula IIIa, R$^1$ is H or $C_{1-10}$ alkyl; R$^3$ is H; and L is up to 20 atoms in length and comprises one or more $C_{1-10}$ alkylene groups and one or more —N(R$^2$)— groups, wherein R$^2$, independently for each occurrence, is H or $C_{1-10}$ alkyl. In certain embodiments of Formula IIIa, R$^1$ is H or $C_{1-10}$ alkyl; R$^3$ is H; and L is up to 20 atoms in length and comprises one or more —C(=O)— groups, one or more $C_{1-10}$ alkylene groups, and one or more —N(R$^2$)— groups, wherein R$^2$, independently for each occurrence, is H or $C_{1-10}$ alkyl.

In certain embodiments of Formula IIIa, R$^1$ is H or $C_{1-10}$ alkyl; R$^3$, together with a moiety in L, form a $C_{2-9}$ heterocycle with the nitrogen atom(s) to which they are attached, wherein L is up to 20 atoms in length and comprises one or more occurrences of groups selected from —N(R$^2$)—, —O—, —S—, —C(=NR$^2$)—, —C(=O)—, $C_{1-10}$ alkylene, $C_{2-10}$ alkenylene, $C_{3-10}$ alkynylene, $C_{4-10}$ cycloalkylene, $C_{6-10}$ arylene, and combinations thereof, wherein R$^2$, independently for each occurrence, is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH$_2$, —NHR', —N(R')$_2$, —NHCOR', NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl; and M is selected from $^{61}$Cu, $^{62}$Cu, $^{64}$Cu, and $^{67}$Cu.

In certain embodiments of Formula IIIa, R$^1$ is H or $C_{1-10}$ alkyl; R$^3$, together with a moiety in L, form a $C_{2-9}$ heterocycle with the nitrogen atom(s) to which they are attached, wherein L is up to 20 atoms in length and comprises one or more occurrences of groups selected from —N(R$^2$)—, —O—, —C(=O)—, $C_{1-10}$ alkylene, and combinations thereof, wherein R$^2$, independently for each occurrence, is selected from H and $C_{1-10}$ alkyl, optionally substituted by one or more substituents selected from —OH, —OR', =O, =S, —SH, —SR', —NH$_2$, —NHR', —N(R')$_2$, —NHCOR', NR'COR', halogen, —CN, —CO$_2$H, —CO$_2$R', —CHO, —COR', —CONH$_2$, —CONHR', —CON(R')$_2$, —NO$_2$, —OP(O)(OH)$_2$, —SO$_3$H, —SO$_3$R', —SOR', and —SO$_2$R', wherein R', independently for each occurrence, is $C_{1-10}$ alkyl or $C_{3-10}$ cycloalkyl; and M is selected from $^{61}Cu$, $^{62}Cu$, $^{64}Cu$, and $^{67}Cu$.

In certain embodiments of Formula IIIa, $R^1$ is H or $C_{1-10}$ alkyl; $R^3$, together with a moiety in L, form a $C_{2-9}$ heterocycle with the nitrogen atom(s) to which they are attached, wherein L is up to 20 atoms in length and comprises one or more occurrences of —N($R^2$)—, wherein $R^2$, independently for each occurrence, is H or $C_{1-10}$ alkyl; and M is selected from $^{61}Cu$, $^{62}Cu$, $^{64}Cu$, and $^{67}Cu$.

3. Compositions

In another aspect, the present disclosure provides compositions (e.g., pharmaceutical compositions) comprising one or more of the compounds of Formula I-III described hereinabove and one or more pharmaceutically acceptable excipients.

Pharmaceutical compositions can be prepared in a manner well known in the pharmaceutical art. The excipient(s) must be acceptable in the sense of being compatible with the other ingredients of the composition and not deleterious to the recipient thereof. In accordance with another aspect of the disclosure there is also provided a process for the preparation of a pharmaceutical composition including a provided compound or pharmaceutically acceptable salt thereof, with one or more pharmaceutically acceptable excipients. The pharmaceutical composition can be for use in the diagnosis, treatment and/or prophylaxis of any of the conditions described herein.

Generally, a provided pharmaceutical composition is administered in an effective amount. The amount administered will typically be determined by a physician, in the light of the relevant circumstances, including the condition to be treated (e.g., a therapeutically effective amount) or image to be generated (e.g., diagnostically effective amount), the chosen route of administration, the pharmaceutical composition administered, the age, weight, and response of the individual patient, the severity of the patient's symptoms, and the like.

Pharmaceutical compositions may be presented in unit dose forms containing a predetermined amount of active ingredient per unit dose. The term "unit dosage forms" refers to physically discrete units suitable as unitary dosages for human subjects and other mammals, each unit containing a predetermined quantity of active material calculated to produce the desired therapeutic effect, in association with a suitable pharmaceutical excipient, vehicle or carrier. Typical unit dosage forms include prefilled, premeasured ampules or syringes of the liquid compositions or pills, tablets, capsules or the like in the case of solid compositions.

Preferred unit dosage compositions are those containing a daily dose or sub-dose, or an appropriate fraction thereof, of an active ingredient. Such unit doses may therefore be administered once or more than once a day. Such pharmaceutical compositions may be prepared by any of the methods well known in the pharmacy art.

Pharmaceutical compositions may be adapted for administration by any appropriate route, for example by the oral (including buccal or sublingual), rectal, inhaled, intranasal, topical (including buccal, sublingual, or transdermal), vaginal or parenteral (including subcutaneous, intramuscular, intravenous, or intradermal) route. Such compositions may be prepared by any method known in the art of pharmacy, for example by bringing into association the active ingredient with the carrier(s) or excipient(s).

In certain embodiments, the pharmaceutical composition comprises a preservative. In certain embodiments, suitable preservatives may include, for example, methylparaben, propylparaben, sodium benzoate, and benzalkonium chloride.

In certain embodiments, the pharmaceutical composition comprises a buffering agent. In certain embodiments, suitable buffering agents may include, for example, citric acid, sodium citrate, phosphoric acid, potassium phosphate, and various other acids and salts.

In certain embodiments, the pharmaceutical composition is administered parenterally (e.g., subcutaneous, intravenous, intraarterial, intramuscular, intradermal, intraperitoneal, intrathecal, or intraocular).

The parenteral pharmaceutical compositions can be presented in unit-dose or multi-dose sealed containers, such as ampoules or vials, and can be stored in a freeze-dried (lyophilized) condition requiring only the addition of a sterile liquid excipient, for example, water for injections, immediately prior to use.

In certain embodiments, injectable pharmaceutical compositions are provided herein. The requirements for effective pharmaceutical carriers for injectable compositions are well-known to those of ordinary skill in the art (see, e.g., Pharmaceutics and Pharmacy Practice, J. B. Lippincott Company, Philadelphia, PA, Banker and Chalmers, eds., pages 238-250 (1982), and ASHP Handbook on Injectable Drugs, Toissel, 4th ed, pages 622-630 (1986)).

In certain embodiments, pharmaceutical compositions according to the present disclosure are characterized by one or more of the activity and purity characteristics as described below.

Radioactivity

The term "radioactivity" (also referred to as activity, or total activity) is a physical quantity defined as the number of radioactive transformations per second that occur in a particular radionuclide. The unit of radioactivity used herein is the becquerel (symbol Bq), which is defined equivalent to reciprocal seconds (1/seconds or $s^{-1}$).

Molar Activity

The term "molar activity" is defined as the amount of radioactivity (e.g., number of nuclear disintegrations per second) per unit mole of radiolabeled compound, and is expressed in Bq/mol, e.g., GBq/mol and is used where the molecular weight of the labelled material is known.

In certain embodiments, the composition has a molar activity of 1 to 280 MBq/nmol, e.g., 5 to 265 MBq/nmol, 10 to 250 MBq/nmol, 15 to 235 MBq/nmol, 20 to 220 MBq/nmol, 25 to 205 MBq/nmol, 30 to 190 MBq/nmol, 35 to 175 MBq/nmol, 40 to 160 MBq/nmol, 45 to 150 MBq/nmol, 50 to 135 MBq/nmol, 55 to 120 MBq/nmol, 1 to 50 MBq/nmol, 2 to 48 MBq/nmol, 4 to 46 MBq/nmol, 6 to 44 MBq/nmol, 8 to 42 MBq/nmol, 10 to 40 MBq/nmol, 12 to 38 MBq/nmol, 14 to 36 MBq/nmol, 16 to 34 MBq/nmol, 18 to 32 MBq/nmol, 20 to 30 MBq/nmol, or 22 to 28 MBq/nmol. In certain embodiments, the composition has a molar activity of 24 MBq/nmol±3 MBq/nmol.

In certain embodiments, the composition has a molar activity of ≥35 MBq/nmol, ≥40 MBq/nmol, ≥45 MBq/nmol, ≥50 MBq/nmol, ≥55 MBq/nmol, ≥60 MBq/nmol, ≥65 MBq/nmol, ≥70 MBq/nmol, ≥75 MBq/nmol, ≥80 MBq/nmol, ≥85 MBq/nmol, ≥90 MBq/nmol, ≥95 MBq/nmol, ≥100 MBq/nmol, ≥105 MBq/nmol, ≥110 MBq/nmol, ≥115 MBq/nmol, ≥120 MBq/nmol, ≥125 MBq/nmol, ≥130 MBq/nmol, ≥135 MBq/nmol, ≥140 MBq/nmol, ≥145 MBq/nmol, ≥150 MBq/nmol, ≥155 MBq/nmol, ≥160 MBq/nmol, ≥165 MBq/nmol, ≥170 MBq/nmol, ≥175 MBq/nmol, ≥180 MBq/nmol, ≥185 MBq/nmol, ≥190 MBq/nmol, ≥195 MBq/nmol, or ≥200 MBq/nmol.

In certain embodiments, the composition has a molar activity of 1 to 250 MBq/nmol, for example, 1 to 200 MBq/nmol, 1 to 150 MBq/nmol, 1 to 100 MBq/nmol, 1 to 50 MBq/nmol, 50 to 250 MBq/nmol, 50 to 200 MBq/nmol, 50 to 150 MBq/nmol, 50 to 100 MBq/nmol, 100 to 250 MBq/nmol, 100 to 150 MBq/nmol, 150 to 250 MBq/nmol, 150 to 200 MBq/nmol, or 200 to 250 MBq/nmol. In certain embodiments, the composition is characterized by molar activity of 1 to 150 MBq/nmol.

In certain embodiments, the composition has a molar activity of ≥90 MBq/nmol, ≥88 MBq/nmol, ≥86 MBq/nmol, ≥84 MBq/nmol, ≥82 MBq/nmol, ≥80 MBq/nmol, ≥78 MBq/nmol, ≥76 MBq/nmol, ≥74 MBq/nmol, ≥72 MBq/nmol, ≥70 MBq/nmol, ≥68 MBq/nmol, ≥66 MBq/nmol, ≥64 MBq/nmol, ≥62 MBq/nmol, ≥60 MBq/nmol, ≥58 MBq/nmol, ≥56 MBq/nmol, ≥54 MBq/nmol, ≥52 MBq/nmol, ≥50 MBq/nmol, ≥48 MBq/nmol, ≥46 MBq/nmol, ≥44 MBq/nmol, or ≥42 MBq/nmol.

In certain embodiments, the composition has a molar activity of ≥3 MBq/nmol, ≥4 MBq/nmol, ≥5 MBq/nmol, ≥6 MBq/nmol, ≥7 MBq/nmol, ≥8 MBq/nmol, ≥9 MBq/nmol, ≥10 MBq/nmol, ≥11 MBq/nmol, ≥12 MBq/nmol, ≥13 MBq/nmol, ≥14 MBq/nmol, ≥15 MBq/nmol, ≥16 MBq/nmol, ≥17 MBq/nmol, ≥18 MBq/nmol, or ≥19 MBq/nmol.

In certain embodiments, the composition has a molar activity of ≥3 MBq/nmol, ≥5 MBq/nmol, ≥10 MBq/nmol, ≥15 MBq/nmol, ≥20 MBq/nmol, ≥25 MBq/nmol, ≥30 MBq/nmol, ≥35 MBq/nmol, ≥40 MBq/nmol, ≥45 MBq/nmol, ≥50 MBq/nmol, ≥55 MBq/nmol, ≥60 MBq/nmol, ≥65 MBq/nmol, ≥70 MBq/nmol, ≥75 MBq/nmol, ≥80 MBq/nmol, ≥85 MBq/nmol, ≥90 MBq/nmol, ≥95 MBq/nmol, ≥100 MBq/nmol, ≥105 MBq/nmol, ≥110 MBq/nmol, ≥115 MBq/nmol, ≥120 MBq/nmol, ≥125 MBq/nmol, 130 MBq/nmol, 135 MBq/nmol, 140 MBq/nmol, 145 MBq/nmol, 150 MBq/nmol, 155 MBq/nmol, ≥160 MBq/nmol, ≥165 MBq/nmol, ≥170 MBq/nmol, ≥175 MBq/nmol, ≥180 MBq/nmol, ≥185 MBq/nmol, ≥190 MBq/nmol, ≥195 MBq/nmol, ≥200 MBq/nmol, ≥205 MBq/nmol, ≥210 MBq/nmol, ≥215 MBq/nmol, 220≥MBq/nmol, ≥225 MBq/nmol, ≥230 MBq/nmol, ≥235 MBq/nmol, ≥240 MBq/nmol, ≥245 MBq/nmol, ≥250 MBq/nmol, ≥255 MBq/nmol, ≥260 MBq/nmol, ≥265 MBq/nmol, ≥270 MBq/nmol, ≥275 MBq/nmol, or ≥280 MBq/nmol. In certain embodiments, the composition has a molar activity of ≥24 MBq/nmol.

In certain embodiments, the composition has a molar activity of 1 to 250 MBq/nmol, for example, 1 to 200 MBq/nmol, 1 to 150 MBq/nmol, 1 to 100 MBq/nmol, 1 to 50 MBq/nmol, 50 to 250 MBq/nmol, 50 to 200 MBq/nmol, 50 to 150 MBq/nmol, 50 to 100 MBq/nmol, 100 to 250 MBq/nmol, 100 to 150 MBq/nmol, 150 to 250 MBq/nmol, 150 to 200 MBq/nmol, or 200 to 250 MBq/nmol.

Activity Concentration

Activity concentration is the total amount of radioactivity per unit volume. In certain embodiments, activity concentration is expressed in Bq/L or magnitudes thereof (e.g., MBq/mL).

In certain embodiments, a composition provided is characterized by an activity concentration of ≥8 MBq/mL. In certain embodiments, a composition provided herein is characterized by an activity concentration of 8 to 10 MBq/mL, 10 to 20 MBq/mL, 20 to 30 MBq/mL, 30 to 40 MBq/mL, 40 to 50 MBq/mL, 50 to 60 MBq/mL, 60 to 70 MBq/mL, 70 to 80 MBq/mL, 80 to 90 MBq/mL, 90 to 100 MBq/mL, 100 to 110 MBq/mL, 110 to 120 MBq/mL, 120 to 130 MBq/mL, 130 to 140 MBq/mL, 140 to 150 MBq/mL, 150 to 160 MBq/mL, 160 to 170 MBq/mL, 170 to 180 MBq/mL, 180 to 190 MBq/mL, 190 to 200 MBq/mL, 200 to 210 MBq/mL, 210 to 220 MBq/mL, 220 to 230 MBq/mL, 230 to 240 MBq/mL, 240 to 250 MBq/mL, 250 to 260 MBq/mL, 260 to 270 MBq/mL, 270 to 280 MBq/mL, 280 to 290 MBq/mL, 290 to 300 MBq/mL, 300 to 310 MBq/mL, 310 to 320 MBq/mL, 320 to 330 MBq/mL, 330 to 340 MBq/mL, 340 to 350 MBq/mL, 350 to 360 MBq/mL, 360 to 370 MBq/mL, 370 to 380 MBq/mL, 380 to 390 MBq/mL, 390 to 400 MBq/mL, 400 to 410 MBq/mL, 410 to 420 MBq/mL, 420 to 430 MBq/mL, 430 to 440 MBq/mL, 440 to 450 MBq/mL, 450 to 460 MBq/mL, 460 to 470 MBq/mL, 470 to 480 MBq/mL, 480 to 490 MBq/mL, 490 to 500 MBq/mL, 500 to 510 MBq/mL, 510 to 520 MBq/mL, 520 to 530 MBq/mL, 530 to 540 MBq/mL, 540 to 550 MBq/mL, 550 to 560 MBq/mL, 560 to 570 MBq/mL, 570 to 580 MBq/mL, 580 to 590 MBq/mL, 590 to 600 MBq/mL, 600 to 610 MBq/mL, 610 to 620 MBq/mL, 620 to 630 MBq/mL, 630 to 640 MBq/mL, 640 to 650 MBq/mL, 650 to 660 MBq/mL, 660 to 670 MBq/mL, 670 to 680 MBq/mL, 680 to 690 MBq/mL, 690 to 700 MBq/mL, 700 to 710 MBq/mL, 710 to 720 MBq/mL, 720 to 730 MBq/mL, 730 to 740 MBq/mL, 740 to 750 MBq/mL, 750 to 760 MBq/mL, 760 to 770 MBq/mL, 770 to 780 MBq/mL, 780 to 790 MBq/mL, 790 to 800 MBq/mL, 800 to 810 MBq/mL, 810 to 820 MBq/mL, 820 to 830 MBq/mL, 830 to 840 MBq/mL, 840 to 850 MBq/mL, 850 to 860 MBq/mL, 860 to 870 MBq/mL, 870 to 880 MBq/mL, 880 to 890 MBq/mL, 890 to 900 MBq/mL, 900 to 910 MBq/mL, 910 to 920 MBq/mL, 920 to 930 MBq/mL, 930 to 940 MBq/mL, 940 to 950 MBq/mL, 950 to 960 MBq/mL, 960 to 970 MBq/mL, 970 to 980 MBq/mL, 980 to 990 MBq/mL, or 990 to 1000 MBq/mL.

In certain embodiments, a composition provided has an activity concentration of ≥8 MBq/mL. In certain embodiments, a composition has an activity concentration of 5 to 500 MBq/mL, 20 to 480 MBq/mL, 40 to 460 MBq/mL, 60 to 440 MBq/mL, 80 to 420 MBq/mL, 100 to 400 MBq/mL, 120 to 380 MBq/mL, 140 to 360 MBq/mL, 160 to 340 MBq/mL, 180 to 320 MBq/mL, or 200 to 300 MBq/mL.

In certain embodiments, a composition has an activity concentration of ≥3 MBq/mL, ≥4 MBq/mL, ≥5 MBq/mL, ≥6 MBq/mL, ≥7 MBq/mL, ≥8 MBq/mL, ≥9 MBq/mL, ≥10 MBq/mL, ≥12 MBq/mL, ≥15 MBq/mL, ≥20 MBq/mL, ≥25 MBq/mL, ≥30 MBq/mL, ≥35 MBq/mL, 40 MBq/mL, ≥45 MBq/mL, ≥50 MBq/mL, ≥55 MBq/mL, ≥60 MBq/mL, ≥65 MBq/mL, ≥70 MBq/mL, ≥75 MBq/mL, ≥80 MBq/mL, ≥85 MBq/mL, ≥90 MBq/mL, ≥95 MBq/mL, ≥100 MBq/mL, ≥105 MBq/mL, ≥110 MBq/mL, ≥115 MBq/mL, ≥120 MBq/mL, ≥125 MBq/mL, 130 MBq/mL, 135 MBq/mL, 140 MBq/mL, 145 MBq/mL, 150 MBq/mL, 155 MBq/mL, ≥160 MBq/mL, ≥165 MBq/mL, ≥170 MBq/mL, ≥175 MBq/mL, ≥180 MBq/mL, ≥185 MBq/mL, ≥190 MBq/mL, ≥195 MBq/mL, ≥200 MBq/mL, ≥205 MBq/mL, ≥210 MBq/mL, ≥215 MBq/mL, 220≥MBq/mL, ≥225 MBq/mL, ≥230 MBq/mL, ≥235 MBq/mL, ≥240 MBq/mL, ≥245 MBq/mL, ≥250 MBq/mL, ≥255 MBq/mL, ≥260 MBq/mL, ≥265 MBq/mL, ≥270 MBq/mL, ≥275 MBq/mL, or ≥280 MBq/mL.

In certain embodiments, the activity concentration of the resulting pharmaceutical composition may be diluted (e.g., by a factor of 3 to 10), as long as the activity concentration is ≥8 MBq/mL. In certain embodiments, a composition has an activity concentration 8 to 20 MBq/mL, 9 to 19 MBq/mL, 10 to 18 MBq/mL, 11 to 19 MBq/mL, 12 to 18 MBq/mL, 13 to 15 MBq/mL, 14 to 15 MBq/mL, 8 to 14 MBq/mL, 8 to 13 MBq/mL, 8 to 12 MBq/mL, 8 to 11 MBq/mL, 8 to 10

MBq/mL, 8 to 9 MBq/mL, 9 to 14 MBq/mL, 10 to 13 MBq/mL, or 11 to 12 MBq/mL.

Radiochemical Purity

"Radiochemical purity," as understood herein, is the ratio, given as a percent, of radioactivity from the desired radionuclide in the radiopharmaceutical composition (e.g., the desired radionuclide that is chelated in a radiotracer as described herein) to the total radioactivity of the composition that comprises the radiopharmaceutical. It is important to know that the majority of the radioactive isotope is attached to the tracer construct and is not free or attached to another chemical entity as these forms may have a different biodistribution. Radiochemical purity (RCP) measurements establish the content of impurities labelled with the same radionuclide used to prepare a radiopharmaceutical, but with a different chemical form. For most radiopharmaceuticals the lower limit of radiochemical purity is 95%, that is, at least 95% of the radioactive isotope must be attached to the ligand. Radiochemical purity determination can be carried out by a variety of chromatographic methods.

Radiochemical purity is determined according to methods well known to those of skill in the art, e.g., radio-HPLC, iTLC and/or γ-spectrometry. As is understood in the art, determination of radiochemical purity is not strictly quantitative, and it is calculated as the ratio between the peak area of the desired radiopharmaceutical and the overall area of all the detected peaks in the radiochromatogram (corrected for decay). The instrument used to determine radiochemical purity with HPLC (radio-HPLC) is a radiometric detector (radiodetector), which has an in-line detector connected in series with a UV or other physicochemical detector. The radiometric detector can be a Geiger-Müller probe, a scintillation detector, or a PIN diode. As compared with radio-HPLC it has the big advantage that all applied radioactivity is detected and there are no concerns with recovery.

In certain embodiments, the composition is characterized by a radiochemical purity of ≥90%. In certain embodiments, the composition is characterized by a radiochemical purity of ≥91%. In certain embodiments, the composition is characterized by a radiochemical purity of ≥95%, ≥96%, ≥97%, ≥98%, or ≥99%. In certain embodiments, the composition is characterized by a radiochemical purity of ≥90%. In certain embodiments, the composition is characterized by radiochemical purity of ≥95%. In certain embodiments, the composition is characterized by radiochemical purity of ≥96%. In certain embodiments, the composition is characterized by radiochemical purity of 98%.

In certain embodiments, the composition provided is characterized by a radiochemical purity of ≥94.0%, ≥94.5%, ≥95.0%, ≥95.5%, ≥96.0%, ≥96.5%, ≥97.0%, ≥97.5%, ≥98.0%, ≥98.5%, ≥99.0%, or ≥99.5%.

In certain embodiments, the composition provided is characterized by a radiochemical purity of ≥95.2%, ≥95.4%, ≥95.6%, ≥95.8%, ≥96%, ≥96.2%, ≥96.4%, ≥96.6%, ≥96.8%, ≥97%≥97.2%≥97.4%≥97.6%≥97.8%≥98%≥98.2%≥98.4% ≥98.6%≥98.8%≥99%, ≥99.2%, ≥99.4%, ≥99.6%, or ≥99.8%.

Radionuclidic Purity

The term "radionuclidic purity" refers to the ratio, expressed as a percentage, of the radioactivity of the desired radionuclide to the total radioactivity of the sample, e.g., the starting material used to prepare a radiolabeled pharmaceutical. As reported herein, unless otherwise specified, radionuclidic purity is determined by high resolution gamma spectroscopy (e.g., high-purity germanium (HPGe) detector) on a sample after expiration, e.g. >8 hours or >3 weeks) and is then extrapolated (e.g., using the TENDLE-2019 database according to procedures well known in the art), and reported herein as the value at the end of synthesis (EoB+2 hours) of the radionuclide.

In certain embodiments, the composition is characterized by radionuclidic purity of the compound at end of synthesis≥85%, for example, of ≥86%, ≥87%, ≥88%, ≥89%, ≥90%, ≥91%, ≥92%, ≥93%, ≥94%, ≥95%, ≥96%, ≥97%, ≥98%, or of ≥99%.

In certain embodiments, the composition is characterized by radionuclidic purity of the compound at end of synthesis≥90.5%, e.g., ≥91%, ≥91.5%, ≥92%, ≥92.5%, ≥93%, ≥93.5%, ≥94%≥94.5%, 95% 95.5%, ≥96%≥96.5%≥97%≥97.5%≥98%≥98.5%≥99% or ≥99.5%.

In certain embodiments, the composition is characterized by a radionuclidic purity of ≥95.1%, e.g., ≥95.2%, ≥95.3%, ≥95.4%, ≥95.5%, ≥95.6%, ≥95.7%, ≥95.8%, ≥95.9%, ≥96%, ≥96.1%, ≥96.2%, ≥96.3%, ≥96.4%, ≥96.5%, ≥96.6%, ≥96.7%, ≥96.8%, ≥96.9%, ≥97%, ≥97.1%, ≥97.2%, ≥97.3%, ≥97.4%, ≥97.5%, ≥97.6%, ≥97.7%, ≥97.8%, ≥97.9%, ≥98%, ≥98.1%, ≥98.2%, ≥98.3%, ≥98.4%, ≥98.5%, ≥98.6%, ≥98.7%, ≥98.8%, ≥98.9%, ≥99%, ≥99.1%, ≥99.2%, ≥99.3%, ≥99.4%, ≥99.5%, ≥99.6%, ≥99.7%, ≥99.8%, or ≥99.9%.

In certain embodiments, the composition is characterized by radionuclidic purity of ≥97% (at end of synthesis). In certain embodiments, the composition is characterized by radionuclidic purity of ≥93%, ≥94%, ≥95%, ≥96%, ≥98%, or ≥99% (at end of synthesis).

4. Methods of Use

In one aspect, the present disclosure provides compounds and pharmaceutical compositions comprising the same for use in medicine, i.e., for use in treatment, imaging, diagnosing, companion diagnosing, etc. The present disclosure further provides the use of any compounds or pharmaceutical compositions described herein for targeted radiotherapy, which would be beneficial to diagnose and/or treat cancer.

In certain embodiments, the compounds or pharmaceutical compositions of the present disclosure are administered to a subject once a day, twice a day, daily, or every other day. In certain embodiments, the compounds or pharmaceutical compositions of the present disclosure are administered to a subject twice a week, once a week, every ten days, every two weeks, every three weeks, every four weeks, once a month, every six weeks, every eight weeks, every three months, every four months, every six months, every eight months, every nine months, or annually. The dosage and frequency (single or multiple doses) of compound or pharmaceutical composition administered can vary depending upon a variety of factors, including route of administration; size, age, sex, health, body weight, body mass index, and diet of the recipient; nature and extent of the symptoms of the disease being treated (e.g., the disease responsive treatment) and complications from any disease or treatment regimen. Other therapeutic regimens or agents can be used in conjunction with the methods and compounds of the invention.

For any provided compound or pharmaceutical composition, the effective amount (e.g., the diagnostically effective or therapeutically effective amount) can be initially determined from cell culture assays and/or animal testing. Target concentrations will be those concentrations of active compound(s) that are capable of diagnosing, monitoring, and/or treating cancer in a patient or subject.

Therapeutic efficacy of the compound may be determined from animal models. The dosage in humans can be adjusted during the clinical trials via dose escalation studies by monitoring safety and efficacy.

Dosages may be varied depending upon the requirements of the patient and the compound or pharmaceutical composition being employed. The dose administered to a patient, in the context of the present invention, should be sufficient to affect a beneficial therapeutic response in the patient over time. The size of the dose also will be determined by the existence, nature, and extent of any adverse side effects.

In one aspect, compounds provided herein display one or more improved pharmacokinetic (PK) properties (e.g., $C_{max}$, $t_{max}$, $C_{min}$, $t_{1/2}$, AUC, CL, bioavailability, etc.) when compared to a reference compound.

In some embodiments, a compound of the disclosure or a pharmaceutical composition comprising the same is provided as a unit dose.

4.4.1. Imaging and Diagnosis

In an aspect of the present disclosure, methods of generating an image of a subject (e.g., of a certain region or part of the subject's body) are provided, the method comprising administering to the subject a compound described herein comprising a radionuclide. In certain embodiments, the radionuclide is a metal radio nuclide. In certain embodiments, the radionuclide is selected from $^{60}$Cu, $^{61}$Cu, $^{62}$Cu, $^{64}$Cu, and $^{67}$Cu. In certain embodiments, the radionuclide is $^{61}$Cu. In certain embodiments, the radionuclide is $^{67}$Cu.

In certain embodiments, methods of generating one or more images of a subject are provided (e.g., of a certain region or part of the subject's body) comprising administering to the subject an effective amount of a compound comprising a radionuclide described herein, or a pharmaceutical composition comprising the same, and generating one or more images of at least a part of the subject's body. In certain embodiments, two or more images of a subject are generated, such as, for example, three or more images, four or more images, or five or more images. In certain embodiments, a diagnostically effective amount of the compound comprising a radionuclide or pharmaceutical composition comprising the same is administered to the subject, i.e., an amount sufficient to identify (visually or computationally) localization of the radionuclide within regions or parts of the subject's body. In some embodiments, the radionuclide is a metal radionuclide. In certain embodiments, the radionuclide is selected from $^{60}$Cu, $^{61}$Cu, $^{62}$Cu, $^{64}$Cu, and $^{67}$Cu. In some embodiments, the radionuclide is $^{61}$Cu.

In certain embodiments, the one or more images are generated using positron emission tomography (PET). In certain embodiments, the one or more images are generated using PET-computer tomography (PET-CT). In certain embodiments, the one or more images are generated using single-photon emission computerized tomography (SPECT).

In certain embodiments, the image is generated using PET or PET-CT, wherein the radionuclide is $^{61}$Cu. In certain embodiments, the image is generated using SPECT wherein the radionuclide is $^{61}$Cu or $^{67}$Cu.

In certain embodiments, after the one or more images are generated, the method further comprises determining the presence or absence of a disease in a subject based on the presence or absence of localization of the radionuclide in the one or more images of the subject's body.

In certain embodiments, the disease is cancer. In certain embodiments, the cancer is selected from breast cancer (e.g., triple-negative breast cancer), pancreatic cancer, small intestine cancer, colon cancer, gastric cancer, rectal cancer, lung cancer (e.g., non-small cell lung cancer), head and neck cancer, ovarian cancer, hepatocellular carcinoma, epithelial cancer, esophageal cancer, hypopharynx cancer, nasopharynx cancer, larynx cancer, myeloma cells, bladder cancer, cholangiocellular carcinoma, clear cell renal carcinoma, neuroendocrine tumor, oncogenic osteomalacia, sarcoma, CUP (carcinoma of unknown primary), thymus carcinoma, desmoid tumors, glioma, astrocytoma, cervix carcinoma, and prostate cancer.

In certain embodiments, the disease is selected from cardiovascular diseases, liver fibrosis and cirrhosis, arthritic disorders (e.g., rheumatoid arthritis), IgG4-related disease, pulmonary fibrosis and interstitial lung disease, Crohn's disease, tuberculosis, sarcoidosis, and periprosthetic joint infections.

In another aspect of the present disclosure, a method of detecting a disease in a subject is provided, the method comprising administering to a subject an effective amount of a compound comprising a radionuclide described herein or pharmaceutical composition comprising the same; detecting the localization of the radionuclide in the subject using, e.g., PET, PET-CT, or SPECT; and determining the presence or absence of the disease based on the presence or absence of localization. In some embodiments, the radionuclide is a metal radionuclide. In certain embodiments, the radionuclide is selected from $^{60}$Cu, $^{61}$Cu, $^{62}$Cu, $^{64}$Cu, and $^{67}$Cu. In some embodiments, the radionuclide is $^{61}$Cu.

In certain embodiments, the disease to be detected is any disease which overexpresses FAP, e.g., cancers, inflammatory diseases, infectious diseases, and immune diseases.

In certain embodiments, the disease is cancer. In certain embodiments, the cancer is selected from breast cancer (e.g., triple-negative breast cancer), pancreatic cancer, small intestine cancer, colon cancer, gastric cancer, rectal cancer, lung cancer (e.g., non-small cell lung cancer), head and neck cancer, ovarian cancer, hepatocellular carcinoma, epithelial cancer, esophageal cancer, hypopharynx cancer, nasopharynx cancer, larynx cancer, myeloma cells, bladder cancer, cholangiocellular carcinoma, clear cell renal carcinoma, neuroendocrine tumor, oncogenic osteomalacia, sarcoma, CUP (carcinoma of unknown primary), thymus carcinoma, desmoid tumors, glioma, astrocytoma, cervix carcinoma, and prostate cancer.

In certain embodiments, the disease is selected from cardiovascular diseases, liver fibrosis and cirrhosis, arthritic disorders (e.g., rheumatoid arthritis), IgG4-related disease, pulmonary fibrosis and interstitial lung disease, Crohn's disease, tuberculosis, sarcoidosis, and periprosthetic joint infections.

In another aspect of the present disclosure, a method of monitoring the effect of cancer treatment on a subject afflicted with cancer is provided. The method comprises administering to a subject an effective amount of a compound comprising a radionuclide described herein or a pharmaceutical composition comprising the same; detecting localization of the radionuclide in the subject using, e.g., PET, PET-CT, or SPECT; and determining the effects of the cancer treatment. In certain embodiments, the compound comprising a radionuclide or pharmaceutical composition comprising the same is administered to the subject and localization is observed at multiple time points, i.e., at an earlier time point (e.g., before cancer treatment begins (t=0)) and at a later time point, e.g., 2 weeks after commencing treatment, 3 weeks after commencing treatment, 1 month after commencing treatment, 2 months after commencing treatment, 3 months after commencing treatment, 4 months after commencing treatment, 5 months after commencing treatment, or 6 or more months after commencing treatment. In certain but not all embodiments, the cancer treatment is determined to be beneficial (i.e., a positive effect) if less localization is observed at the later time point compared to the earlier time point. In certain but not all embodiments, the cancer treatment is determined to not be beneficial (i.e., a negative effect) if more localization is observed at the later time point compared to the earlier time point. In certain but not all embodiments, the cancer treatment is determined to not have an effect if there is no difference in localization at the later time point compared to the earlier time point.

4.4.2. Therapy

In an aspect of the present disclosure, a method of treating a disease in a patient afflicted with a disease is provided, the method comprising administering to the patient an effective amount of compound or pharmaceutical composition described herein.

In certain embodiments, the compound administered is of Formula I, wherein T comprises a drug that is not a radionuclide and does not contain a radionuclide. Such embodiments are useful for treating inflammatory diseases, infectious diseases, and immune diseases. In certain embodiments, the disease is selected from cardiovascular diseases, liver fibrosis and cirrhosis, arthritic disorders (e.g., rheumatoid arthritis), IgG4-related disease, pulmonary fibrosis and interstitial lung disease, Crohn's disease, tuberculosis, sarcoidosis, and periprosthetic joint infections.

In certain embodiments, the compound administered is of Formula I, wherein T comprises a drug that is cytotoxic. In certain embodiments, the compound comprises a radionuclide selected from $^{64}$Cu and $^{67}$Cu. Such embodiments are useful in treating cancers, e.g., breast cancer (e.g., triple-negative breast cancer), pancreatic cancer, small intestine cancer, colon cancer, gastric cancer, rectal cancer, lung cancer (e.g., non-small cell lung cancer), head and neck cancer, ovarian cancer, hepatocellular carcinoma, epithelial cancer, esophageal cancer, hypopharynx cancer, nasopharynx cancer, larynx cancer, myeloma cells, bladder cancer, cholangiocellular carcinoma, clear cell renal carcinoma, neuroendocrine tumor, oncogenic osteomalacia, sarcoma, CUP (carcinoma of unknown primary), thymus carcinoma, desmoid tumors, glioma, astrocytoma, cervix carcinoma, and prostate cancer.

4.4.3. Theranostics

In an aspect of the present disclosure, a theranostic method comprises the use of a pair of *Cu radiotracers ("theranostic pair"), as provided herein, for both imaging/diagnosis of a disease and for treating the disease in the same patient, wherein the theranostic pair of radiotracers differ only in the radionuclide, i.e., they are different radioisotopes. In certain embodiments, the theranostic pair comprises a γ or positron emitting radionuclide in the radiotracer for imaging/diagnosis (e.g., with PET, PET-CT, or SPECT) and a β emitting radionuclide in the radiotracer for therapy.

In certain embodiments, the theranostic pair comprises $^{61}$Cu (for imaging/diagnosis) and $^{67}$Cu (for therapy). In certain embodiments, this is referred to as a $^{61/67}$Cu theranostic pair.

Certain embodiments of the theranostic method comprise the administration of a diagnostic form of the radiotracer (e.g., wherein *Cu is $^{61}$Cu for PET or wherein *Cu is $^{67}$Cu for SPECT), enabling expression of the therapeutic target to be visualized in vivo with a companion imaging method before switching to the radiolabeled therapeutic counterpart, e.g., wherein *Cu is $^{64}$Cu or $^{67}$Cu.

In certain embodiments, a theranostic method comprises:
(a) administering to a subject an effective amount of a compound comprising a $^{61}$Cu radionuclide described herein or a pharmaceutical composition comprising the same;
(b) generating one or more images of the subject (e.g., of a certain region or part of the subject's body); and
(c) administering to the subject an effective amount of a compound comprising a $^{67}$Cu radionuclide described herein or a pharmaceutical composition comprising the same, wherein the compounds of step (a) and (c) differ only in radioisotopic identity.

In certain embodiments, the amount of compound comprising a $^{61}$Cu radionuclide described herein or pharmaceutical composition comprising the same administered in step (a) is effective to generate one or more images of subject (i.e., a "detectably effective amount"). In certain embodiments, the amount of compound comprising a $^{61}$Cu radionuclide described herein or pharmaceutical composition comprising the same administered in step (a) is effective to diagnose the presence or absence of a disease (i.e., a "diagnostically effective amount").

In certain embodiments, the method further comprises determining, via the one or more images of the subject, the presence or absence of a disease in the subject based on the presence or absence of localization of the $^{61}$Cu radionuclide in the subject's body. In instances where the subject is not determined to have a disease, step (c) in the method is not performed.

In certain embodiments, the amount of compound comprising a $^{67}$Cu radionuclide described herein or a pharmaceutical composition comprising the same administered in step (c) is effective to treat the disease in the subject (i.e., a "therapeutically effective amount").

In certain embodiments, a theranostic method comprises:
(a) generating one or more images of a subject (e.g., of a certain region or part of the subject's body) comprising administering to the subject an effective amount of a compound comprising a $^{61}$Cu radionuclide described herein or a pharmaceutical composition comprising the same;
(b) determining, via the one or more images of the subject, the presence or absence of a disease in the subject based on the presence or absence of localization of the $^{61}$Cu radionuclide in the subject's body; and
(c) administering to the subject, when the presence of a disease in the subject is determined, an effective amount of a compound comprising a $^{67}$Cu radionuclide described herein, or a pharmaceutical composition comprising the same, wherein the compounds in step (a) and (c) differ only in the radionuclide identity.

5. ENUMERATED EMBODIMENTS

Embodiment 1. A compound, wherein the compound is of Formula I:

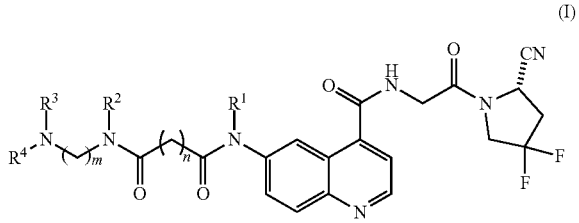

(I)

wherein:
R¹ is $R^a$;
R² and R³ are each $R^a$ or together form a $C_{2-9}$ heterocycle with the nitrogen atoms to which they are attached;
R⁴ is H, an amine protecting group, or -L-T;
$R^a$, independently for each occurrence, is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, optionally substituted by one or more substituents selected from —OH, —OR', =O, =S, —SH, —SR', —NH₂, —NHR', —N(R')₂, —NHCOR', —NR'COR', halogen, —CN, —CO₂H, —CO₂R', —CHO, —COR', —CONH₂, —CONHR', —CON(R')₂, —NO₂, —OP(O)(OH)₂, —SO₃H, —SO₃R', —SOR', and —SO₂R', wherein R', independently for each occurrence, is $C_{1-10}$ alkyl or $C_{3-10}$ cycloalkyl;
L is a bond or a divalent linker;
T comprises (a) a chelating moiety suitable for chelating a radionuclide, (b) an imaging agent, or (c) a drug;
n is an integer from 1 to 20; and
m is an integer from 1 to 20;
or is a pharmaceutically acceptable salt thereof.

Embodiment 2. The compound of embodiment 1, wherein R¹ is methyl or H.

Embodiment 3. The compound of embodiment 1 or 2, wherein R² is H and R³ is H.

Embodiment 4. The compound of embodiment 1 or 2, wherein R² and R³ together form a $C_{2-9}$ heterocycle with the nitrogen atoms to which they are attached.

Embodiment 5. The compound of embodiment 4, wherein the $C_{2-9}$ heterocycle is a 6-membered heterocycle selected from a piperazine, hexahydropyrimidine, hexahydropyridazine, 1,2,3-triazinane, 1,2,4-triazinane, and 1,3,5-triazinane.

Embodiment 6. The compound of any one of embodiments 1-5, wherein R⁴ is H.

Embodiment 7. The compound of any one of embodiments 1-5, wherein R⁴ is an amine protecting group.

Embodiment 8. The compound of any one of embodiments 1-5, wherein R⁴ is -L-T.

Embodiment 9. The compound of embodiment 8, wherein L is a divalent linker selected from an acid-labile linker, a hydrolysis-labile linker, an enzymatically cleavable linker, a reduction labile linker, a self-immolative linker, and a non-cleavable linker.

Embodiment 10. The compound of embodiment 8 or 9, wherein T comprises a chelating moiety suitable for chelating a radionuclide.

Embodiment 11. The compound of embodiment 10, wherein the chelating moiety is chelated to a radionuclide, and the radionuclide is selected from alpha radiation emitting isotopes, beta radiation emitting isotopes, gamma radiation emitting isotopes, Auger electron emitting isotopes, X-ray emitting isotopes, and fluorescence emitting isotopes.

Embodiment 12. The compound of embodiment 11, wherein the radionuclide is selected from $^{225}$Ac, $^{51}$Cr, $^{66}$Ga, $^{67}$Ga, $^{68}$GA, [$^{18}$F]AlF, $^{111}$In, $^{113m}$In, $^{52m}$Mn, $^{99m}$Tc, $^{186}$Re, $^{188}$Re, $^{139}$La, $^{140}$La, $^{175}$Yb, $^{179}$Yb, $^{153}$Sm, $^{177m}$Sn, $^{166}$Ho, $^{86}$Y, $^{88}$Y, $^{90}$Y, $^{149}$Pm, $^{165}$Dy, $^{169}$Er, $^{177}$Lu, $^{52}$Fe, $^{43}$Sc, $^{44}$Sc, $^{46}$Sc, $^{47}$Sc, $^{142}$Pr, $^{157}$Gd, $^{159}$Gd, $^{212}$Bi, $^{213}$Bi, $^{72}$As, $^{77}$As, $^{97}$Ru, $^{109}$Pd, $^{105}$Rh, $^{101m}$Rh, $^{119}$Sb, $^{197}$Hg, $^{151}$Eu, $^{153}$Eu, $^{169}$Eu, $^{201}$Tl, $^{149}$Tb, $^{152}$Tb, $^{155}$Tb, $^{161}$Tb, $^{203}$Pb, $^{212}$Pb, $^{151}$Pm, $^{153}$Pm, $^{142}$Pr, $^{143}$Pr, $^{55}$Co, $^{60}$Cu, $^{61}$Cu, $^{62}$Cu, $^{64}$Cu, $^{67}$Cu, $^{62}$Zn, $^{188}$Re, $^{198}$Au, $^{199}$Au, $^{227}$Th, $^{111}$Ag, $^{199}$Ag, $^{211}$At, $^{223}$Ra, $^{88}$Zr, and $^{89}$Zr.

Embodiment 13. The compound of embodiment 12, wherein the radionuclide is selected from $^{61}$Cu, $^{64}$Cu, and $^{67}$Cu.

Embodiment 14. The compound of any one of embodiments 10-13, wherein the chelating moiety is selected from DOTAGA (1,4,7,10-tetraazacyclododecane,1-(glutaric acid)-4,7,10-triacetic acid), DOTA (1,4,7,10-tetraazacyclododecane-1,4,7,10-tetraacetic acid), DOTASA (1,4,7,10-tetraazacyclododecane-1-(2-succinic acid)-4,7,10-triacetic acid), CB-DO2A (10-bis(carboxymethyl)-1,4,7,10-tetraazabicyclo[5.5.2]tetradecane), DEPA (7-[2-(Bis-carboxymethylamino)-ethyl]-4,10-bis-carboxymethyl-1,4,7,10-tetraazacyclododec-1-yl-acetic acid)), 3p-C-DEPA (2-[(carboxymethyl)][5-(4-nitrophenyl-1-[4,7,10-tris(carboxymethyl)-1,4,7,10-tetraazacyclododecan-1-yl]pentan-2-yl)amino]acetic acid)), TCMC (2-(4-isothiocyanotobenzyl)-1,4,7,10-tetraaza-1,4,7,10-tetra-(2-carbamonyl methyl)-cyclododecane, oxo-DO3A (1-oxa-4,7,10-triazacyclododecane-5-S-(4-isothiocyanatobenzyl)-4,7,10-triacetic acid), p-NH2-Bn-Oxo-DO3A (1-Oxa-4,7,10-tetraazacyclododecane-5-S-(4-aminobenzyl)-4,7,10-triacetic acid), TE2A ((1,8-N,N'-bis-(carboxymethyl)-1,4,8,11-tetraazacyclotetradecane), MM-TE2A, DM-TE2A, CB-TE2A (4,11-bis(carboxymethyl)-1,4,8,11-tetraazabicyclo[6.6.2]hexadecane), CB-TE1A1P (4,8,11-tetraazacyclotetradecane-1-(methanephosphonic acid)-8-(methanecarboxylic acid), CB-TE2P (1,4,8,11-tetraazacyclotetradecane-1,8-bis(methanephosphonic acid), TETA (1,4,8,11-tetraazacyclotetradecane-1,4,8,11-tetraacetic acid), NOTA (1,4,7-triazacyclononane-N,N',N"-triacetic acid), NODA (1,4,7-triazacyclononane-1,4-diacetate), NODAGA (1,4,7-triazacyclononane-1-glutaric acid-4,7-acetic acid) (also known as NOTAGA), NODA Deferoxamine (1,4,7-triazacyclononane-1,4-diyl)diacetic acid DFO), NETA ([4-[2-(bis-carboxymethylamino)-ethyl]-7-carboxymethl-[1,4,7]triazonan-1-yl}-acetic acid), TACN-TM (N,N',N"', tris(2-mercaptoethyl)-1,4,7-triazacyclononane), Diamsar (1,8-Diamino-3,6,10,13,16,19-hexaazabicyclo(6,6,6)eicosane, 3,6,10,13,16,19-Hexaazabicyclo[6.6.6]eicosane-1,8-diamine), Sarar (1-N-(4-aminobenzyl)-3, 6,10,13,16,19-hexaazabicyclo[6.6.6] eicosane-1,8-diamine), AmBaSar (4-((8-amino-3,6,10,13,16,19-hexaazabicyclo [6.6.6] icosane-1-ylamino) methyl) benzoic acid), and 4,4'-((3,6,10,13,16, 19-hexaazabicyclo[6.6.6]ico-sane-1,8-diylbis(aza-nediyl)) bis(methylene))dibenzoic acid (BaBaSar).

Embodiment 15. The compound of embodiment 8 or 9, wherein T comprises an imaging agent, wherein the imaging agent comprises a radionuclide or a fluorescent dye.

Embodiment 16. The compound of embodiment 8 or 9, wherein T comprises a drug, wherein the drug comprises a chelating moiety chelated to a radionuclide.

Embodiment 17. The compound of embodiment 1, wherein the compound is of Formula Ia

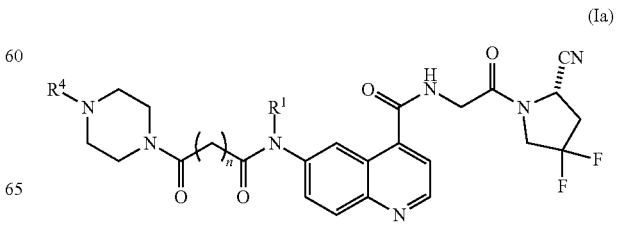

(Ia)

-continued

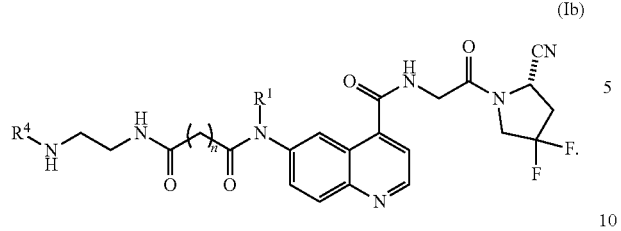
(Ib)

Embodiment 18. The compound of embodiment 17, wherein $R^1$ is H or methyl.

Embodiment 19. The compound of embodiment 17 or 18, wherein $R^4$ is -L-T.

Embodiment 20. The compound of any one of embodiments 17-19, wherein: T comprises a chelating moiety chelated to a radionuclide, wherein the chelating moiety is selected from DOTAGA, DOTA, NOTA, NODAGA, and NODA; and the radionuclide is selected from $^{61}$Cu, $^{64}$Cu, and $^{67}$Cu.

Embodiment 21. The compound of embodiment 1, wherein the compound is selected from:

| Compound | Structure |
|---|---|
| 1 | |
| 2 | |
| 3 | |
| 4 | |

| Compound | Structure |
|---|---|
| NODAGA-1 | 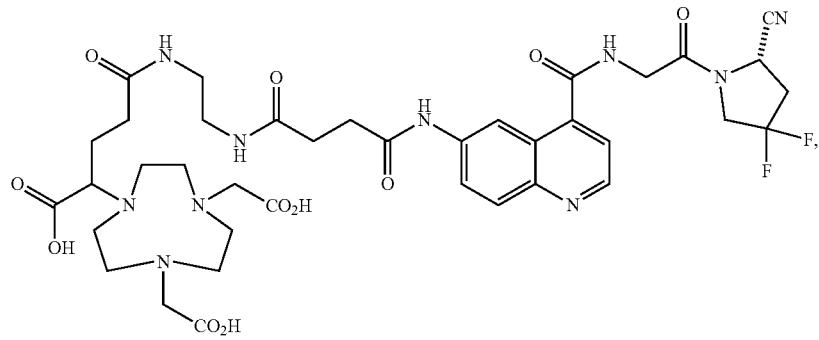 [SMILES: N#C[C@@H]1CC(F)(F)CN1C(=O)CNC(=O)c1ccnc2ccc(NC(=O)CCC(=O)NCCNC(=O)CCC(C(=O)O)N3CCN(CC(=O)O)CCN(CC(=O)O)CC3)cc12] |
| NODAGA-2 | 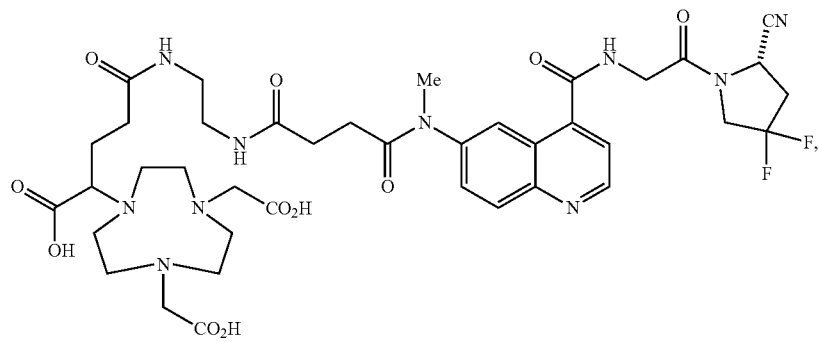 [SMILES: CN(C(=O)CCC(=O)NCCNC(=O)CCC(C(=O)O)N1CCN(CC(=O)O)CCN(CC(=O)O)CC1)c1ccc2nccc(C(=O)NCC(=O)N3CC(F)(F)C[C@H]3C#N)c2c1] |
| NODAGA-3 | 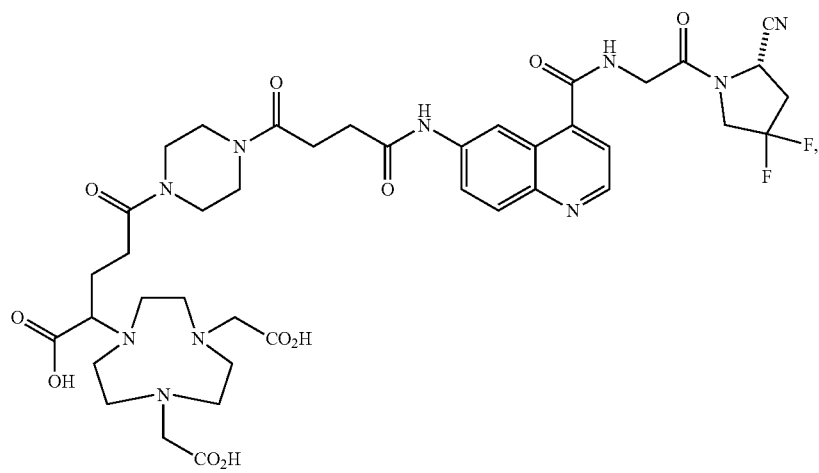 [SMILES: N#C[C@@H]1CC(F)(F)CN1C(=O)CNC(=O)c1ccnc2ccc(NC(=O)CCC(=O)N3CCN(C(=O)CCC(C(=O)O)N4CCN(CC(=O)O)CCN(CC(=O)O)CC4)CC3)cc12] |

| Compound | Structure |
|---|---|
| NODAGA-4 | 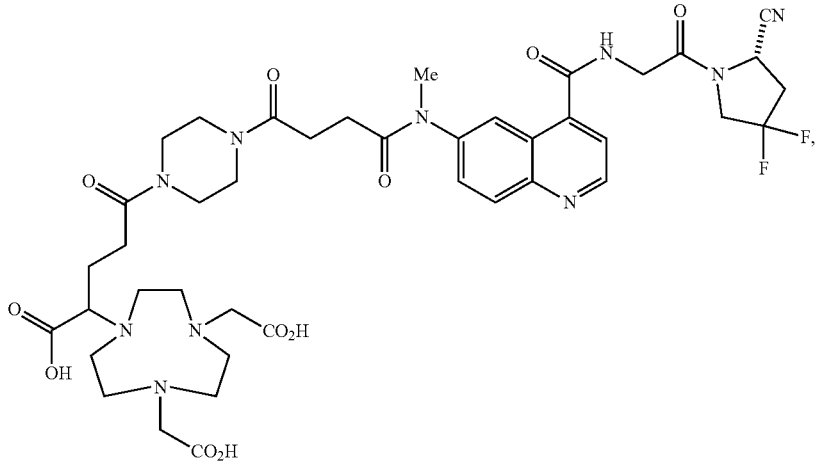 [SMILES: CN(C(=O)CCC(=O)N1CCN(C(=O)CCC(C(=O)O)N2CCN(CC(=O)O)CCN(CC(=O)O)CC2)CC1)c1ccc2nccc(C(=O)NCC(=O)N3CC(F)(F)C[C@H]3C#N)c2c1] |
| *Cu-NODAGA-1 | 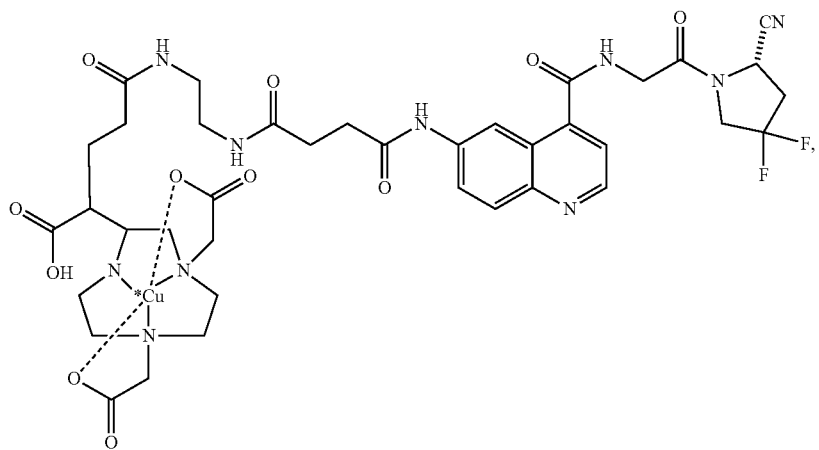 |
| *Cu-NODAGA-2 | 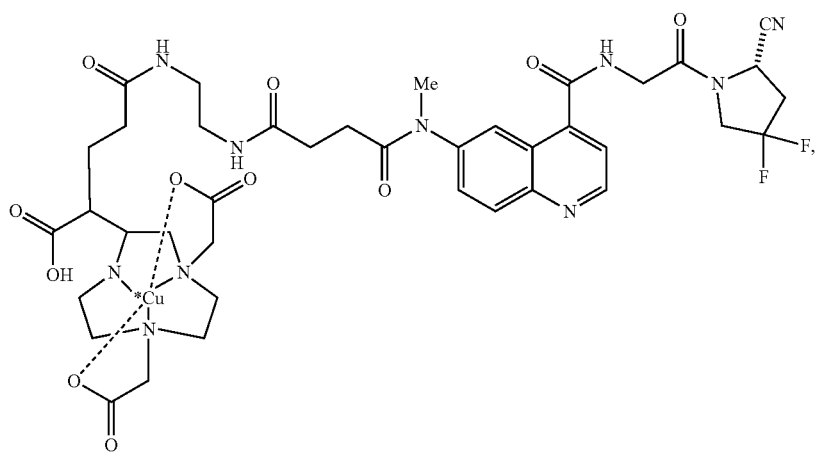 |

| Compound | Structure |
|---|---|
| *Cu-NODAGA-3 | 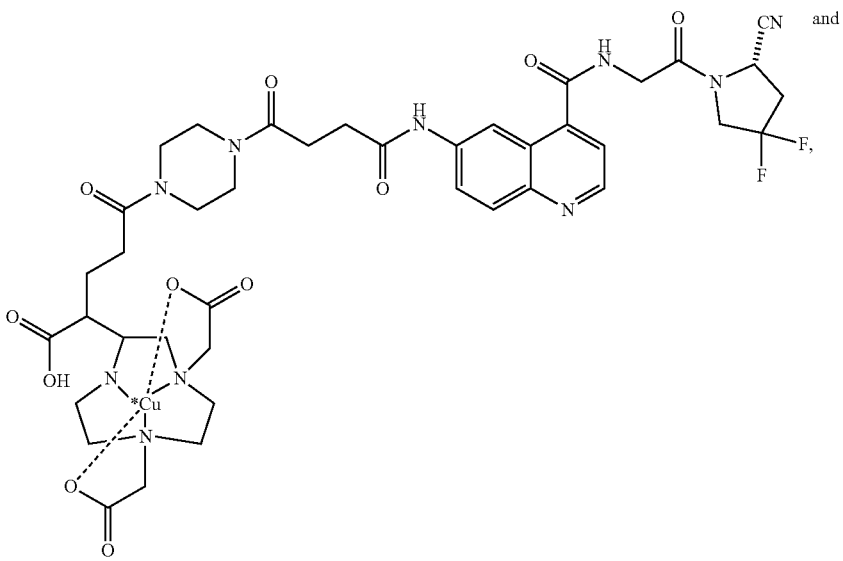 and |
| *Cu-NODAGA-4 | 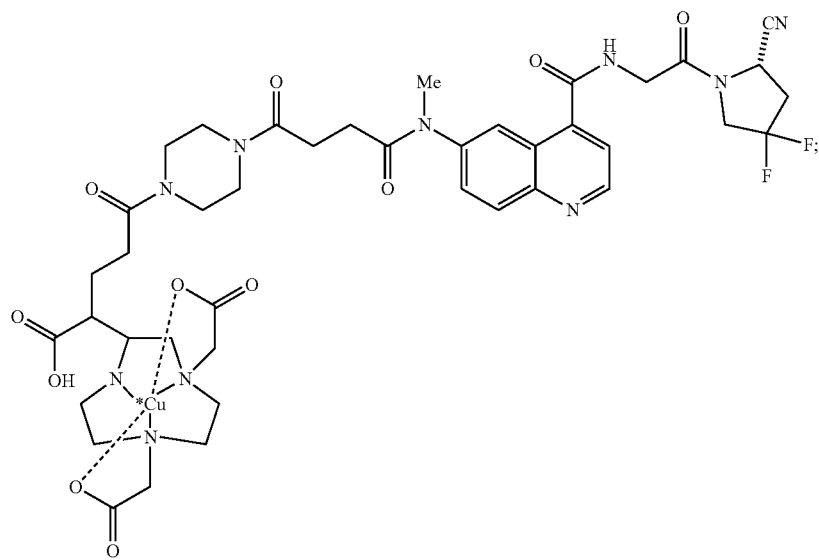 | or is a pharmaceutically acceptable salt thereof, wherein *Cu is selected from $^{61}$Cu, $^{62}$Cu, $^{64}$Cu, and $^{67}$Cu, particularly $^{61}$Cu and $^{67}$Cu.

Embodiment 22. A pharmaceutical composition comprising a compound of any one of embodiments 1-21 and a pharmaceutically acceptable excipient.

Embodiment 23. The pharmaceutical composition of embodiment 22, wherein $R^4$ is -L-T, the composition is characterized by one or more of: (i) molar activity of ≥3 MBq/nmol, (ii) radiochemical purity≥91%, (iii) activity concentration of ≥8 MBq/mL, and (iv) by radionuclidic purity of the compound at end of synthesis (EoB plus 2 hours) of 95%.

Embodiment 24. A method of generating one or more images of a subject comprising:
 administering to a subject an effective amount of a compound of embodiment 13, wherein the radionuclide is $^{61}$Cu; and
 generating one or more images of at least a part of the subject's body.

Embodiment 25. The method of embodiment 24, wherein the image is generated using positron emission tomography (PET), PET-computer tomography (PET-CT), or single-photon emission computerized tomography (SPECT).

Embodiment 26. A method of treating a disease in a patient in need thereof, comprising administering to the patient an effective amount of a compound according to any one of embodiments 1-14, or 16-20.

Embodiment 27. The method of embodiment 26, wherein the disease is selected from cancers, inflammatory diseases, infectious diseases, and immune diseases.

Embodiment 28. A theranostic method comprising:
 (a) administering to a subject an effective amount of a first compound of embodiment 13, wherein the radionuclide is $^{61}$Cu, or a pharmaceutical composition comprising an effective amount of a first compound of embodiment 13, wherein the radionuclide is $^{61}$Cu;

(b) generating one or more images of the subject; and
(c) administering to the subject an effective amount of a second compound of embodiment 13, wherein the radionuclide is $^{67}$Cu, or a pharmaceutical composition comprising an effective amount of a second compound of embodiment 13, wherein the radionuclide is $^{67}$Cu, wherein the first and second compounds of steps (a) and (c) differ only in radioisotopic identity.

Embodiment 29. The method of embodiment 28, wherein:
(a) the first compound is $^{61}$[Cu]Cu-NODAGA-1 and the second compound is $^{67}$[Cu]Cu-NODAGA-1;
(b) the first compound is $^{61}$[Cu]Cu-NODAGA-2 and the second compound is $^{67}$[Cu]Cu-NODAGA-2;
(c) the first compound is $^{61}$[Cu]Cu-NODAGA-3 and the second compound is $^{67}$[Cu]Cu-NODAGA-3; or
(d) the first compound is $^{61}$[Cu]Cu-NODAGA-4 and the second compound is $^{67}$[Cu]Cu-NODAGA-4.

Embodiment 30. The method of embodiment 28 or 29, further comprising determining, via the one or more images of the subject, the presence or absence of a disease in the subject based on the presence or absence of localization of the $^{61}$Cu radionuclide of the first compound in the subject's body.

6. EXAMPLES

Example 1: Synthesis of FAP Inhibitors 1.1: Synthesis of (S)—N1-(2-aminoethyl)-N4-(4-((2-(2-cyano-4,4-difluoropyrrolidin-1-yl)-2-oxoethyl)carbamoyl)quinolin-6-yl)succinimide (1)

Step 1: (S)-6-amino-N-(2-(2-cyano-4,4-difluoropyrrolidin-1-yl)-2-oxoethyl)quinoline-4-carboxamide (A)

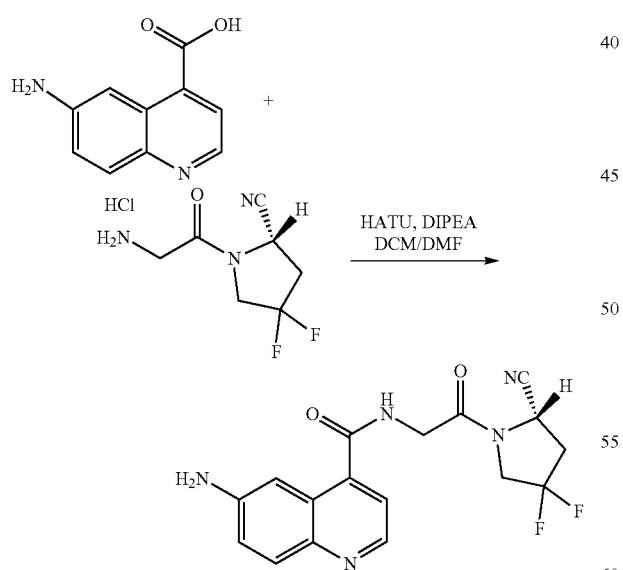

The two precursors (purchased from AstaTech) were dissolved together with HATU in DMF and then DCM was added. DIPEA was added dropwise and the reaction was monitored via LC/MS. The reaction was complete after less than 1 h. The crude product was concentrated, diluted with Water/ACN 85:15 and directly purified via HPLC (LCMS-2020 Shimadzu system equipped with a Gemini C-6 Phenyl column (10×250 mm, 5 μm particle size). The gradient used was 5-80% solvent B in 15 min (A=H$_2$O [0.1% TFA], B=ACN [0.1% TFA]) at a flow rate of 5.0 mL/min) to provide A as a pure red powder (38 mg, 84% yield).

Step 2: Synthesis of (S)-4-((4-((2-(2-cyano-4,4-difluoropyrrolidin-1-yl)-2-oxoethyl)carbamoyl)quinolin-6-yl)amino)-4-oxobutanoic Acid (B)

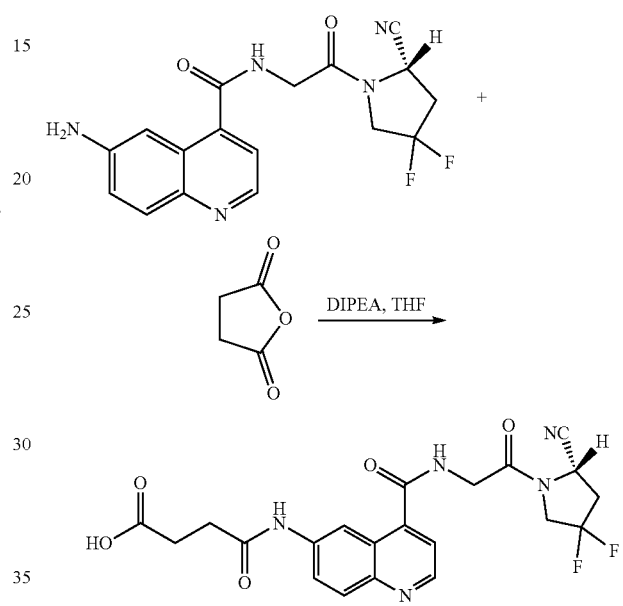

(S)-6-amino-N-(2-(2-cyano-4,4-difluoropyrrolidin-1-yl)-2-oxoethyl)quinoline-4-carboxamide (A) and succinic anhydride were dissolved in THF. DIPEA was added dropwise and the reaction was mixed overnight and checked via LC/MS. The crude product was directly purified via HPLC (LCMS-2020 Shimadzu system equipped with a Gemini C-6 Phenyl column (10×250 mm, 5 μm particle size). The gradient used was 5-80% solvent B in 8 min (A=H$_2$O [0.1% TFA], B=ACN [0.1% TFA]) at a flow rate of 5.0 mL/min) to afford B as a yellow powder (32.7 mg, 68% yield).

Step 3: (S)—N1-(2-aminoethyl)-N4-(4-((2-(2-cyano-4,4-difluoropyrrolidin-1-yl)-2-oxoethyl)carbamoyl)quinolin-6-yl)succinimide (1)

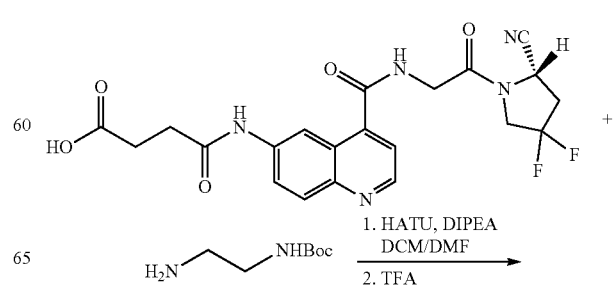

-continued

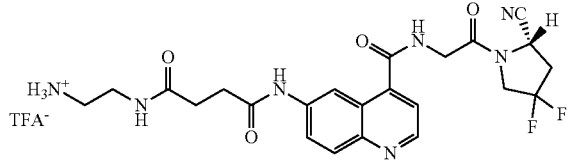

S)-4-((4-((2-(2-cyano-4,4-difluoropyrrolidin-1-yl)-2-oxoethyl)carbamoyl)quinolin-6-yl)amino)-4-oxobutanoic acid (B), HATU and the amine were dissolved in DCM and DMF. DIPEA was added dropwise and the reaction was mixed and checked via LC/MS. After completion, TIPS was added and TFA was added dropwise: first, the DIPEA was quenched. The deprotection step took over in 2 days. The crude material was used without further purification.

1.2: Synthesis of (S)—N1-(2-aminoethyl)-N4-(4-((2-(2-cyano-4,4-difluoropyrrolidin-1-yl)-2-oxoethyl)carbamoyl)quinolin-6-yl)-N4-methylsuccinamide (2)

Compound 2 was prepared as shown in Scheme 1:

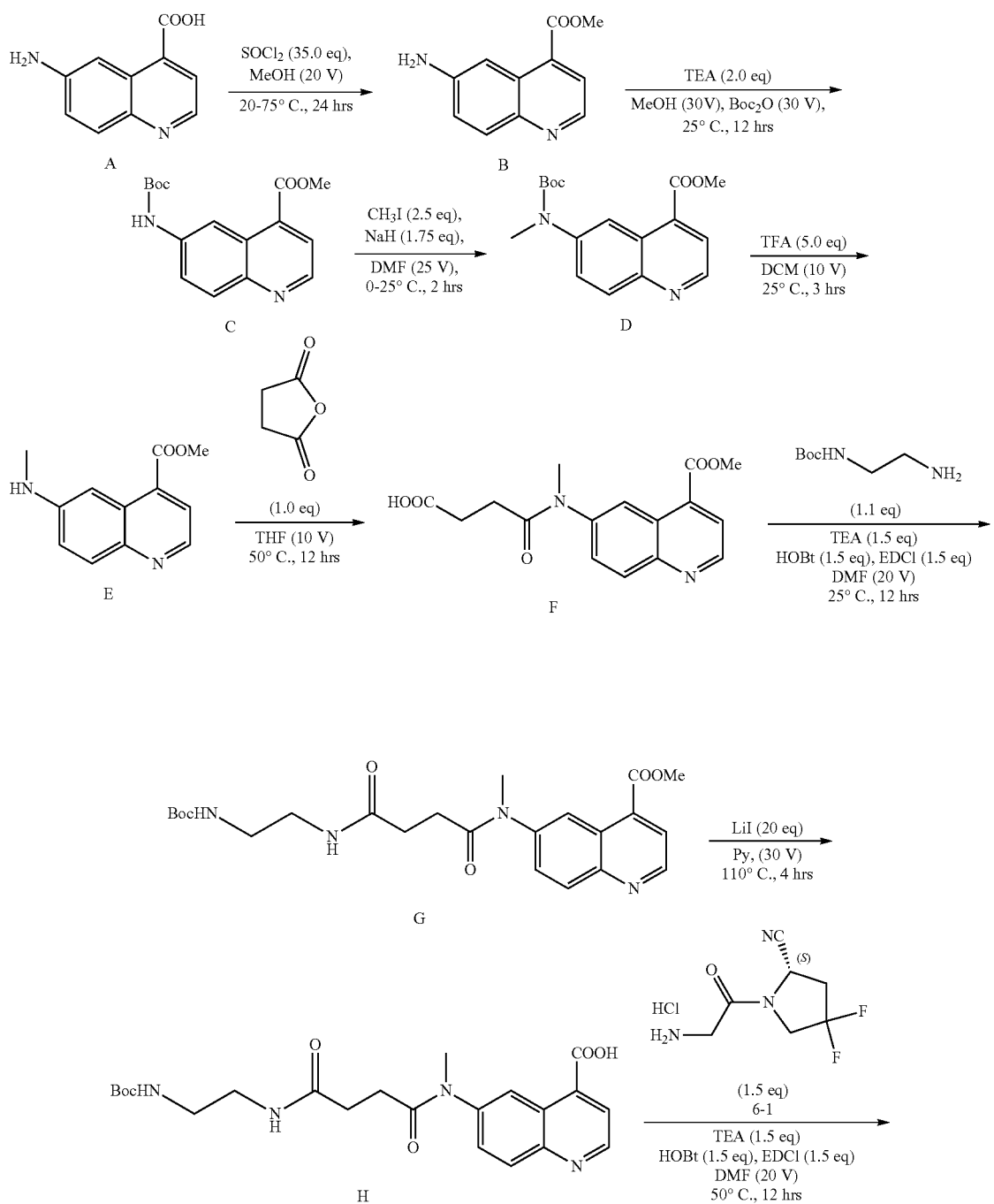

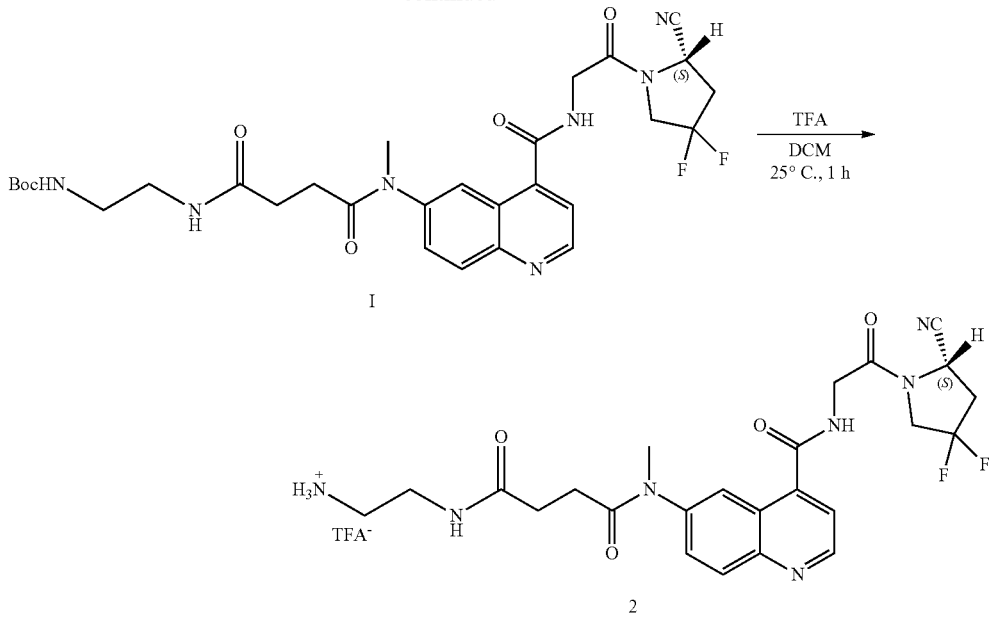

Step 1: To a mixture of compound A (4.17 g, 22.2 mmol) in MeOH (84.0 mL) was added SOCl₂ (26.4 g, 222 mmol, 16.1 mL) in one portion at 0-5° C. under N₂. The reaction was stirred at 0-5° C. for 0.5 h. The mixture was heated to 75° C. and stirred for 12 hrs. The mixture was added SOCl₂ (26.4 g, 222 mmol, 16.1 mL) and stirred for 12 hrs at 75° C. The mixture was added SOCl₂ (26.4 g, 222 mmol, 16.1 mL) and stirred for 12 hrs at 75° C. The mixture was added SOCl₂ (13.2 g, 111 mmol, 8.04 mL) and stirred for 12 hrs at 75° C. LC-MS showed one main peak with desired mass was detected. The mixture was concentrated in vacuum. The crude product was triturated with MeCN (300 mL) at 20° C. for 1 hr to afford compound B (7.05 g, crude) as a brown solid. $^1$H NMR: (400 MHz, DMSO-$d_6$) δ 8.81 (d, J=4.8 Hz, 1H), 8.27 (d, J=8.8 Hz, 1H), 8.10 (d, J=4.8 Hz, 1H), 7.82 (s, 1H), 7.67 (d, J=8.0 Hz, 1H), 3.98 (s, 3H). LC-MS (LCMS-2020 Shimadzu system equipped with a Gemini C-6 Phenyl column (3.5×250 mm, 5 μm particle size). The gradient used was 5-80% solvent B in 8 min (A=H₂O [0.1% TFA], B=ACN [0.1% TFA]) at a flow rate of 1.0 mL/min, product: RT=1.262 min).

Step 2: To a solution of B (7.02 g, 34.7 mmol) in MeOH (100 mL), Boc₂O (100 mL) was added TEA (7.03 g, 69.4 mmol), the mixture was stirred at 25° C. for 12 hrs. LCMS showed compound B consumed and one peak of desired MS was detected. The mixture was concentrated in vacuum. The residue was purified by column chromatography (SiO₂, Petroleum ether/Ethyl acetate=100/1 to 1/1, compound C Rf=0.35) to obtain compound C (4.36 g, 41.5% yield) as a brown solid. $^1$H NMR: (400 MHz, CDCl₃) δ 8.89 (d, J=4.4 Hz, 1H), 8.78 (d, J=2.4 Hz, 1H), 8.11 (d, J=9.2 Hz, 1H), 7.96-7.89 (m, 2H), 6.83 (s, 1H), 4.04 (s, 3H), 1.57 (s, 9H).

Step 3: To a solution of compound C (3.36 g, 11.1 mmol) in DMF (84.0 mL) was added NaH (778 mg, 19.5 mmol, 60% purity) in portions at 0° C., the mixture was stirred at 25° C. for 20 mins. MeI (3.94 g, 27.8 mmol) was added to the reaction mixture at 25° C. and stirred at 25° C. for 2 hrs. LCMS (ET60385-17-P1A3, Product RT=0.562 min) showed compound C consumed and one peak of desired MS was detected. The reaction mixture was cooled to 0° C. and quenched with brine (80.0 mL), extracted with EtOAc (3×100 mL). The organic layer was dried over sodium sulfate, filtered and concentrated in vacuum to obtain compound D (4.78 g, crude) as a brown solid.

Step 4: To a solution of compound D (4.78 g, 15.1 mmol) in DCM (50.0 mL) was added dropwise TFA (8.61 g, 75.5 mmol), the mixture was stirred at 25° C. for 12 hrs. LCMS showed compound D consumed and one peak of desired MS was detected. The reaction mixture was quenched with saturated NaHCO₃ (50.0 mL), extracted with DCM (3×40.0 mL). The organic layer was dried over sodium sulfate, filtered and concentrated in vacuum. The residue was purified by column chromatography (SiO₂, Petroleum ether/Ethyl acetate=100/1 to 1/1, product Rf=0.40) to obtain compound E (2.51 g, 76.8% yield) as a brown solid. $^1$H NMR: ET60385-19-P1A1 (400 MHz, CDCl₃) δ 8.67 (d, J=4.4 Hz, 1H), 7.94 (d, J=9.2 Hz, 1H), 7.85 (d, J=4.4 Hz, 1H), 7.80 (d, J=2.4 Hz, 1H), 7.17-7.14 (m, 1H), 4.02 (s, 3H), 3.01 (s, 3H).

Step 5: To a solution of compound E (500 mg, 2.31 mmol) in THF (4.00 mL) was added tetrahydrofuran-2,5-dione (231 mg, 2.31 mmol), the reaction mixture was stirred at 50° C. for 12 hrs. LCMS showed compound E consumed and one peak of desired MS was detected. The mixture was concentrated in vacuum to obtain compound F (716 mg, crude) as a brown solid. $^1$H NMR: ET60385-43-P1A1 (400 MHz, CDCl₃) δ 9.10 (d, J=4.0 Hz, 1H), 8.77 (d, J=2.4 Hz, 1H), 8.28 (d, J=8.8 Hz, 1H), 8.03 (d, J=4.0 Hz, 1H), 7.66-7.64 (m, 1H), 4.06 (s, 3H), 3.42 (s, 3H), 2.69-2.66 (m, 2H), 2.51-2.50 (m, 2H).

Step 6: To a solution of compound F (716 mg, 2.26 mmol) in DMF (7.00 mL) was added TEA (343 mg, 3.40 mmol), HOBt (458 mg, 3.40 mmol), EDCI (650 mg, 3.40 mmol) and tert-butyl N-(2-aminoethyl)carbamate (398 mg, 2.49 mmol), the reaction mixture was stirred at 25° C. for 12 hrs. LCMS showed compound F consumed and one peak of desired MS was detected. The reaction mixture was quenched with saturated NaHCO₃ (15.0 mL), extracted with DCM (25.0 mL×3) washed with brine (15.0 mL). The organic layer was dried over sodium sulfate, filtered and concentrated in vacuum to obtain compound G (1.33 g, crude) as a brown solid.

Step 7: To a solution of compound G (1.33 g, 2.90 mmol) in Py. (20.0 mL) was added LiI (7.86 g, 58.6 mmol), the mixture was stirred at 110° C. for 4 hrs. LCMS showed compound G consumed and one peak of desired MS was detected. The mixture was concentrated in vacuum. The residue was purified by prep-HPLC (column: Welch Xtimate C18 250*100 mm #10 um; mobile phase: [water (NH$_4$HCO$_3$)-ACN]; B %: 1%-30%, 20 min) to obtain compound H (647 mg, 50.1% yield) as an off-white solid.

Step 8: To a solution of compound H (617 mg, 1.39 mmol) in DMF (6.00 mL) was added DIEA (717 mg, 5.55 mmol), HATU (791 mg, 2.08 mmol) and compound 6-1 (587 mg, 2.08 mmol, 80% purity, HCl), the mixture was stirred at 25° C. for 1 hr. LCMS showed compound H consumed and one peak of desired MS was detected. The reaction mixture was quenched with saturated NaHCO$_3$ (15.0 mL), extracted with DCM (25.0 mL×3) washed with brine (15.0 mL). The organic layer was dried over sodium sulfate, filtered and concentrated in vacuum to obtain compound I (2.70 g, crude) as a brown solid.

Step 9: To a solution of compound I (2.70 g, 4.39 mmol) in DCM (10.0 mL) was added TFA (41.5 g, 364 mmol), the mixture was stirred at 25° C. for 1 hr. LCMS (ET60385-61-P1A4, Product RT=0.490 min) showed compound I consumed and one peak of desired MS was detected. The mixture was concentrated in vacuum. The residue was purified by prep-HPLC (column: Welch Xtimate C18 250*100 mm #10 um; mobile phase: [water (NH$_4$HCO$_3$)-ACN]; B %: 5%-35%, 20 min) to obtain compound 2 (260 mg, 11.1% yield, 97.3% purity) as a brown solid. LCMS (LCMS-2020 Shimadzu system equipped with a Gemini C-6 Phenyl column (3.5×250 mm, 5 μm particle size). The gradient used was 5-80% solvent B in 8 min (A=H$_2$O [0.1% TFA], B=ACN [0.1% TFA]) at a flow rate of 1.0 mL/min, Product RT=0.493 min).

1.3: Synthesis of (S)—N-(2-(2-cyano-4,4-difluoropyrrolidin-1-yl)-2-oxoethyl)-6-(4-oxo-4-(piperazin-1-yl)butanamido)quinoline-4-carboxamide (3)

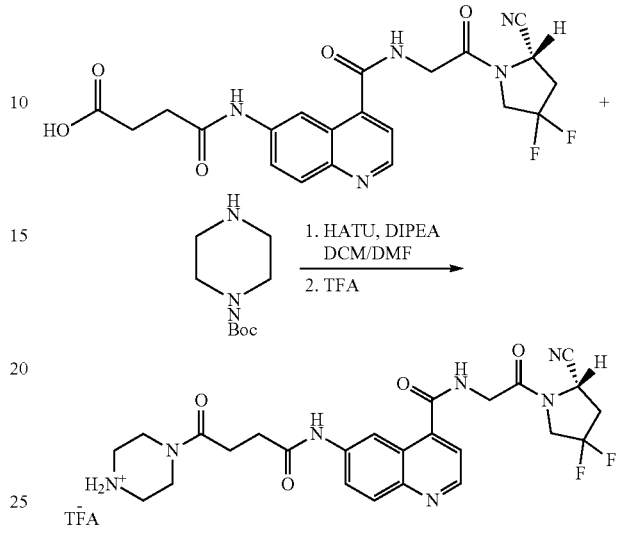

(S)-4-((4-((2-(2-cyano-4,4-difluoropyrrolidin-1-yl)-2-oxoethyl)carbamoyl)quinolin-6-yl)amino)-4-oxobutanoic acid, HATU and the amine were dissolved in DCM and DMF. DIPEA was added dropwise and the reaction was checked. When all the coupling occurred, the crude product was concentrated a bit and then TIPS was added. TFA was added dropwise and the mixture was checked via LC/MC until completion. Crude product (3) was used as such.

1.4: Synthesis of (S)—N-(2-(2-cyano-4,4-difluoropyrrolidin-1-yl)-2-oxoethyl)-6-(N-methyl-4-oxo-4-(piperazin-1-yl)butanamido)quinoline-4-carboxamide (4)

Compound 4 was prepared as shown in Scheme 2:

Scheme 2

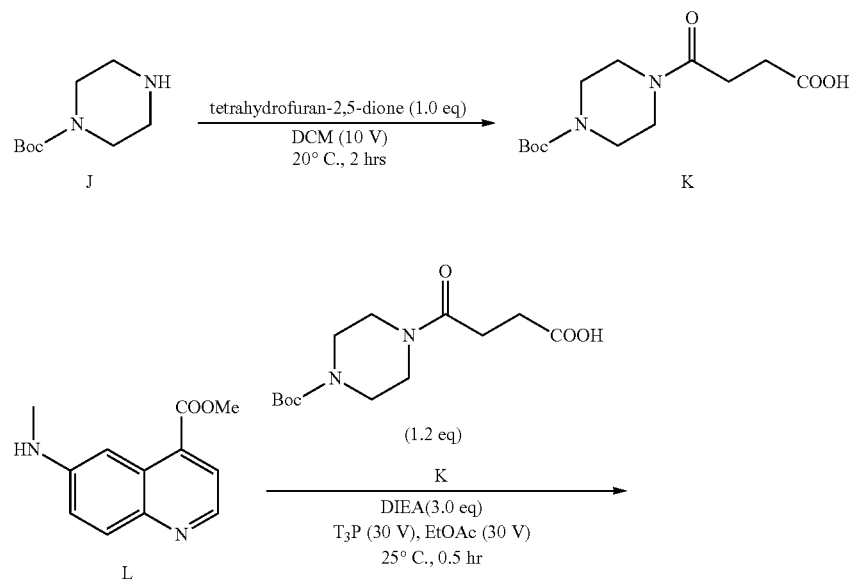

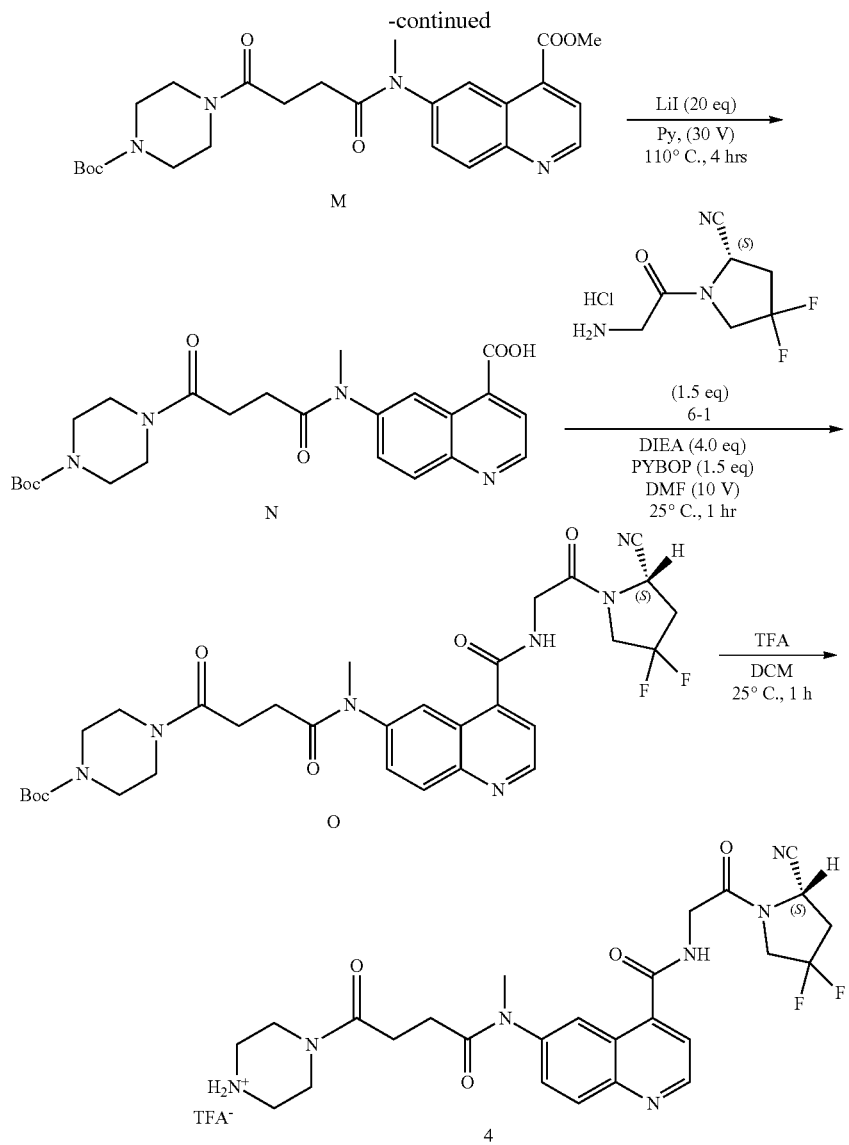

Step 1: To a mixture of compound J (10.0 g, 53.7 mmol) in DCM (70.0 mL) was added tetrahydrofuran-2, 5-dione (5.37 g, 53.7 mmol). The mixture was stirred for 2 hrs at 20° C. TLC (dichloromethane/methanol/AcOH=9/1/0.01, compound J Rf=0.0) showed the reaction was completed. The mixture was concentrated in vacuum. The residue was purified by silica gel chromatography (dichloromethane/methanol=100/1, 9/1) to afford compound K (4.75 g, 30.9% yield) as a white solid. $^1$H NMR: (400 MHz, CDCl$_3$) δ 10.56-11.09 (m, 1H), 3.53-3.62 (m, 2H), 3.45 (s, 4H), 3.36-3.42 (m, 2H), 2.60-2.73 (m, 4H), 1.45 (s, 9H).

Step 2: To a solution of compound L (300 mg, 1.39 mmol) in EtOAc (10.0 mL) was added DIEA (537 mg, 4.16 mmol), compound K (476 mg, 1.66 mmol) and T$_3$P (11.2 g, 17.7 mmol, 50% purity), the reaction mixture was stirred at 25° C. for 0.5 hr. LCMS showed compound L consumed and one peak of desired MS was detected. Then reaction mixture is diluted with EtOAc (20.0 mL), washed with water (60.0 mL), saturated NaHCO$_3$ (60.0 mL), and brine (20.0 mL). The organic phase is dried over Na$_2$SO$_4$ and concentrated in vacuum to obtain compound M (716 mg, crude) as brown oil.

Step 3: To a solution of compound M (716 mg, 1.48 mmol) in Py. (20.0 mL) was added LiI (3.96 g, 29.5 mmol), the mixture was stirred at 110° C. for 4 hrs. LCMS showed compound M consumed and one peak of desired MS was detected. The mixture was concentrated in vacuum. The residue was purified by prep-HPLC (column: Welch Xtimate C18 250*100 mm #10 um; mobile phase: [water (NH$_4$HCO$_3$)-ACN]; B %: 1%-30%, 20 min) to obtain compound N (460 mg, 64.4% yield, 97.4% purity) as an off-white solid. LCMS (LCMS-2020 Shimadzu system equipped with a Gemini C-6 Phenyl column (3.5×250 mm, 5 μm particle size). The gradient used was 5-80% solvent B in 8 min (A=H$_2$O [0.1% TFA], B=ACN [0.1% TFA]) at a flow rate of 1.0 mL/min, Product RT=0.596 min)

Step 4: To a solution of compound N (460 mg, 977 umol) in DMF (5.00 mL) was added DIEA (505 mg, 3.91 mmol), PYBOP (763 mg, 1.47 mmol) and compound 6-1 (330 mg, 1.47 mmol, HCl), the mixture was stirred at 25° C. for 1 hr. LCMS showed one peak of desired MS was detected. The reaction mixture was quenched with saturated NaHCO$_3$ (15.0 mL), extracted with DCM (25.0 mL×3) washed with brine (15.0 mL). The organic layer was dried over $Na_2SO_4$, filtered and concentrated in vacuum to obtain compound O (2.10 g, crude) as brown oil.

Step 5: To a solution of compound O (2.10 g, 3.27 mmol) in DCM (10.0 mL) was added TFA (15.4 g, 135 mmol), the mixture was stirred at 25° C. for 1 hr. LCMS showed compound O consumed and one peak of desired MS was detected. The mixture was concentrated in vacuum. The residue was purified by prep-HPLC (column: Welch Xtimate C18 250*70 mm #10 um; mobile phase: [water ($NH_4HCO_3$)-ACN]; B %: 0%-40%, 20 min) to obtain compound 4 (196 mg, 11.0% yield) as an off-white solid.

1.5: Synthesis of FAPI-46

FAPI-46 was prepared as shown in Scheme 3:

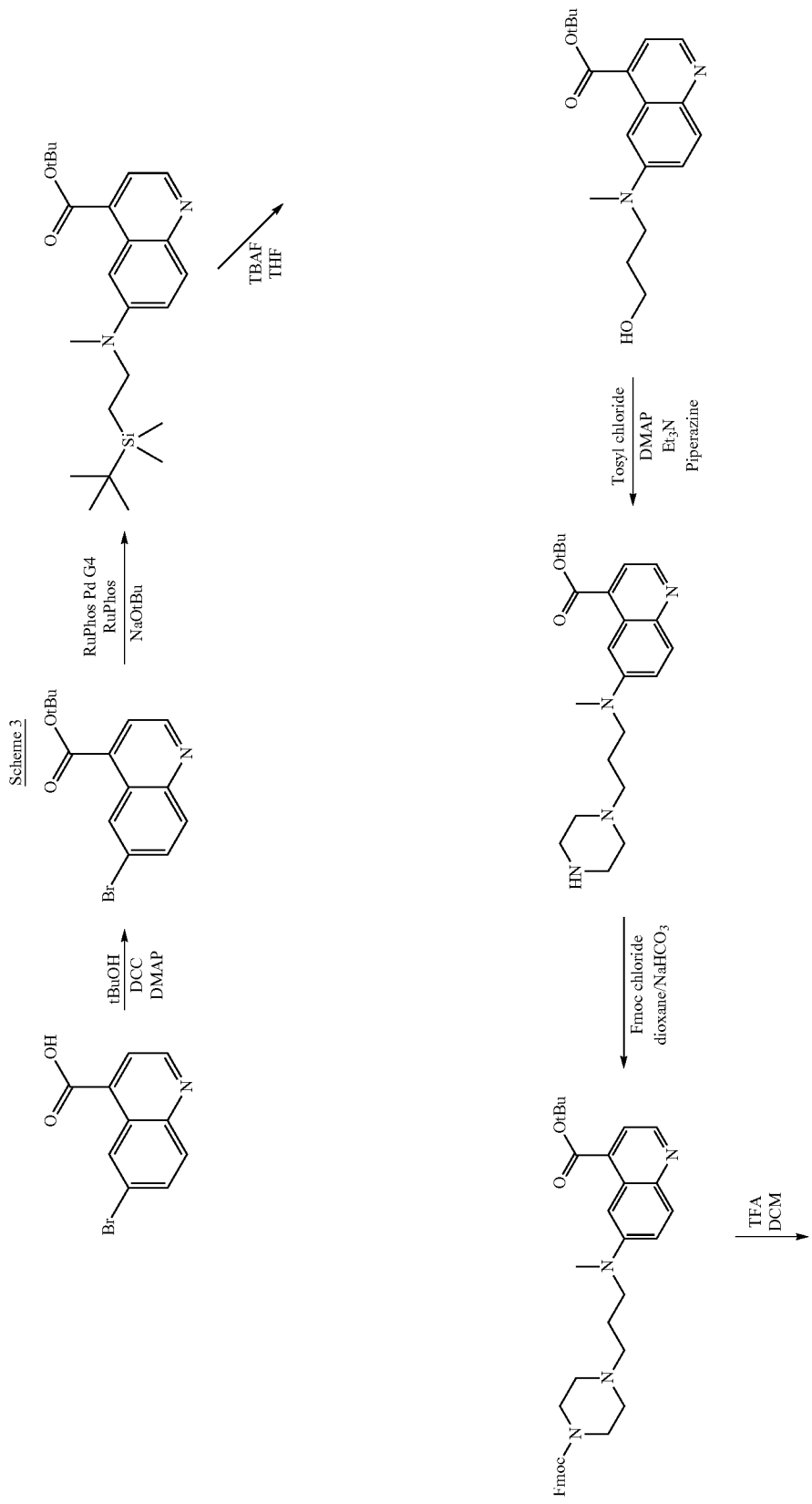
Scheme 3

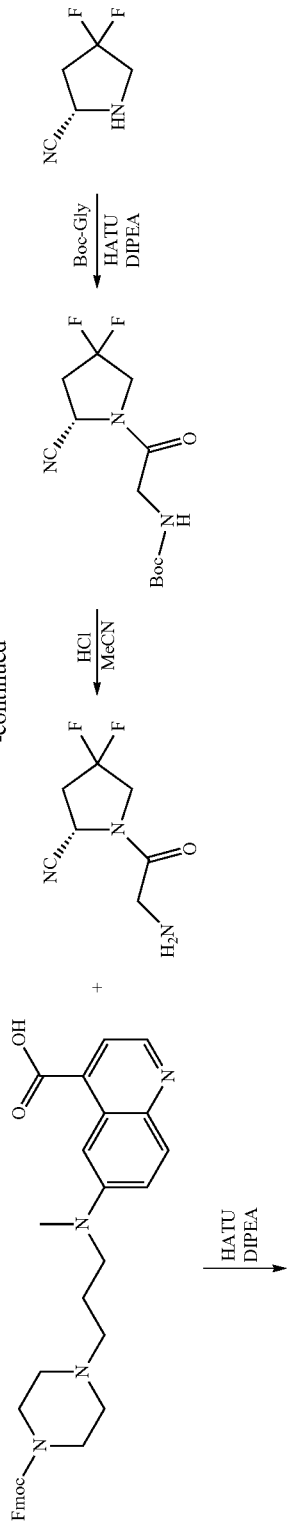
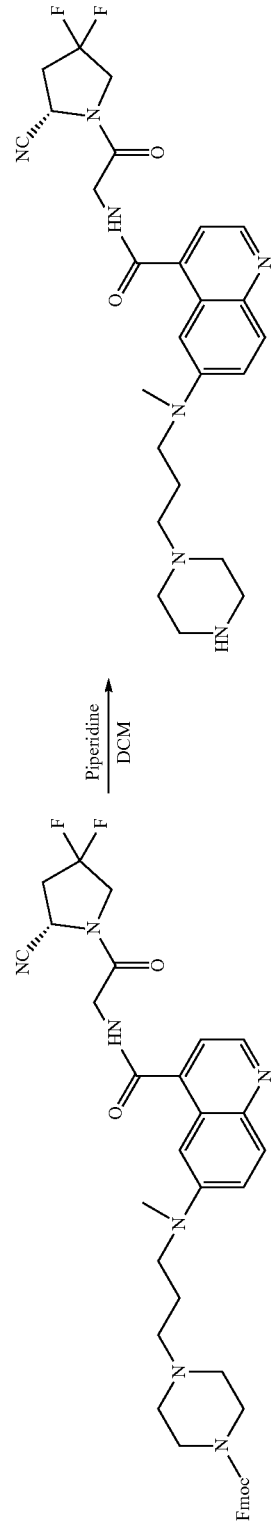

FAPI-46 can also be prepared according to the method described in WO 2019/154886A1.
Example 2: Synthesis of FAPI-NODAGA Conjugates
2.1: Synthesis of 2,2'-(7-((R)-1-carboxy-4-((2-(4-((4-((2-((S)-2-cyano-4,4-difluoropyrrolidin-1-yl)-2-oxoethyl)carbamoyl)quinolin-6-yl)amino)-4-oxobutanamido)ethyl)amino)-4-oxobutyl)-1,4,7-trIazonane-1,4-diyl)dIacetic Acid ((R)-NODAGA-1)
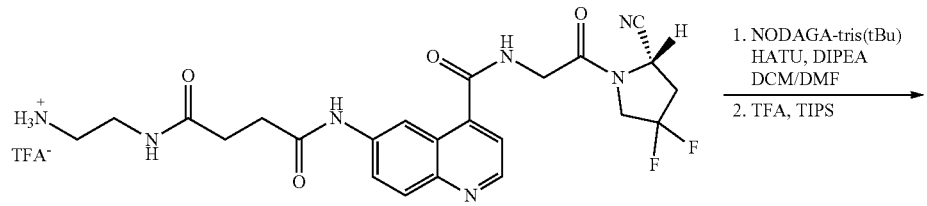
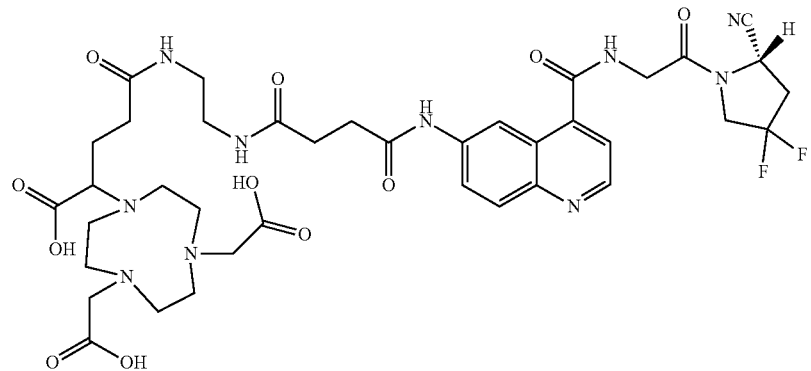

To the (S)—N1-(2-aminoethyl)-N4-(4-((2-(2-cyano-4,4-difluoropyrrolidin-1-yl)-2-oxoethyl)carbamoyl)quinolin-6-yl)succinimide (1) crude solution, DIPEA was added dropwise to neutralize TFA. Then, HATU and NODAGA-Tris(tBu) were added dropwise as DMSO solution (150 μL). The reaction was complete after a few minutes. The crude product was concentrated and purified via HPLC. To the pure material, DCM, TIPS and TFA were added and the reaction was left for 1 day until completion and purified via HPLC to obtain 15.8 mg of (R)-NODAGA-1 as a pale yellow powder (Yield: 51%).

2.2: Synthesis of 2,2'-(7-((R)-1-carboxy-4-((2-(4-((4-((2-((S)-2-cyano-4,4-difluoropyrrolidin-1-yl)-2-oxoethyl)carbamoyl)quinolin-6-yl)(methyl)amino)-4-oxobutanamido)ethyl)amino)-4-oxobutyl)-1,4,7-triazonane-1,4-diyl)diacetic acid ((R)-NODAGA-2)

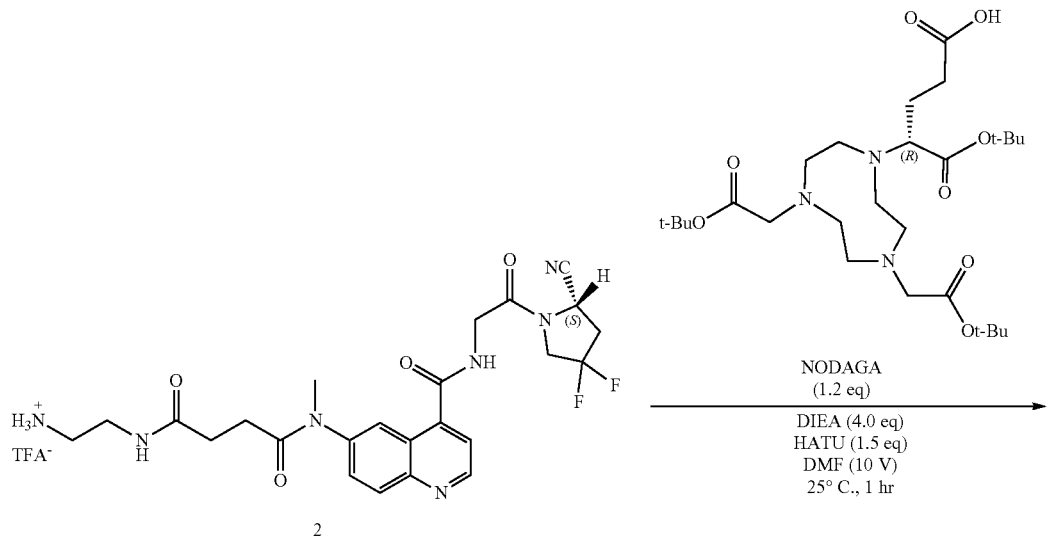

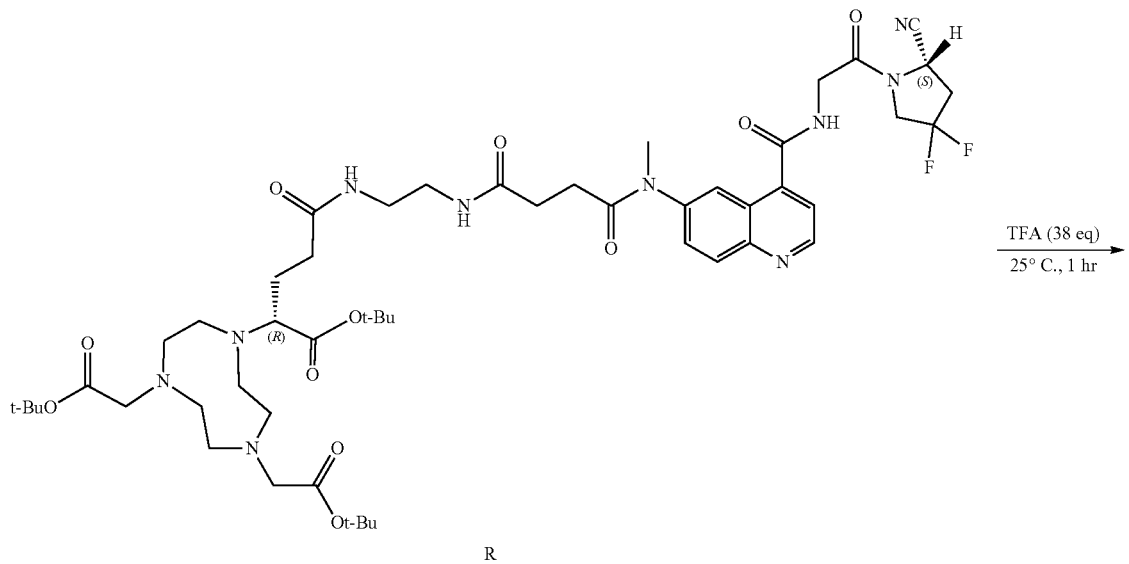

-continued

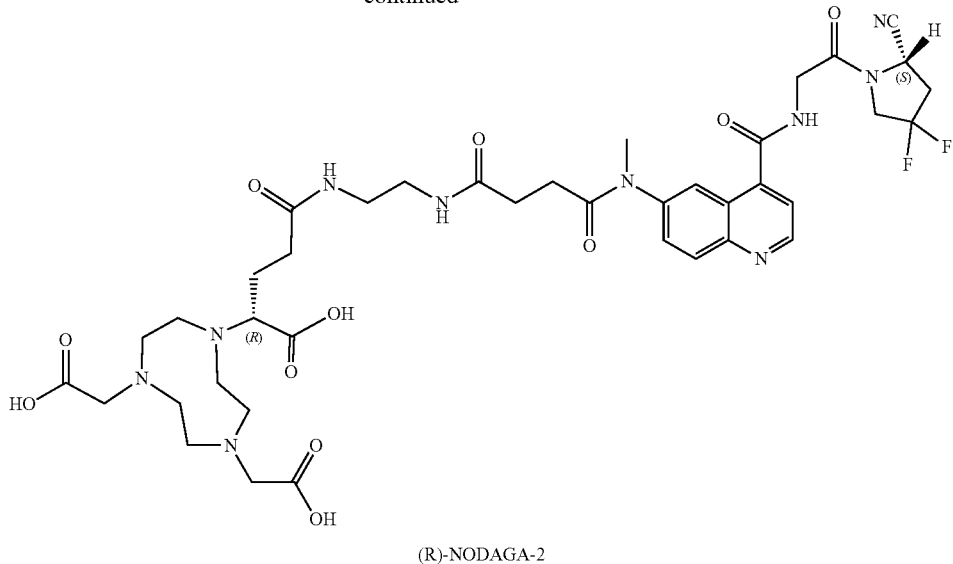

(R)-NODAGA-2

Step 1: To a solution of compound 2 (80.0 mg, 155 μmol) in DMF (1.00 mL) was added DIEA (80.2 mg, 620 μmol), HATU (121 mg, 232 μmol) and NODAGA-Tris(tBu) (101 mg, 186 μmol), the mixture was stirred at 25° C. for 1 hr. LCMS showed compound 2 consumed and one peak of desired MS was detected. The reaction mixture was quenched with saturated NaHCO$_3$ (4.00 mL), extracted with DCM (10.0 mL×3) washed with brine (10.0 mL). The organic layer was dried over sodium sulfate, filtered, and concentrated in vacuum to obtain R (310 mg, crude) was obtained as brown oil.

Step 2: To a solution of compound R (310 mg, 297 μmol) in TFA (1.29 g, 11.3 mmol) at 25° C., the mixture was stirred at 25° C. for 1 hr. LCMS showed compound R consumed and one peak of desired MS was detected. The mixture was concentrated in vacuum. The crude product on notebook page ET60385-73 (220 mg, crude) and ET60385-78 (206 mg, crude) was combined for further purification. The residue was purified by prep-HPLC (column: C18-1 150*30 mm*5 um; mobile phase:[water (TFA)-ACN]; B %: 5%-35%, 20 min) to obtained (R)-NODAGA-2 (10.01 mg, 3.30% yield, 96.9% purity, TFA) a brown solid. $^1$H NMR: ET60385-73-P1A2 (400 MHz, D$_2$O) δ 9.14 (d, J=5.2 Hz, 1H), 8.32-9.30 (m, 2H), 8.02-7.98 (m, 2H), 5.18-5.14 (m, 1H), 4.38 (s, 2H), 4.33-4.24 (m, 1H), 4.20-4.10 (m, 1H), 3.76 (s, 4H), 3.51-3.31 (m, 4H), 3.25-3.12 (m, 12H), 3.03-2.87 (m, 6H), 2.49 (s, 3H), 2.30 (t, J=7.2 Hz, 2H), 2.03-1.85 (m, 1H). LCMS (ET60385-73-P1Z1, Product RT=1.610 min).

2.3: Synthesis of 2,2'-(7-((R)-1-carboxy-4-(4-(4-((4-((2-((S)-2-cyano-4,4-difluoropyrrolidin-1-yl)-2-oxoethyl)carbamoyl)quinolin-6-yl)amino)-4-oxobutanoyl)piperazin-1-yl)-4-oxobutyl)-1,4,7-triazonane-1,4-diyl)diacetic acid ((R)-NODAGA-3)

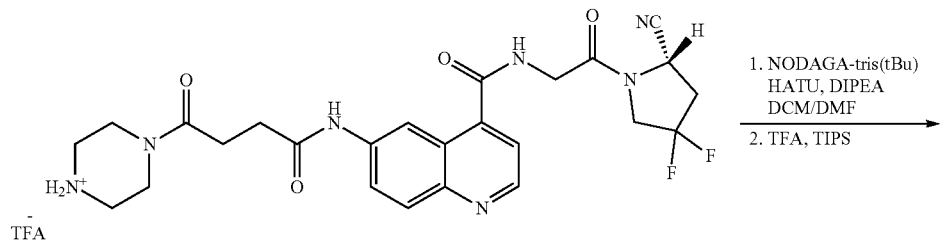

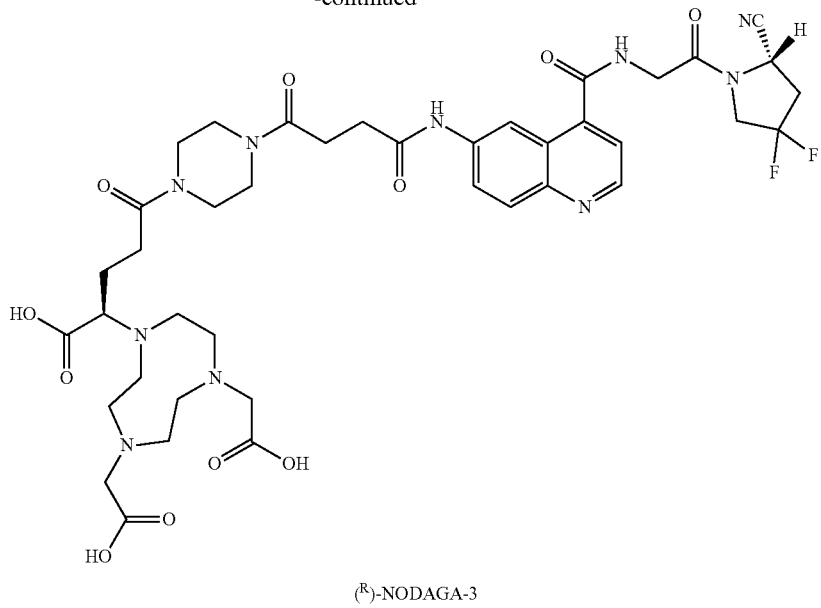

(R)-NODAGA-3

To the (S)—N-(2-(2-cyano-4,4-difluoropyrrolidin-1-yl)-2-oxoethyl)-6-(4-oxo-4-(piperazin-1-yl)butanamido)quinoline-4-carboxamide crude solution, DIPEA was added dropwise to neutralize TFA. Then, HaTU and NODAGA-Tris (TBu) were added dropwise as DMSO solution (150 μL). The reaction was complete after a few minutes. The crude product was concentrated and purified via HPLC. To the pure material, DCM, TIPS and TFA were added and the reaction was left for 1 day until completion and purified via HPLC to obtain 15.8 mg of (R)-NODAGA-3 as a pale yellow powder (Yield: 26%).

2.4: Synthesis of 2,2'-(7-((R)-1-carboxy-4-(4-(4-((2-((S)-2-cyano-4,4-difluoropyrrolidin-1-yl)-2-oxoethyl)carbamoyl)quinolin-6-yl)(methyl)amino)-4-oxobutanoyl)piperazin-1-yl)-4-oxobutyl)-1,4,7-triazonane-1,4-diyl)diacetic acid ((R)-NODAGA-4)

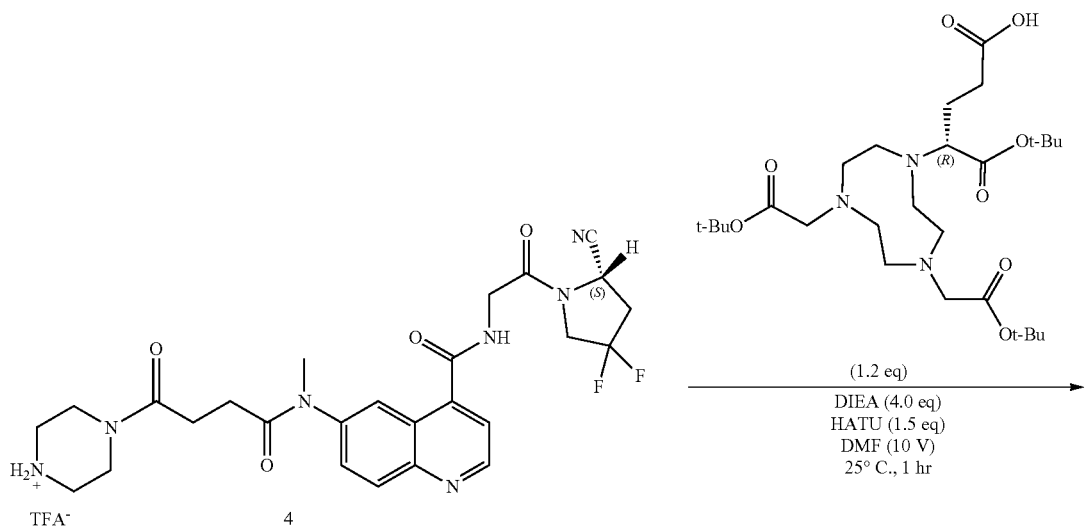

-continued

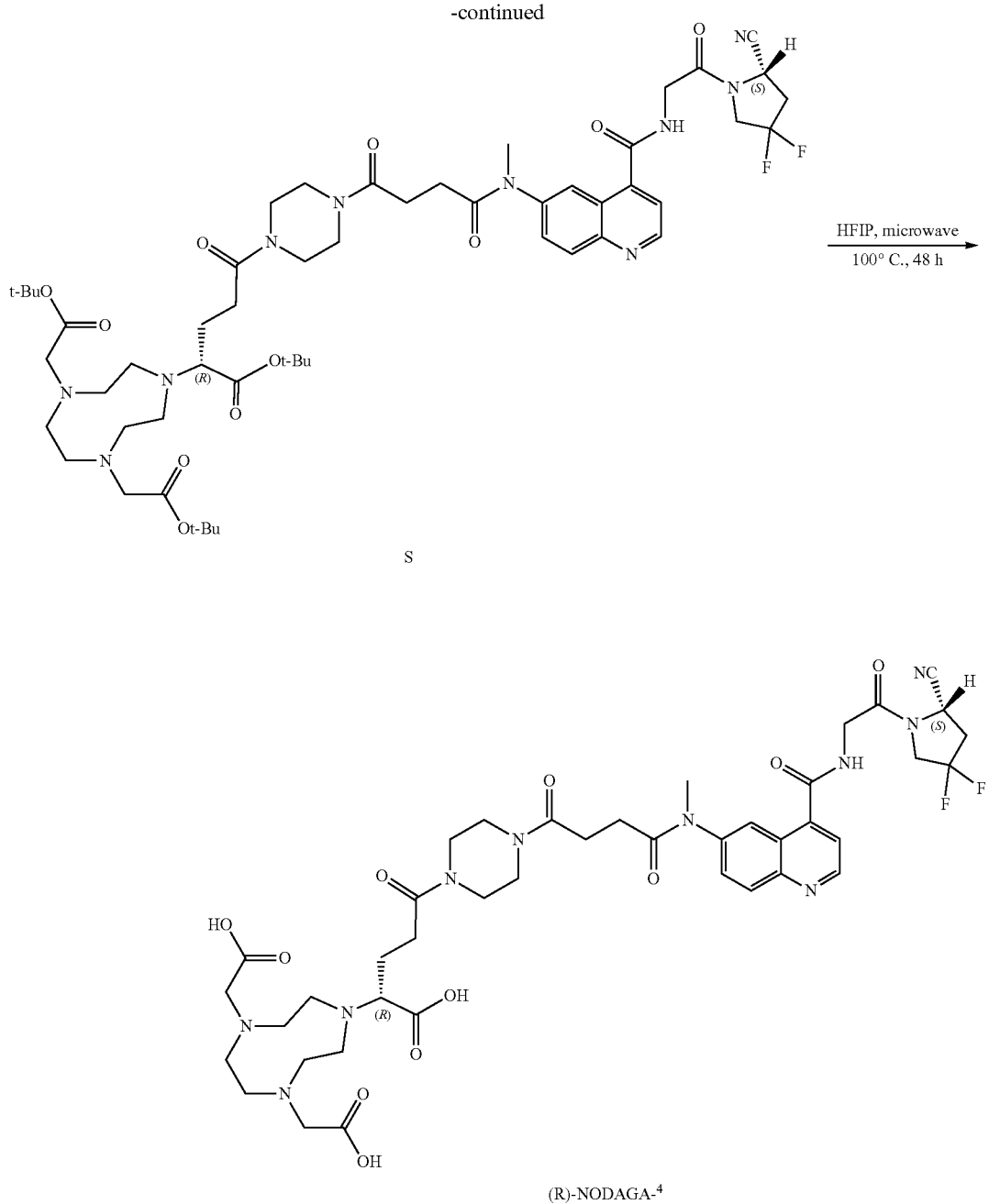

(R)-NODAGA-4

Step 1: To a solution of compound 4 (40.0 mg, 73.8 μmol) in DMF (0.50 mL) was added DIEA (9.55 mg, 73.8 μmol), HATU (57.6 mg, 110 μmol), and NODAGA-Tris(tBu) (48.1 mg, 88.6 μmol). The mixture was stirred at 25° C. for 1 hr. LCMS showed one peak of desired MS was detected. The mixture was concentrated in vacuum. The residue was purified by prep-HPLC (column: Waters Xbridge Prep OBD C18 150*40 mm*10 um; mobile phase: [water (NH$_4$HCO$_3$)-ACN]; B %: 50%-90%, 8 min) to obtain compound S (28.0 mg, 35.5% yield) as a white solid.

Step 2: Compound S (28.0 mg, 26.2 μmol) was taken up into a microwave tube in HFIP (4.41 mg, 26.2 μmol). The sealed tube was heated at 100° C. for 48 hrs under microwave. LCMS showed compound S consumed and one peak of desired MS was detected. The mixture was concentrated in vacuum. The residue was purified by prep-HPLC (column: Phenomenex Luna C$_{18}$ $_{75*30}$ mm*3 um; mobile phase: [water (TFA)-ACN]; B %: 5%-30%, 8 min) to obtain (R)-NODAGA-4 (9.01 mg, 36.9% yield, 96.6% purity, TFA) as an off-white solid. $^1$H NMR: (400 MHz, D$_2$O) δ 9.10 (d, J=4.8 Hz, 1H), 8.31-8.27 (m, 2H), 8.00-7.97 (m, 2H), 5.15-5.12 (m, 1H), 4.35 (s, 2H), 4.26-4.22 (m, 1H), 4.17-4.15 (m, 1H), 3.75 (s, 4H), 3.60-3.50 (m, 9H), 3.22-3.09 (m, 18H), 2.67-2.58 (m, 6H), 2.07-1.96 (m, 2H). LCMS (LCMS-2020 Shimadzu system equipped with a Gemini C-6 Phenyl column (3.5×250 mm, 5 μm particle size). The gradient used was 5-80% solvent B in 8 min (A=H$_2$O [0.1% TFA], B=ACN [0.1% TFA]) at a flow rate of 1.0 mL/min, Product RT=1.640 min)

2.5: Synthesis of 2,2'-((R)-7-(1-carboxy-4-(4-(3-((4-((2-((S)-2-cyano-4,4-difluoropyrrolidin-1-yl)-2-oxoethyl)carbamoyl)quinolin-6-yl)(methyl)amino)propyl)piperazin-1-yl)-4-oxobutyl)-1,4,7-triazonane-1,4-diyl)diacetic acid (NODAGA-FAPI-46)
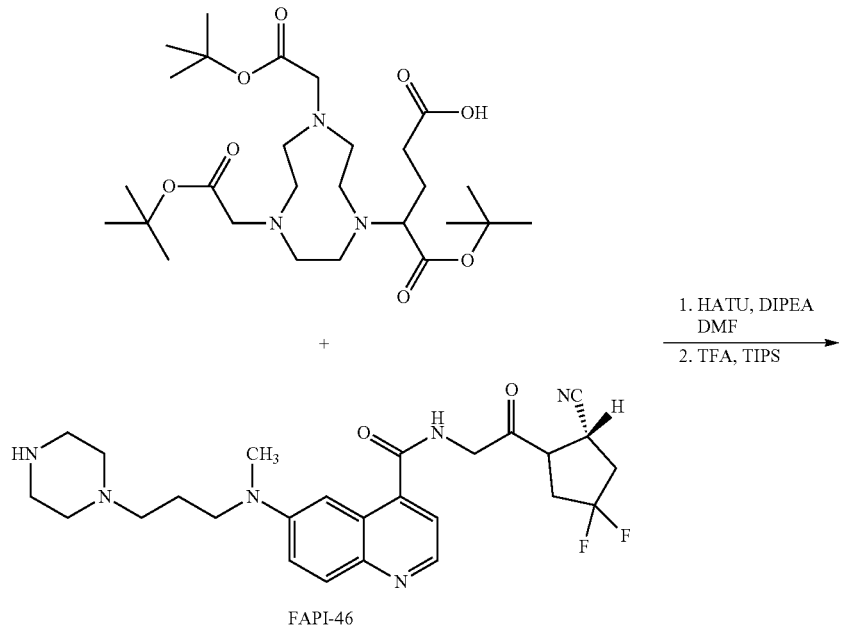
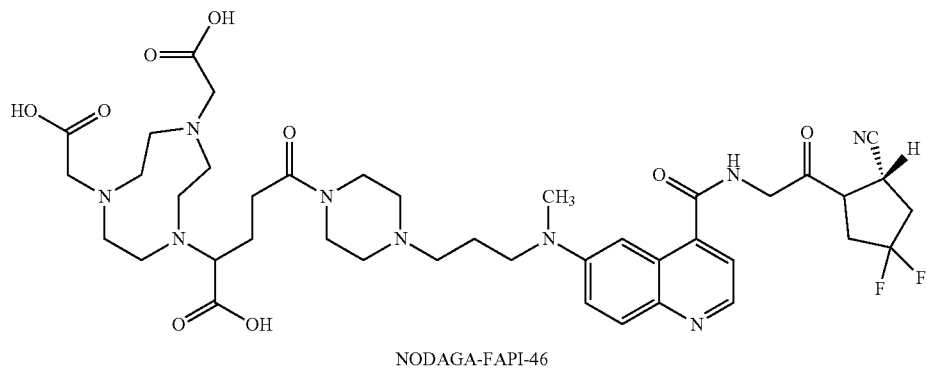

(S)—N-(2-(2-cyano-4,4-difluoropyrrolidin-1-yl)-2-oxo-ethyl)-6-(4-oxo-4-(piperazin-1-yl)butanamido)quinoline-4-carboxamide, (R)-NODAGA(tris)tBu and HATU were dissolved in DCM+100 µL of DMF. DIPEA was added dropwise and the reaction was stirred for 2 h until completion (checked via LC/MS, method 15 to 80% in ACN). When no starting material was left and only a peak related to the product mass was observable (m/z=1025), TIPS and TFA (600 µL) were added. After 48 h, the reaction was complete. The crude was purified via HPLC (10-65% CAN in 15 min, rt=9.5) to afford 6.8 mg of a red powder (Yield: 36%).

Example 3: Cold Labelling $^{nat}$Cu-NODAGA-1 and $^{nat}$Cu-NODAGA-3

The $^{nat}$Cu complexes were prepared by incubating each conjugate with 1.5-fold excess of $^{nat}$CuCl$_2$×2 H$_2$O in ammonium acetate buffer, 0.5 M, pH 8 at 95° C. for 15 min. Uncomplexed $^{nat}$Cu ions were eliminated by SepPak C-18 purification. The $^{nat}$Cu-complexes were eluted with methanol, evaporated to dryness, re-dissolved in water and lyophilized. The purity of all complexes was confirmed by liquid chromatography and mass spectrometry (LC-MS). Table 1 presents the retention time ($t_R$), and the obtained mass (mass-to-charge ratio, m/z) of the ion [M+2H]$^{2+}$ in comparison to the theoretical mass, confirming the identity of the formed $^{nat}$Cu-complexed conjugates. The analysis was performed on a LC-MS (Shimadzu LC2020) system using Gemini C6 Phenyl 5 µm, 250×4.6 mm column and a gradient of 15-80% acetonitrile (0.1% TFA)/water (0.1% TFA) in 15 min, at a flow rate of 2 mL/min. LC-MS chromatogram data are provided in Table 1A.

TABLE 1A

Analytical for $^{nat}$Cu conjugates

| $^{nat}$Cu-complexed conjugates | m/z calculated | m/z measured | $t_R$ (min) |
| --- | --- | --- | --- |
| NODAGA-1 | 858.9 | 859 | 6.28 |
| $^{nat}$Cu-NODAGA-1 | 920.2 | 920.3 | 9.77 |
| NODAGA-3 | 884.9 | 885 | 9.97 |
| $^{nat}$Cu-NODAGA-3 | 946.9 | 946.5 | 9.94 | m/z = mass-to-charge ratio of the ion [M + H]$^+$;
$t_R$ = retention time $^{nat}$Cu-NODAGA-2 and $^{nat}$Cu-NODAGA-4

The $^{nat}$Cu complexes were prepared by incubating 1-1.5 mg of each conjugate with a 1.5-fold excess of CuCl$_2$ in 125-300 µL of ammonium acetate (0.5 M, pH 8). A pH check was performed in order to guarantee the necessary conditions for the reaction (pH≥5). The reaction mixture was incubated for 10 min at room temperature. Free metal ions were eliminated via HPLC (Shimadzu SCL-40, Phenomenex Jupiter Proteo C12 (90 Å, 250×4.6 mm) column using the gradient 15-80% B in 8 min (A=H$_2$O [0.1% TFA], B=ACN [0.1% TFA]) with a flow rate of 5 ml/min).

TABLE 1B

LC/MS, HPLC profile of the described compounds.

| Compound | m/z calculated | m/z measured | tR (min) |
| --- | --- | --- | --- |
| NODAGA-2 | 872.88 | 873 | 10.62 |
| $^{nat}$Cu-NODAGA-2 | 934.41 | 934 | 9.44 |

TABLE 1B-continued

LC/MS, HPLC profile of the described compounds.

| Compound | m/z calculated | m/z measured | tR (min) |
| --- | --- | --- | --- |
| NODAGA-4 | 898.92 | 899 | 10.73 |
| $^{nat}$Cu-NODAGA-4 | 960.45 | 960 | 10.46 | m/z = mass-to-charge ratio of the ion [M + H]$^+$;
$t_R$ = retention time

Example 4: High Purity Copper-61 ($^{61}$Cu)

1. Methods of Making a Coin

Preparation of Buffer Solution

Ammonium Chloride (4.6 g, Aldrich: 326372, Trace Select) was weighed into a clean (no metal) Falcon Tube (50 mL), and the previously cleaned magnetic stirring bar was added. 6 mL of Trace Select water (Honeywell 95305) was added in one aliquot to flush walls of the Falcon in case any salt stuck to the Falcon tube walls. 1 mL of ammonium hydroxide 28% (Sigma 338818) was added with a 1000 µL pipette with a respective pipette tip, 8× times. The lid of the Falcon was closed, and the Falcon was, in turns, vortexed (1-2 minutes) (immersion in an ultra-sonic bath was a possible alternative for 1-2 minutes) and shaken, until all salt was dissolved. The Falcon tube can also be warmed (e.g., by rolling between hands) to improve solubility, temperature (e.g., around 23° C., preferably between 23-25° C.). After complete dissolution of the salt, the pH acceptance criteria, pH range 9.28-9.62, was verified by pH measurement of the solution at RT, e.g., with and electronic pH meter. The Falcon tube was closed with parafilm and stored at room temperature. Prior to use, any solid salt formation was redissolved.

Preparation of Nickel Nitrate Plating Solution

A 50 mL glass beaker was washed with nitric acid (Trace Select) followed by water (Trace Select). In a fume hood, the beaker was dried by placing it on a heating plate set to 150° C. To the beaker was added 210 mg of natural (isotopic distribution) nickel (powder, Sigma-Aldrich≤50 µm, 99.7% trace metals basis, essentially free from any impurities, except iron. The copper impurity amounts to <0.3 ppm.) were weighed into the beaker and 4 mL of 65% nitric acid were added using a pipette. The beaker was placed back on the active heating plate and the stirring was set to 300 rpm. Proper ventilation of the fume hood was confirmed (evolution of NO$_2$). During the dissolution, the solution turned green. The solution was reduced by evaporation to a volume of 600 µL and taken from the heating plate to cool down to room temperature. The remaining solution was transferred to a 50 mL metal-free Falcon tube. The glass beaker was rinsed with a total of 2.8 mL of Trace Select water, in steps of 0.8 mL, 1 mL, and 1 mL, where each step was transferred to the Falcon tube before the adding the next washing fraction. Buffer solution (4 mL), 11 mL of Trace Select water, and 3 mL of ammonium hydroxide 28% (Sigma 338818) were added to the Falcon tube. The pH of the solution was measured and adjusted to the required pH by adding ammonium hydroxide 28% (Aldrich 338818) using sterile B-Braun syringes.

Examples of Suitable Starting Material to Prepare $^{60}$Ni And $^{61}$Ni Electroplating Solutions The following Tables 2-4 are example lots of $^{60}$Ni and $^{61}$Ni (certificate as provided by Isoflex, USA, March 2018):

TABLE 2

| Isotope | $^{61}$Ni | | | | | | | | | |
|---|---|---|---|---|---|---|---|---|---|---|
| Enrichment | 86.20% | | | | | | | | | |
| Form | Metal ingot/powder | | | | | | | | | |
| Certificate | 6275 | | | | | | | | | |
| Isotopic distribution | Isotope | Ni-58 | Ni-60 | Ni-61 | Ni-62 | Ni-64 | | | | |
| | Content (%) | 1.17 | 0.8 | 86.2 | 11.7 | 0.14 | | | | |
| Chemical admixtures | Element | Al | Bi | Ca | Cd | Co | Cr | Cu | Fe | K | Mg |
| | Content (ppm) | 10 | <10 | 20 | 10 | <10 | <10 | 20 | 40 | <10 | <50 |
| | Element | Mo | Mn | Na | Pb | Si | Sn | Zn | | | |
| | Content (ppm) | <8 | <50 | <10 | <10 | 20 | 30 | 50 | | | |

TABLE 3

| Isotope | $^{61}$Ni | | | | | | | | | |
|---|---|---|---|---|---|---|---|---|---|---|
| Enrichment | 99.39% | | | | | | | | | |
| Form | Metal powder | | | | | | | | | |
| Certificate | TBD/not specified | | | | | | | | | |
| Isotopic distribution | Isotope | Ni-58 | Ni-60 | Ni-61 | Ni-62 | Ni-64 | | | | |
| | Content (%) | 0.01 | 0.29 | 99.39 | 0.29 | 0.02 | | | | |
| Chemical admixtures | Element | Al | Co | Cr | Cu | Fe | Mg | Mn | Pb | Si | Ti |
| | Content (ppm) | 12 | <10 | <10 | 14 | <10 | <10 | <10 | <10 | <10 | <10 |
| | Element | Zn | C | S | | | | | | | |
| | Content (ppm) | <10 | 157 | <10 | | | | | | | |

TABLE 4

| Isotope | $^{61}$Ni | | | | | | | | | |
|---|---|---|---|---|---|---|---|---|---|---|
| Enrichment | 99.31% | | | | | | | | | |
| Form | metal powder | | | | | | | | | |
| Certificate | TBD/not specified | | | | | | | | | |
| Isotopic distribution | Isotope | Ni-58 | Ni-60 | Ni-61 | Ni-62 | Ni-64 | | | | |
| | Content (%) | 0.21 | 99.31 | 0.46 | 0.015 | 0.005 | | | | |
| Chemical admixtures | Element | Al | Co | Cr | Cu | Fe | Mg | Mn | Pb | Si | Ti |
| | Content (ppm) | <10 | 70 | 20 | 25 | <10 | <10 | <10 | <10 | 15 | <10 |
| | Element | Zn | C | S | P | | | | | | |
| | Content (ppm) | 15 | 114 | 20 | 30 | | | | | | |

The samples of natural nickel from Sigma-Aldrich were essentially free from any impurities, except iron. The copper impurity amounts to <0.3 ppm. Certificates of analysis are described below. Additional suitable sources of natural Ni include:

Nickel powder, <50 μm, 99.7% trace metals basis
Nickel rod, diam. 6.35 mm, =99.99% trace metals basis
Nickel foil, thickness 0.5 mm, 99.98% trace metals Preparation of Zinc Nitrate Plating Solution A 50 mL glass beaker was washed with nitric acid (Trace Select) followed by water (Trace Select). In a fume hood, the beaker was dried by placing it on a heating plate set to 150° C. 210 mg of natural (isotopic distribution) zinc (zinc powder, Sigma-Aldrich≤10 μm, >98%) was weighed into the beaker and 4 mL of 65% nitric acid was added using a pipette. The beaker was placed back on the active heating plate and the stirring was set to 300 rpm. Proper ventilation of the fume hood was confirmed (evolution of $NO_2$). During the dissolution, the solution turned green. The solution was reduced by evaporation to a volume of ≈600 μL and taken from the heating plate to cool down to room temperature. The remaining solution was transferred to a 50 mL metal-free Falcon tube. The glass beaker was rinsed with a total of 2.8 mL of Trace Select water, in steps of 0.8 mL, 1 mL, and 1 mL, where each step was transferred to the Falcon tube before the adding the next washing fraction. 4 mL of the buffer solution (prepared above), 11 mL of Trace Select water, and 3 mL of ammonium hydroxide 28% (Sigma 338818) were added to the Falcon tube. The pH of the solution was measured and adjusted to the required pH by adding ammonium hydroxide 28% (Aldrich 338818) using sterile B-Braun syringes.

Electroplating the Backing Surface

A disc shaped niobium backing was obtained from high purity Nb as described herein and (28 mm×1.0 mm) was cleaned with ethanol (high-purity) and inserted in a Comecer Electroplating Unit V21204. A platinum wire anode was positioned so that the distance relative to the coin surface was between about 1 and 3 mm, adjusted by a polymer spacer. The coin mass was determined to be 5.25 grams. Niobium backing (22 mm×1.0 mm weighs 3.3 g). The plating solution was charged to the electrolyte container and attached to the apparatus. The voltage was set to 4.5V. The current reading after 5 min stabilization was 180 µA. The duty cycle for pump was set to 45%. The plating liquid turned from blue to transparent, slow decrease of current to 160 µA was observed over the period of 120 minutes. The plating process was stopped. The coin was taken out of the electrolytic cell and its weight was measured. The coin also underwent microscopic evaluation using a DINOLite digital microscope to observe the crystal structure and homogeneity of the surface (FIG. 16). The coin (FIG. 17) was stored in a metal-free Falcon tube under a nitrogen atmosphere.

Upon completion of electroplating, the coin underwent a microscopic evaluation using a DINOLite digital microscope to observe the crystal structure and homogeneity of the surface. As can be seen in FIG. 16 (panels A-C), a homogenous target coating having durable adhesion was obtained.

2. General Guidelines for High-Purity [$^{61}$Cu]Cl$_2$ Production

The purpose of this example was to enable the bulk production of Copper-61 ($^{61}$Cu) from the deuteron irradiation of natural nickel and/or enriched $^{60}$Ni. This effort was a proof of concept, and, therefore, there were no bench-marked specifications for $^{61}$Cu. However, we optimize target performance, target geometry/material use, irradiation parameters, and chemical processing methods to produce [$^{61}$Cu]CuCl$_2$ following enriched $^{60}$Ni irradiation, or, scaled accordingly for $^{nat}$Ni irradiation. There were no pharmacopoeia specifications for radio-copper explicitly, however, test QC methods include assessment of radionuclidic purity and apparent molar activity (to demonstrate usability of the extracted [$^{61}$Cu]CuCl$_2$).

This example considers use of two different types of targets, natural nickel ($^{nat}$Ni) targets and highly enriched Nickel-60 ($^{60}$Ni) targets both of which were suitable for deuteron bombardment. However, $^{nat}$Ni was cost-effective and available in high-purity while $^{60}$Ni was costly and requires efficiency measures. If even higher yields were desired, target preparation efforts may be directly translated into the proton-based $^{61}$Ni(p,n)$^{61}$Cu route, however, given the cost of enriched $^{61}$Ni (c.a. $25 USD/mg), such an approach imposes the need for target recycling.

The set of guidelines below enables all types of targets in the production of $^{61}$Cu, including the production of high-purity [$^{61}$Cu]CuCl$_2$ from the Nb coins with a Zn or Ni (any isotopic enrichment) coating electroplated thereon as provided herein. Specific details are also provided for deuteron and proton irradiations, respectively. This protocol was followed to generate the [$^{61}$Cu]Cl$_2$ compositions evaluated herein.

| | |
|---|---|
| Target Backing Geometry | Flat coin - disc-shaped. The dimensions of the target backing form are: |
| | Coin backing: |
| | Diameter Ø = 20 – 30 ± 0.1 mm |
| | Thickness H = 1.5 mm |
| | Target Ni layer or coating |
| | a. Diameter 13 mm (deuteron) or 10 mm (proton) |
| | b. Mass 70-100 mg, e.g, around 100 ± 40 mg (deuteron) or |
| | around 50 ± 20 mg (proton) |
| | c. Thickness (H) full density (d = 8.9) |
| | i. $H_{min}$ = 0.1 mm; $H_{max}$ = 0.14 mm corresponding to |
| | 70-100 mg deposited |
| | Tolerances/finishes unless otherwise stated are as follows: |
| | Surface finish: Ra 1.6 |
| | General tolerance: ISO 2768-m |
| | Sharp edges and corners according to ISO 13 715 |
| Target Backing Surface | Optional - Surface treated with abrasion by pink corundum grindstone - free of impurities |
| Target Backing Material | Niobium foil, 99.8% (metals basis), 1.0 mm (0.04 in) thick, annealed, |
| | Stock No.: 10257 |
| | Lot No.: C15P07 |

| Element | ppm |
|---|---|
| Carbon | 24 |
| Hydrogen | 1 |
| Molybdenum | 2 |
| Nickel | 4 |
| Silicon | 1 |
| Titanium | 2 |
| Zirconium | 3 |
| Iron | 1 |
| Hafnium | 2 |
| Nitrogen | 14 |
| Oxygen | 56 |
| Tantalum | 785 |
| Tungsten | 4 |

| Target Backing Material | Niobium 99.9% typical certificate of analysis results, Goodfellows Product nr. 931-627-20 | |
|---|---|---|
| | Element | ppm |
| | B | <10 ppm |
| | Ni | <5 ppm |
| | O | 100 ppm |
| | Si | 100 ppm |
| | Zr | <10 ppm |
| | Ta | 500 ppm |
| | H | <10 ppm |
| | W | <100 ppm |
| | C | 25 ppm |
| | N | 20 ppm |
| | Fe | 30 ppm |
| | Cu | <5 ppm |
| | Mo | 10 ppm |
| | Ti | <10 ppm |

| | |
|---|---|
| Transfer system compatibility | As the target can be automatically transferred to/from the cyclotron by means of a pneumatic target transfer system, it was critical that the deposited Ni was robust to direct air flow and abrupt mechanical movements.<br>In certain embodiments, the target coating remains adhered to the backing during pneumatic transfer both to and from the cyclotron. Such a pneumatic system was typically fed by a compressed air connection of ~6-7 bar, and at minimum, 360 SLPM flow. Such a system was "push-push", and therefore, compressed air was typically blown on both the front and rear sides of the coin, respectively, depending on the direction of transfer. The coin came to an abrupt stop as it reached the target station or hotcell.<br>In certain embodiments, suitable tests that indicate target durability include the following, whereby the total mass loss for all tests combined should be negligible (e.g. <1 mg): Visual inspection, gentle knocking/tapping on a countertop on top of white paper to check for loosening of target coating grains, gently rubbing an acid-washed Teflon spatula against the deposited target coating and checking for loosening of target coating grains, and/or placing and gently pressing down on a piece of Scotch tape against the target coating.<br>If there was access to the cyclotron apparatus, it was recommended to transfer the coin back/forth multiple times and ensure target coating stability (i.e., no mass loss). Such a test may be performed with a degrader in place. |
| Method of Production | Electrodeposition from bath with a significantly high pH (e.g., 9.9-10.8) |
| Target Metal Form | To withstand the deposited beam power, the target metal was preferably metallic nickel (not, e.g., nickel oxide).<br>Depending on the means of target preparation (e.g., electroplating), the raw nickel starting material need not necessarily be metallic. However, methods used for preparing $^{nat}$Ni targets should ultimately be directly translatable to preparation of $^{60}$Ni or $^{61}$Ni targets. At present, it was understood that enriched Ni was typically in the form of a salt. |
| Target Additives | The use of binders must not necessary be avoided if they are absent of the final metallic coin and if an assessment on a case-by-case basis to understand potential impact to product quality has been done (e.g. ICP-MS on the binder material).<br>Any reagents used for target preparation (e.g., electroplating reagents) must be of the highest quality, in particular, with regards to trace metals. |
| Metal Content | Preferably, the highest grades of reagents should be used, to avoid trace metals contamination of the target coating, as more than a tenth of a microgram per 100 mg of target metal (that is, 1 ppm of the target metal) is already a significant contamination that may render the coin unusable for production of high-purity radionuclides. In the case of the production of radiocopper it is not accepted to add more than 0.1 ppm of cold Cu as this would reduce the purity of the prepared radionuclide composition.<br>Preferably, max level of impurities allowed to be added by the process to the initial nickel:<br>Copper (Cu): 0.1 ppm<br>High affinity metals (Ga, Lu, Pb, Y): 0.1 ppm<br>Zinc and cobalt (Zn, Co): 0.3 ppm<br>Transition and other metals (Cd, Cr, Al, Mn, Mo, Sn, Ti, V . . .): 1 ppm on a case by case<br>Iron (Fe): 10 ppm<br>Family I and II (K, Ba, Mg, Be . . .): 1000 ppm<br>The metal coins were analyzed on a batch per batch basis by dissolution in nitric acid to assess the metal contamination within the coin that were not found in the starting nickel metal and thus originate from the process.<br>The amount suggested above were a good, albeit not strict, guide since chemical purification following irradiation will, in turn, further remove |

| | |
|---|---|
| | some of these impurities. The ultimate specification on this front will therefore be an iterative process as the Cu/Ni separation chemistry is refined. However, the process shall not significantly add impurities that were not in the originating pure nickel material.<br>Cold Cu should be minimized in the deposited Ni since this will follow the chemistry of any $^{61}$Cu and cannot be separated post-irradiation. Any such cold Cu will directly compete with $^{61}$Cu during radiolabeling. Methods of removing Cu from the dissolved target metal are well known. |
| Density of Target | To withstand the deposited beam power, the Ni target should be of reasonably high volumetric density (e.g., approximately ≥90% or, ≥8.0 g/cm$^3$). |
| Power Rating | The power rating for the target, including the combined deposited Ni and plate should be:<br>≥420 W (deuterons)<br>≥820 W (protons) |
| Loading Mass of Target | The loading mass vs. the deposited mass of Ni (i.e., deposition efficiency) relates not to technical specifications, but rather, to cost. In the case of $^{nat}$Ni deposition, loading efficiency did not have a significant impact on the cost of $^{61}$Cu. However, losses should be minimized in considering the translation to enriched $^{6x}$Ni. For $^{60}$Ni, losses should be maintained below ~10%, and for $^{61}$Ni, below ~1%. Some techniques such as magnetron sputtering are thus not possible for enriched nickel but are satisfactory for $^{nat}$Ni. |
| Mass/thickness of Nickel | For deuterons (i.e., $^{nat}$Ni or $^{60}$Ni), the thickness should be appropriate for stopping the deuterons, with a maximum 10% variability in material deposition. Such thicknesses equate to:<br>≥100 μm (assuming 100% density)<br>≥70 mg or ≥89 mg/cm$^2$ (assuming 10 mm diameter)<br>For protons (i.e., $^{61}$Ni), one may wish to selectively limit the deposited material to optimize the balance between material cost, yield, and backing material activation. With a maximum 10% variability in material deposition, four examples are noted below.<br>$^{61}$Ni Scenario #1 (11→9 MeV)<br>78 μm (assuming 100% density)<br>55 mg or 69 mg/cm$^2$ (assuming 10 mm diameter well)<br>$^{61}$Ni Scenario #1 (12→8 MeV)<br>155 μm (assuming 100% density)<br>108 mg or 138 mg/cm$^2$ (assuming 10 mm diameter well)<br>$^{61}$Ni Scenario #1 (13→7 MeV)<br>233 μm (assuming 100% density)<br>163 mg or 208 mg/cm$^2$ (assuming 10 mm diameter well)<br>$^{61}$Ni Scenario #1 (13→4 MeV)<br>309 μm (assuming 100% density)<br>216 mg or 275 mg/cm$^2$ (assuming 10 mm diameter well) |
| Isotopic enrichment | The $^{6x}$Cu radioisotopes which will be coproduced during production of $^{61}$Cu (t ½ = 3.339 h) include:<br>$^{57}$Cu (t ½ = 0.196 s) $^{58}$Cu (t ½ = 3.204 s)<br>$^{59}$Cu (t ½ = 81.5 s) $^{60}$Cu (t ½ = 23.7 m)<br>$^{62}$Cu (t ½ = 9.673 m) $^{64}$Cu (t ½ = 12.701 h)<br>From a practical handling point of view, all but $^{60}$Cu and $^{64}$Cu are likely to decay prior to use. Only $^{64}$Cu will have any impact on the possible shelf-life of $^{61}$Cu.<br>In addition to the production of Cu radioisotopes, other radionuclides (e.g., Co and Ni) may also be produced, the ratio of which will depend on the isotopic composition, and whether undergoing deuteron or proton irradiation. As these byproducts are chemically different from copper, such radionuclides may be removed during $^{61}$Cu purification/processing. For example, The $^{61}$Cu was purified from metal and radiometal impurities via a GE Healthcare FASTlab 2 module through a tributyl phosphate resin cartridge and a tertiary-amine-based weak ionic exchange resin containing long-chained alcohols. |
| Any other requirements | Niobium is preferred over silver for its better resistance to corrosion, its low amount of activation on irradiation and for its high melting temperature that permits the deposit of nickel by other processes such as melting or heat sintering. However, silver possesses a higher thermal conductivity and may be suitable for certain embodiments.<br>For target backing manufacture, the following sheet of niobium is suitable for laser cutting:<br>http://www.Goodfellow.com<br>NB000400 Niobium Foil, Size: 150 × 150 mm Thickness: 1.5 mm, Purity: 99.9%, Temper: Annealed, Quality: LT<br>From one sheet up to 25 target backings can be manufactured. |

Purification and Characterization of [$^{61}$Cu]CuCl$_2$ and Waste Streams

The solid target irradiated material was dissolved in a total volume of 7 mL of 6 M HCl with the addition of 30% hydrogen peroxide via a dissolution chamber.

Separation and purification were accomplished using a cassette-based FASTlab platform using a TBP (tributylphosphate-based) resin (1 mL) (particle size 50-100 µm; pre-packed, Triskem) then a weakly basic (tertiary amine; TK201) resin (2 mL) (particle size 50-100 µm; pre-packed, Triskem), each of which were pre-conditioned with H$_2$O (7 mL) and HCl (10M, 7 mL). The cassette reagent vials were prepared using concentrated HCl (Optima Grade, Fischer Scientific), NaCl (ACS, Fischer Scientific) and milli-Q water (Millipore system, 18 M2-cm resistivity). 6M HCl (2×4.2 mL), 5M NaCl in 0.05 M HCl (4.2 mL). The subsequent $^{61}$Cu was then purified with two subsequent ion exchange resins in a FASTlab synthesis unit.

1) The acid-adjusted dissolution solution (approx. 7 mL) was loaded over both columns in series and directed into a "Ni collection fraction". The TBP resin acted as a guard column as it quantitatively retained Fe$^{3+}$ ions, while the Cu$^{2+}$ and Co$^{2+}$ complexes were quantitatively retained on the tertiary amine (TK201) resin.
2) Both columns were washed with 6M HCl (4 mL) to maximize Ni recovery for future recycling.
3) The TK201 column was washed with 4.5M HCl (5.5 mL) to elute the majority of cobalt salts.
4) The TK201 column was washed with 5M NaCl in 0.05M HCl (4 mL) to decrease residual acid on the resin and further remove any residual cobalt salts.
5) The TK201 column was washed with of 0.05M HCl (3 mL) to quantitatively elute the [$^{61}$Cu]CuCl$_2$.

The resulting [$^{61}$Cu]CuCl$_2$ solution of the plated material had an average activity of 1.0-4.5 GBq (FIG. 20). This activity was measured using a dose calibrator from Comecer and its radionuclidic purity by a gamma spectrometer at PSI in Switzerland (FIG. 22).

Gamma spectrometry measurements were performed to identify any radionuclidic impurities, particularly long-lived radionuclides. These results indicate an 89.3% and 94% reduction in impurities for $^{nat}$Ni and $^{61}$Ni on niobium backing materials with respect to silver backing materials when utilizing the methods disclosed herein (FIG. 20 and FIG. 21). ICP-MS measurements were performed on the product of cold dissolutions by Labor Veritas in Switzerland to monitor elemental impurities present in product according to ICH-Q3D (FIG. 23). All detected impurities were within regulated ICH-Q3D concentrations (see ICH-Q3D Guidelines, pg 25).

The plating of highly enriched $^{61}$Ni was also enabled with the same plating parameters as described above, for a higher yield and industrial production using proton irradiation (typically at 80 µA to 100 µA, 13 MeV protons for 1 hour to 2 hours and up to one half-life of $^{61}$Cu).

Purity and Activity Evaluations of [$^{61}$Cu]CuCl$_2$ Compositions Prepared from $^{nat}$Ni(d,n)$^{61}$Cu and $^{60}$Ni(d,n)$^{61}$Cu Using Nb-Backed Coins.

This example presents information on the activity of the produced $^{61}$Cu generated using the Nb backing, Ni electrodeposited coins alongside cobalt radioisotopes that were produced with deuteron irradiation using the coin comprising a natural nickel target and the coin comprising enriched $^{60}$Ni as target, i.e., $^{61}$Ni(d,n)$^{61}$Cu and $^{60}$Ni(d,n)$^{61}$Cu, respectively. The irradiated materials were dissolved and purified as described above.

The obtained and purified [$^{61}$Cu]Cu product and waste generated during purification from the products of deuteron irradiation of natural nickel/Nb coin and $^{60}$Ni/Nb coin, respectively, was processed and analysed by gamma-spectrometry and presented below.

TENDL-2019 based thick target yield calculations using isotopic abundancy of natural nickel/Nb coin and enriched $^{60}$Ni/Nb coin, respectively.

Radiocobalt Content

Table 5 contains activities of cobalt radioisotopes in the different fractions post FASTlab purification as a mean of three measurements (n=3 irradiations) using $^{nat}$Ni/Nb target coin. The activities were extrapolated to a 3 h and 50 µA beam at EoB (end of bombardment)+2 h. The activity of [$^{61}$Cu]CuCl$_2$ in these irradiations was determined experimentally and confirmed to be ~80% of TENDL-2019 based estimates.

Activity of produced $^{61}$Cu for irradiation with deuteron at 8.4 MeV, 3 h at 50 µA at 80% efficiency (EoB+2 h): 3052 MBq. Also see FIG. 18 for the change in cobalt radioisotopes with time along with the corresponding change in $^{61}$Cu purity.

TABLE 5

Cobalt isotopes: natNi/Nb target coin

| Radionuclide | Cu fraction [Bq] | Ni fraction [Bq] | Co-waste I + II [Bq] | Half-life [days] |
|---|---|---|---|---|
| $^{56}$Co | 118345 | 2696 | 2458071 | 77 |
| $^{57}$Co | 0 | 0 | 474 | 272 |
| $^{58}$Co | 95395 | 2145 | 1940192 | 71 |
| $^{60}$Co | 124 | 3 | 2602 | 1925 |

Table 6 contains calculated activities of cobalt radioisotopes that would be obtained by using 99% enriched $^{60}$Ni as target metal. The activities were extrapolated to a 3 h and 50 µA beam at EoB (end of bombardment)+2 h. The activity of $^{61}$Cu was calculated accordingly.

Activity of produced $^{61}$Cu with deuteron irradiation at 8.4 MeV, 3 h at 50 µA at 80% efficiency (EoB+2 h): 11,552 MBq. Also see FIG. 19 for the change in cobalt radioisotopes with time and the corresponding change in $^{61}$Cu purity.

TABLE 6

Cobalt isotopes: enriched $^{60}$Ni/Nb target coin.

| Radionuclide | $^{61}$Cu fraction [Bq] | Separated Ni [Bq] | Separated Co-waste I + II [Bq] | Half-life [days] |
|---|---|---|---|---|
| $^{56}$Co | 365 | 8 | 7583 | 77 |
| $^{57}$Co | 0 | 0 | 1793 | 272 |
| $^{58}$Co | 242909 | 5463 | 4940424 | 71 |
| $^{60}$Co | 0.5 | 0 | 11 | 1925 |

Activity and Chemical Purity

Based on a combination of theoretical calculations and experimental results, the purity of [$^{61}$Cu]CuCl$_2$ produced from deuteron irradiation of $^{nat}$Ni/Nb target coin was compared with [$^{61}$Cu]CuCl$_2$ from deuteron irradiation of enriched $^{60}$Ni/Nb target coin.

In Table 7, the extrapolated radiocobalt activity content and $^{61}$Cu purity of [$^{61}$Cu]CuCl$_2$ solution produced by $^{nat}$Ni as target metal for a 50 µA, 3 h deuteron irradiation after FASTlab purification are presented.

TABLE 7

Natural Ni/Nb Target Coin- Analysis of $^{61}$Cu activity
and purity in produced [$^{61}$Cu]CuCl$_2$ solution.

| Hours post EoB | Co species activity in Cu fraction [Bq] | $^{61}$Cu activity [MBq] | $^{64}$Cu activity [MBq] | % Purity $^{61}$Cu | % Purity PET nuclides $^{61}$Cu + $^{64}$Cu | % non-Cu radionuclides |
|---|---|---|---|---|---|---|
| 0 | 213864 | 4622 | 70 |  | 99.995% | 0.00456% |
| 1 | 213784 | 3756 | 66 | 98.261% | 99.994% | 0.00559% |
| 2 | 213704 | 3052 | 63 | 97.979% | 99.993% | 0.00686% |
| 3 | 213624 | 2479 | 59 | 97.652% | 99.992% | 0.00841% |
| 4 | 213544 | 2015 | 56 | 97.274% | 99.990% | 0.01031% |
| 5 | 213465 | 1637 | 53 | 96.837% | 99.987% | 0.01263% |
| 6 | 213385 | 1330 | 50 | 96.332% | 99.985% | 0.01545% |
| 7 | 213305 | 1081 | 48 | 95.750% | 99.981% | 0.01890% |
| 8 | 213225 | 878 | 45 | 95.081% | 99.977% | 0.02309% |
| 9 | 213145 | 714 | 43 | 94.312% | 99.972% | 0.02817% |
| 10 | 213066 | 580 | 41 | 93.432% | 99.966% | 0.03434% |

Less than 0.03% non-Cu radioisotopes ($^{56}$Co and $^{58}$Co) will be left in the copper fraction, assuming a product expiry time of 8 h post EoB. This value was lower than the limit allowed for Ga-68 cyclotron-produced as found in the Pharmacopeia (*0.1% at expiry for non-Ga radioisotopes):

The $^{64}$Cu originating from $^{nat}$Ni irradiation (content ~5% at expiry) will be the main impurity, reducing the radioisotopic purity of $^{61}$Cu product at longer irradiation times or shelf-life (illustrated as the grey curve in FIG. 19).

In Table 8: $^{60}$Ni/Nb Target coin—Analysis of $^{61}$Cu activity and purity after FASTlab purification. FIG. 19 shows the extrapolated radiocobalt activity content and $^{61}$Cu purity of the produced [$^{61}$Cu]CuCl$_2$ solution.

TABLE 8

$^{60}$Ni/Nb Target coin - Analysis of $^{61}$Cu activity
and purity in produced [$^{61}$Cu]CuCl$_2$ solution.

| Hours post EoB | Co species activity in Cu fraction [Bq] | $^{61}$Cu activity [MBq] | $^{64}$Cu activity [MBq] | % Purity $^{61}$Cu | % Purity PET nuclides $^{61}$Cu + $^{64}$Cu | % non-Cu radionuclides |
|---|---|---|---|---|---|---|
| 0 | 243275 | 17498 | 0.378 |  | 99.999% | 0.00139% |
| 1 | 243176 | 14217 | 0.358 | 99.996% | 99.998% | 0.00171% |
| 2 | 242977 | 11552 | 0.339 | 99.995% | 99.998% | 0.00210% |
| 3 | 242680 | 9386 | 0.321 | 99.994% | 99.997% | 0.00259% |
| 4 | 242285 | 7627 | 0.304 | 99.993% | 99.997% | 0.00318% |
| 5 | 241792 | 6197 | 0.288 | 99.991% | 99.996% | 0.00390% |
| 6 | 241201 | 5035 | 0.272 | 99.990% | 99.995% | 0.00479% |
| 7 | 240514 | 4091 | 0.258 | 99.988% | 99.994% | 0.00588% |
| 8 | 239731 | 3324 | 0.244 | 99.985% | 99.993% | 0.00721% |
| 9 | 238853 | 2701 | 0.231 | 99.983% | 99.991% | 0.00884% |
| 10 | 237882 | 2195 | 0.219 | 99.979% | 99.989% | 0.01084% |

Less than 0.01% non-Cu radioisotopes ($^{56}$Co and $^{58}$Co) were left in the Cu fraction, assuming a product expiry time of 8 h post EoB. This value was ten times lower than the allowed limit for $^{68}$Ga cyclotron-produced as found in the Pharmacopeia (0.1% at expiry for non-Ga radioisotopes*).

Less than 0.02% $^{64}$Cu was left in the copper fraction at an expiry time of 8 h post EoB, one hundred times lower than the specification required for $^{68}$Ga (2% Ga radioisotopes were allowed for $^{68}$Ga).

Purity of Produced [$^{61}$Cu]CuCl$_2$ from Ni/Nb Target Coins: Comparison with Commercially Available Radionuclides In Table 9, a comparison of the regulatory specifications on the purity of commercially available radionuclides were given along with the characteristics of the high purity [$^{61}$Cu]CuCl$_2$ produced from deuteron irradiation of natNi/Nb and enriched $^{60}$Ni/Nb target coin (50 µA, 3 h) after FASTlab purification are presented.

TABLE 9

Comparison between commercially available radionuclides and [$^{61}$Cu]CuCl$_2$ solution produced from irradiation of $^{nat}$Ni/Nb coins and enriched $^{60}$Ni/Nb coins.

| Radionuclide | % Purity at calibration | % Max radioisotopes of same element at calibration | % Max other radioisotopes at calibration | Dominant impurities | % Purity at expiry | % Max other radioisotopes at expiry |
|---|---|---|---|---|---|---|
| $^{111}$In | 99.93% | | 0.075% | $^{65}$Zn, $^{114m}$In | 99.85% | 0.15% |
| $^{18}$F | | | | $^{56}$Co | 99.90% | 0.10% |
| $^{18}$F | | | | $^{56}$Co | 99.99% | 0.01% |
| $^{8}$Ga cyclotron | 98% | 2% | 0.10% | | | |
| $^{68}$Ga generator | 99.90% | | 0.001% | $^{68}$Ge | | |
| $^{177}$Lu | 99.90% | 0.05% | | | | |
| $^{61}$Cu from $^{nat}$Ni | 97.27% (EoB + 4 h) | 3.16% | 0.013% | $^{56}$Co, $^{58}$Co | 95.08% (EoB + 8 h) | 5% |
| $^{61}$Cu from $^{60}$Ni | 99.99% (EoB + 4 h) | 0.009% | 0.004% | $^{56}$Co, $^{58}$Co | 99.98% (EoB + 8 h) | 0.02% |

As the first notable comparison, cyclotron production of $^{68}$Ga from proton irradiation also produces long lived radionuclides, (see, e.g., *Applied Radiation and Isotopes*, 65(10), 1101-1107, IAEA-TECDOC-1863 Gallium-68 Cyclotron Production)-notably $^{65}$Zn (half-life=244 days) from the $^{66}$Zn (p,pn)$^{65}$Zn decay. With a roughly 0.36500 of $^{66}$Zn in an enriched $^{68}$Zn starting target metal, about 770 Bq of $^{65}$Zn will be produced from a 50 µA, 3 h beam with an energy of 13 MeV in a thick target (TENDL-2019 based calculations). Using natural Zn with 27.7% abundancy in $^{66}$Zn, 58 kBq of $^{65}$Zn will be produced in one run of 50 µA for 3 h beam. The isotopic purity of Zn in the target metal is, thus, very important.

Similar with [$^{61}$Cu]CuCl$_2$ production, cyclotron production of [$^{64}$Cu]CuCl$_2$ from proton irradiation also produces long-lived cobalt radionuclides, namely, $^{55}$Co, $^{57}$Co, $^{58}$Co, and $^{60}$Co. (See, e.g., Nuclear Medicine & Biology, Vol. 24, pp. 35-43, 1997; Applied Radiation and Isotopes 68 (2010) 5-13) By operating with a degraded beam of below 13 MeV, $^{60}$Co (from $^{64}$Ni(p,na)$^{60}$Co) was reduced to 1 Bq per run of 50 µA, 3 h. With beam energies below 13 MeV, $^{55}$Co, formed from the $^{58}$Ni(p,a)$^{55}$Co reaction, will remain the main impurity (half-life=17.53 hours). The 170 Bq of the long-lived $^{57}$Co was formed in about 170 Bq in these conditions mostly from $^{60}$Ni(p,a)$^{57}$Co.

Note: These estimates were computed from thick target yields using TENDL-2019 cross section data and isotopic abundancy of enriched $^{64}$Ni as follows: 0.00376% $^{58}$Ni, 0.00298% $^{60}$Ni, 0.0058% $^{6}$Ni, 0.135% $^{62}$Ni, 99.858% $^{64}$Ni).

5. Conclusion

The experimental activities of $^{61}$Cu produced after deuteron irradiation are about 80% of the theoretical yield as calculated from TENDL-2019 cross section data.

The main long-lived nuclides in the radioactive waste fraction from cyclotron production of $^{61}$Cu are radiocobalt species of $^{56}$Co, $^{57}$Co, $^{58}$Co, and $^{60}$Co. After four years, $^{56}$Co, $^{57}$Co, and $^{58}$Co are calculated to have decayed below regulatory clearance limits, LL*, leaving only $^{60}$Co. *Clearance limits (LL) means the value corresponding to the specific activity level of a material below which handling of this material is no longer subject to mandatory licensing or supervision.

Target coins with 99% enriched $^{60}$Ni or $^{61}$Ni improved the yield and purity of the $^{61}$Cu product. Using these targets, the extrapolated purity of $^{61}$Cu was higher as $^{64}$Cu was not formed as a radioisotopic impurity. Additionally, the $^{56}$Co and $^{60}$Co contents were reduced by a factor of 100. $^{57}$Co amounts increased (but were in low activity), and $^{58}$Co amounts increased (but 1 decay below LL before $^{56}$Co/$^{58}$Co).

Example 5: Radiolabeling

[$^{61}$Cu]Cu-NODAGA-1 and [$^{61}$Cu]Cu-NODAGA-3

An aliquot of conjugate (3-6 nmol, 1 mg/mL in water) was diluted in 0.25-0.30 mL of ammonium (or sodium) acetate (0.5 M pH 8), followed by the addition of 0.1-0.7 mL [$^{61}$Cu]CuCl$_2$ in 0.05 M HCl (70-240 MBq). The reaction mixture was incubated for 15 min at room temperature (approx. 20-25° C.). The pH of the reaction was between 5 and 6. Quality control was performed on a reverse-phase high performance liquid chromatography (RP-HPLC) connected to a radio-detector (radio-HPLC). Phenomenex Jupiter Proteo C12 (90 Å, 250×4.6 mm) column using the gradient 15-80% B in 8 min (A=H$_2$O [0.10% TFA], B=ACN [0.1% TFA]) with a flow rate of 1 mL/min. The results of the radio-HPLC are provided in Table 10 below.

[$^{61}$Cu]Cu-NODAGA-2 and [$^{61}$Cu]Cu-NODAGA-4

$^{61}$Cu-labeled conjugates were prepared by incubating 1.5-3 nmol of the corresponding conjugate (as a 1 mg/mL solution) in 125-300 µL of ammonium acetate (0.5 M, pH 8) with 50-200 µL of [$^{61}$Cu]CuCl$_2$ in 0.05 M HCl (33-70 MBq). A pH check was performed in order to guarantee the necessary conditions for the reaction (pH≥5). The reaction mixture was incubated for 10 min at room temperature. Quality control and stability studies were performed by Radio-HPLC on a Shimadzu SCL-40 connected to a GABI radioactivity-HPLC-flow-monitor 7-spectrometer (Elysiaraytest, Straubenhardt, Germany). Radioligands were analyzed using Phenomenex Jupiter Proteo C12 (90 Å, 250×4.6 mm) column using the gradient 15-80% B in 8 min (A=H$_2$O [0.1% TFA], B=ACN [0.1% TFA]) with a flow rate of 1 mL/min. The results are shown in Table 10.

TABLE 10

Radiochemical purity and retention time
(tR) of the $^{61}$Cu-labeled conjugates

| Radiotracer | Radiochemical purity | $t_R$ (min) |
|---|---|---|
| [$^{61}$Cu]Cu-NODAGA-1 | ≥98% | 5.9 ± 0.2 |
| [$^{61}$Cu]Cu-NODAGA-2 | ≥98% | 6.1 ± 0.2 |
| [$^{61}$Cu]Cu-NODAGA-3 | ≥97% | 5.7 ± 0.2 |
| [$^{61}$Cu]Cu-NODAGA-4 | ≥98% | 6.4 ± 0.2 |
| [$^{61}$Cu]Cu -NODAGA-FAPI-46 | ≥95% | 5.7 ± 0.2 |

All conjugates were labeled with $^{61}$Cu in very high yield and purity. No further purification step was necessary to remove uncomplexed $^{61}$Cu from the reaction mixture, allowing direct us e of the formed radiotracer.

Example 6: Partition Coefficient (Log D)

Figure 1:
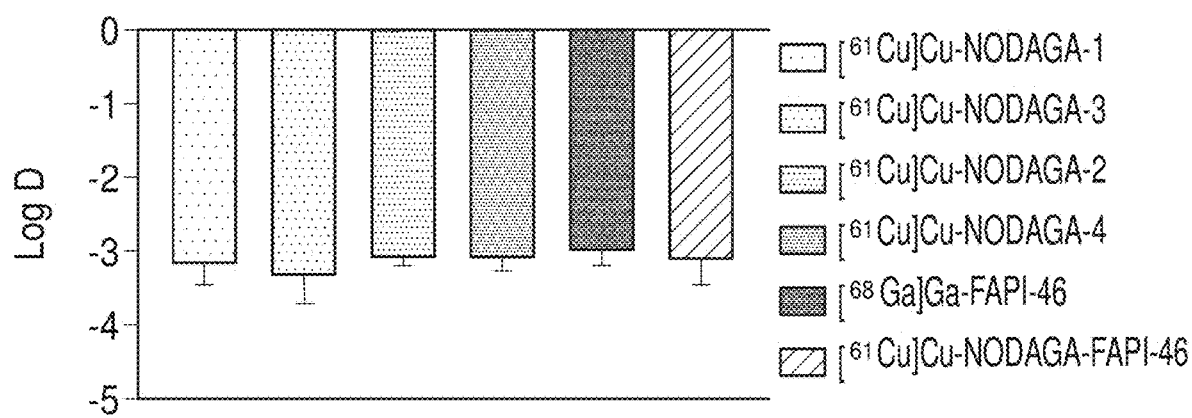
FIG. 1 shows the partition coefficient (log $D_{PBS/octanol,\ pH=7.4}$) of $^{61}$Cu or $^{68}$Ga-labeled conjugates. From left to right: [$^{61}$Cu]Cu-NODAGA-1, [$^{61}$Cu]Cu-NODAGA-3, [$^{61}$Cu]Cu-NODAGA-2, [$^{61}$Cu]Cu-NODAGA-4, [$^{68}$Ga]Ga-FAPI-46, and [$^{61}$Cu]Cu-NODAGA-FAPI-46.

The lipophilic/hydrophilic character of the radiotracers was assessed by the determination of the distribution coefficient (D), expressed as log D (pH=7.4), between an aqua and an organic phase following the "shake-flask" method. In a pre-lubricated Eppendorf tube, a pre-saturated mixture of 500 µL of 1-octanol and 500 µL of PBS pH 7.4 (phosphate-buffered saline) were added. An aliquot of 10 µmol in 10 µL of the radioligand was added to this mixture, shaken for 30 min, and then centrifuged at 3000 rcf for 10 min to achieve phase separation. Aliquots of 100 µL were removed from the 1-octanol and from the PBS phases, and the activity was measured in a γ-counter. The partition coefficient was calculated as the average log ratio value of the radioactivity in the organic fraction and PBS fraction. The results are presented in Table 11 and in FIG. 1.

TABLE 11

Lipophilicity expressed as the log distribution coefficient
D (log D$_{O/PBS\ pH\ 7.4}$) of $^{61}$Cu-labeled conjugates versus
$^{68}$Ga-labeled conjugates (reference radiotracers).

| Radiotracer | log D$_{(O/PBS\ pH\ 7.4)}$ |
|---|---|
| [$^{61}$Cu]Cu-NODAGA-1 | −3.17 ± 0.28 |
| [$^{61}$Cu]Cu-NODAGA-3 | −3.32 ± 0.39 |
| [$^{61}$Cu]Cu-NODAGA-2 | −3.09 ± 0.08 |
| [$^{61}$Cu]Cu-NODAGA-4 | −3.12 ± 0.16 |
| [$^{61}$Cu]Cu-NODAGA-FAPI-46 | −3.10 ± 0.34 |
| [$^{68}$Ga]Ga-FAPI-46 | −3.01 ± 0.18 |

Results are means ± standard deviation from a minimum of two separate experiments, each in triplicates.

Example 7: In Vitro hFAP Inhibition Assay

Figure 2:
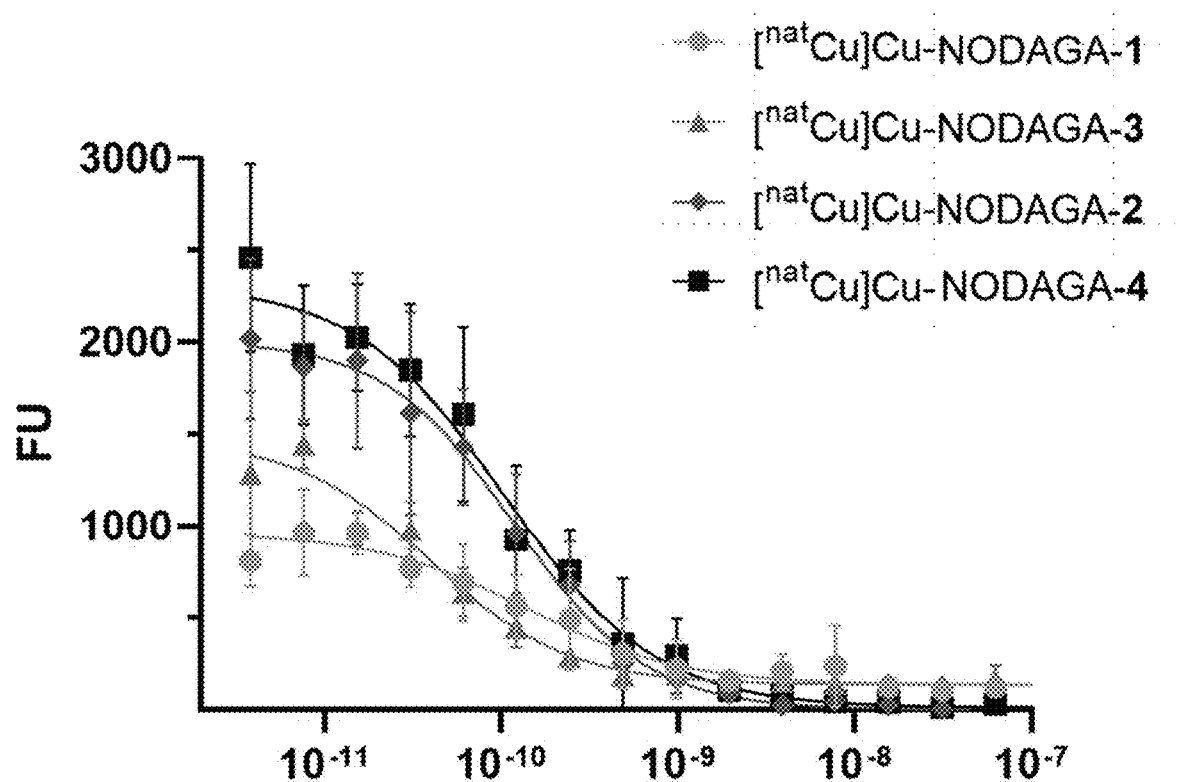
FIG. 2 shows the inhibition (IC$_{50}$) of $^t$Cu-labeled conjugates.

The enzymatic activity of hFAP on the substrate Z-Gly-Pro-AMC was measured at room temperature on a microtiter plate reader, monitoring the fluorescence at an excitation wavelength of 360 nm and an emission wavelength of 465 nm. The assay was performed by mixing the substrate (20 µM), hFAP (200 pM, constant), and the inhibitors in assay buffer (50 mM Tris, 1 M NaCl, 1 mg/mL BSA, pH=7.5), with serial dilution of the inhibitors ranging from 250 nM to 2 fM, 1:2 in a total volume of 20 µL. FAPI-46 was used as positive control. Experiments were performed in triplicate, and the mean fluorescence values were fitted using Graph Pad Pri-sm 9 (equation used: Y=Bottom+(Top−Bottom)/(1+((X^HillSlope)/(IC50^HillSlope)))). The IC50 value is defined as the concentration of inhibitor required to reduce the enzyme activity by 50% after the addition of the substrate. The results are presented in Table 12 and FIG. 2.

TABLE 12

In Vitro Inhibition Assay

| Compound | IC$_{50}$ (pM) | 95% CI (pM) |
|---|---|---|
| [$^{nat}$Cu]Cu- NODAGA-1 | 141.3 | 71.9 to 230.0 |
| [$^{nat}$Cu]Cu-NODAGA-3 | 40.1 | 26.2 to 54.4 |
| [$^{nat}$Cu]Cu-NODAGA-2 | 120.5 | 88.0 to 157.8 |
| [$^{nat}$Cu]Cu-NODAGA-4 | 105.1 | 63.3 to 149.4 |

Example 8: In Vitro Cellular Uptake $^{61}$Cu-NODAGA-1 and $^{61}$Cu-NODAGA-3

The cellular uptake was studied in vitro using intact cells seeded in 6-well plates overnight. On the day of the experiment, the cells were washed and incubated with each $^{61}$Cu-labeled conjugate at different time points, either alone or in the presence of a blocking agent to distinguish between specific and non-specific uptake. At each investigated time point, the medium containing the unbound (free) radiotracer was removed, followed by two washing steps with ice-cold phosphate-buffered saline. The cells were then treated 2×5 min with ice-cold glycine solution (0.05 M, pH 2.8) to detach the cell surface-bound radiotracer (acid released). Afterwards, the cells containing the internalized radiotracer were detached with 1 M NaOH at 37° C. and collected for measurement. The amount of specific cell surface-bound and internalized radiotracer is expressed as percentage of the total applied activity, after subtracting the non-specific values. [$^{61}$Cu]Cu-NODAGA-1, [$^{61}$Cu]Cu-NODAGA-3 and [$^{61}$Cu]Cu-NODAGA-FAPI-46 (0.2 nM) were assessed in HT-1080.hFAP (FAP-positive) and HT-1080.wt (FAP-negative) cells. Internalization and cell surface-bound fractions for the tested radiotracers are reported in Table 13. The values are expressed as % of the applied activity and refer to the specific uptake calculated after subtracting the non-specific values (measured in the presence of the non-FAP expressing cell line HT-1080.wt) from the total values (specific=total−non-specific).

TABLE 13

Cellular uptake and distribution

| Time Point [min] | [$^{61}$Cu]Cu-NODAGA-1 | [$^{61}$Cu]Cu-NODAGA-2 | [$^{61}$Cu]Cu-NODAGA-3 | [$^{61}$Cu]Cu-NODAGA-4 | [$^{61}$Cu]Cu-NODAGA-FAPI-46 |
|---|---|---|---|---|---|
| Cell surface fraction | | | | | |
| 15 | 1.2 ± 0.3 | 1.2 ± 0.6 | 0.9 ± 0.3 | 1.0 ± 0.7 | 0.9 ± 0.3 |
| 60 | 1.4 ± 0.3 | 1.4 ± 0.5 | 1.2 ± 0.4 | 1.4 ± 0.4 | 1.2 ± 0.4 |
| 240 | 1.3 ± 0.2 | 1.3 ± 0.5 | 1.4 ± 0.4 | 0.9 ± 0.6 | 1.7 ± 0.4 |

TABLE 13-continued

| | Cellular uptake and distribution | | | | |
|---|---|---|---|---|---|
| Time Point [min] | [$^{61}$Cu]Cu-NODAGA-1 | [$^{61}$Cu]Cu-NODAGA-2 | [$^{61}$Cu]Cu-NODAGA-3 | [$^{61}$Cu]Cu-NODAGA-4 | [$^{61}$Cu]Cu-NODAGA-FAPI-46 |
| | Internalized fraction | | | | |
| 30 | 26.2 ± 3.5 | 20.7 ± 5.5 | 26.6 ± 4.9 | 22.2 ± 7.4 | 24.3 ± 2.3 |
| 60 | 29.9 ± 1.8 | 27.0 ± 6.9 | 36.9 ± 5.3 | 22.2 ± 5.1 | 36.1 ± 1.6 |
| 240 | 29.3 ± 1.8 | 28.3 ± 7.5 | 39.4 ± 4.8 | 17.4 ± 4.4 | 50.0 ± 6.0 |

[$^{61}$Cu]Cu-NODAGA-2 and [$^{61}$Cu]Cu-NODAGA-4

Upon thawing, HT-1080.hFAP (FAP-positive), HT-1080.wt (FAP-negative), HEK-293.hFAP and HEK-293.wt cells were kept in culture in MEM medium supplemented with fetal bovine serum (10%, FBS) and Penicillin-Streptomycin (1%) at 37° C. and 5% $CO_2$. For passaging, cells were detached using Trypsin-EDTA 0.05% when reaching 90% confluency and re-seeded at a dilution of 1:4/1:12 (HT-1080) or 1:10/1:20 (HEK-293).

HT-1080.hFAP and HT-1080.wt cells were seeded in a 24-well plate at a concentration of $1.8 \times 10^5$ cells/well in 400 µL of medium 24 hours before the experiment. The cells were then preconditioned in 360 µL of assay medium (MEM medium without supplements) at 37° C. for 60 min. 40 µL of a 2 nM solution of $^{61}$Cu-labeled radioligand was added and the cells were incubated at 37° C. The cellular uptake was interrupted at different time points (15 min, 1 hour and 4 hours), by washing twice with ice-cold PBS. Cell surface-bound radioligand was obtained by washing cells twice with ice-cold glycine buffer (pH 2.8), followed by a collection of the internalized fraction with 1 M NaOH. The activity in each fraction was measured in a γ-counter (Cobra II). The results are expressed as a percentage of the applied radioactivity, after subtracting the non-specific uptake in the HT-1080.wt cells (FIGS. 3 and 4).

The $^{61}$Cu-labeled FAP radiotracers were fast and almost entirely internalized on cell expressing the human FAP at 37° C., with only a negligible amount remaining on the cell surface (cell membrane).

Example 9: Saturation Binding Experiment

Cell Membrane Preparation: HEK-293.hFAP cells were grown to confluence, mechanically disaggregated, washed with PBS (pH 7.4) and re-suspended in 20 mM of homogenization Tris buffer (pH 7.5) containing 1.3 mM EDTA, 0.25 M sucrose, 0.7 mM bacitracin, 5 µM soybean trypsin inhibitor, and 0.7 mM PMSF. The cells were homogenized using Ultra-Turrax, and the homogenized suspension was centrifuged at 500×g for 10 min at 4° C. The supernatant was collected in centrifuge tubes (Beckman Coulter Inc., Brea, CA, USA). This procedure was then repeated 5 times. The collected supernatant was centrifuged in an ultra-centrifuge (Beckman) at 4° C. for 55 min at 49,000×g. Then, the pellet was re-suspended in 10 mM ice-cold HEPES buffer (pH 7.5), aliquoted, and stored at −80° C. The protein concentration of those membrane suspensions was determined by the Bradford method, BSA as the standard.

Saturation Experiment: The association profiles of $^{61}$Cu-labeled radioligands were studied at different concentrations, ranging from 0.075 to 50 nM, in HEK-293.hFAP cell membranes at 37° C. Each assay tube contained 170 µL of binding buffer (20 mM HEPES, pH 7.4, containing 4 mM MgCl2, 0.2% BSA, 20 mg/L bacitracin, 20 mg/L PMSF and 200,000 KIU/L aprotinin). The incubation was initiated by adding 30 µL of radioligand solution at 10 times the final concentration and 100 µL of cell membrane suspension to yield 10 µg of protein per well. For the determination of the non-specific binding, 140 µL of the above binding buffer was added along with 30 µL of FAPI-46 to obtain (0.1 mM). Bound fractions were plotted versus the corresponding radioligand concentration at equilibrium. The dissociation constant (KD) and maximal binding capacity (Bmax) values were calculated using GraphPad Software Inc., Prism 7, San Diego, CA, USA (Table 14 and FIG. 5).

TABLE 14

| In Vitro Saturation Binding | | |
|---|---|---|
| Compound | $B_{max}$ | $K_D$ (nM) |
| [$^{61}$Cu]Cu-NODAGA-1 | 8.6-9.2 | 1.7-2.2 |
| [$^{61}$Cu]Cu-NODAGA-3 | 7.3-8.1 | 1.2-1.8 |
| [$^{61}$Cu]Cu-NODAGA-2 | 7.7-8.4 | 1.4-2.0 |
| [$^{61}$Cu]Cu-NODAGA-4 | 9.1-9.8 | 3.0-3.9 |
| [$^{61}$Cu]-NODAGA-FAPI-46 | 9.0-10.3 | 2.3-3.8 |

Example 10: Mice Studies

All animal experiments were conducted in accordance with Swiss animal welfare laws and regulations under the license number 30515 granted by the Veterinary Office (Department of Health) of the Canton Basel-Stadt.

Tumor Implantation: Female athymic nude-Foxn1nu/Foxn1+ mice (Envigo, The Netherlands), 4-6 weeks old, were injected subcutaneously with $5\text{-}10\times10^6$ of HT-1080.hFAP cells suspended in 100 µL of PBS on the right shoulder or on the right flank, while $5\text{-}10\times10^6$ HT-1080.wild-type cells suspended in 100 µL of PBS were injected on the contralateral shoulder or flank. The tumors were allowed to grow to an average volume of 100-200 mm$^3$.

Biodistribution Studies: The xenografted mice were randomized (n=5 per group) and injected intravenously via the tail vein with the $^{61}$Cu-labeled radioligands (100 µL, 500 µmol, 0.8-1 MBq). Mice were euthanized 1 h and 4 h p.i. by $C_{O2}$ asphyxiation. Organs of interest and blood were collected, rinsed of excess blood, blotted dry, weighed, and counted in a γ-counter. The samples were counted against a suitably diluted aliquot of the injected solution as the standard and the results are expressed as the percentage of the injected activity per gram of tissue (% I.A./g) SD. Results are shown in Table 15A-B and FIGS. 6-11.

TABLE 15A

Biodistribution data

| Organ | [61Cu]Cu-NODAGA-1 | | [61Cu]Cu-NODAGA-2 | |
|---|---|---|---|---|
| | 1 hour | 4 hours | 1 hour | 4 hours |
| Blood | 2.3 ± 0.1 | 1.2 ± 0.3 | 1.2 ± 0.1 | 0.5 ± 0.1 |
| Heart | 1.2 ± 0.3 | 0.7 ± 0.1 | 0.6 ± 0.1 | 0.3 ± 0.0 |
| Lung | 1.8 ± 0.0 | 0.8 ± 0.2 | 0.8 ± 0.1 | 0.4 ± 0.0 |
| Liver | 1.5 ± 0.0 | 1.0 ± 0.2 | 0.6 ± 0.1 | 0.6 ± 0.1 |
| Pancreas | 2.5 ± 0.3 | 1.4 ± 0.2 | 1.1 ± 0.2 | 0.5 ± 0.0 |
| Spleen | 0.8 ± 0.1 | 0.5 ± 0.1 | 0.4 ± 0.1 | 0.2 ± 0.0 |
| Stomach | 1.1 ± 0.2 | 0.7 ± 0.1 | 0.6 ± 0.1 | 0.3 ± 0.1 |
| Intestine | 1.7 ± 0.4 | 1.1 ± 0.4 | 0.5 ± 0.1 | 0.3 ± 0.1 |
| Adrenal | 2.3 ± 0.5 | 1.4 ± 0.2 | 1.5 ± 0.3 | 0.3 ± 0.1 |
| Kidneys | 2.4 ± 0.3 | 1.5 ± 0.5 | 1.1 ± 0.1 | 1.0 ± 0.1 |
| Muscle | 2.6 ± 0.7 | 1.3 ± 0.1 | 0.9 ± 0.1 | 0.4 ± 0.1 |
| Femur | 10.9 ± 1.1 | 4.2 ± 1.5 | 2.4 ± 0.3 | 1.6 ± 0.3 |
| HT-1080.hFAP | 12.6 ± 1.5 | 7.1 ± 3.0 | 3.5 ± 1.0 | 4.0 ± 0.6 |
| HT-1080.wt | 4.5 ± 0.6 | 2.1 ± 0.5 | 1.4 ± 0.2 | 0.9 ± 0.1 |
| Tumor mass | 0.1 ± 0.0 | 0.2 ± 0.2 | 0.4 ± 0.1 | 0.3 ± 0.1 |

TABLE 15B

Biodistribution data

| Organ | [61Cu]Cu-NODAGA-3 | | [61Cu]Cu-NODAGA-4 | | [61Cu]Cu-NODAGA-FAPI-46 | |
|---|---|---|---|---|---|---|
| | 1 hour | 4 hours | 1 hour | 4 hours | 1 hr | 4 hours |
| Blood | 1.7 ± 0.1 | 0.9 ± 0.0 | 1.4 ± 0.1 | 0.4 ± 0.1 | 2.6 ± 0.1 | 1.5 ± 0.1 |
| Heart | 0.7 ± 0.1 | 0.5 ± 0.0 | 0.6 ± 0.0 | 0.2 ± 0.0 | 1.1 ± 0.0 | 0.7 ± 0.1 |
| Lung | 1.2 ± 0.1 | 0.7 ± 0.1 | 0.9 ± 0.1 | 0.3 ± 0.0 | 1.5 ± 0. | 1.0 ± 0.1 |
| Liver | 0.9 ± 0.1 | 0.7 ± 0.1 | 0.6 ± 0.1 | 0.4 ± 0.0 | 0.9 ± 0.0 | 0.8 ± 0.2 |
| Pancreas | 1.6 ± 0.2 | 0.9 ± 0.0 | 1.1 ± 0.1 | 0.4 ± 0.1 | 2.0 ± 0.2 | 1.6 ± 0.1 |
| Spleen | 0.5 ± 0.1 | 0.3 ± 0.0 | 0.4 ± 0.0 | 0.2 ± 0.0 | 0.7 ± 0.1 | 0.5 ± 0.1 |
| Stomach | 0.8 ± 0.1 | 0.5 ± 0.0 | 0.5 ± 0.0 | 0.2 ± 0.0 | 1.0 ± 0.1 | 0.6 ± 0.1 |
| Intestine | 0.8 ± 0.2 | 0.4 ± 0.1 | 0.5 ± 0.2 | 0.3 ± 0.1 | 1.0 ± 0.4 | 0.6 ± 0.2 |
| Adrenal | 2.1 ± 0.6 | 1.4 ± 0.3 | 1.1 ± 0.2 | 0.5 ± 0.1 | 2.2 ± 0.1 | 2.0 ± 0.2 |
| Kidneys | 1.6 ± 0.3 | 1.0 ± 0.2 | 1.8 ± 0.2 | 1.1 ± 0.1 | 1.5 ± 0.1 | 1.0 ± 0.1 |
| Muscle | 2.1 ± 0.8 | 1.1 ± 0.1 | 0.8 ± 0.2 | 0.4 ± 0.1 | 1.7 ± 0.1 | 1.4 ± 0.2 |
| Femur | 5.4 ± 1.2 | 3.7 ± 0.3 | 3.2 ± 0.8 | 1.2 ± 0.1 | 6.5 ± 0.4 | 4.6 ± 0.4 |
| HT-1080.hFAP | 7.9 ± 0.9 | 6.4 ± 2.0 | 7.4 ± 1.6 | 3.0 ± 0.8 | 8.4 ± 1.4 | 7.7 ± 0.4 |
| HT-1080.wt | 4.0 ± 2.2 | 1.8 ± 0.3 | 1.7 ± 0.2 | 0.6 ± 0.0 | 3.1 ± 0.0 | 2.5 ± 0.2 |
| Tumor mass | 0.1 ± 0.0 | 0.1 ± 0.1 | 0.3 ± 0.1 | 0.3 ± 0.1 | 0.1 ± 0.0 | 0.2 ± 0.0 |

[61Cu]Cu-NODAGA-1, [61Cu]Cu-NODAGA-2, [61Cu]Cu-NODAGA-3, [61Cu]Cu-NODAGA-4, and [61Cu]Cu-NODAGA-1 showed high accumulation in FAP-positive (HT-1080.hFAP) tumor and murine-FAP-positive tissues, such as the bone marrow (bones).

PET/CT Imaging: Mice bearing FAP-positive and FAP-negative xenografts were injected intravenously with $^{61}$Cu-labeled radioligands of the present disclosure or [61Cu]Cu-NODAGA-FAPI-46 (100 μL/500 μmol/6-12 MBq). Mice were anesthetized with 1.5% isoflurane and dynamic PET scans were acquired during 1 hour upon injection of the radiotracer. The mice were euthanized by CO2 at 4 hours p.i., and static PET scans were acquired for 30 min.

PET/CT images were acquired using β-CUBE PET scanner system (Molecubes, Gent, Belgium), with a spatial resolution of 0.85 mm and an axial field-of-view of 13 cm. Dynamic PET scans were acquired for 60 min. All PET scans were decay corrected and reconstructed into a 192×192×384 matrix by an ordered subsets maximization expectation (OSEM) algorithm using 30 iterations, a voxel size of 400×400×400 μm a 15 min per frame. CT data was used to apply attenuation correction on the PET data. The CT was imaged supine, head first, using the NanoSPECT/CT™ scanner (Bioscan Inc.). Topograms and helical CT scans of the whole mouse were first acquired using the following parameters: X-ray tube current: 177 μA, X-ray tube voltage 45 kVp, 90 seconds and 180 frames per rotation, pitch 1. CT images were reconstructed using CTReco (version r1.146), with a standard filtered back projection algorithm (exact cone beam) and post-filtered (RamLak, 100% frequency cut-off), resulting in a pixel size of 0.2 mm. Co-registered PET/CT images were visualized using maximum intensity projection (MIP) with VivoQuant software (version 4.0). (FIGS. 12-15, and FIG. 24).

Remaining PET activity in the mouse body 4 h p.i. prior to the 4 h scan was determined (Table 16). [61Cu]Cu-NODAGA-FAPI-46 and [61Cu]Cu-NODAGA-1 showed the highest retention in the body, while [61Cu]Cu-NODAGA-4 presented the lowest value. Due to the physical characteristic of the radionuclide, [$^{68}$Ga]Ga-FAPI-46 was not evaluated 4 h p.i.

TABLE 16

In Vitro PET Remaining Activity

| | Injected Activity (MBq) | Activity left after 4 h (MBq) | Percentage of activity left |
|---|---|---|---|
| [$^{61}$Cu] Cu-NODAGA-1 | 10.07 | 1.85 | 18.4% |
| [$^{61}$Cu]Cu-NODAGA-3 | 7.65 | 0.86 | 11.2% |
| [$^{61}$Cu] Cu-NODAGA-2 | 12.12 | 1.31 | 10.8% |
| [$^{61}$Cu]Cu-NODAGA-4 | 10.34 | 0.76 | 7.4% |
| [$^{61}$Cu]Cu-NODAGA-FAPI-46 | 7.25 | 1.34 | 18.9% |
| [$^{68}$Ga] Ga-FAPI-46 | 12.23 | / | / |

7. EQUIVALENTS AND INCORPORATION BY REFERENCE

While the provided disclosure has been particularly shown and described with reference to a preferred embodiment and various alternate embodiments, it will be understood by persons skilled in the relevant art that various changes in form and details can be made therein without departing from the spirit and scope of the provided disclosure.

All references, issued patents, and patent applications cited within the body of the instant specification, are hereby incorporated by reference in their entirety, for all purposes. In particular, U.S. Provisional Patent Application Nos. 63/409,684 (filed Sep. 23, 2022); 63/409,687 (filed Sep. 23, 2022); 63/416,479 (filed Oct. 14, 2022); 63/520,329 (filed Aug. 17, 2023); and 63/520,323 (filed Aug. 17, 2023) are hereby incorporated by reference in their entirety. Additionally, the following U.S. non-provisional patent applications, concurrently filed with the present application, are also incorporated by reference in their entirety:

the application titled "SOLID TARGET SYSTEMS FOR THE PRODUCTION OF HIGH PURITY RADIONUCLIDE COMPOSITIONS" filed Sep. 25, 2023, U.S. patent appliction Ser. No. 18/474,211; and the application titled "HIGH PURITY COPPER RADIOPHARMACEUTICAL COMPOSITIONS AND DIAGNOSTIC AND THERAPEUTIC USES THEREOF" filed Sep. 25, 2023, U.S. patent application Ser. No. 18/474,218.

What is claimed is:
1. A compound, wherein the compound is of Formula I:

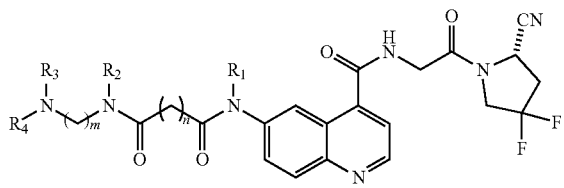

(I)

wherein:
$R^1$ is $R^a$;
$R^2$ and $R^3$ are each $R^a$ or together form a $C_{2-9}$ heterocycle with the nitrogen atoms to which they are attached;

$R^4$ is -L-T;
$R^a$, independently for each occurrence, is selected from H, $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl, wherein each $C_{1-10}$ alkyl, $C_{2-10}$ alkenyl, $C_{3-10}$ alkynyl, $C_{3-10}$ cycloalkyl, $C_{6-10}$ aryl, $C_{2-9}$ heterocyclyl, or $C_{5-9}$ heteroaryl is optionally substituted by one or more substituents selected from —OH, —OR', =O, =S, —SH, —SR', —NH$_2$, —NHR', —N(R') 2, —NHCOR', —NR'COR', halogen, —CN, —CO$_2$H, —CO$_2$R', —CHO, —COR', —CONH$_2$, —CONHR', —CON(R') 2, —NO$_2$, —OP(O) (OH) 2, —SO$_3$H, —SO$_3$R', —SOR', and —SO$_2$R', wherein R', independently for each occurrence, is $C_{1-10}$ alkyl or $C_{3-10}$ cycloalkyl;

L is a bond or a divalent linker,
T comprises (a) a chelating moiety suitable for chelating a radionuclide, (b) an imaging agent, or (c) a drug;
n is an integer from 1 to 20; and
m is an integer from 1 to 20;
or is a pharmaceutically acceptable salt thereof.

2. The compound of claim 1, wherein $R^1$ is methyl or H.
3. The compound of claim 1, wherein $R^2$ is H and $R^3$ is H.
4. The compound of claim 1, wherein $R^2$ and $R^3$ together form a $C_{2-9}$ heterocycle with the nitrogen atoms to which they are attached.
5. The compound of claim 4, wherein the $C_{2-9}$ heterocycle is a 6-membered heterocycle selected from a piperazine, hexahydropyrimidine, hexahydropyridazine, 1,2,3-triazinane, 1,2,4-triazinane, and 1,3,5-triazinane.
6. The compound of claim 1, wherein L is a divalent linker selected from an acid-labile linker, a hydrolysis-labile linker, an enzymatically cleavable linker, a reduction labile linker, a self-immolative linker, and a non-cleavable linker.
7. The compound of claim 1, wherein T comprises a chelating moiety suitable for chelating a radionuclide.
8. The compound of claim 7, wherein the chelating moiety is chelated to a radionuclide, and the radionuclide is selected from alpha radiation emitting isotopes, beta radiation emitting isotopes, gamma radiation emitting isotopes, Auger electron emitting isotopes, X-ray emitting isotopes, and fluorescence emitting isotopes.
9. The compound of claim 7, wherein the radionuclide is selected from $^{225}$Ac, $^{51}$Cr, $^{66}$Ga, $^{67}$Ga, $^{68}$Ga, [$^{18}$F]AlF, $^{111}$In, $^{113m}$In, $^{52m}$Min, $^{99m}$Tc, $^{186}$Re, $^{188}$Re, $^{139}$La, $^{140}$La, $^{175}$Yb, $^{179}$Yb, $^{153}$Sm, $^{177m}$Sn, $^{166}$Ho, $^{86}$Y, $^{88}$Y, $^{90}$Y, $^{149}$Pm, $^{165}$Dy, $^{169}$Er, $^{177}$Lu, $^{52}$Fe, $^{43}$Sc, $^{44}$Sc, $^{46}$Sc, $^{47}$Sc, $^{142}$Pr, $^{157}$Gd, $^{159}$Gd, $^{212}$Bi, $^{213}$Bi, $^{72}$As, $^{77}$As, $^{97}$Ru, $^{109}$Pd, $^{105}$Rh, $^{101m}$Rh, $^{119}$Sb, $^{197}$Hg, $^{151}$Eu, $^{153}$Eu, $^{169}$Eu, $^{201}$Tl, $^{149}$Tb, $^{152}$Tb, $^{155}$Tb, $^{161}$Tb, $^{203}$Pb, $^{212}$Pb, $^{151}$Pm, $^{153}$Pm, $^{142}$Pr, $^{143}$Pr, $^{55}$Co, $^{60}$Cu, $^{61}$Cu, $^{62}$Cu, $^{64}$Cu, $^{67}$Cu, $^{62}$Zn, $^{188}$Re, $^{198}$Au, $^{199}$Au, $^{227}$Th, $^{111}$Ag, $^{199}$Ag, $^{211}$At, $^{223}$Ra, $^{88}$Zr, and $^{89}$Zr.
10. The compound of claim 9, wherein the radionuclide is selected from $^{61}$Cu, $^{64}$Cu, and $^{67}$Cu.
11. The compound of claim 7, wherein the chelating moiety is selected from DOTAGA (1,4,7,10-tetraazacyclododecane, 1-(glutaric acid)-4,7,10-triacetic acid), DOTA (1,4,7,10-tetraazacyclododecane-1,4,7,10-tetraacetic acid), DOTASA (1,4,7,10-tetraazacyclododecane-1-(2-succinic acid)-4,7,10-triacetic acid), CB-DO2A (10-bis (carboxymethyl)-1,4,7, 10-tetraazabicyclo [5.5.2] tetradecane), DEPA (7-[2-(Bis-carboxymethylamino)-ethyl]-4,10-bis-carboxymethyl-1,4,7, 10-tetraaza-cyclododec-1-yl-acetic acid)), 3p-C-DEPA (2-[(carboxymethyl)] [5-(4-nitrophenyl-1-[4,7,10-tris (carboxymethyl)-1,4,7,10-tetraazacyclododecan-1-yl] pentan-2-yl) amino] acetic acid)), TCMC (2-(4- isothiocyanotobenzyl)-1,4,7, 10-tetraaza-1,4,7,10-tetra-(2-carbamonyl methyl)-cyclododecane), oxo-DO3A (1-oxa-4,7,10-triazacyclododecane-5-S-(4-isothiocyanatobenzyl)-4,7,10-triacetic acid), p-NH$_2$-Bn-Oxo-DO3A (1-Oxa-4,7,10-tetraazacyclododecane-5-S-(4-aminobenzyl)-4,7,10-triacetic acid), TE2A ((1,8-N,N'-bis-(carboxymethyl)-1,4,8,11-tetraazacyclotetradecane), MM-TE2A, DM-TE2A, CB-TE2A (4,11-bis (carboxymethyl)-1,4,8,11-tetraazabicyclo [6.6.2] hexadecane), CB-TE1A1P (4,8,11-tetraazacyclotetradecane-1-(methanephosphonic acid)-8-(methanecarboxylic acid), CB-TE2P (1,4,8,11-tetraazacyclotetradecane-1,8-bis (methanephosphonic acid), TETA (1,4,8,11-tetraazacyclotetradecane-1,4,8, 11-tetraacetic acid), NOTA (1,4,7-triazacyclononane-N,N',N"-triacetic acid), NODA (1,4,7-triazacyclononane-1,4-diacetate), NODAGA (1,4,7-triazacyclononane-1-glutaric acid-4,7-acetic acid) (also known as NOTAGA), NODA Deferoxamine (1,4,7-triazacyclononane-1,4-diyl) diacetic acid DFO), NETA ([4~ [2-(bis-carboxymethylamino)-ethyl]-7-carboxymethl-[1,4,7]triazonan-1-yl}-acetic acid), TACN-TM (N,N',N", tris (2-mercaptoethyl)-1,4,7-triazacyclononane), Diamsar (1,8-Diamino-3,6,10, 13,16, 19-hexaazabicyclo (6,6,6) eicosane, 3,6, 10, 13, 16, 19-Hexaazabicyclo[6.6.6] eicosane-1,8-diamine), Sarar (1-N-(4-aminobenzyl)-3, 6,10,13, 16, 19-hexaazabicyclo [6.6.6] eicosane-1,8-diamine), AmBaSar (4-((8-amino-3,6,10,13,16,19-hexaazabicyclo [6.6.6] icosane-1-ylamino) methyl) benzoic acid), and 4,4'-((3,6,10, 13,16, 19-hexaazabicyclo [6.6.6] ico-sane-1,8-diylbis (azanediyl)) bis(methylene) dibenzoic acid (BaBaSar).

12. The compound of claim 1, wherein T comprises an imaging agent, wherein the imaging agent comprises a radionuclide or a fluorescent dye.

13. The compound of claim 1, wherein T comprises a drug, wherein the drug comprises a chelating moiety chelated to a radionuclide.

14. The compound of claim 1, wherein the compound is of Formula Ia or Formula (Ib):

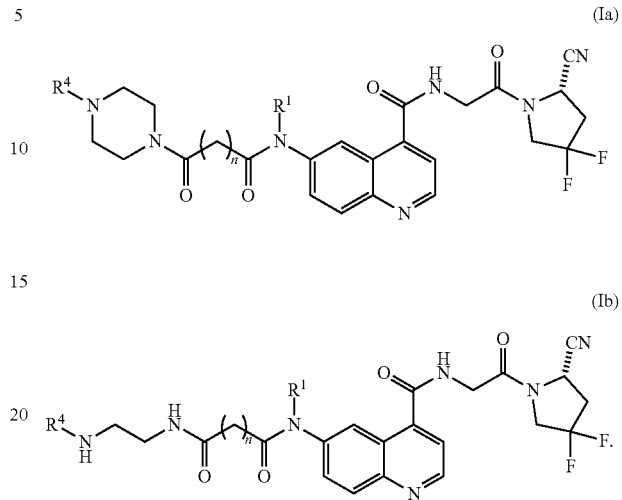

(Ia)

(Ib)

15. The compound of claim 14, wherein R$^1$ is H or methyl.

16. The compound of claim 15, wherein T comprises a chelating moiety chelated to a radionuclide, wherein the chelating moiety is selected from DOTAGA, DOTA, NOTA, NODAGA, and NODA; and the radionuclide is selected from $^{61}$Cu, $^{64}$Cu, and $^{67}$Cu.

17. The compound of claim 1, wherein the compound is selected from:

| Compound | Structure |
| --- | --- |
| *Cu-NODAGA-1 | |

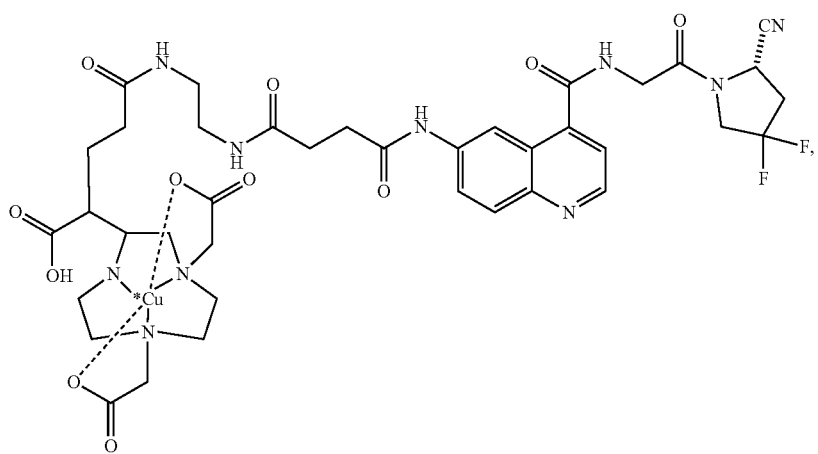

| Compound | Structure |
|---|---|
| *Cu-NODAGA-2 | 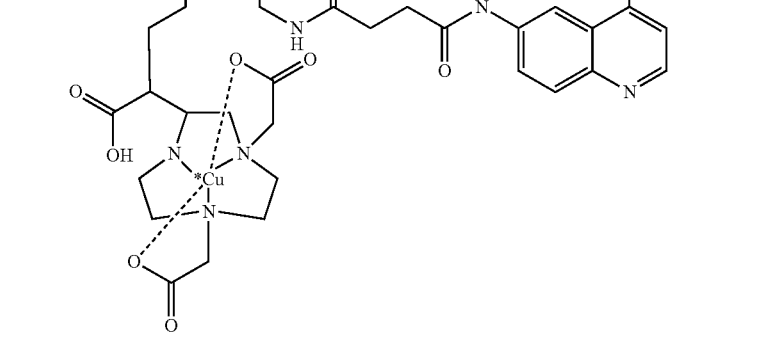 |
| *Cu-NODAGA-3 | 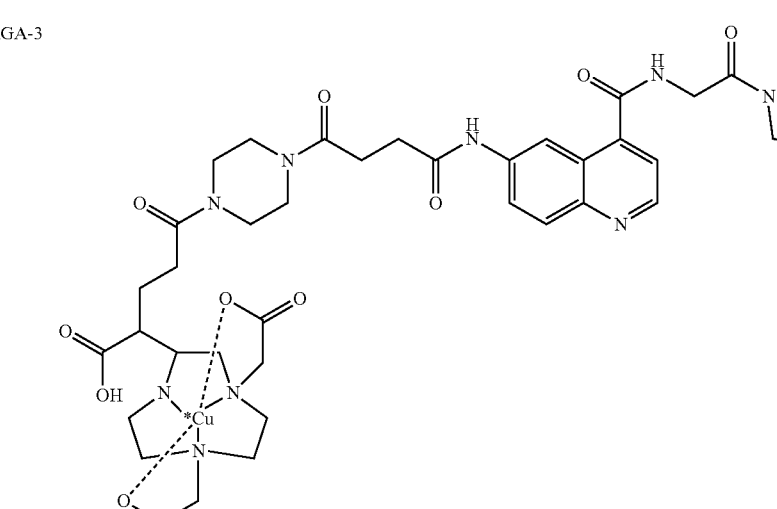 and |
| *Cu-NODAGA-4 | 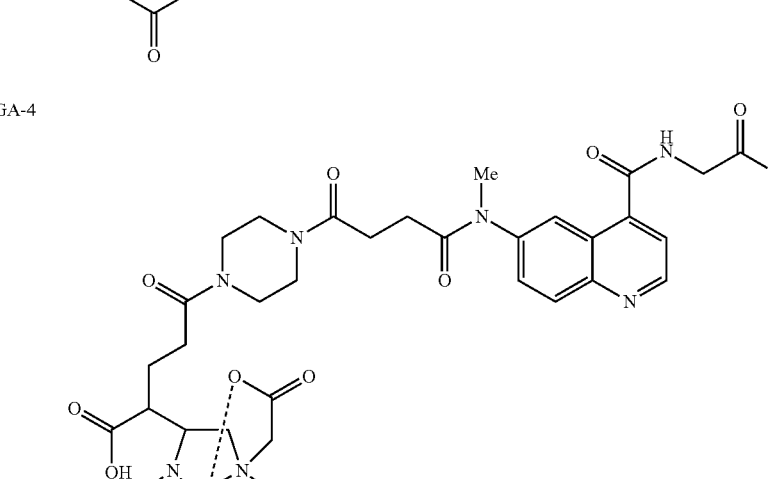 |

18. A pharmaceutical composition comprising a compound of claim 1 and a pharmaceutically acceptable excipient.

19. A method of generating one or more images of a subject comprising:
administering to a subject an effective amount of a compound of Formula Ia or Formula Ib:

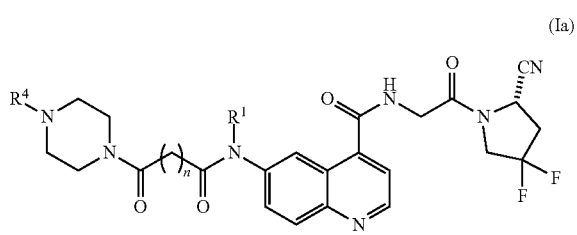

wherein:
n is an integer from 1 to 20;
$R^1$ is H or $C_{1-10}$ alkyl; and
$R^4$ is-L-T, wherein L is a bond and T comprises a chelating moiety chelated to a radionuclide, wherein the chelating moiety is selected from DOTAGA, DOTA, NOTA, NODAGA, and NODA, and the radionuclide is selected from $^{61}$Cu and $^{64}$Cu; and
generating one or more images of at least a part of the subject's body.

20. The method of claim 19, wherein the image is generated using positron emission tomography (PET), PET-computer tomography (PET-CT), or single-photon emission computerized tomography (SPECT).

21. The method of claim 19, wherein the method further comprises determining the presence or absence of a disease in a subject based on the presence or absence of localization of the radionuclide in the one or more images of the subject's body.

22. The method of claim 21, wherein the disease is selected from a cancer, inflammatory disease, infectious diseases, and immune disease.

23. The method of claim 22, wherein the disease is a cancer, and the cancer is selected from breast cancer, pancreatic cancer, small intestine cancer, colon cancer, gastric cancer, rectal cancer, lung cancer, head and neck cancer, ovarian cancer, hepatocellular carcinoma, epithelial cancer, esophageal cancer, hypopharynx cancer, nasopharynx cancer, larynx cancer, myeloma cells, bladder cancer, cholangiocellular carcinoma, clear cell renal carcinoma, neuroendocrine tumor, oncogenic osteomalacia, sarcoma, CUP, thymus carcinoma, desmoid tumors, glioma, astrocytoma, cervix carcinoma, and prostate cancer.

24. The method of claim 22, wherein the disease is selected from cardiovascular diseases, liver fibrosis and cirrhosis, arthritic disorders, IgG4-related disease, pulmonary fibrosis and interstitial lung disease, Crohn's disease, tuberculosis, sarcoidosis, and periprosthetic joint infections.

25. The method of claim 19, wherein the compound is selected from $^{61}$[Cu] Cu-NODAGA-1, $^{61}$[Cu] Cu-NODAGA-2, $^{61}$[Cu] Cu-NODAGA-3, and $^{61}$[Cu]Cu-NODAGA-4.

26. The compound of claim 1, wherein the compound is

NODAGA-1

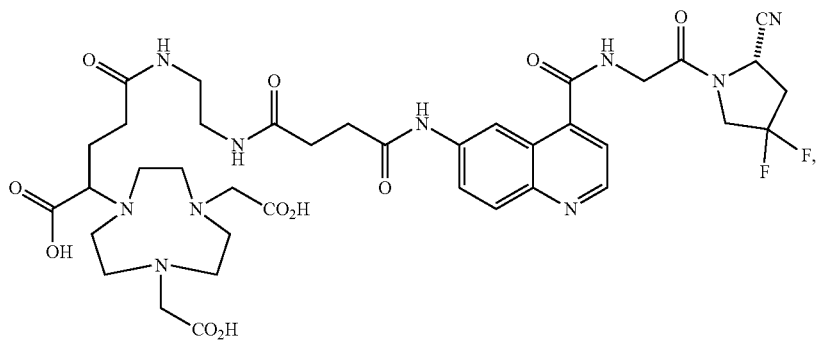 [SMILES: N#C[C@@H]1CC(F)(F)CN1C(=O)CNC(=O)c1ccnc2ccc(NC(=O)CCC(=O)NCCNC(=O)CCC(C(=O)O)N3CCN(CC(=O)O)CCN(CC(=O)O)CC3)cc12]

or is a pharmaceutically acceptable salt thereof.

27. The compound of claim 1, wherein the compound is
NODAGA-2
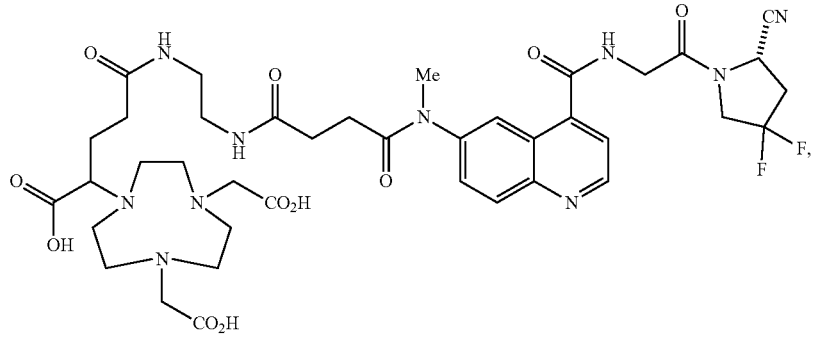 [SMILES: CN(C(=O)CCC(=O)NCCNC(=O)CCC(C(=O)O)N1CCN(CC(=O)O)CCN(CC(=O)O)CC1)c1ccc2nccc(C(=O)NCC(=O)N3CC(F)(F)C[C@H]3C#N)c2c1]
or is a pharmaceutically acceptable salt thereof.
28. The compound of claim 1, wherein the compound is
NODAGA-3
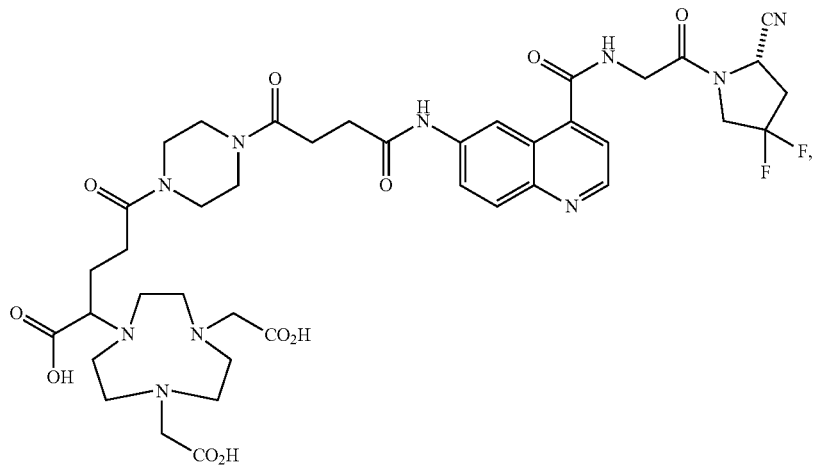 [SMILES: N#C[C@@H]1CC(F)(F)CN1C(=O)CNC(=O)c1ccnc2ccc(NC(=O)CCC(=O)N3CCN(C(=O)CCC(C(=O)O)N4CCN(CC(=O)O)CCN(CC(=O)O)CC4)CC3)cc12]
or is a pharmaceutically acceptable salt thereof.
29. The compound of claim 1, wherein the compound is
NODAGA-4
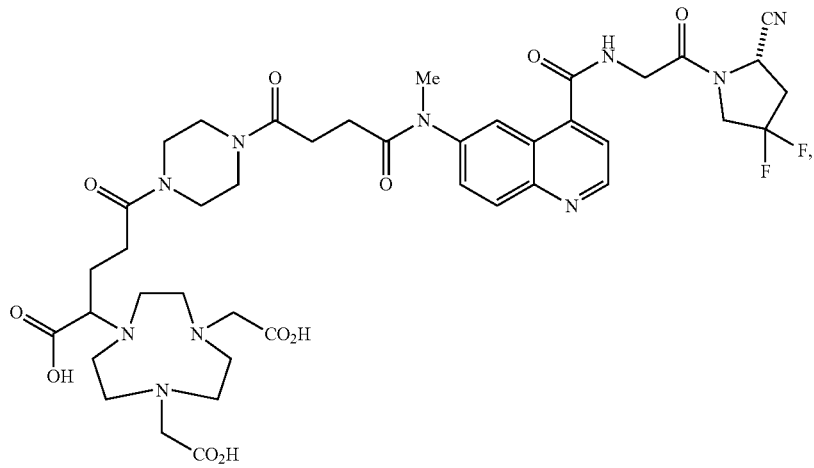 [SMILES: CN(C(=O)CCC(=O)N1CCN(C(=O)CCC(C(=O)O)N2CCN(CC(=O)O)CCN(CC(=O)O)CC2)CC1)c1ccc2nccc(C(=O)NCC(=O)N3CC(F)(F)C[C@H]3C#N)c2c1]
or is a pharmaceutically acceptable salt thereof.

30. The compound of claim 1, wherein the compound is
*Cu-NODAGA-1
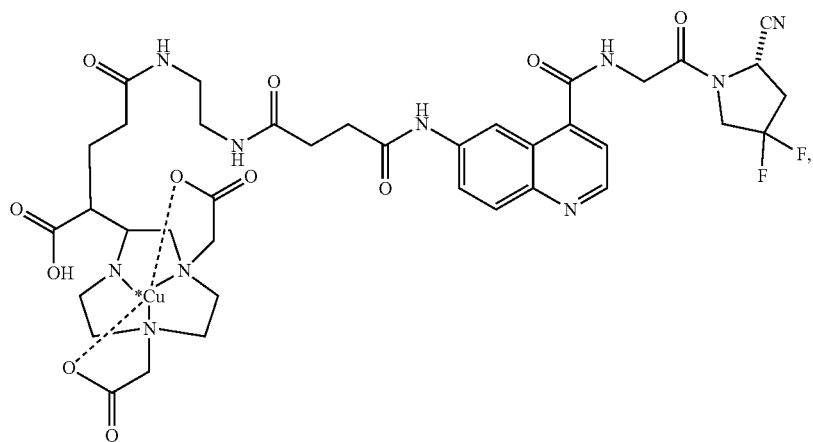
or is a pharmaceutically acceptable salt thereof, wherein *Cu is $^{61}$Cu.
31. The compound of claim 1, wherein the compound is
*Cu-NODAGA-2
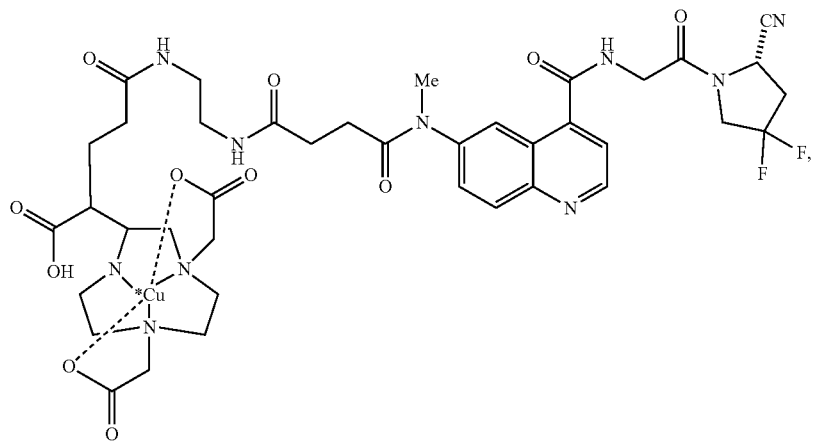

or is a pharmaceutically acceptable salt thereof, wherein
 *Cu is $^{61}$Cu.
32. The compound of claim 1, wherein the compound is
*Cu-NODAGA-3
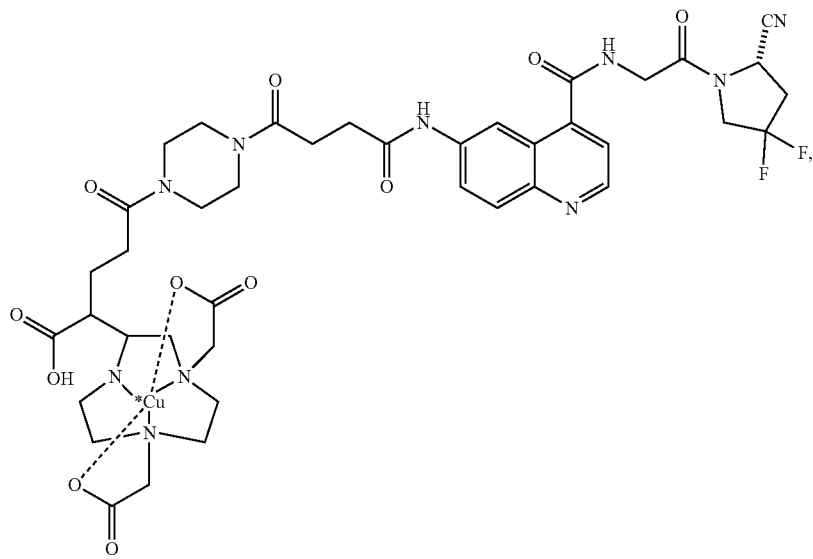
and
or is a pharmaceutically acceptable salt thereof, wherein
 *Cu is $^{61}$Cu.
33. The compound of claim 1, wherein the compound is
*Cu-NODAGA-4
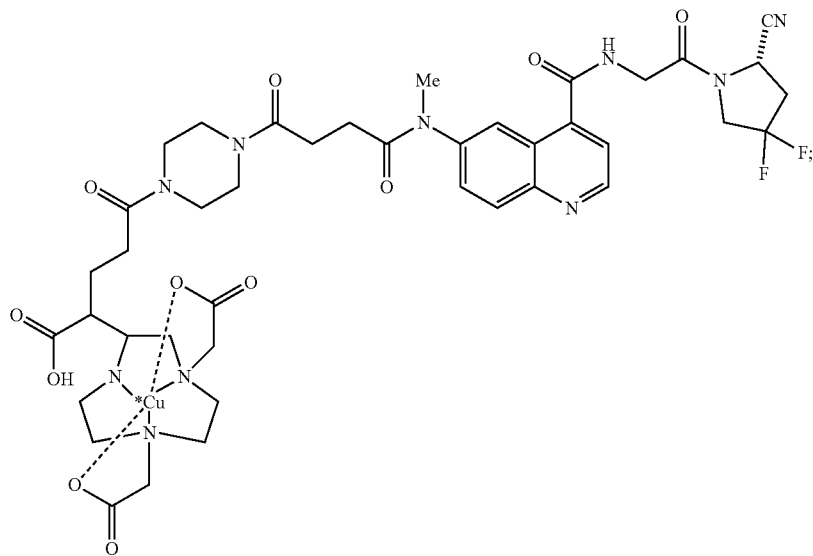

or is a pharmaceutically acceptable salt thereof, wherein
*Cu is $^{61}$Cu.

\* \* \* \* \*